United States Patent
Takahashi et al.

(10) Patent No.: US 8,054,494 B2
(45) Date of Patent: *Nov. 8, 2011

(54) IMAGE FORMING SYSTEM, METHOD AND PROGRAM OF CONTROLLING IMAGE FORMING SYSTEM, AND STORAGE MEDIUM

(75) Inventors: Hiroyuki Takahashi, Kanagawa (JP); Nao Nagashima, Kanagawa (JP); Kazuhiko Ushiyama, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 125 days.

This patent is subject to a terminal disclaimer.

(21) Appl. No.: 12/483,079

(22) Filed: Jun. 11, 2009

(65) Prior Publication Data

US 2009/0244620 A1   Oct. 1, 2009

Related U.S. Application Data

(63) Continuation of application No. 10/809,517, filed on Mar. 26, 2004, now Pat. No. 7,567,360.

(30) Foreign Application Priority Data

| Mar. 27, 2003 | (JP) | 2003-088349 |
| Mar. 27, 2003 | (JP) | 2003-088350 |
| Mar. 2, 2004  | (JP) | 2004-057836 |
| Mar. 2, 2004  | (JP) | 2004-057837 |

(51) Int. Cl.
G06F 15/00 (2006.01)
G06F 15/16 (2006.01)

(52) U.S. Cl. ...................................... 358/1.15; 709/203

(58) Field of Classification Search ............... 358/1.15, 358/1.16, 1.14, 1.13, 1.18, 448, 402, 467; 715/740, 771; 709/202, 203, 225, 219; 399/18, 399/70

See application file for complete search history.

(56) References Cited

U.S. PATENT DOCUMENTS 5,642,208 A   6/1997   Takahashi et al.   ............ 358/501
(Continued)

FOREIGN PATENT DOCUMENTS

JP   7-168482   7/1995
(Continued)

OTHER PUBLICATIONS

Japanese Office Action issued in the counterpart application No. 2004-057837 dated Oct. 19, 2010—3 pages.

(Continued)

*Primary Examiner* — Saeid Ebrahimi Dehkordy
(74) *Attorney, Agent, or Firm* — Fitzpatrick, Cella, Harper & Scinto

(57) ABSTRACT

In order to implement and manage an optimal system in the printing business and POD market, in an image forming system which comprises a plurality of devices including at least one of an image forming device which can print data in a storage unit that can store data of a plurality of jobs including data of a first job and data of a second job which is input after the data of the first job, and a sheet processing device which can execute a sheet process for a sheet printed by the image forming device, a schedule associated with a plurality of work flows including a first work flow that includes a plurality of process steps using a plurality of devices of the image forming system required to complete the first job, and a second work flow that includes a plurality of process steps using a plurality of devices of the image forming system required to complete the second job can be set.

15 Claims, 68 Drawing Sheets

U.S. PATENT DOCUMENTS

| | | | |
|---|---|---|---|
| 6,031,631 A | 2/2000 | Tahara et al. | 358/296 |
| 6,281,983 B1 | 8/2001 | Takahashi et al. | 358/1.2 |
| 6,438,574 B1 | 8/2002 | Nagashima | 709/102 |
| 7,567,360 B2 * | 7/2009 | Takahashi et al. | 358/1.15 |
| 2002/0054314 A1 | 5/2002 | Takahashi | 358/1.13 |
| 2002/0057455 A1 | 5/2002 | Gotoh et al. | 358/1.15 |
| 2002/0118387 A1 | 8/2002 | Patton | 358/1.15 |
| 2002/0145750 A1 | 10/2002 | Honda et al. | 358/1.15 |
| 2005/0097232 A1 | 5/2005 | Sasaki et al. | 710/8 |
| 2005/0264832 A1 * | 12/2005 | Baum et al. | 358/1.2 |

FOREIGN PATENT DOCUMENTS

| | | |
|---|---|---|
| JP | 10-233864 A | 9/1998 |
| JP | 11-202577 | 7/1999 |
| JP | 2000-163176 A | 6/2000 |
| JP | 2000-214905 | 8/2000 |
| JP | 2002-215350 A | 8/2002 |
| JP | 2002-297849 | 10/2002 |
| JP | 2003-29956 | 1/2003 |
| JP | 2003-036162 A | 2/2003 |
| JP | 2003-60832 | 2/2003 |
| JP | 2003-122538 A | 4/2003 |

OTHER PUBLICATIONS

Japanese Office Action dated Dec. 1, 2009, regarding Application No. 2004-057836.

* cited by examiner

```
[DESCRIPTION OF R901]
Char_color={0.0, 0.0, 0.0, 1.0}              ← L911
string1="ABC" ;                              ← L912
put_char (0.0, 0.0, 0.2, 0.3, string1) ;     ← L913

[DESCRIPTION OF R902]
line_color={1.0, 0.0, 0.0, 0.0}              ← L921
put_line (0.9, 0.0, 0.9, 0.1) ;              ← L922

[DESCRIPTION OF R903]
image1={CMYK, 8, 5, C0, M0, Y0, K0,          ← L931
                    C1, M1, Y1, K1, C24, M24, Y24, K24} ;
put_image (0.0, 0.5, 0.5, 0.5, image1) ;     ← L932
```

LINEAR GAMMA TABLE G0

PRINTER OUTPUT CHARACTERISTICS Gp OF MFP 104a

GAMMA TABLE Ga FOR MFP 104a

GAMMA TABLE Gb FOR MFP 104b

IN CASE OF COLOR SCANNER :

IN CASE OF MONOCHROME SCANNER :

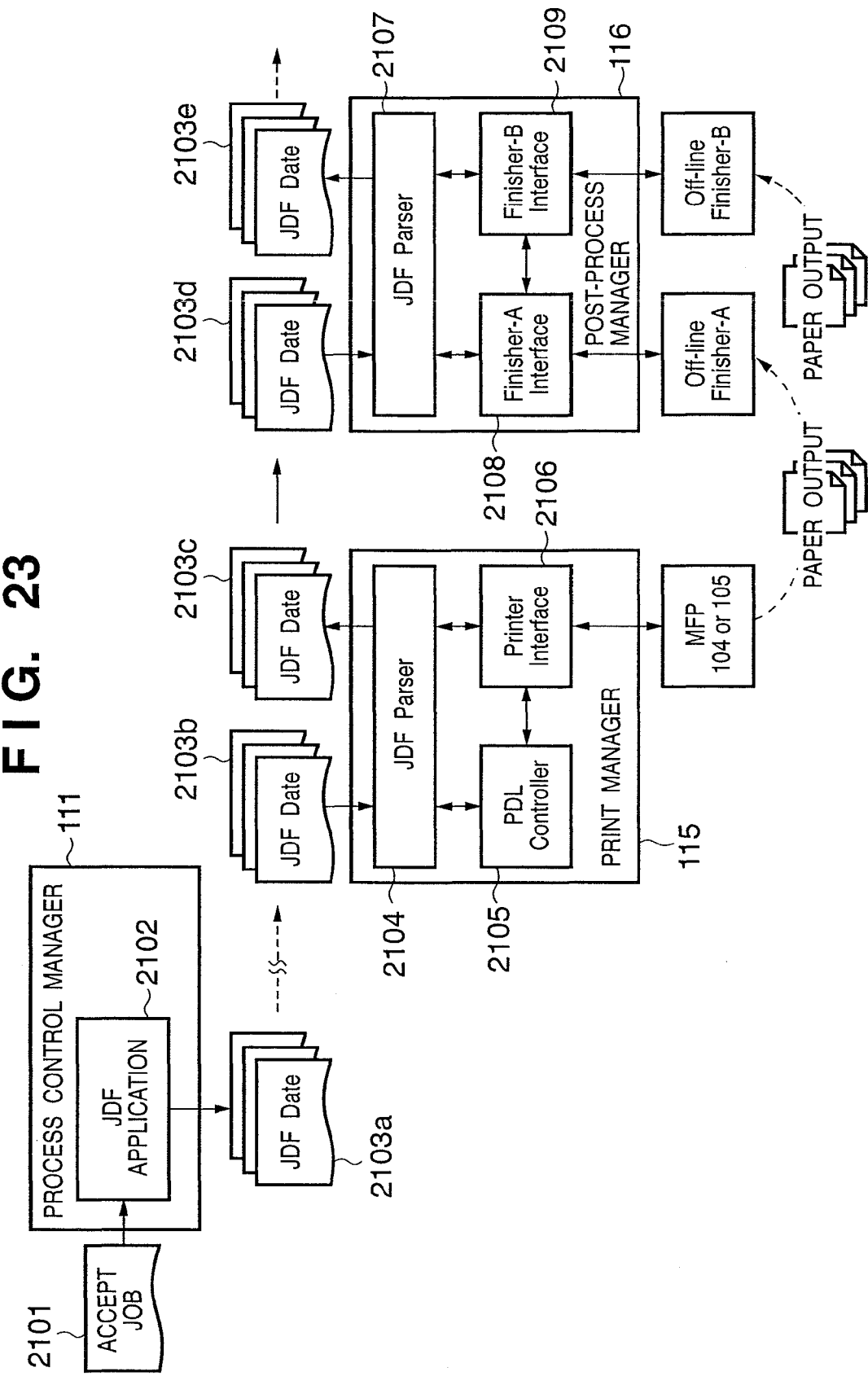

FIG. 25

Web Browser

File | Edit | View | Tool | Help

Previous | Next | Stop | Refresh | Home | Search | Print

Address: http://www.****.com/~userid/customerinfo.htm — 2201

| Customer Info | Document Info | Job Info | Finishing Info | Proof & Archive | Delivery Info |

2202 — Document Info
2203 — (Customer Info tab)
2204 — Finishing Info
2205 — Proof & Archive
2206 — Delivery Info Name
Company
Address1
Address2
City
State
Zip
Country
Phone
Fax
Email Next — 2209
Cancel — 2210

FIG. 27

Web Browser

File  Edit  View  Tool  Help

Previous  Next  Stop  Refresh  Home  Search  Print

Address http://www.***.com/~userid/jobinfo.htm

| Customer Info | Document Info | Job Info | Finishing Info | Proof & Archive | Delivery Info |

2201  2202  2203  2204  2205  2206

Copies : 100

Paper Size : A4 ▶

Media Type : Plain Paper ▶

Color / B&W : ⊙ Color  ○ B&W  ○ Mixed

Duplex : Off ▶

Orientation : Printer's Default ▶

Page List : All ▶

Imposition : None ▶

N-up : 4 up ▶

Detail — 2207    Previous — 2208    Next — 2209    Cancel — 2210

FIG. 29

Web Browser

File  Edit  View  Tool  Help

Previous  Next  Stop  Refresh  Home  Search  Print

Address: http://www.****.com/~userid/proofarchiveinfo.htm — 2202

2201

| Customer Info | Document Info | Job Info | Finishing Info | Proof & Archive | Delivery Info |

2203  2204  2205  2206

Proof Printing:

ON ▶ — 2220

Methods:
● Thumbnail on web site — 2221
● PDF file on ftp site — 2222
○ PDF file by E-mail (less than 1MB) — 2223
○ PDF file in CD-ROM by post — 2224

Comments:

Methods:
● PDL File
● Printer Ready File

Archive Directory:

Restore:
● Re-Print
● Re-RIP

Restore Job Number:

[Detail] — 2207

[Previous] — 2208    [Next] — 2209    [Cancel] — 2210

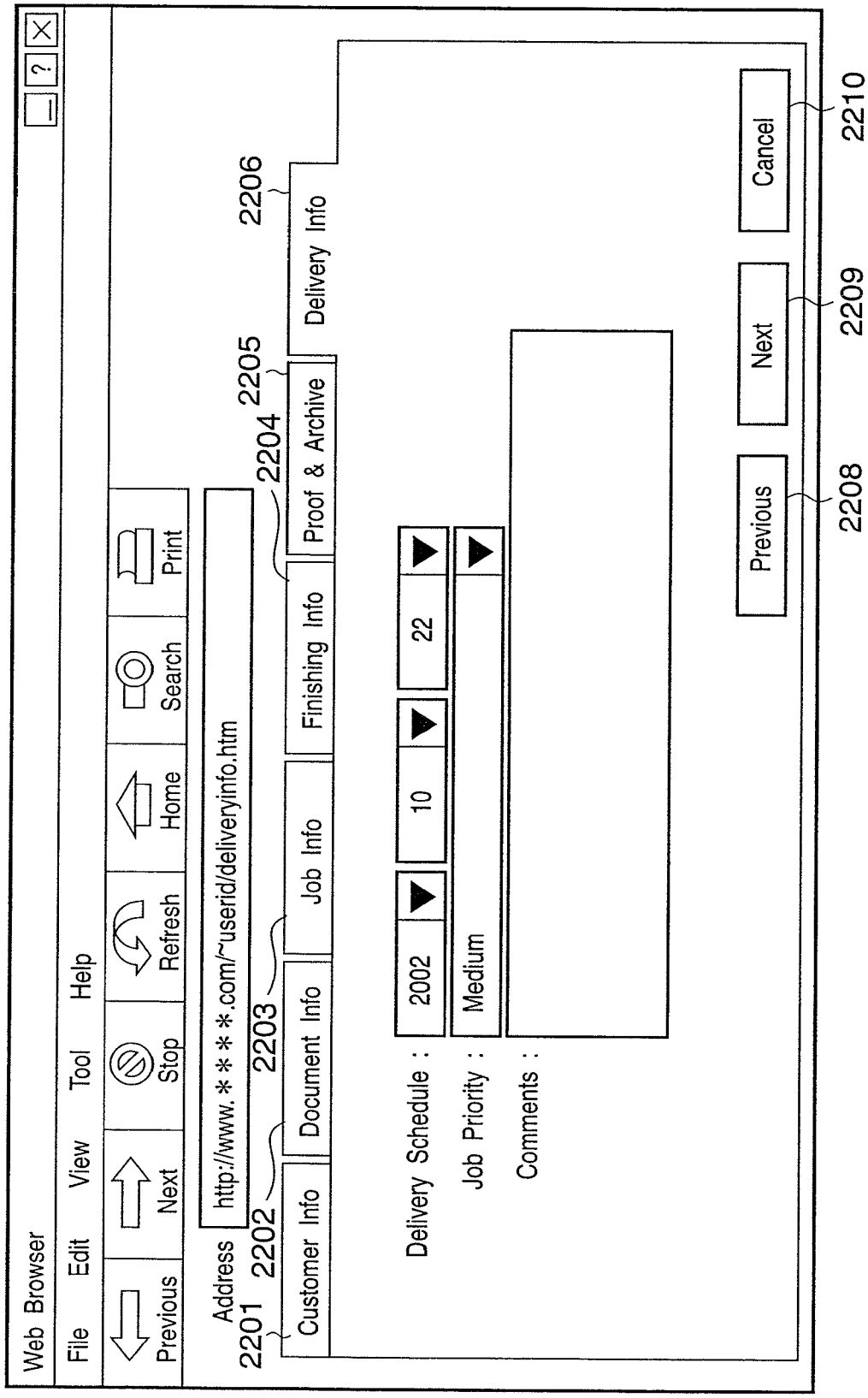

FIG. 31

| | Price | Qty. | Cost | Notes |
|---|---|---|---|---|
| Document | | | | |
| Proof Print | | | | |
| Printing | | | | |
| Finishing | | | | |
| Delivery | | | | |
| Others | | | | |
| Total | | | | |

- 2211 — OK
- 2210 — Cancel
- 2208 — Previous

FIG. 37

Web Browser

File  Edit  View  Tool  Help

Previous  Next  Stop  Refresh  Home  Search  Print

Address: http://www.****.com/~userid/proofarchiveinfo.htm 2201  2202  2203

| Customer Info | Document Info | Job Info | Finishing Info | Proof & Archive | Delivery Info |

2204  2205  2206

Proof Printing:
ON  ▶ 2220

Methods:
- ⦿ Thumbnail on web site ~2221
- ⦿ PDF file on ftp site ~2222
- ○ PDF file by E-mail (less than 1MB) ~2223
- ○ CD-ROM by post ~2224
- ○ Print Output by Post ~2901
- ○ Visit Customer Site ~2902
- ○ Others ~2903

Comments:
[Detail] ~2207

Methods:
- ○ PDL File
- ⦿ Printer Ready File

Archive Directory:

Restore:
- ○ Re-Print
- ○ Re-RIP

Restore Job Number:

[Previous] 2208   [Next] 2209   [Cancel] 2210

FIG. 43

| | MFP104 | MFP105a | MFP105b | MFP105c |
|---|---|---|---|---|
| | Ready | Ready | Paper Jam | Printing |
| Drawer 1 | A4 | A4 500 | A4 1000 | A4 200 |
| Drawer 2 | LTR | LTR 300 | LTR 300 | LTR 500 |
| Drawer 3 | 11×17 | 11×17 200 | 11×17 200 | 11×17 0 |
| Drawer 4 | A3 | A3 0 | A3 450 | A3 300 |
| Drawer 5 | | | A4 1000 | A4 1000 |
| Drawer 6 | | | LTR 800 | LTR 700 |
| Accessories | Stapler Feeder | Saddle, Stapler Inserter | Saddle, Stapler | Saddle, Stapler Inserter |
| | Detail | Detail | Detail | Detail |

FIG. 56

FIG. 66
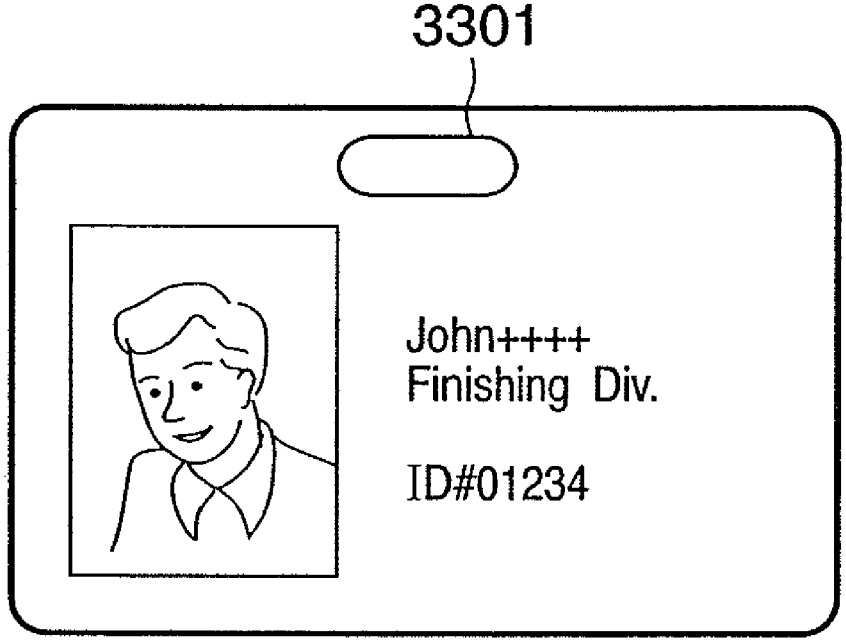
3301
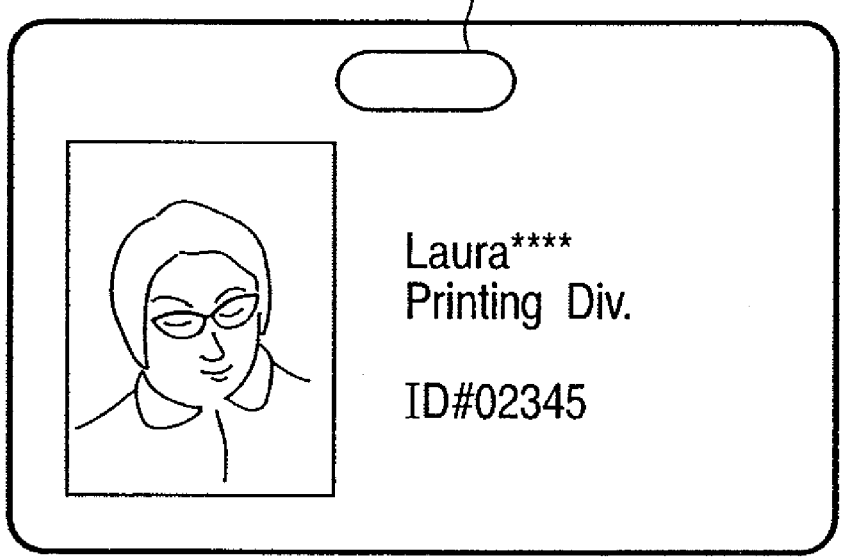
3302

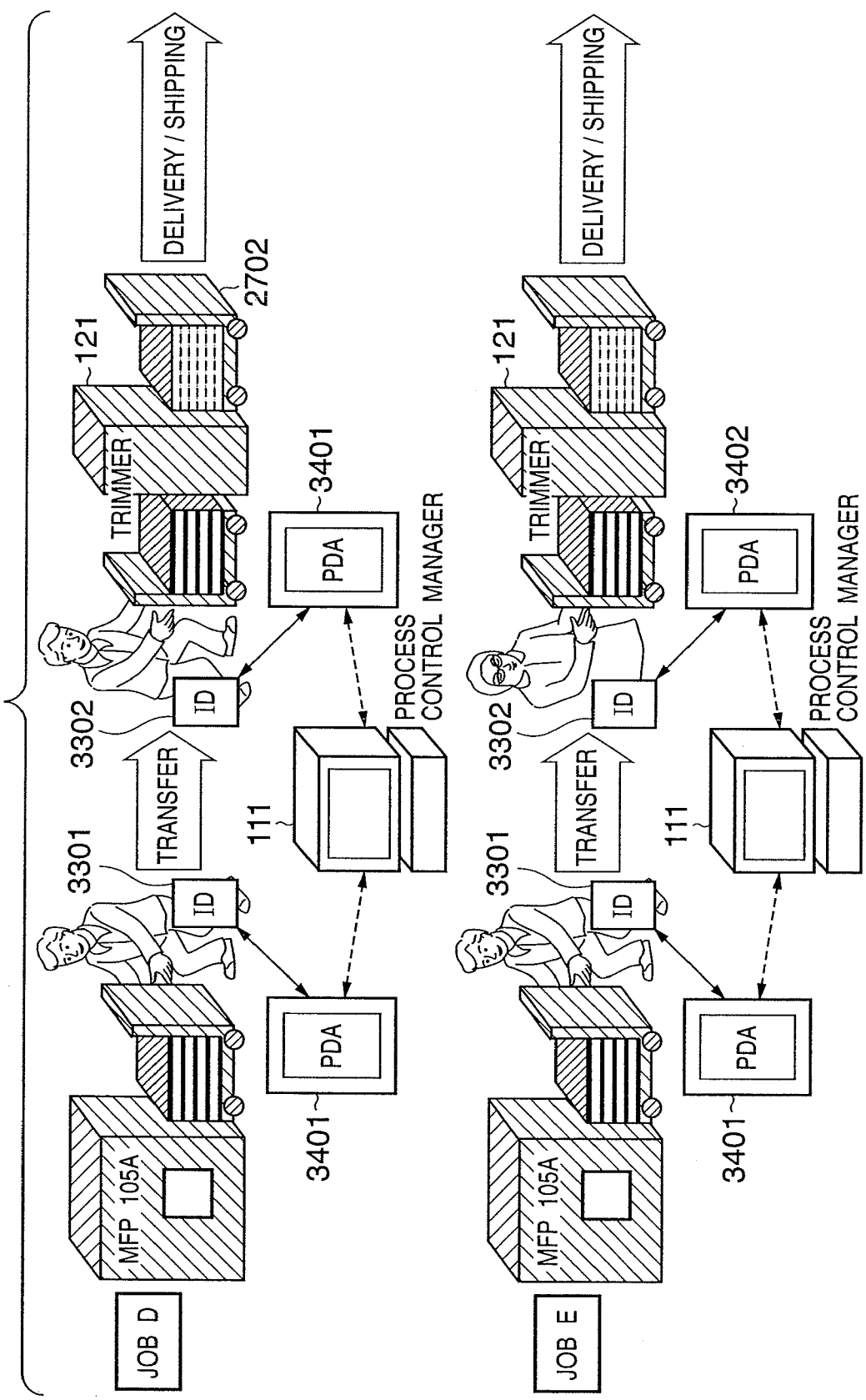

FIG. 68

STORAGE MEDIUM SUCH AS FD / CD-ROM, ETC

| DIRECTORY INFORMATION |
|---|
| FIRST DATA PROCESSING PROGRAM<br>PROGRAM CODE GROUP CORRESPONDING TO STEPS OF<br>FLOW CHART SHOWN IN FIG. 2 |
| SECOND DATA PROCESSING PROGRAM<br>PROGRAM CODE GROUP CORRESPONDING TO STEPS OF<br>FLOW CHART SHOWN IN FIG. 6 |
| THIRD DATA PROCESSING PROGRAM<br>PROGRAM CODE GROUP CORRESPONDING TO STEPS OF<br>FLOW CHART SHOWN IN FIG. 38 |
| FOURTH DATA PROCESSING PROGRAM<br>PROGRAM CODE GROUP CORRESPONDING TO STEPS OF<br>FLOW CHART SHOWN IN FIG. 39 |
| FIFTH DATA PROCESSING PROGRAM<br>PROGRAM CODE GROUP CORRESPONDING TO STEPS OF<br>FLOW CHART SHOWN IN FIG. 40 |
| SIXTH DATA PROCESSING PROGRAM<br>PROGRAM CODE GROUP CORRESPONDING TO STEPS OF<br>FLOW CHART SHOWN IN FIG. 41 |
| SEVENTH DATA PROCESSING PROGRAM<br>PROGRAM CODE GROUP CORRESPONDING TO STEPS OF<br>FLOW CHART SHOWN IN FIG. 50 |
| EIGHTH DATA PROCESSING PROGRAM<br>PROGRAM CODE GROUP CORRESPONDING TO STEPS OF<br>FLOW CHART SHOWN IN FIG. 51 |
| NINTH DATA PROCESSING PROGRAM<br>PROGRAM CODE GROUP CORRESPONDING TO STEPS OF<br>FLOW CHART SHOWN IN FIG. 52 |
| 10TH DATA PROCESSING PROGRAM<br>PROGRAM CODE GROUP CORRESPONDING TO STEPS OF<br>FLOW CHART SHOWN IN FIG. 53 |
| 11TH DATA PROCESSING PROGRAM<br>PROGRAM CODE GROUP CORRESPONDING TO STEPS OF<br>FLOW CHART SHOWN IN FIG. 54 |
| 12TH DATA PROCESSING PROGRAM<br>PROGRAM CODE GROUP CORRESPONDING TO STEPS OF<br>FLOW CHART SHOWN IN FIG. 62 |

MEMORY MAP OF STORAGE MEDIUM

IMAGE FORMING SYSTEM, METHOD AND PROGRAM OF CONTROLLING IMAGE FORMING SYSTEM, AND STORAGE MEDIUM

RELATED APPLICATIONS

This application is a Continuation of U.S. patent application Ser. No. 10/809,517, filed Mar. 26, 2004 (now allowed), which is incorporated by reference herein in its entirety, as if fully set forth herein, and claims the benefit of priority under 35 U.S.C. §119, based on Japanese Priority Application Nos. JP 2003-088349, filed Mar. 27, 2003; 2003-088350, filed Mar. 27, 2003; 2004-057836, filed Mar. 2, 2004; and 2004-057837, filed Mar. 2, 2004, which are incorporated by reference herein in their entirety, as if fully set forth herein.

FIELD OF THE INVENTION

The present invention relates to, for example, control of an image forming system which can implement an image forming process including a plurality of steps.

BACKGROUND OF THE INVENTION

Conventionally, a so-called commercial printing business, that receives an order of a creation request of prints (magazine, newspaper, brochure, advertisement, gravure, etc.) from a third party (customer, client), creates prints desired by the client, and delivers them to the client so as to get a reward, still prevalently uses a large-scale printing device such as an offset prepress & printing press and the like today. Such printing business proceeds with operations via various steps such as document acceptance, design & layout, comprehensive layout (presentation by means of printer output), proofing (layout correction & color correction), proof print, artwork preparation, print, post-process, shipping, and the like. Artwork preparation is mandatory for use of the aforementioned printing press, and once an artwork is prepared, it is not easy and is disadvantageous in terms of cost to correct it. Hence, elaborate proofing, i.e., layout checking and color confirmation operations are indispensable. In this manner, such printing business requires a large-scale device, and takes considerable time to create prints desired by clients. However, these operations require expert knowledge, i.e., know-how of experts called craftsmen.

Meanwhile, in recent years, along with the advent of high-speed, high image quality electrophotographic printing devices and ink-jet printing devices, a so-called print-on-demand (POD) market prevails as competition with the aforementioned printing business. That is, this market aims at handling a huge number of copies and a huge number of jobs within a short delivery period without any large-scale device or system, and implements digital prints using digital data by fully utilizing a digital image forming device such as a digital copying machine, digital multi-function peripheral, and the like in place of the large-scale printing press and printing scheme, so as to do business. Such POD market merges digitalization compared to the conventional printing business, effectively utilizes computerized management and control, and makes an attempt to reach the printing business level using computers. In such situation, PFP (Print For Pay) as a print service of a copy/print shop, CRD (Centralized Reproduction Department) as an in-house print service, and the like are known in the POD market.

Note that Japanese Patent Laid-Open No. 2003-122538 is known as an application that pertains to the POD market.

However, the aforementioned printing business and POD market consider to provide a service that combines all services from ordering of commercial products to packaging, shipping, after service, inventory control, and cash receipt control to have prints as commercial products, but there is still room for more consideration.

In the aforementioned printing business and POD market, a system that supports business planning and management works via acquisition, processing, and reporting of production-related data, accumulates information, and provides the accumulated information to respective departments as needed has been examined, but it is still difficult to realize and manage an optimal system.

Also, in the aforementioned POD market, skilled persons are unemployable compared to the conventional printing business under the existing situation, and demands have arisen to complete jobs at low cost, to do business with fewer investments, to reduce TCO (Total Cost of Ownership), and so forth. However, such demands are not sufficiently met due to a new marketplace, and problems for solution still remain.

SUMMARY OF THE INVENTION

It is an object of the present invention to provide an image forming system, a method and program for controlling an image forming system, a storage medium, and the like, which can solve the aforementioned problems.

It is another object of the present invention to provide an image forming system, a method and program for controlling an image forming system, and a storage medium, which accept a print job and print instruction, control a plurality of steps for the print job, schedules the respective steps, and manage the respective steps on the basis of the scheduling result, so as to categorize the steps in the printing business and POD market, and to optimally schedule the respective steps in consideration of an efficient operation order, an order in association with other jobs, and the like.

It is still another object of the present invention to provide an image forming system, an image forming method and program, and a storage medium, which can fully utilize unique functions of an image forming device without influencing a schedule, and can build a flexible system.

It is still another object of the present invention to provide an image forming system, a method and program for controlling an image forming system, and a storage medium, which manage a plurality of steps (document edit, proof, print, post-process, file archiving, delivery/shipping, scan, and the like) of an image forming process, and issue operation instructions to workers who actually do operations, so as to categorize the respective steps of the image forming process in the printing business and POD market, and to efficiently manage the steps by scheduling these steps in terms of workers' operations.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 23 shows the rewrite states of JDF data in respective steps;

FIG. 25 shows an example of a job order window by the order/input manager shown in FIG. 1;

FIG. 27 shows an example of a job order window by the order/input manager shown in FIG. 1;

FIG. 29 shows an example of a job order window by the order/input manager shown in FIG. 1;

FIG. 30 shows an example of a job order window by the order/input manager shown in FIG. 1;

FIG. 31 shows an example of a job order window by the order/input manager shown in FIG. 1;

FIG. 37 shows an example of a job order window according to the second embodiment of the present invention;

FIG. 43 shows a print step management window provided by the print manager shown in FIG. 1;

FIG. 56 shows a management window (a window used to monitor and control the states of all finishers managed by a post-process manager) of a post-process provided by the post-process manager shown in FIG. 1;

FIG. 66 shows an example of ID cards provided for respective workers;

FIG. 67 is a chart for explaining an example of the arrangement that successively issues reliable instructions to respective workers; and FIG. 68 is a view for explaining a memory map of a storage medium that stores various data processing programs which can be read out by the image forming system according to the present invention.

DETAILED DESCRIPTION OF THE PREFERRED EMBODIMENTS

First Embodiment

An embodiment according to the present invention will now be described in detail in accordance with the accompanying drawings.

[System Overview]

Figure 1:
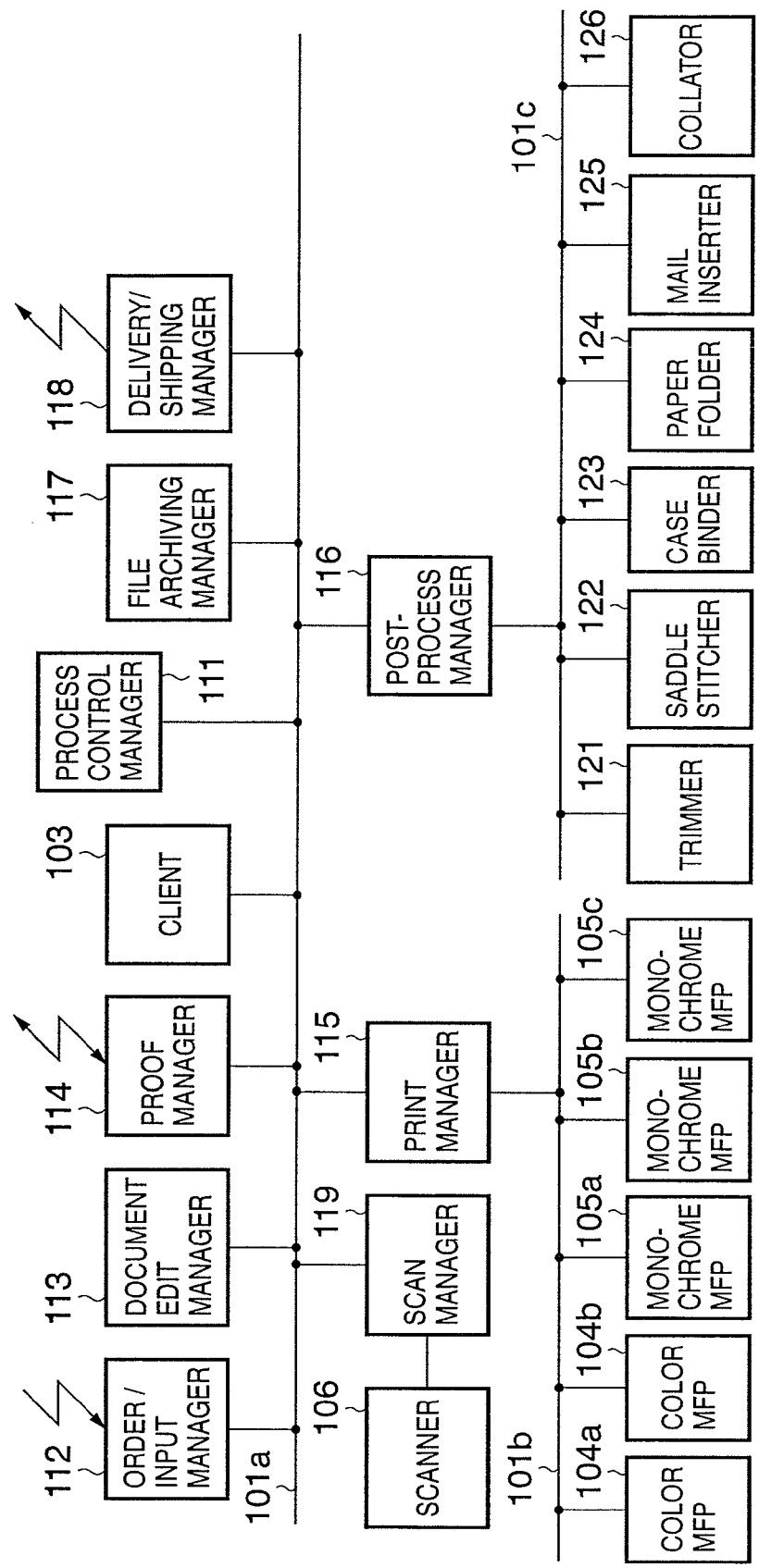
FIG. 1 is a block diagram showing an example of the arrangement of an image forming system according to the first embodiment of the present invention.

FIG. 1 is a block diagram showing an example of the arrangement of an image forming system according to the first embodiment of the present invention.

As shown in FIG. 1, respective devices which form the image forming system of this embodiment are connected via a network 101. The system may have only one network 101, or a plurality of networks 101a, 101b, and 101c, as shown in FIG. 1.

This system comprises multi-function devices such as a color MFP 104, monochrome MFP 105, and the like, which can print digital data from a scanner unit or an external device such as a computer or the like, and have a plurality of functions. Also, the system comprises single-function devices such as a scanner 106 having only a scanner function, a device (not shown) having only a print function, and the like.

This system comprises various sheet processing devices that can apply a sheet process to sheets printed by the image forming device. Note that the sheet process corresponds to at least one of a plurality of different post-processes such as a trimming process, stapling process, folding process, booklet processes such as saddle stitching, case binding, and the like, mail insertion process, collation process, and the like. For example, the system comprises, as an example of the sheet processing devices, a trimmer 121 which executes a trimming process of a print sheet, which trims a print sheet printed by each image forming device to have a predetermined portion (e.g., the left end of the print sheet; three sides, i.e., the upper, right, and lower ends of the print sheet; the center of the print sheet; or the like) of the print sheet as an axis or axes. Also, the system comprises a saddle stitcher 122 which applies a stapling process to the center of printed print sheets using a staple unit, and then folds them into two to have the center as a central axis to form a saddle stitched book. The system comprises a case binder 123 which executes a case binding process that aligns (applies an alignment process to) print sheets printed by the image forming apparatus, adheres the back of a bundle of the aligned print sheets using a special glue, enwraps the bundle with a cover sheet, and press-molds them. The system comprises a paper folder 124 which can apply a folding process to print sheets printed by the image forming device. The system comprises a mail inserter 125 which inserts and seals print sheets which are printed by the aforementioned image forming device and undergo sheet processes by the aforementioned sheet processing devices and the like into envelopes and the like, and helps with delivery to customers. Furthermore, the system comprises a collator 126 which can execute a collation process (a process for collating print sheets in an appropriate page order) of print sheets printed by the image forming apparatus. In the system of this embodiment, a plurality of different sheet processes can be executed by independent sheet processing devices. However, the present invention is not limited to such specific device arrangement. For example, one sheet processing device may execute a plurality of different sheet processes such as a stapling process, booklet process, folding process, and the like, or may execute only one sheet process. In either case, the embodiment of the present invention can be applied to the device and system arrangements as long as sheet processes desired by the user (customer) can be executed.

As described above, the system of this embodiment comprises a plurality of different devices such as image forming devices, sheet processing devices, and the like, which respectively comprise communication units and can exchange data (image data, print condition data, control data, status request data, status data, and the like) via a predetermined communication medium such as the network 101 and the like.

Referring to FIG. 1, reference numeral 111 denotes a process control manager that manages steps of all jobs (including jobs to be processed by this system of various kinds of status, such as an active job whose process such as a print process or the like is active, a waiting job which waits for the start of a process after a print request is issued, a complete job whose output process is complete, an error job that has generated an error, and the like) flowing computers, devices, or the image forming system. The process control manager 111 acquires various data such as information associated with a job acceptance state, information associated with device status (operation state, error state, and the like), job progress information associated with a job processing state, and the like from the respective devices (including the image forming devices, sheet processing devices, and the like) via the communication medium such as the network 110 and the like using its own communication unit and those of the devices. The process control manager 111 recognizes jobs to be processed in the respective devices and system based on the acquired information, thus managing the steps of the jobs. Reference numeral 112 denotes an order/input manager, which accepts a job entered as data from a user interface unit (e.g., a client computer) of the user (client) via a predetermined communication medium such as the Internet or the like. Reference numeral 113 denotes a document edit manager, which processes the entered job and/or a job based on image data scanned by a scanner to a page order or layout according to the user's request. Note that various data which include image data to be printed on print sheets, and various print output process condition data such as a print copy number setup, image process setup, finishing process setup, and the like will be referred to as job data.

Reference numeral 114 denotes a proof manager which can make data communications with a device such as a client computer or the like via a communication medium such as the Internet or the like, and prompts the user (customer) to confirm whether or not a job obtained by editing document data from the client according to the output process conditions from the client or its output sample is formed as the user intended via a user interface unit such as a display of a client computer (so as to attain a proof process). For example, upon reception of print output condition data (various process condition data associated with color edit, a zoom process such as enlargement/reduction or the like, an edit process such as a reduced layout process, enlarged layout process, or the like, a finishing process, and the like) used to specify how to process client's document image data together with that document image data from a client computer, the proof manager 114 processes the received document image data using its own edit unit and/or those which of other devices (e.g., the image forming devices and other information processing devices) in accordance with the output condition data set for that document image data. The proof manager 114 sends back the processed image data to the client computer via the communication medium such as the Internet or the like before that data is actually printed by the image forming device, and displays that processed image data on a display of the client computer so as to allow the client to confirm and recognize the processing result. The system of this embodiment can actually start a print process after user's confirmation, and can provide an output result desired by the client to the client without generating an inappropriate output result different from it. In order to obtain such effect, the proof manager 114 can execute pre-print processes such as a document edit process, proof process, and the like prior to execution of an actual print process. Note that the proof manager 114 controls to pass the process of the job of interest to a print manager 115 as the next step in response to an approval instruction which is input via an OK key (not shown) of a UI of a client computer when the client approves the image data as an edit processing result that is presented via the UI of the client computer. On the other hand, when the client inputs a re-edit instruction via the UI of the client computer in place of the approval instruction, the proof manager 114 controls to re-execute the edit process, and to repeat this step (the proof step of a job to be processed) until processed document image data accepted by the client is obtained. Reference numeral 115 denotes a print manager which applies a rasterize process (a process for converting into bitmap image data) to a job to be processed that has undergone the pre-print processes (document edit process, proof process) via the proof process of the proof manager 114, transfers the rasterized image data to the image forming device, e.g., the MFP (at least one of the color MFPs 104a and 104b and monochrome MFPs 105a to 105c) of this system as a print output destination via the communication medium such as the network 110 and the like, and controls the image forming device as the print output destination to print out (execute a print process of) the processed image data.

Reference numeral 116 denotes a post-process manager which controls the sheet processing devices such as the trimmer 121, saddle stitcher 122, case binder 123, paper folder 124, mail inserter 125, collator 126, and the like to apply post-process (finishing process) steps (sheet processes to be applied to print sheets such as a trimming process step, saddle stitching process step, case binding process step, sheet folding process step, mail insertion process step, collation process step, and the like) requested by the user (client) to print sheets printed by the image forming device such as the MFP or the like in accordance with the output processing condition data of the job accepted by the order/input manager 112. Reference numeral 117 denotes a file archiving manager, which is a file server that archives a user's job (including image data to be printed on print sheets), and responds to a re-print request. For example, even after image data of a job received by the order/input manager 112 is printed by one of image forming devices (e.g., MFP) of this system in an output format desired by the client, the file archiving manager 117 stores and holds the printed image data in its memory unit such as a hard disk or the like. When the client issues a re-output request instruction via the order/input manager 112, the file archiving manager 117 reads out the printed image data held in the memory unit from that memory unit, and can re-print the readout data using one of the image forming devices (e.g., MFP) in a desired output format which is newly set by the client upon issuing the re-output request. In this manner, the reusability of the printed image data can be improved so as not to repetitively receive identical data from the client, thus minimizing wasteful data communications.

Reference numeral 118 denotes a delivery/shipping manager, which can make data communications with other devices via a communication medium such as the Internet or the like. For example, in response to print completion message data which indicates completion of prints and is received from any one of the devices of this system, the delivery/shipping manager 118 instructs a worker who operates a device of this system to deliver a finished document (prints) to the client who issued the print request to the order/input manager 112 using a UI of that device or the like. Also, the delivery/shipping manager 118 manages delivered delivery slip data (including slip information associated with a job to be delivered), shipping history data (including information associated with a job that has undergone document creation and has been shipped to the client), and the like (to execute a delivery process). Reference numeral 119 denotes a scan manager which controls the scanner 106 to scan a client's paper document and to convert the scanned document data into digital data that can be handled by the devices (e.g., MFP) of this system, so as to cope with input of a paper document for the client who wants to make a print request by means of a paper document.

Note that the managers 111 to 118 may be implemented by individual information processing devices (e.g., host computers and servers) or some of or all functions of the managers 111 to 118 may be implemented by a single information processing device. For example, a single host computer, server, or the like which can implement all the functions of the managers 111 to 118 may be incorporated in the system of this embodiment, individual host computers, servers, and the like may be incorporated in this system for the respective managers 111 to 118, or a plurality of host computers, servers, or the like, each of which can implement some manager functions may be incorporated in this system. That is, the device and system arrangements are not particularly limited as long as they can implement various kinds of control described in this embodiment.

Alternatively, each manager corresponds to a computer device (information processing unit) which comprises, e.g., a CPU, ROM, RAM, HD, and the like, and the CPU executes a program stored in a storage medium such as the ROM, HD, or the like to implement the function of the manager. Reference numeral 103 denotes a client computer (client) which can access the respective managers. For example, the client computer 103 can transmit image data to be printed to the order/ input manager 112 together with its print output process condition data, can receive document image data that has undergone the edit process from the proof manager 114 so as to confirm the doneness of a document whose print request was issued, and can receive print completion message data from the delivery/shipping manager 118 so as to receive a print completion message. The client computer 103 allows the user to make various print setups, confirm an image, and so forth via the UI of, e.g., its display.

The roles of the managers shown in FIG. 1 will be described below.

[Process Control Manager 111]

The process control manager 111 serves as a central control system called an MIS (Management Information System), which supports business planning and management works via acquisition, processing, and reporting of production-related data, accumulates information, and provides the accumulated information to respective departments as needed.

The process control manager 111 is a computer that forms the core of this MIS, and serves to make central management of information of a part which cannot undergo central management due to limitations on human capability in the conventional system (e.g., processes executed via manual operations of workers except for those which are complete by only machines) by means of data communications with the devices of this system, information databases of computers, and the like.

Using data stored in the process control manager 111 (e.g., function information and capability information of respective devices, status information of devices, status information and progress information of an accepted job, and the like), the process control manager 111 executes a decision-making application, especially, scheduling of products (e.g., prints generated by this system) so as to instruct and manage operation steps to allow efficient operations of workers, thus improving production capacity planning.

[Order/Input Manager 112]

The order/input manager 112 shown in FIG. 1 is a computer which serves as an intermediary of so-called electronic commerce (EC) and, for example, executes an ordering process with other devices such as a client computer or the like via a communication medium such as the Internet or the like. The order/input manager 112 is an e-shop using a Web page on the Internet when viewed from the user. After user authentication, the user sends, as digital data, a desired file together with desired setups from his or her computer to the order/input manager 112 to order a job.

Figure 2:
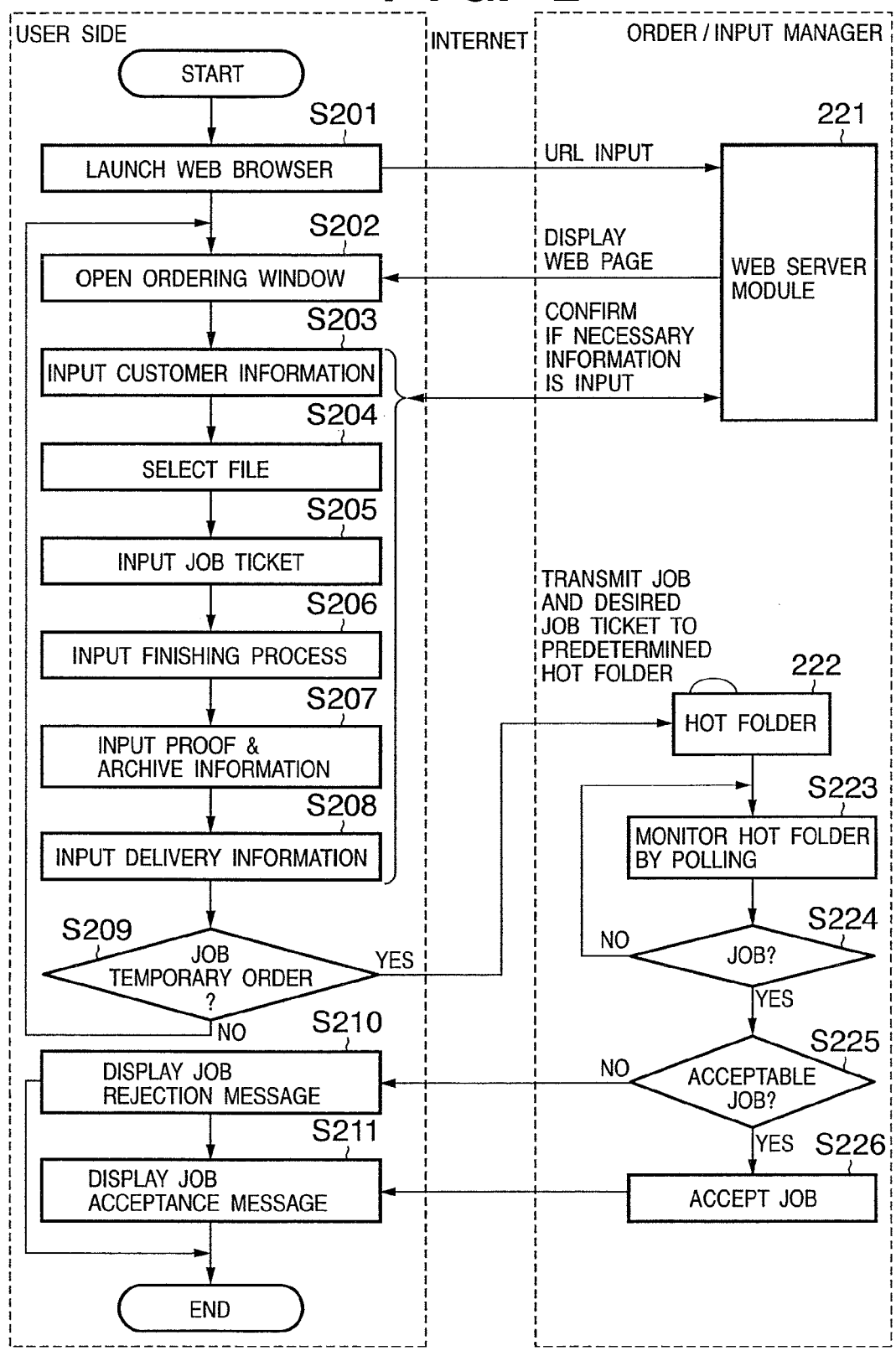
FIG. 2 is a flow chart showing communications between an order/input manager shown in FIG. 1 and user's computer, and an order process (the first control process of the present invention) by the order/input manager.

FIG. 2 is a flow chart showing data communications between the order/input manager 112 shown in FIG. 1 and user's computer, and the order process (the first control process of the present invention) by the order/input manager 112. In FIG. 2, S201 to S211 indicate operation steps on the user's Web browser, and S222 to S226 indicate control process steps on the order/input manager 112 side.

In step S201, a controller (CPU) of the client computer controls to launch the Web browser in response to a user's (client's) key input, and prompts the user to input a URL (Uniform Resource Locator) address on the Web browser, and access a Web server module 221 of the order/input manager 112.

This Web server module 221 is a Web server program represented by the IIS (Internet Information Server) available from Microsoft Corporation, and controls to provide (display) service windows (Web pages; FIGS. 24 to 31 to be described later) on the Web browser launched at the user's client computer in response to the URL (Uniform Resource Locator) address input by a user's operation on that Web browser.

On the user side, the service window (FIG. 24 to be described later) provided by the Web server module 221 via the Web browser is displayed on the display of the client computer under the control of the controller of the computer. The user who has already registered the user ID and password selects "registered" on the window of FIG. 24 using a pointer, and inputs his or her user ID (e.g., e-mail address), password, and the like on that window. An unregistered, new user selects "New" on the window of FIG. 24 using the pointer to select an unregistered user. The controller of the client computer then selectively and sequentially displays various ordering windows (FIGS. 25 to 30) provided by the Web server module 221 on the display of the client computer in response to user's operations (S202).

Next, the user inputs various print instructions such as customer information (in case of a new user or when the registered user changes the registered contents), document information (a file name of image data (multiple selections allowed)), job information (job ticket or the like), post-process information (finishing processes or the like), proof & archive information, delivery information, and the like via the ordering window (windows shown in FIGS. 25 to 30 to be described later) which are sequentially provided by the Web server module 221 and are sequentially displayed on the Web browser using an operation unit such as a mouse, keyboard, and the like of the client computer. These pieces of information are stored in an appropriate memory as information to be used by this system (S203 to S208). At this time, the Web server module 221 controls to shift (provide) display to a job temporary order window (FIG. 31 to be described later) after it simply checks omissions or input errors in user input items on the respective order placement windows (the windows shown in FIGS. 25 to 30). If the Web server module 221 finds any problem in user input items on the respective order placement windows (the windows shown in FIGS. 25 to 30), it controls to display a warning message via the UI of the client computer every time it finds a problem, so as to prevent any job order errors. Assume that the service windows shown in FIGS. 24 to 31, input item check program, and the like are uploaded in advance to the Web server unit 221. Upon displaying the UI windows shown in FIGS. 24 to 31 on the display unit of the client computer, display window data may be transferred from the order/input manager 112 to the client computer in real time so as to display operation windows including those shown in FIGS. 24 to 31 to be used by this system when the user inputs a job request to the order/input manager 112 of this system in practice. Alternatively, program data required to display operation windows including those shown in FIGS. 24 to 31 to be used by this system may be downloaded from an external device such as a server or the like to the client computer in advance, so as to allow the user to input a job request to the order/input manager 112 in practice without receiving any operation window data from the order/input manager 112. Also, program data required to display operation windows including those shown in FIGS. 24 to 31 to be used by this system may be written in a storage medium (CD, MD, FD, or the like) which is detachable from the client computer, and may be read out from the storage medium set in the client computer and may be installed in the client computer. In this way, a job request can be input to the order/input manager 112 in practice without receiving any operation window data from the order/input manager 112, as in the above case. In this manner, various methods may be adopted upon providing the user interface. In any case, the method of providing the user interface is not particularly limited as long as the operation windows including those shown in FIGS. 24 to 31 to be used by this system can be displayed on the computer, the user can make desired setups and instructions via various operation windows, and appropriate instructions can be sent to the order/input manager 112.

The input operations are repeated until the user approves a temporary order on the job temporarily order window (FIG. 31 to be described later) which is provided by the Web server module 221 of the order/input manager 112 (or the program data which is downloaded in advance from the server to the client computer and includes a program required to display the operation windows in FIGS. 24 to 31, or program data which is read out from the storage medium set in the client computer and includes a program required to display the operation windows in FIGS. 24 to 31) and is displayed on the Web browser of the client computer (S209). If it is determined based on a user's key input to a key 2211 of the window in FIG. 31 that the user has approved the temporary order on the job temporary order window (FIG. 31) (Yes in S209), control is made to transmit job data which includes a file (image data) and respective print instructions selected by the user using the Web browser from the client computer to a hot folder module 222 of the order/input manager 112 via the communication medium such as the Internet or the like. This hot folder may be assured for each user. Note that the hot folder is a virtual folder used to store image data to be printed, and output condition data and the like which allow the controller to specify print output process conditions upon outputting that image data, and a plurality of hot folders can be assured on a memory (not shown) such as a hard disk or the like of the order/input manager 112. Also, the hot folder allows to manage image data and its output condition data in association with each other, and can be read out by the controller or the like of the order/input manager 112 as needed. For example, image data of a job to be printed in the hot folder can be printed out by the image forming device (e.g., MFP) of this system in accordance with the print output condition data in that hot folder under the control of the order/input manager 112 or the process control manager 111.

The order/input manager 112 always monitors the presence/absence of a job in each hot folder by polling (S223, S224). If the order/input manager 112 determines the presence of a job, it confirms whether or not that job can be accepted (e.g., including a decision as to whether or not the job as the processing request from the client can be printed out in a print output format desired by the client by the devices of this system), with reference to device function information and status information acquired from the respective devices of this system, the processing state information and progress information of jobs in the respective devices, and the like (S225). If that job is permitted (the job is acceptable), control is made to accept the job, and to transmit data of the accepted job to the process control manager 111 via the communication medium such as the network 101 and the like (S226). In addition, control is made to send back message data that informs the client of "acceptance" to the client computer so as to display that message for the user using, e.g., a Web page or the like. On the other hand, if acceptance of the job is not permitted (that job is not acceptable) in step S225, control is made not to transmit data of the accepted job to the process control manager 111 via the communication medium such as the network 101 and the like, and to send back message data that informs the client of "rejection" so as to so as to display that message for the user using, e.g., a Web page or the like.

The client computer on the user side controls to display the "acceptance" or "rejection" message provided from the Web browser on the Web browser (S210, S211), thus ending the process.

[Document Edit Manager 113]

The document edit manager 113 shown in FIG. 1 aims at merging a plurality of files sent from the user, inserting or deleting pages, or laying out pages according to user's instruction, or visualizing the requested post-processes to allow the user to visually confirm them for a job to be managed as that of the document edit step by the process control manager 111. For example, the document edit manager 113 handles a job as digital data, and allows the client user to visually confirm the results of a print process on print sheets by the image forming device of this system, sheet processes on printed print sheets by the sheet processing devices, and the like before these processes are actually done by the devices (in a pre-print step stage), via the user interface unit such as the display or the like on the computer. The document edit manager 113 controls to display a preview of edited image data obtained by applying edit processes to document image data on the display of the client computer. That is, the document edit manager 113 controls to display, on the display of the client computer, display image data such as thumbnails or the like that indicate the printed state of edited image data on print sheets, and display image data such as thumbnails or the like that allow the user to confirm the sheet process result of print sheets on which the edited image data are printed.

Figure 3:
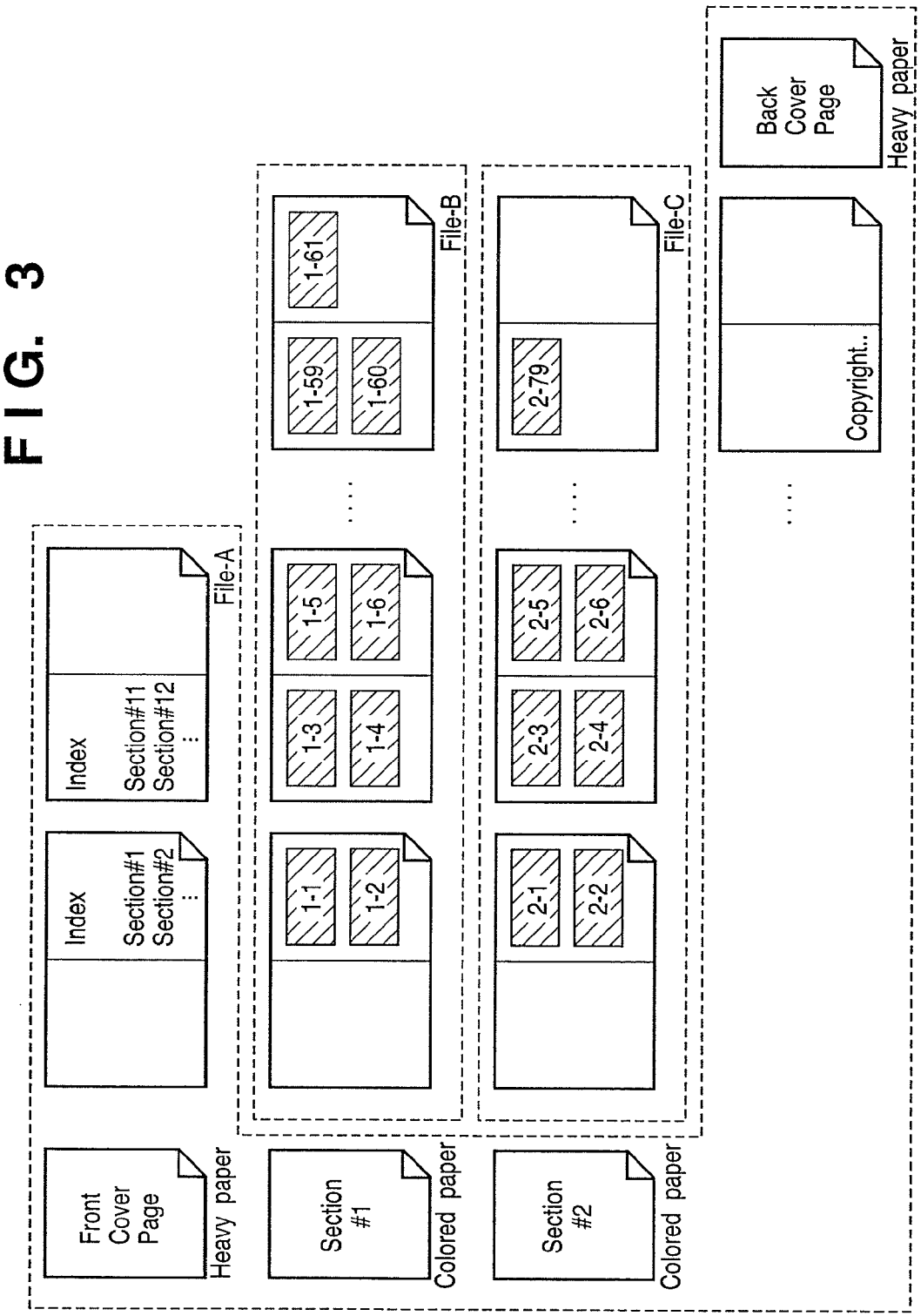
FIG. 3 shows an example of a file transmitted from the user and its finished (edited) image.
Figure 4:
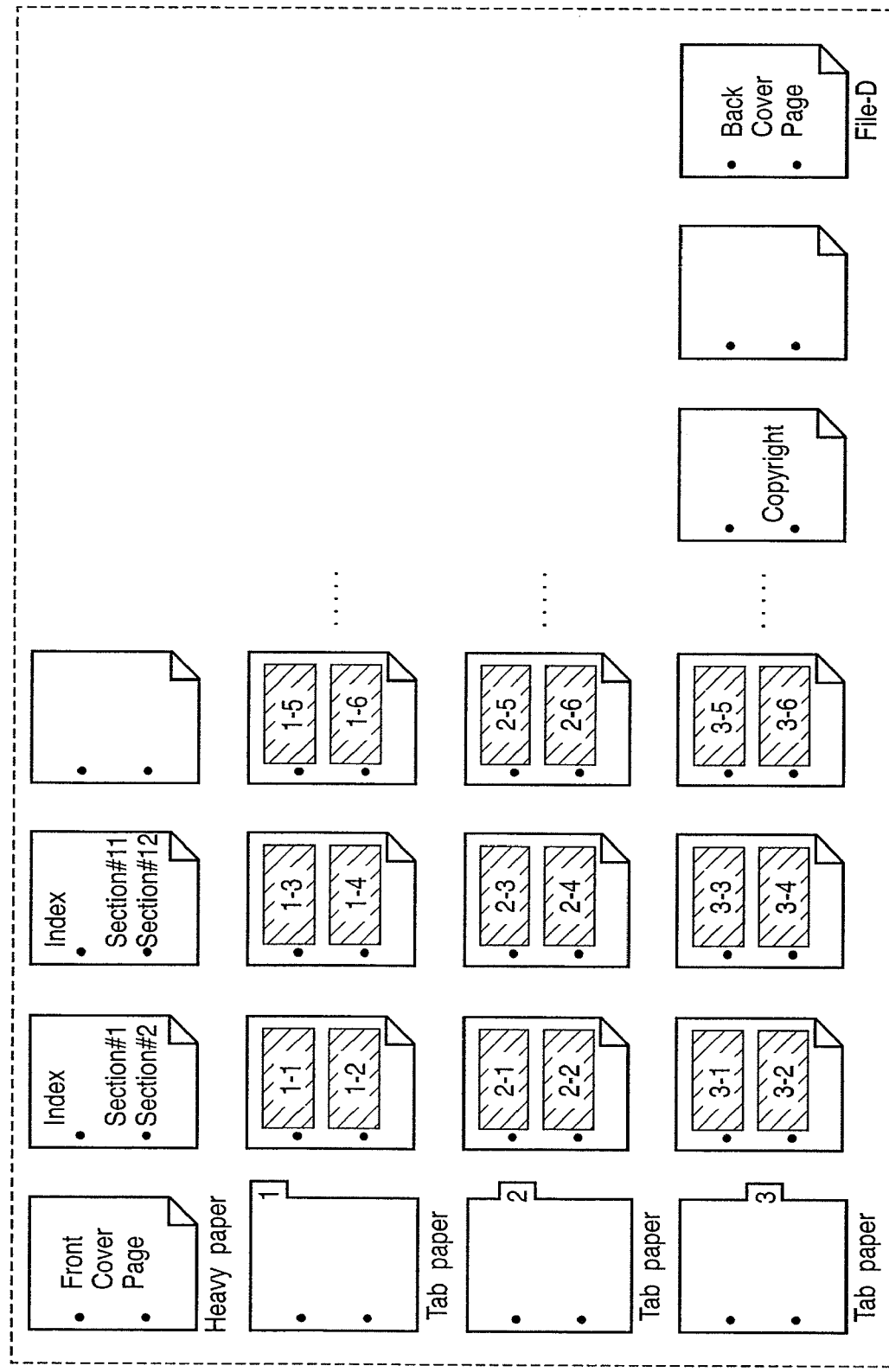
FIG. 4 shows an example of a file transmitted from the user and its finished (edited) image.
Figure 5:
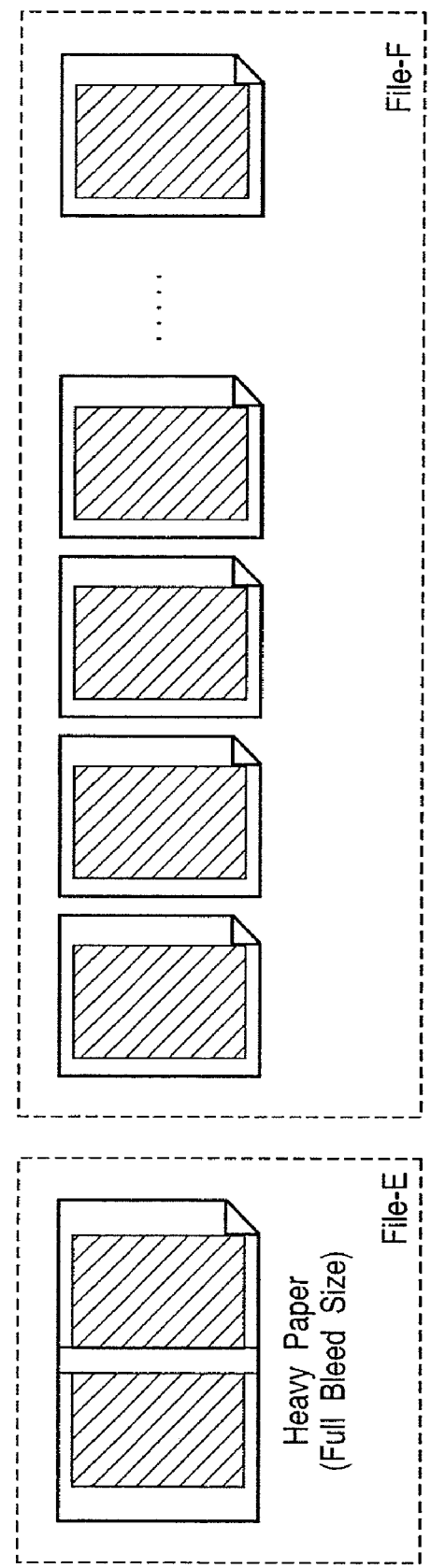
FIG. 5 shows an example of a file transmitted from the user and its finished (edited) image.

FIGS. 3 to 5 show examples of files A to F transmitted from the user and their finished (edited) images.

In the example shown in FIG. 3, a job input by the user consists of file A (File-A) to file C (File-C). The user wants to output file A with its original size, and to output files B and C in a 2in1 mode (a mode for executing a print process while a plurality of document image data for two pages are laid out and formed on a single surface of a print sheet for one page). In such case, since the document edit process requires output sizes and the like, the user must designate these sizes. Also, when the output order must be taken into consideration, the user must designate such order upon document input.

In the example shown in FIG. 4, a job input by the user consists of only one file D (File-D). For file D, the user desires an output setup onto specific media such as tab paper sheets or the like (for example, a function that allows the image forming device to insert tab sheets having tab portions among a plurality of print sheets, on which document image data are printed, as divider sheets, chapter sheets, or the like, and printing document image data, page numbers, and chapter numbers on the tab sheets themselves in accordance with user's instructions), and also post-processes (also called sheet processes) such as a punch process on print sheets of the job by the sheet processing device that can apply the punch process, a stapling process on print sheets of the job by the sheet processing device that can apply the stapling process, and the like. In this manner, even when a job is entered as a single file, if the user wants to output that job onto specific media such as tab paper sheets or the like and to apply post-processes such as a punch process, stapling process, and the like, the document edit process requires information of each tab itself and media information of a tab paper sheet or the like, and post-process information such as a punch process and the like. Hence, the user must designate these pieces of information upon document input.

Furthermore, in the example shown in FIG. 5, a job input by the user consists of file E (File-E) and file F (File-F). The user wants to apply case binding to files E and F using different sheet sizes. In this manner, when the sheet sizes to be output are different, the document edit process requires information such as sheet sizes and the like. Hence, the user must designate these pieces of information upon document input.

Note that the user can instruct various kinds of information from the ordering windows shown in FIGS. 27, 29, and the like to be described later in steps S205, S206, and the like in FIG. 2 described above.

In this manner, since the user's input file itself does not always match user's finished image (a finished image as an output result after an actual print process and post-processes) (when the state of document image data before the print process does not match that of an output result after application of the print process and sheet processes), the image forming system must execute edit processes according to user's instructions. The document edit manager 113 has charge of such edit processes.

Since a plurality of files sent from the user are not always those which are created using an identical application or are of an identical type, they must be combined into one file. Assume that the document edit manager 113 also executes this process for combining a plurality of files into one file.

The aforementioned edit process in the document edit manager 113 is done by a program in itself on the basis of edit information instructed by the user upon document input (without any edit operations by the worker) and/or edit operations using various applications by the worker from the client 103. The edit process in the document edit manager 113 is one of pre-print processes.

[Proof Manager 114]

The proof manager 114 shown in FIG. 1 is normally used for two purposes, i.e., layout confirmation and tincture confirmation. In case of a monochrome document, only layout confirmation is made, but a color document requires these two confirmations.

The printing business uses a colored output called a color comprehensive layout, which is formed for the purpose of presentation to an advertiser prior to the prepress/printing step. Recently, a color hardcopy generated by outputting a digital color image, which is processed by DTP (Desk Top Publishing) that creates a publication using a personal computer or CEPS (Color Electronic Prepress System) used in image correction or composition in the print step, by a color printer or color plotter is used as the aforementioned color comprehensive layout.

In on-demand print using a printer, layout confirmation and simple tincture confirmation corresponding to a comprehensive layout, and detailed tincture confirmation corresponding to a proof can be made using an identical color printer (or monochrome printer). Hence, the proof manager 114 processes these confirmation operations together.

Figure 6:
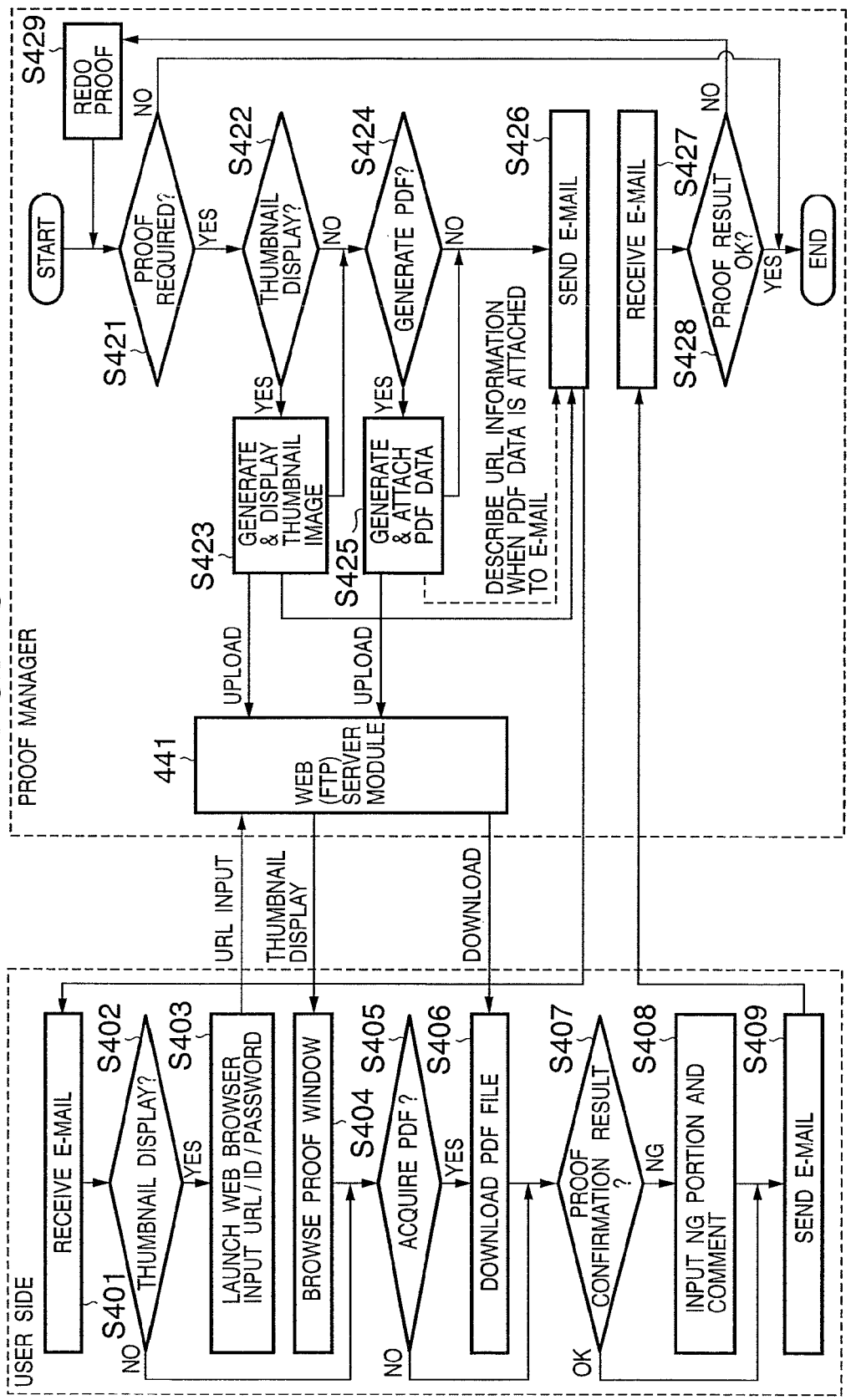
FIG. 6 is a flow chart showing communications between a proof manager shown in FIG. 1 and user's computer, and a proof creation process (the second control process of the present invention) by the proof manager.

FIG. 6 is a flow chart showing communications between the proof manager 114 shown in FIG. 1 and user's computer (e.g., client computer), and the proof creation process (the second control process of the present invention) by the proof manager 114. S401 to S409 indicate operation steps to be executed by the user's client computer, and S421 to S429 indicate control process steps to be executed by the proof manager 114.

The proof manager 114 comprises a Web server module 441 as in the order/input manager 112 (the Web server module 221 of the order/input manager 112 shown in FIG. 2 may be commonly used). It is checked in step S421 if the user requests to output a proof of the job to be managed in the proof step by the process control manager 111 (i.e., if the user inputs such request on the proof setup window (the window shown in FIG. 29) in step S207 in FIG. 2). If the user inputs no proof request, the process ends.

On the other hand, if it is determined in step S421 that the user inputs the proof request, the flow advances to step S422 and subsequent steps to provide a service to the user by the requested proof method (proof expression method) (so as to make proof expression). The proof expression corresponds to expression of the output result (doneness) when an image is printed on a print sheet in practice and/or the output result (doneness) when the print sheet undergoes sheet processes in practice without any actual print process by the image forming device of this system and without any actual sheet processes by the sheet processing devices of this system, by displaying image data on the user interface unit such as the display or the like of the client computer as finished image data so as to be graphically confirmed by the user.

More specifically, it is checked in step S422 if thumbnail display on a Web page is requested as the proof expression method. If it is determined that such expression method is requested, the proof manager 114 controls the document edit manager 113 to generate a thumbnail image on the basis of, e.g., document image data as original data received from the client computer, the print output condition data from the user set for that job, and the like, and uploads the generated thumbnail image to the Web server module 441 and sets that thumbnail image so that only an authentic user can display it, in step S423. In this manner, the user can confirm the finished image on the Web page (can confirm it on confirmation windows shown in FIGS. 32 to 36 to be described later).

On the other hand, if it is determined in step S422 that thumbnail display on a Web page is not requested, or after step S423, the flow advances to step S424 to check if a PDF file is requested as the proof expression method. If it is determined that a PDF file is requested, a PDF file (data) is created using, e.g., Acrobat Distiller available from Adobe Systems Corporation in step S425, and is presented to the user by the method requested by the user (e.g., that PDF file may be browsed on a Web page, may be uploaded to an ftp site, or may be attached to an e-mail message to the user if it has a small file size).

On the other hand, if it is determined in step S424 that the PDF file is not requested, or after step S425, the flow advances to step S426 to submit an e-mail message which describes the URL of the Web site to which the thumbnail image or PDF file is uploaded, or which is attached with the PDF file, to the user.

Upon reception of this e-mail message in step S401, if the user wants to display a thumbnail in step S402, he or she launches a Web browser, inputs the URL, also the user ID and password on a window provided by the Web server module 441, and acquires a thumbnail window from the Web server module 441 in step S403. In step S404, the user displays and browses the thumbnail image acquired from the Web server module 441 (FIGS. 32 to 36 to be described later), and the flow advances to step S405.

On the other hand, if the user does not want to display a thumbnail in step S402, the flow jumps to step S405.

If the user wants to acquire a PDF file in step S405, the flow advances to step S406 to download the PDF file from the Web server module 441, and the flow advances to step S407.

If the user does not want to acquire a PDF file in step S406, the flow jumps to step S407.

In step S407, the user confirms the proof. If the user determines that proof confirmation is OK (if the user instructs to proceed with the print step by the image forming device (e.g., MFP) of this system), the flow jumps to step S409.

On the other hand, if the user determines in step S407 that proof confirmation is not OK (NG) (if the user instructs re-proofing in place of the print step), the user inputs an NG portion and comment of the proof in step S408, and the flow advances to step S409.

In step S409, an e-mail message indicating the proof confirmation result (to instruct to proceed with the print step or instruct re-proofing in place of the print step), and is submitted to the proof manager 114. If the proof confirmation result is NG, the user attaches data of the NG portion and comment of the proof input in step S408 to the e-mail message or writes them in the body text of the e-mail message. Also, information indicating if the proof confirmation result is OK/NG may be described in the body text of the e-mail message or a character string indicating OK/NG may be described in the title of the e-mail message.

Upon reception of this e-mail message (S427), the proof manager 141 checks in step S428 if the proof confirmation result is OK. If it is determined that the proof confirmation result is OK (to instruct to proceed with the print step), the proof manager 141 ends the process, and rewrites JDF (Job Definition Format) data, which expresses an instruction required to execute the work flow including a series of process steps such as order, edit, proofing, print, sheet processes, delivery, and the like as digital data that can be recognized by respective devices, as shown in FIG. 23 (to be described later), so as to proceed with the print step. Note that determination in step S428 may be made by a program on the basis of the title or like of the received e-mail message, or a person in charge may be informed of reception of the e-mail message, may make determination in step S428, and may input the confirmation result=OK/NG.

On the other hand, if it is determined in step S428 that the proof confirmation result is not OK (NG) (to instruct re-proofing in place of the print step), the flow advances to step S429, and the worker attending the image forming system (the worker of this system who received the print creation request from the client) controls to redo a document edit process, document process, and proof printing process in accordance with the comment data of the NG portion from the user (client) as the data analysis result of data received from the client computer. The flow then returns to step S421.

In FIG. 6, the proof confirmation result of the user to be output from the client computer is sent via the e-mail message in step S409. Alternatively, the user may contact a person in charge (worker) of the image processing system via a telephone or FAX, that person in charge may determine if the proof confirmation result is OK/NG, and may input OK/NG to an appropriate device (e.g., the proof manager 114) via an operation unit. Note that the pre-print processes include the job order process step by the order/input manager 112, the edit process step of document data by the document edit manager, which is to be executed after the order process step, and the proof process step by the proof manager 114, which is to be executed after the edit process step. On the other hand, the print steps (or post-print steps) include an RIP process step by the print manager 115 (to be described below), a print process step executed by the image forming device (e.g., the MFP 104, 105, or the like), which is to be executed after the RIP process step, and sheet processes by various sheet processing devices 121 to 126, which are to be executed after the print process step.

[Print Manager 115]

The data flow in the print manager 115 will be described below using FIG. 7.

Figure 7:
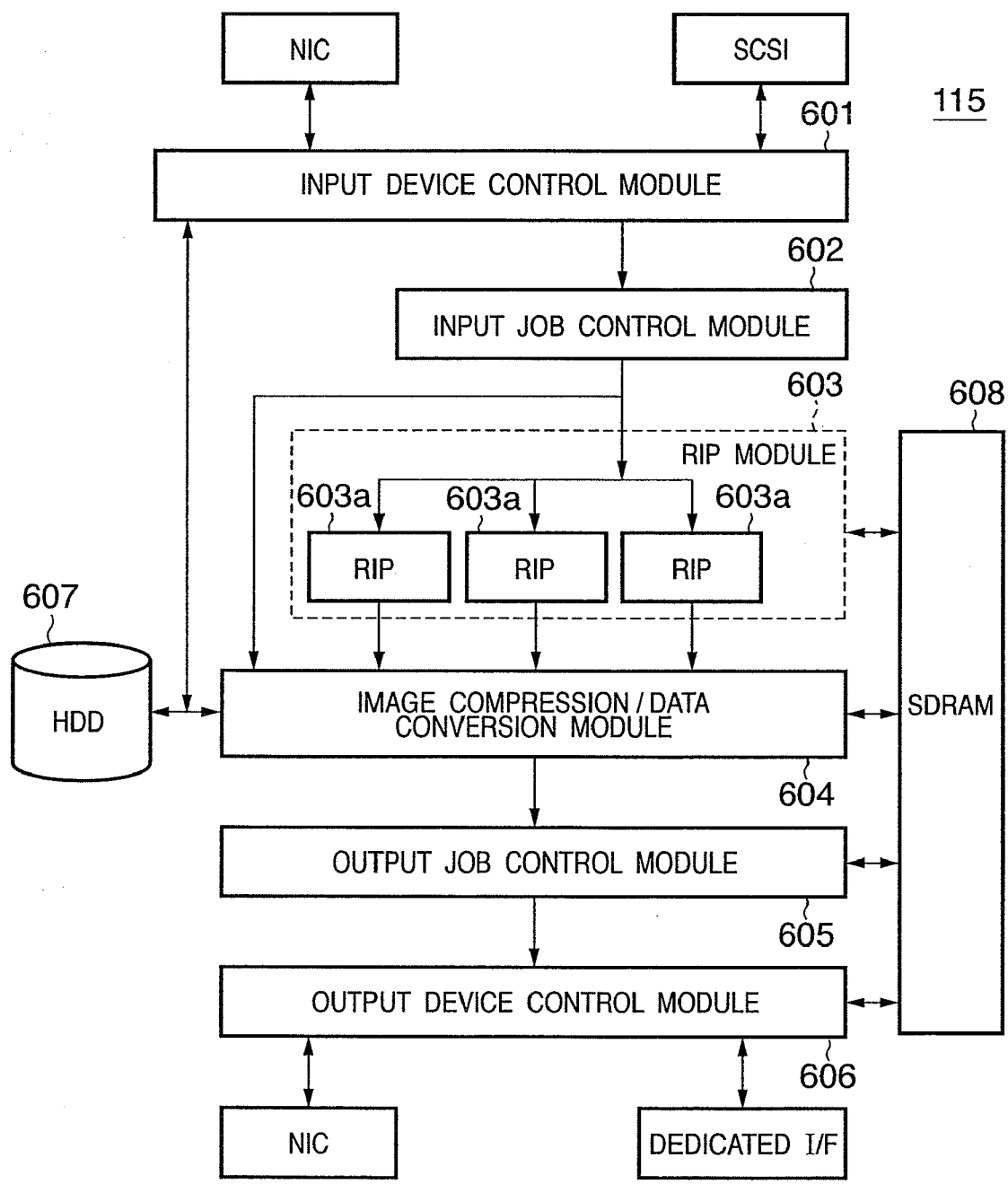
FIG. 7 is a block diagram for explaining the data flow in a print manager shown in FIG. 1.

FIG. 7 is a block diagram for explaining the data flow in the print manager 115 shown in FIG. 1.

A job (a job whose print instruction is submitted from a job submit window in the print step shown in FIG. 44 or 45 to be described later) which is input from an NIC (Network Interface Card) or SCSI (Small Computer System Interface) interface and shifts to the print step by the process control manager 111 enters a server (print manager 115) via an input device control module 601, and plays its role in connecting various client applications to the server. As inputs, PDL (Page Description Language) data and JCL (Job Control Language) data are accepted. Such data are status information associated with printers and servers, and correspond to various clients. The output from this module (input device control module 601) has a role of coupling all appropriate PDL and JCL elements.

Reference numeral 602 denotes an input job control module, which generates a job list so as to manage a request list of jobs and to access individual jobs sent to the server. Furthermore, this module (input job control module 602) includes a job routing function of determining a job route, a job split function of controlling if a job is to be split to apply an RIP process, and a job scheduling function of determining a job order.

Reference numeral 603 denotes an RIP (Raster Image Processor) module, which includes a plurality of processors (603a, 603b, 603c . . . ). The number of RIPs 603a, 603b, 603c, . . . may be increased as needed, and they will be generally referred to as the RIP module 603 hereinafter. The RIP module (603) executes an RIP process of PDL data of various jobs to generate bitmap data with appropriate sizes and resolutions. As for the RIP process, rasterize processes of various formats such as PCL, TIFF, JPEG, PDF, and the like in addition to PostScript (trademark of Adobe Systems Corporation) are available.

Reference numeral 604 denotes an image compression/data conversion module, which compresses bitmap image data generated by the RIP module 603 and applies format conversion to that data, and selects an optimal image type that matches each individual printer. For example, when a job is to be handled for respective pages, the module 604 executes an edit process that append a PDF header to bitmap data obtained by rasterizing TIFF data, JPEG data, or the like by the RIP module to form PDF data.

Reference numeral 605 denotes an output job control module which takes page images of a job, and manages the way these page images are to be handled on the basis of command setups. Page data is printed by a printer (e.g., MFP) or is saved (stored and held) in a hard disk 607 in the state of, e.g., bitmap image data. The way page images are to be handled is determined in accordance with the output process condition data from the client. Whether or not a printed job is left in the hard disk 607 can be selected by an instruction from the client. When the printed job is saved in the hard disk 607, the output job control module makes data control by reading out the printed job data from the memory to allow a desired re-output process such as a print process, transmission process, or the like every time it receives a request from the user (client). Furthermore, this module (output job control module 605) manages using both the hard disk 607 and a memory (SDRAM) 608.

Reference numeral 606 denotes an output device control module, which controls to determine devices to which the job is to be output, and devices to be clustered (a mode for making a plurality of image forming devices parallelly and simultaneously execute the print operation of a job output from one image data generation source), sends print data to interfaces of the selected devices, and controls the devices to execute an output process such as a print process, transmission process, and the like. This module (output device control module 606) monitors status of the MFP (104 and/or 105) as an example of the image forming device of this embodiment to acquire device status information or the like (e.g., information to be identified by the controller in this system, such as information used to confirm if current status of the image forming device of interest is "waiting" or "print in progress", status information used to confirm how many print waiting jobs are stored in the memory of the image forming device, information used to identify if an error such as a scanner error, printer error, or the like has occurred, expendable alert state information indicating whether or not an out-of-paper state of print sheets or an out-of-toner state has occurred, information used to identify the size and type of set print sheets, function information used to identify the functions of the image forming device, and the like) from the respective image forming devices via communication units, and informs the print manager 115 of the acquired information. Upon transmitting such various kinds of information acquired from the image forming devices to the print manager 115 via the communication units, the output device control module 606 may transfer data to the print manager 115 in response to information acquisition command data received from the print manager 115, or may transfer the information to the print manager 115 periodically and/or in real time without any request from the print manager 115.

Note that the print manager 115 shown in FIG. 7 comprises the RIP module 603. However, the RIP module 603 may be incorporated in the MFP 104 (or 105), or may form a unit independent from the print manager 115 in practice. In any case, the primary role of the print manager is to control a series of processes from the RIP process to the print process of input PDL information as well as the MFP 104 (or 105) and RIP module 603.

[Printer Driver]

Data are entered from the user's client computer to the order/input manager 112 or the like in various formats such as PDL data, PDF data, application data, a paper document (such paper document may be input from the scanner 106 in place of the information processing device such as the client computer or the like). When data entered by the user is PDL data (PS or PCL data, or the like), PDF data, or the like, if such data is input to the print manager 115 intact when it reaches the print step, that data can undergo the RIP process. On the other hand, when data entered by the user is application data, the worker must convert the application data into print data using a printer driver from the client computer 103 and must transmit it to the print manager 115 when that data reaches the print process. This system is configured and controlled to cope with such various formats.

The printer driver will be described below.

Figure 8:
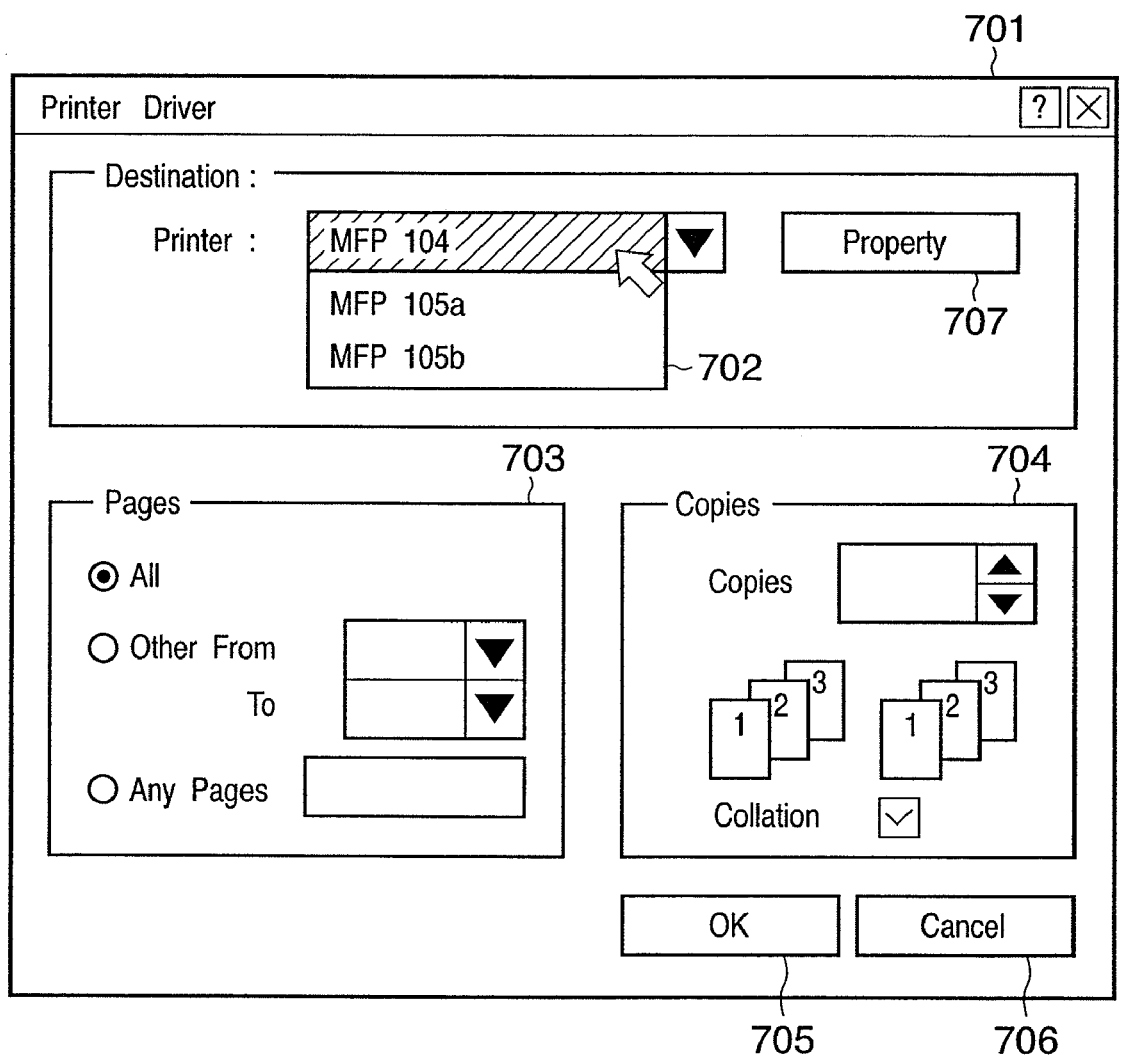
FIG. 8 shows an example of a printer driver window on a client computer shown in FIG. 1.
Figure 9:
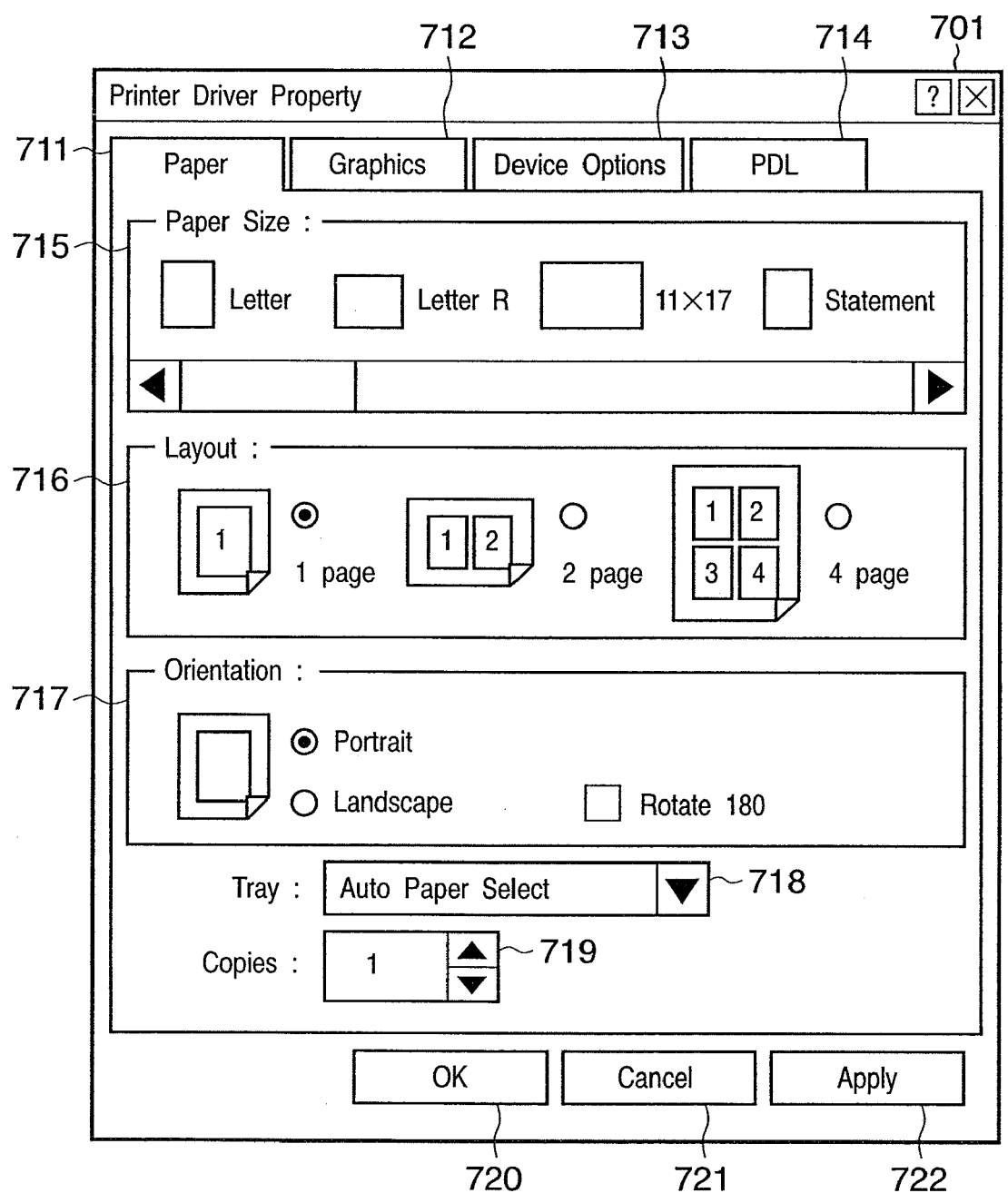
FIG. 9 shows an example of a printer driver window on the client computer shown in FIG. 1.
Figure 10:
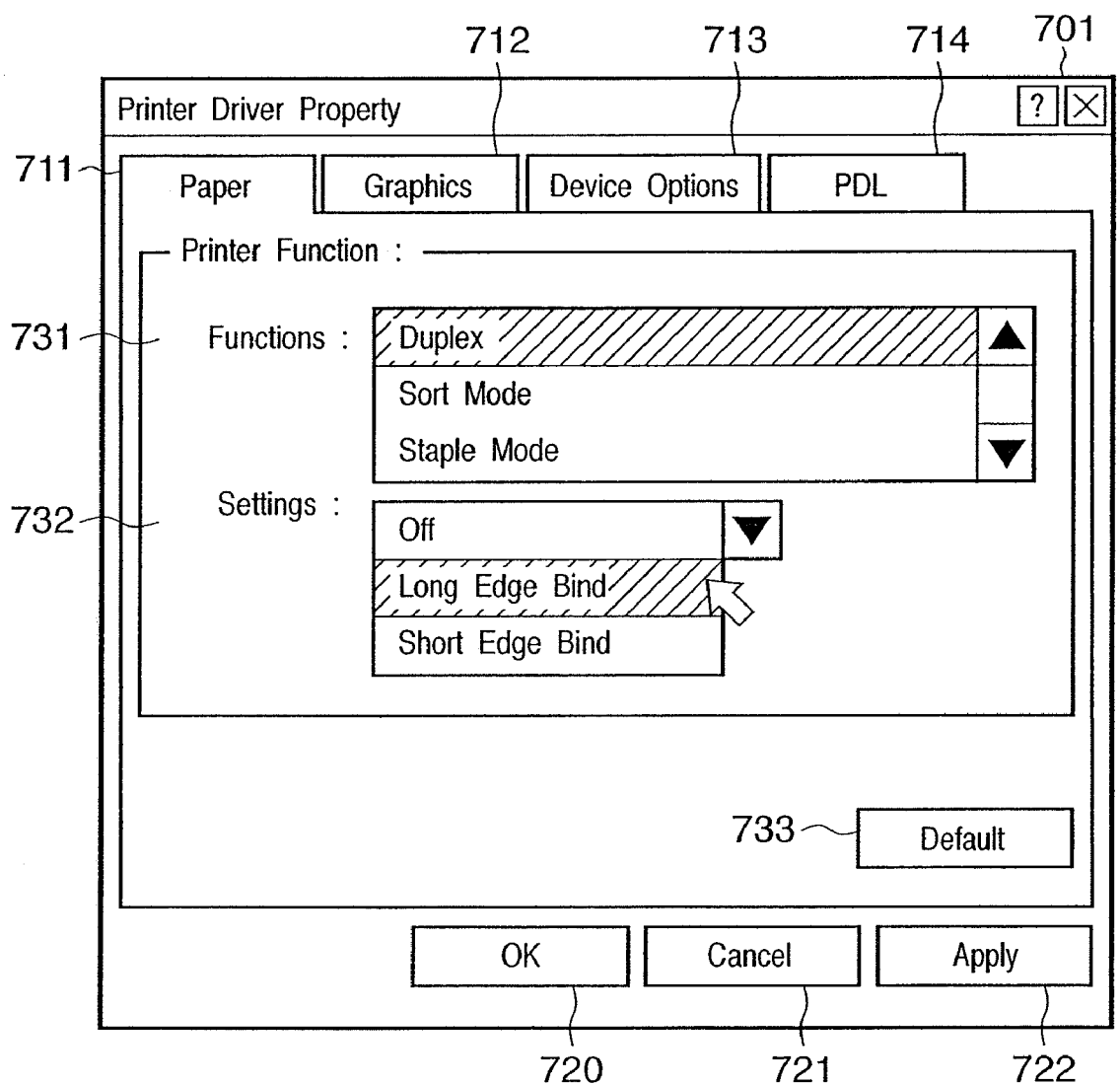
FIG. 10 shows an example of a printer driver window on the client computer shown in FIG. 1.

FIGS. 8 to 10 show an example of a printer driver window which is displayed on the display of the client computer 103 mainly by its controller. Note that operations and control to be explained using FIGS. 8 to 10 are included in the present invention.

The printer driver allows the user to set desired parameters (print output process condition data) by his or her key operations on a GUI (a GUI which is displayed on the display when the user makes a key operation to issue a display instruction of the property about "printer" on a print setup GUI that is displayed on the display of the computer upon issuing a print instruction from an operation window or the like of an application by his or her key operation) suited to instruct an output operation such as a print operation or the like by the image forming device (e.g., MFP) of this system. The printer driver controls to transmit the set user setups to a transmission destination (or an output destination) such as a printer or the like together with desired image data via the communication medium such as the network 101 and the like.

In FIGS. 8 to 10, reference numeral 701 denotes a window of the printer driver. Of setup items in the window 701 of the printer driver, reference numeral 702 denotes a transmission destination selection column used to select an output destination as a target. In this embodiment, one of the MFPs 104 and 105 can be selected. The user can select a desired output destination device of this system via the selection column 702 displayed on the window in this way.

Reference numeral 703 denotes a page setup column used to select output pages from a job. With this column, the user determines pages to be output of images created by application software which runs on the client computer 103. The user can select pages to be printed out by the device (e.g., MFP) of this system via the page setup column 703 displayed on the window in this way, and can set to print all pages or to print specific pages in place of all pages.

Reference numeral 704 denotes a copy number setup column used to designate the number of copies to be output of a job which is to be printed out by the device (e.g., MFP) of this system. When the user moves a cursor to this position and clicks one of arrows (those of a scroll bar), he or she can increase/decrease the number of copies. Reference numeral 707 denotes a property key used to make detailed setups associated with the transmission destination device selected using the transmission destination selection column 702. In response to the user's key input of the key 707, control is made to display various detailed setup windows shown in FIGS. 9 and 10 on the display of the computer.

When the user inputs an OK key 705 after he or she has done desired setups via various operation windows shown in FIGS. 8 to 10, a print process according to his or her desired setups can start. In response to depression of the OK key 705 on the window 701 by the user, control is made to transmit print data from the client computer 103 to the print manager 115 (see FIG. 51 to be described later). When the user wants to cancel the process, he or she presses a cancel key 706. In response to this operation, the controller aborts the print process, and quits display of the window 701.

FIGS. 9 and 10 show operation windows (GUIs) to be displayed on the client computer 103 in response to clicking of the property key 707 on the operation window shown in FIG. 8 by the user.

This window includes tab keys 711 to 714 such as "Paper", "Graphics", "Device Options", and "PDL". When the user clicks one of these tab keys (instructs a given tab key using an operation unit such as a pointing device or the like (not shown) of the client computer 103), he or she can set various detailed print output conditions of setups about "Paper", setups about "Graphics", setups about "Device Options", setups about "PDL", and the like.

FIG. 9 shows an example of the operation window displayed upon depression of the "Paper" tab 711. This window comprises a paper size setup field 715 which allows the user to set the paper size of print sheets of a job to be printed, a booklet imposition layout setup field 716 which allows the user to input an instruction for selecting a layout mode that lays out and forms document image data for a plurality of pages on a single surface of a single print sheet, and to input an instruction for selecting a layout of pages to be laid out on a single surface of a single print sheet in that layout mode from a plurality of candidates, a sheet orientation setup field 717 which allows the user to select a desired print orientation of a job to be printed from a plurality of candidates such as portrait, landscape, and the like, a paper feed tray setup field 718 which allows the user to select a paper feed tray used in the print process of a job to be processed from a plurality of candidates of paper feed trays of the image forming device of this system that can store a plurality of types and/or sizes of print sheets for respective types, a copy number setup field 719 which allows the user to select the number of print copies of a job to be processed, and the like. These setup item fields on the window allow the user to attain desired print setups described above. When the user selects the "Device Options" tab 713 by his or her key operation, the controller displays the operation window shown in FIG. 10 in response to this operation. This window comprises a plurality of setup fields which allow the user to make various detailed setups of unique setup information associated with a device such as the MFP 104, 105, or the like selected by the user on the operation window in FIG. 8 from a plurality of devices of this system, such as setups of sheet processes including those of finishing such as a setup of a stapling process, that of a sort process, that of a punch process, that of a booklet process, and the like, a setup of simplex or duplex printing to be executed, a setup of fine adjustment associated with an image process for changing parameters such as color appearance and the like by the printer, and so forth. That is, this window allows the user to make various detailed setups described above. For example, as shown in FIG. 10, a function selection field 731 allows the user to set a desired sheet process, and a setting value setup field 732 allows the user to set detailed processing condition parameters in a processing mode selected on the selection field 731. For example, with the setups of this display example, the image forming device which is selected by the user on the operation window of FIG. 8 is controlled to execute a print process of a job to be printed in accordance with the duplex print mode set by the client via the setup field 732 on the operation window in FIG. 10, and is also controlled to execute a duplex print process based on a long edge bind setup in the duplex print mode set via the setup field 732. When the user operates a default key 733 on the operation window of FIG. 10, control is made to revert the detailed print setups on the operation window in FIG. 10 to default values.

Although not shown, a window displayed upon selection of the "Graphics" tab 712 allows the user to make a resolution setup and halftone setup, and a window displayed upon selection of the "PDL" tab 714 allows the user to select a PDL output format and the like.

Furthermore, reference numeral 720 denotes an OK key. Upon depression (designation) of this key, the property setups are activated, and the window shown in FIG. 8 is displayed again. Reference numeral 721 denotes a cancel key. Upon depression (designation) of this key, the property setups are deactivated, and the window shown in FIG. 8 is displayed again. Reference numeral 722 denotes an apply key. Upon depression (designation) of this key, the property setups are activated while displaying the property window.

After the client sets desired output conditions of the print process conditions including various detailed setups via various print setup windows shown in FIGS. 8 to 10, the client computer outputs a job output request, the print condition data of that job, and image data of that job. Then, devices selected by the client of those (including a plurality of image forming devices such as MFPs, printers, and the like) of this system are controlled to execute an output operation desired by the client according to the output conditions set by the client for data (including image data) of the job output from the client computer 103.

[RIP Module]

The arrangement of the RIP module 603 shown in FIG. 7 will be described below with reference to FIGS. 11 to 14.

Figure 11:
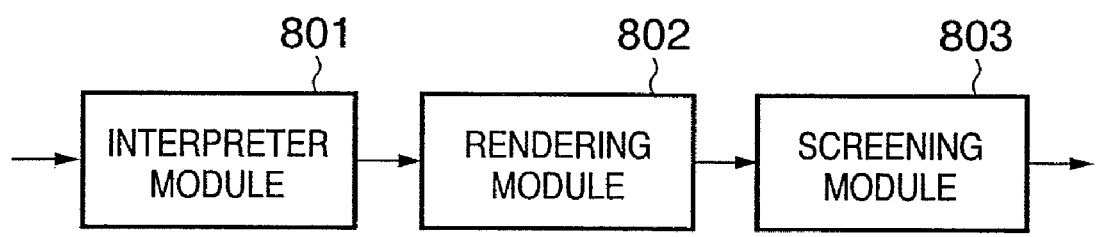
FIG. 11 is a block diagram showing an example of the arrangement of an RIP module shown in FIG. 7.

FIG. 11 is a block diagram showing an example of the arrangement of the RIP module 603 shown in FIG. 7.

As shown in FIG. 11, the RIP module 603 comprises three modules, i.e., an interpreter module 801, rendering module 802, and screening module 803.

The interpreter module 801 interprets PDL data to rasterize that data to bitmap data. The rendering module 802 performs color rendering of PDL data. The screening module 803 executes a binarization process and generates a screen with a predetermined period and angle when data is to be output to the monochrome MFP 105, and also generates a calibration gamma table when data is to be output to the color MFP 104.

The respective modules will be described in detail below.

The interpreter module 801 will be described first with reference to FIGS. 12A and 12B.

The interpreter module 801 interprets PDL data, and the PDL represented by PostScript® of Adobe Systems Corporation is categorized into the following three elements (a) to (c).

(a) an image description by means of character codes
(b) an image description by means of graphic codes
(c) an image description by means of raster image data.

That is, the PDL is a language that describes an image formed by combining the above elements, and data described in this language is called PDL data.

Figures 12A, 12B:
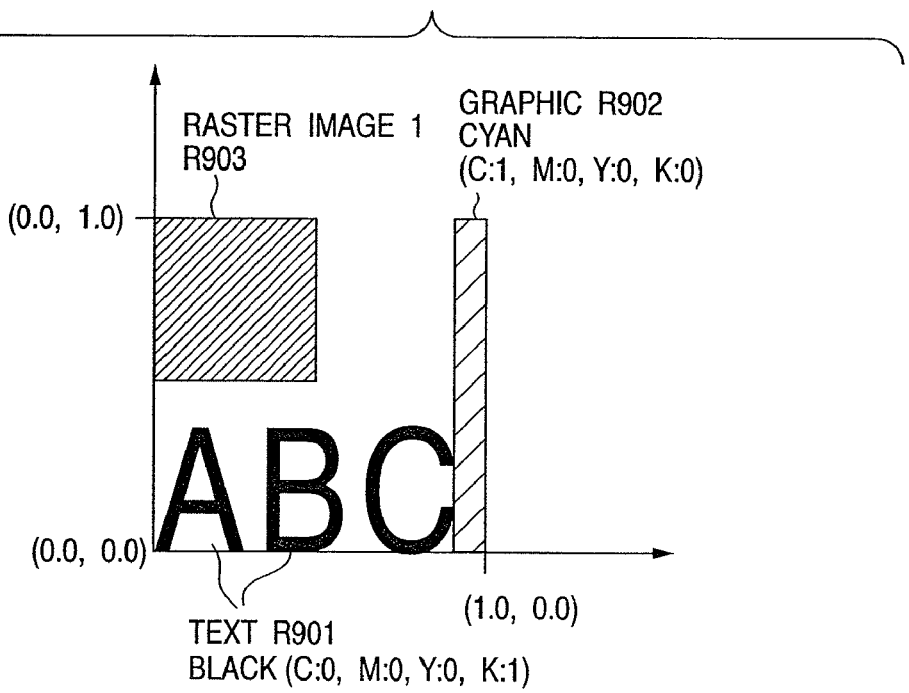
FIGS. 12A and 12B show a description example of PDL data input to an interpreter module shown in FIG. 11, and a rendering result by the interpreter module.

FIGS. 12A and 12B show a description example of PDL data to be input to the interpreter module 801 shown in FIG. 11, and a rendering result by the interpreter module 801.

FIG. 12A corresponds to a PDL description example of the rendering result shown in FIG. 12B. Character information "description of R901" includes L911 to L913, which respectively indicate a character color, a character string, and coordinate positions. The values in the parentheses of the character color represent Cyan, Magenta, Yellow, and Black densities in turn. The minimum value is "0.0", and the maximum value is "1.0". L911 indicates a designation example of the character color which is set to be black. L912 indicates that a character string "ABC" is substituted in variable String1.

In L913, the first and second parameters indicate the x- and y-coordinates of the start position on a paper sheet upon laying out a character string, the third parameter indicates the character size, the fourth parameter indicates the character spacing, and the fifth parameter indicates a character string to be laid out. In short, L913 instructs to lay out a character string "ABC" from the coordinate position (0.0, 0.0) to have a size "0.2" and spacing "0.3".

In an example "description of R902" of graphic information, L921 designates a line color by the same description method as in L911 that designates the character color. In this example, Cyan is designated. L922 designates to draw a line. The first and second parameters indicate the x- and y-coordinates of the initial end of the line, the third and fourth parameters indicate the x- and y-coordinates of the terminal end, and the fifth parameter indicates the width of the line.

Furthermore, in an example "description of R903" of raster image information, L931 substitutes a raster image in variable image1. In L931, the first parameter indicates the image type and the number of color components of a raster image, the second parameter indicates the number of bits per color component, and the third and fourth parameters indicate the image sizes of the raster image in the x- and y-directions. The fifth parameter and subsequent parameters represent raster image data. The number of raster image data is expressed by the product of the number of color components that form one pixel, and the image sizes in the x- and y-directions. In L931, since a CMYK image is made up of four color components (Cyan, Magenta, Yellow, Black), the number of raster image data is 100 (=4×5×5).

Next, L932 instructs to lay out image1 from a coordinate position (0.0, 0.5) to have a size "0.5×0.5".

FIG. 12B shows a state wherein the three image descriptions ("description of R901", "description of R902", and "description of R903") in one page shown in FIG. 12A are interpreted to be rasterized to raster image data.

In FIG. 12B, R901, R902, and R903 are obtained by rasterizing the respective PDL data ("description of R901", "description of R902", and "description of R903") shown in FIG. 12A.

These raster image data are rasterized on the memory 608 (or hard disk 607) for respective C, M, Y, and K color components in practice. For example, for a portion of R901, C=0, M=0, Y=0, and K=255 are written in C, M, Y, and K memory areas, and for a portion of R902, C=255, M=0, Y=0, and K=0 are written in the C, M, Y, and K memory areas.

In the print manager 115, PDL data sent from the client 103 (or another computer) is written in the memory 608 (or hard disk 607) intact or after it is rasterized to a raster image, as described above, and is saved as needed.

The rendering module 802 shown in FIG. 11 will be described below with reference to FIG. 13.

Image data output from the interpreter module 801 shown in FIG. 11 may be expressed by various color spaces such as grayscale, RGB, CMYK, and the like. In case of other color spaces, the color space of image data is temporarily converted into a CMYK space by CRD (Color Rendering Dictionary), and the color data then undergoes color matching.

Figure 13:
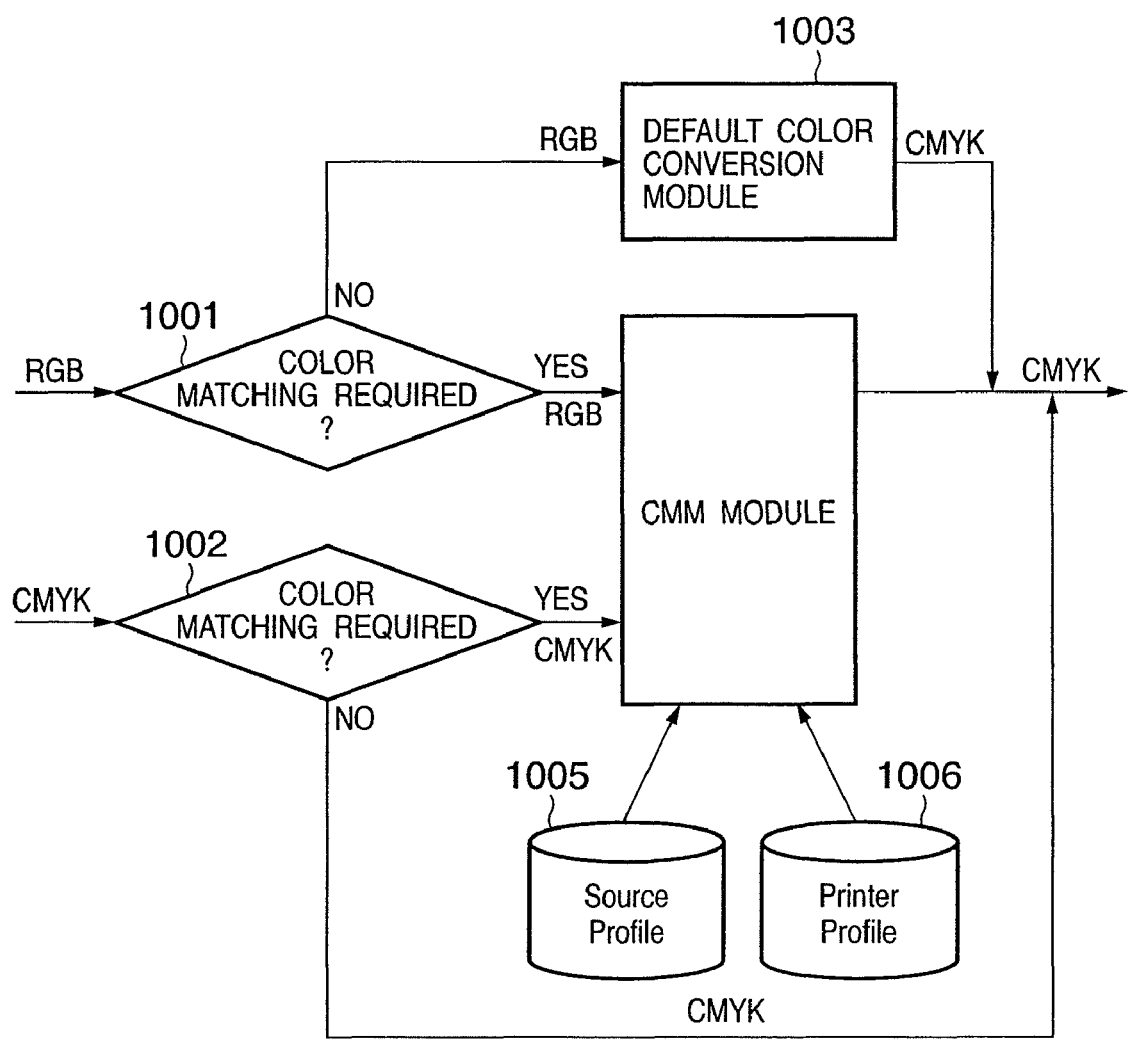
FIG. 13 is a flow chart showing an example of color matching in a rendering module shown in FIG. 11.

FIG. 13 is a flow chart showing an example of color matching in the rendering module 802 shown in FIG. 11.

As shown in FIG. 13, if color matching is required for input RGB or CMYK data, a CMM module 1004 executes color adjustment based on an ICC profile. The ICC profile includes a source profile 1005 and printer profile 1006. The source profile temporarily converts RGB (or CMYK) data into a standardized L*a*b* color space, and then converts this L*a*b* data into a CMYK space suited to a target printer.

The source profile 1005 includes RGB and CMYK profiles (not shown). When an input image is an RGB-based image (an image created by application software of Microsoft Corporation, JPEG image, TIFF image, or the like), the RGB profile is selected; when an input image is a CMYK-based image (some data created by Photoshop or Illustrator of Adobe Systems Corporation or the like), the CMYK profile is selected.

The printer profile 1006 is prepared in correspondence with the color characteristics of each printer. For an RGB-based image, Perceptual (color appearance priority) or Saturation (brightness priority) is preferably selected. In case of a CMYK-based image, Colorimetric (minimum color difference) is normally selected to output an optimal image.

The ICC profile is normally prepared in a lookup table format. Upon reception of RGB (or CMYK) data, the source profile 1005 uniquely converts the input data into L*a*b* data, and the printer profile 1006 converts the L*a*b* data into CMYK data that matches a printer.

If no color matching is required for input RGB data, a default color conversion module 1003 converts that RGB data into CMYK data that matches a printer, and outputs the CMYK data.

If no color matching is required for input CMYK data, the CMYK data is output intact.

Gamma correction in the screening module 803 shown in FIG. 11 will be described below with reference to FIGS. 14A to 14D.

Figure 14A:
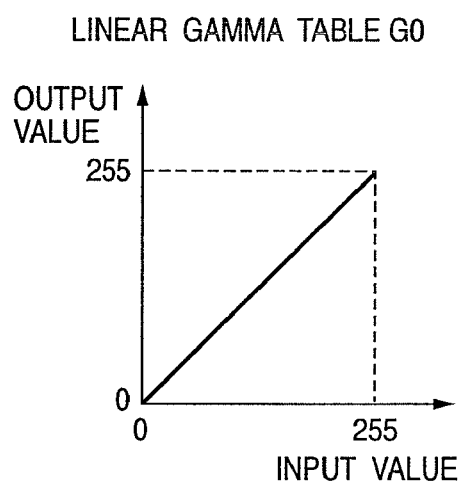
FIGS. 14A to 14D are graphs for explaining gamma correction in a screening module shown in FIG. 11.
Figure 14B:
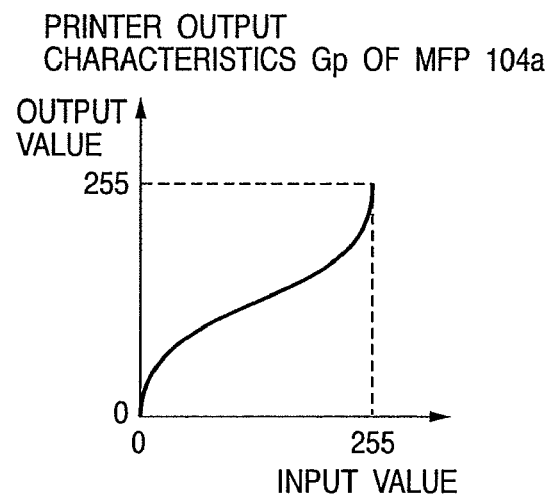
Figure 14C:
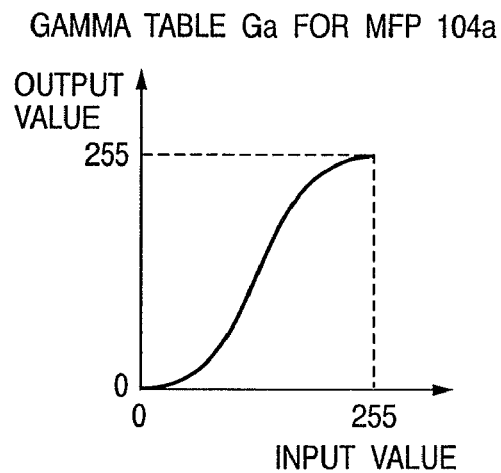

FIGS. 14A to 14D are graphs for explaining gamma correction in the screening module 803 shown in FIG. 11. FIG. 14A corresponds to a linear gamma table; FIG. 14B, printer output characteristics; FIG. 14C, a calibrated gamma table; and FIG. 14D, a gamma table with the output characteristics.

As a gamma table, a linear gamma curve shown in FIG. 14A is prepared as a default, and tables are prepared in correspondence with printer characteristics.

For example, when output characteristics Gp of an MFP 104a have values shown in FIG. 14B, if such characteristics are multiplied by FIG. 14C as inverse function Ga, the output characteristics are corrected to linear values shown in FIG. 14A (Ga×Gp=G0).

Figure 14D:
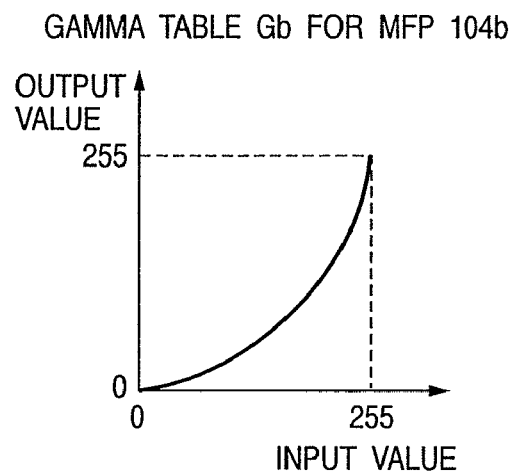

If the user wants to select characteristics shown in FIG. 14D as print-like output characteristics, a table with values (Ga×Gb) may be multiplied.

In order to prepare these gamma tables, a calibration function using the MFP 104a, a scanner unit, a densitometer, and the like is generally used.

[Arrangement of MFPs 104 and 105]

The arrangement of the MFPs (Multi-Function Peripherals) 104 and 105 will be described below using FIGS. 15 to 19. Each of these MFPs is an image forming device which comprises a memory such as a hard disk or the like, which can store data of a plurality of jobs, and a plurality of functions such as a copy function that allows a printer unit to print job data output from a scanner via the memory, a print function that allows the print unit to print job data output from an external device such as a computer or the like via the memory, and the like. Note that the difference between the MFPs 104 and 105 is that between full-color and monochrome devices, and the full-color device normally includes the arrangement of the monochrome device except for a color process. Hence, the following description will be given focusing on the full-color device, and a description of the monochrome device will be added as needed. The arrangement of this system may comprise the aforementioned multi-function image forming device having a plurality of functions and also an SFP (Single-Function Peripheral) such as a single-function image forming device having a print function alone or the like, or may comprise an image forming device of either one type. Also, the system may comprise a plurality of image forming devices independently of their types. The present invention is not limited to a specific arrangement as long as the control of this embodiment can be implemented.

Figure 15:
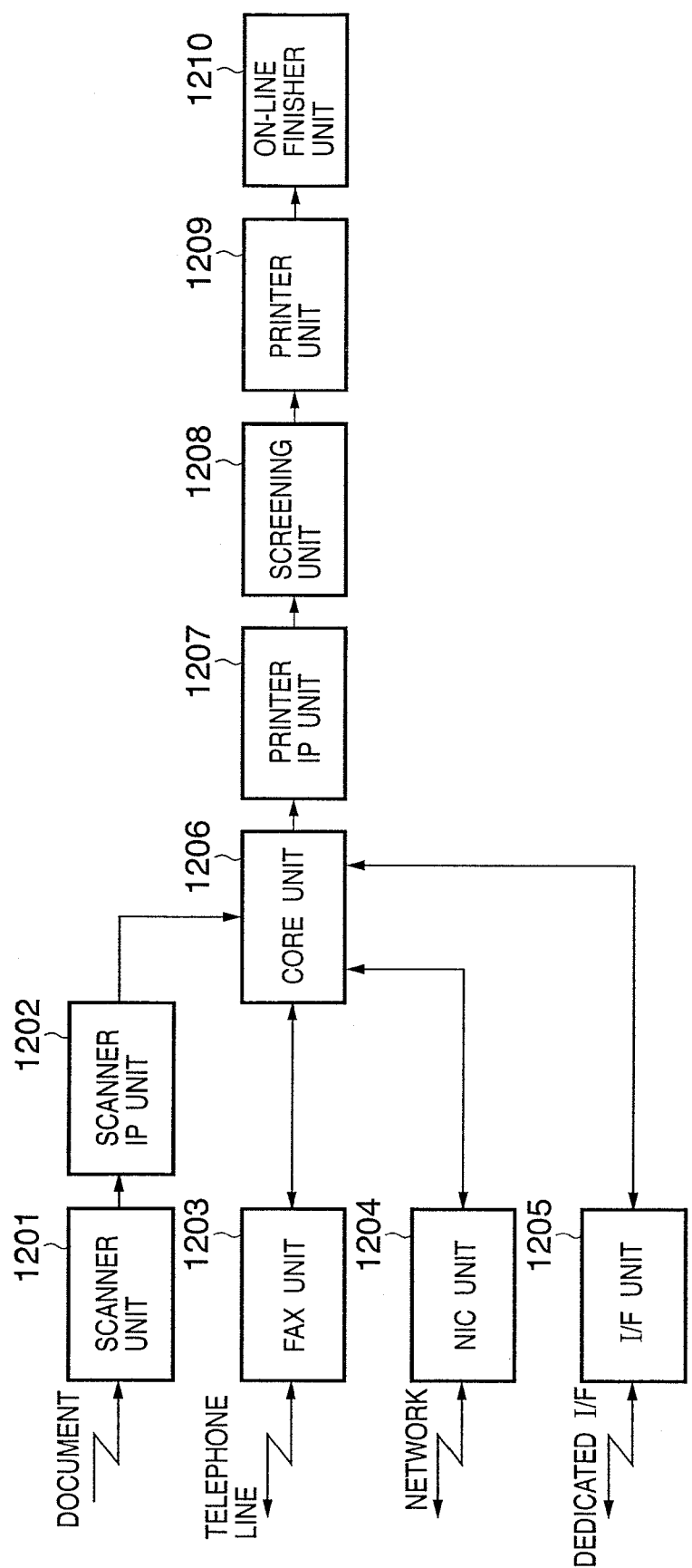
FIG. 15 is a block diagram showing the arrangement of an MFP (Multi-Function Peripheral) shown in FIG. 1.

FIG. 15 is a block diagram showing the arrangement of the MFPs (Multi-Function Peripherals) 104 and 105 shown in FIG. 1.

As shown in FIG. 15, each of the MFPs 104 and 105 comprises a scanner unit 1201 for scanning an image, an scanner IP unit 1202 for applying an image process to the scanned image data, a FAX unit 1203 such as facsimile for transmitting/receiving images using a telephone line, an NIC (Network Interface Card) unit 1204 for exchanging image data and device information using a network, and a dedicated I/F unit 1205 which exchanges information with the full-color MFP 104. A core unit 1206 controls to temporarily save an image signal, and to determine the route of the image signal in accordance with the method of using the MFPs 104 and 105. Note that the core unit 1206 comprises a memory such as a hard disk or the like, which can store a plurality of image data. A controller (e.g., a CPU of the core unit or the like) of the image forming device controls to store, in the hard disk, a plurality of image data such as image data input from the scanner unit 1201, image data of a facsimile job input via the FAX unit 1203, image data input from an external device such as a computer or the like via the NIC unit 1204, image data input from another image forming device via the I/F unit 1205, and the like, and to read out the image data from the hard disk as needed and transfer the readout image data to an output unit such as a print unit 1209 or the like, thus executing an output process such as a print process or the like by the printer unit 1209. Note that control is made to transfer image data read out from the hard disk to an external device such as a computer, another image forming device, or the like in accordance with an operator's instruction.

Image data output from the core unit 1206 is sent to the printer unit 1209 that forms an image via a printer IP unit 1207 and screening unit 1208. Sheets printed out by the printer unit 1209 are fed into an on-line finisher unit 1210 and undergo a sheet sorting process and finishing process.

The core unit 1206 makes traffic control of a bus, and switches paths like (1) to (5) to be described below. When data goes through the network, it is a common practice to use compressed data such as JPEG, JBIG, ZIP, or the like. Such data is decompressed (expanded) by the core unit 1206 after it is input to the MFP.

(1) Copy function: scanner unit 1201→core unit 1206→printer unit 1209

(2) Network scanner: scanner unit 1201→core unit 1206→NIC unit 1204

(3) Network printer: NIC unit 1204→core unit 1206→printer unit 1209

(4) Facsimile transmission function: scanner unit 1201→core unit 1206→FAX unit 1203

(5) Facsimile reception function: FAX unit 1203→core unit 1206→printer unit 1209

The printer IP unit 1207 comprises an output masking/UCR unit which converts input signals into Y, M, C, and K signals as toner colors of the image forming device by matrix calculations, a gamma correction unit which converts input data into C, M, Y, and K data for image output using a lookup table (LUT) RAM that considers various color appearance characteristics of toners, a spatial filter that applies a sharpness or smoothing process, and the like.

The screening unit 1208 executes a process such as error diffusion, dithering, PWM (Pulse Width Modulation), or the like.

Figure 16A:
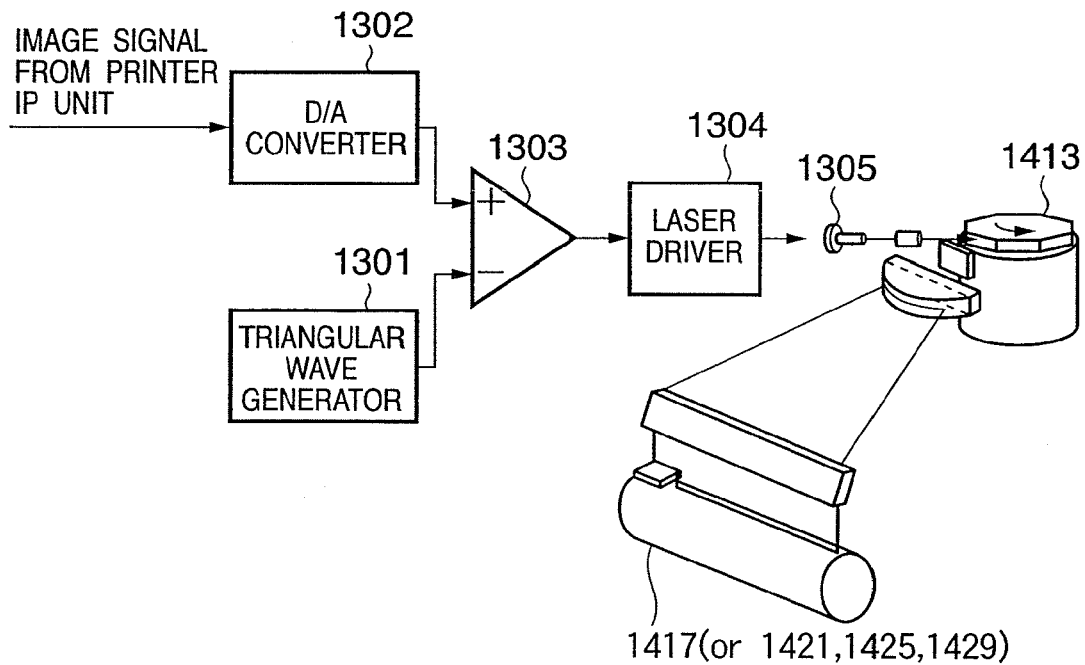
FIGS. 16A and 16B are respectively a diagram and chart for explaining a PWM process in a screening unit shown in FIG. 15.
Figure 16B:
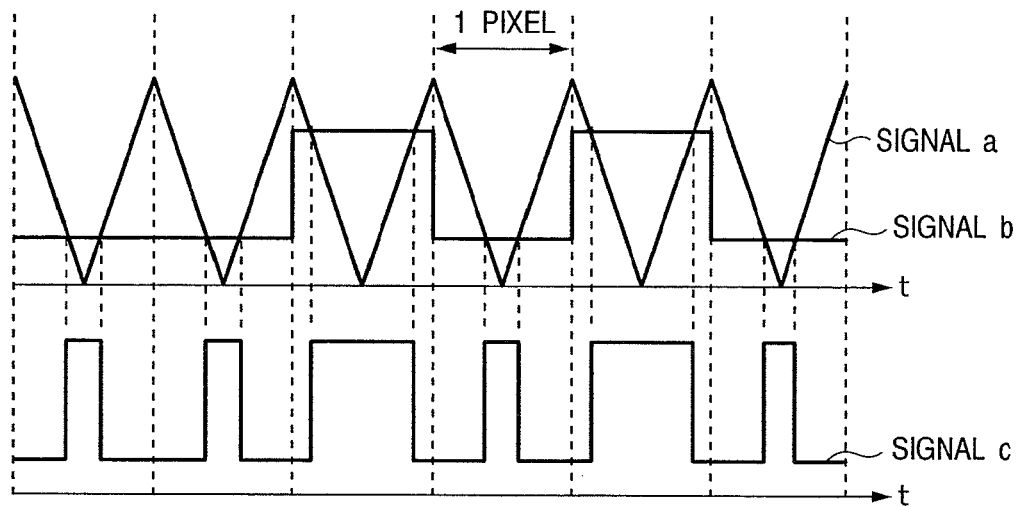

FIGS. 16A and 16B are respectively a diagram and chart for explaining the PWM process in the screening unit 1208 shown in FIG. 15.

Referring to FIG. 16A, reference numeral 1301 denotes a triangular wave generator; and 1302, a D/A converter for converting an input digital image signal into an analog signal.

A signal (signal a shown in FIG. 16B) output from the triangular wave generator 1301 and a signal (signal b shown in FIG. 16B) output from the D/A converter 1302 are compared by a comparator 1303 to generate a density-dependent pulse-width signal like signal c shown in FIG. 16B, which is sent to a laser driver 1304. In case of a color image, four (C, M, Y, and K) arrangements equivalent to that shown in FIG. 16A are required, and C, M, Y, and K data are respectively converted into laser beams by corresponding lasers 1305.

A polygonal scanner (mirror) 1413 scans the respective laser beams to irradiate photosensitive drums 1417, 1421, 1425, and 1429 with these laser beams.

Figure 17:
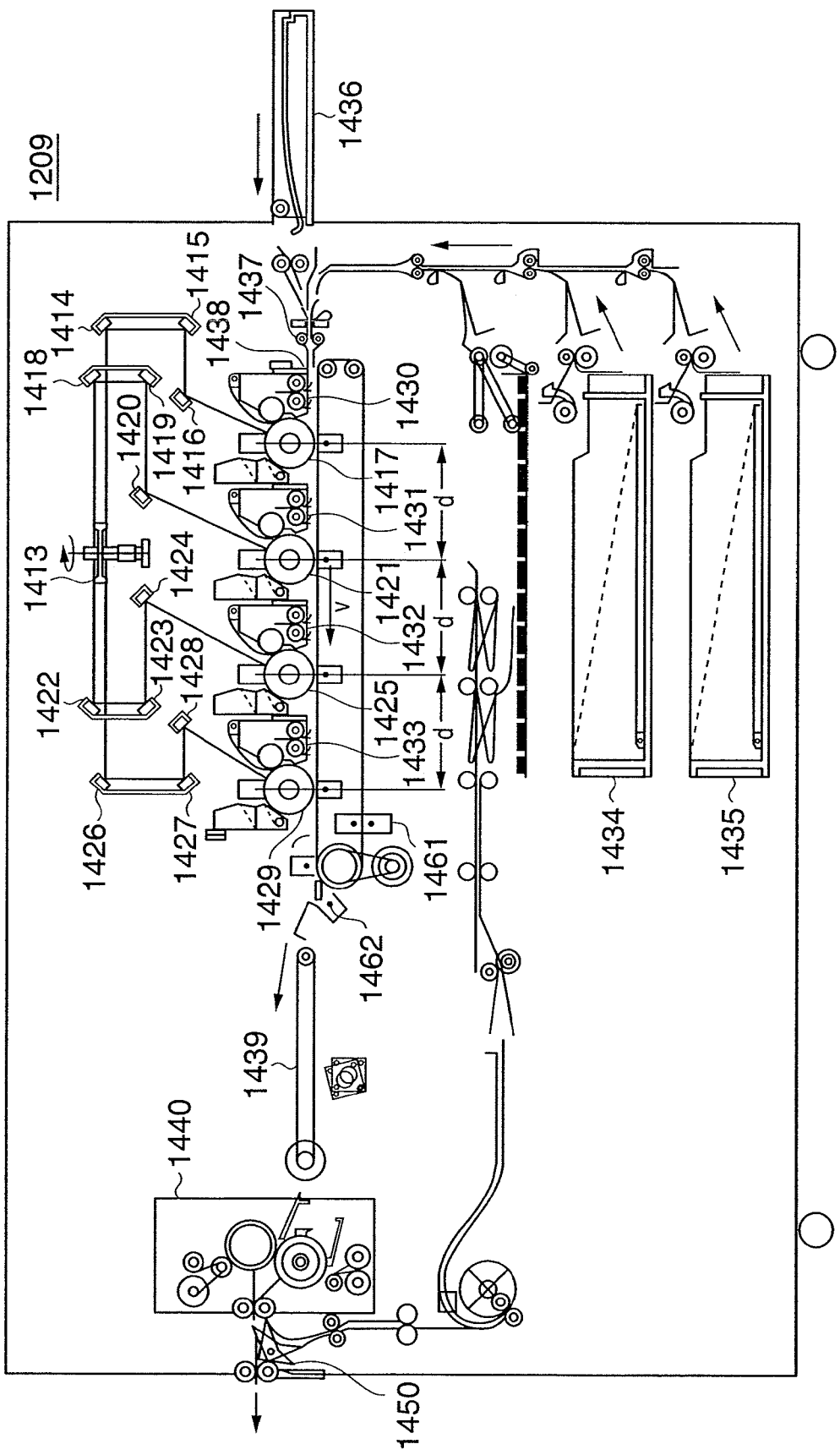
FIG. 17 is a sectional view showing the structure of a printer unit (especially, a color printer unit) shown in FIG. 15.

FIG. 17 is a sectional view showing the structure of the printer unit (especially, color printer unit) 1209 shown in FIG. 15, and the same reference numerals in FIG. 17 denote the same parts as those in FIG. 16.

As shown in FIG. 17, the polygonal mirror 1413 receives four laser beams emitted by four semiconductor lasers 1305. One of these laser beams scans and exposes the photosensitive drum 1417 via mirrors 1414, 1415, and 1416, the next laser beam scans and exposes the photosensitive drum 1421 via mirrors 1418, 1419, and 1420, the next laser beam scans and exposes the photosensitive drum 1425 via mirrors 1422, 1423, and 1424, and the last laser beam scans and exposes the photosensitive drum 1429 via mirrors 1426, 1427, and 1428.

Reference numeral 1430 denotes a developer which supplies yellow (Y) toner, and forms a yellow toner image on the photosensitive drum 1417 in accordance with the laser beam. Reference numeral 1431 denotes a developer that supplies magenta (M) toner, and forms a magenta toner image on the photosensitive drum 1421 in accordance with the laser beam. Reference numeral 1432 denotes a developer that supplies cyan (C) toner, and forms a cyan toner image on the photosensitive drum 1425 in accordance with the laser beam. Reference numeral 1433 denotes a developer that supplies black (K) toner, and forms a black toner image on the photosensitive drum 1429 in accordance with the laser beam. These four (Y, M, C, and K) toner images are transferred from the photosensitive drums 1417, 1421, 1425, and 1429 onto a sheet, thus obtaining a full-color output image.

A sheet fed from one of sheet cassettes 1434 and 1435 and a manual insertion tray 1436 is chucked and conveyed along a transfer belt 1438 via registration rollers 1437. Respective toner images are formed in advance on the photosensitive drums 1417, 1421, 1425, and 1429 in synchronism with the sheet feed timing, and are transferred onto the sheet as the sheet is conveyed.

The sheet on which the respective color toner images are transferred is separated and is conveyed by a conveyor belt 1439. Then, a fixing unit 1440 fixes the toner images on the sheet. The sheet which has left the fixing unit 1440 is temporarily guided downward by a flapper 1450. After the trailing end of the sheet leaves the flapper 1450, the sheet is switched back and exhausted. In this manner, the sheet is exhausted facing down, and a correct page order is assured when pages are printed in turn from the first page.

Note that the four photosensitive drums 1417, 1421, 1425, and 1429 are arranged at equal intervals (=distance d), and a sheet is conveyed at a constant velocity v by the conveyor belt 1439. The four semiconductor lasers 1305 are driven in synchronism with this timing.

Figure 18:
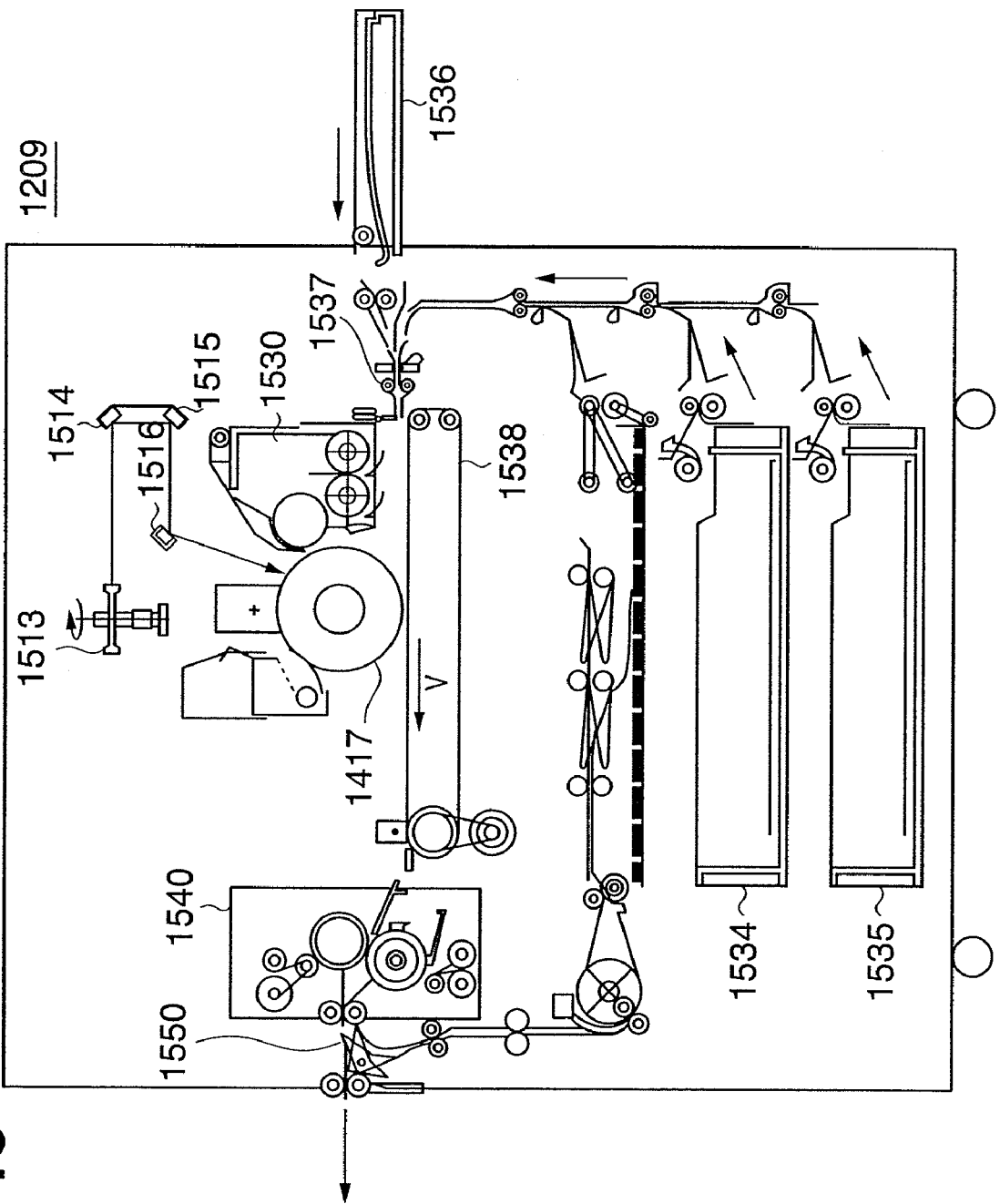
FIG. 18 is a sectional view showing the structure of a printer unit (especially, a monochrome printer unit) shown in FIG. 15.

FIG. 18 is a sectional view showing the structure of the printer unit (especially, monochrome printer unit) shown in FIG. 15, and the same reference numerals in FIG. 18 denote the same parts as those in FIG. 16.

Referring to FIG. 18, the polygonal mirror 1413 receives a laser beam emitted by the semiconductor laser 1305. The laser beam scans the photosensitive drum 1417 via mirrors 1514, 1515, and 1516.

Reference numeral 1530 denotes a developer which supplies black toner. The developer 1530 forms a toner image on the photosensitive drum 1417 in accordance with the laser beam. The toner image is transferred onto a sheet, thus obtaining an output image.

A sheet fed from one of sheet cassettes 1534 and 1535 and a manual insertion tray 1536 is chucked and conveyed along a transfer belt 1538 via registration rollers 1537. A toner image is formed in advance on the photosensitive drum 1417 in synchronism with the sheet feed timing, and is transferred onto the sheet as the sheet is conveyed.

The sheet on which the toner image is transferred is separated and a fixing unit 1540 fixes the toner image on the sheet. The sheet which has left the fixing unit 1540 is temporarily guided downward by a flapper 1550. After the trailing end of the sheet leaves the flapper 1550, the sheet is switched back and exhausted. In this manner, the sheet is exhausted facing down, and a correct page order is assured when pages are printed in turn from the first page.

Note that the case has been exemplified wherein the printer unit 1209 adopts a laser beam system. Also, the present invention can be applied to electrophotography systems (e.g., an LED system) other than the laser beam system, or to other print systems such as a liquid crystal shutter system, ink-jet system, thermal transfer system, dye sublimation system, and the like.

[Arrangement of On-Line Finisher Unit 1210]

Figure 19:
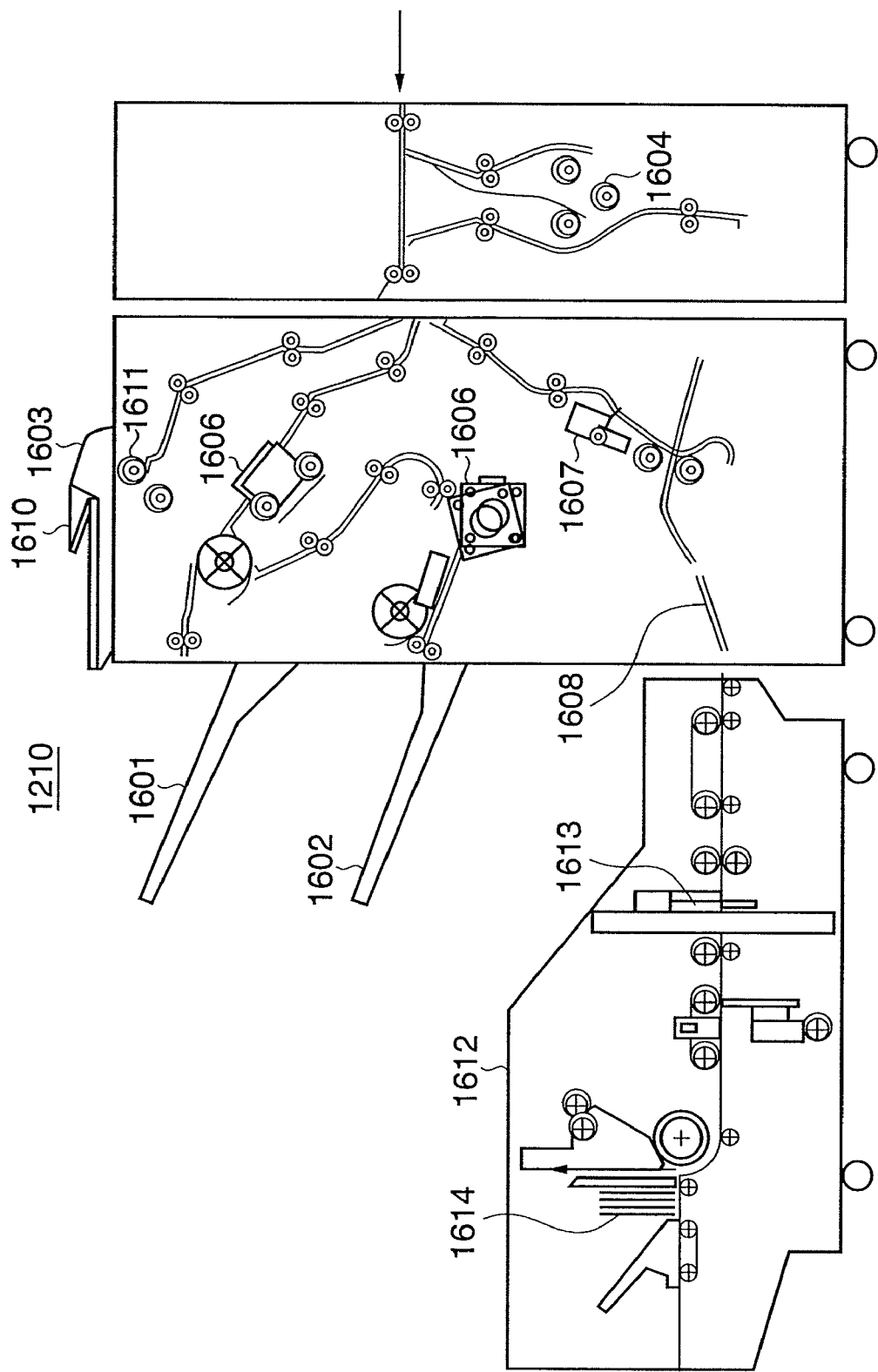
FIG. 19 is a sectional view showing the structure of an on-line finisher unit shown in FIG. 15.

FIG. 19 is a sectional view showing the structure of the on-line finisher unit 1210 shown in FIG. 15.

A sheet exhausted from the fixing unit of the printer unit 1209 enters the on-line finisher unit 1210 (if that finisher is connected). The on-line finisher unit 1210 has a sample tray 1601 and stack tray 1602, and sheets are selectively exhausted onto these trays in accordance with the type of job and the number of sheets to be exhausted.

Sorting can be made by two sort methods, i.e., a bin sort method that sorts sheets to a plurality of bins, and a shift sort method that sorts output sheets for respective jobs by shifting a digital sort function and bins (or trays) back and forth. The digital sort function is also called a collation function. If the image forming device has the large-capacity memory explained in the core unit, the digital sort function can be supported using a so-called collation function that changes the buffered page order and exhaust order using this buffer memory. A group function sorts sheets for respective pages while the sorting function sorts sheets for respective jobs.

When a staple mode is set for a job to be output, control is made to exhaust sheets onto the stack tray 1602. In this case, before sheets are exhausted onto the stack tray, they are stored in a process tray in the finisher in turn, and are bound by a stapler 1605 on that process tray. After that, the bundle of print sheets is exhausted onto the stack tray 1602.

In addition, up to these two trays, a Z-folder 1604 which folds sheets in a Z shape, and a puncher 1606 which punches two (or three) holes for a file are equipped, and they execute respective processes according to the type of job. For example, when the user makes a Z-fold process setup via the operation unit as a setup associated with the sheet process for a job to be output, the Z-folder 1604 is controlled to execute a folding process for print sheets of that job, and to exhaust the sheets onto the exhaust tray such as the stack tray 1602, sample tray, or the like through the machine. On the other hand, for example, when the user makes a punch process setup via the operation unit as a setup associated with the sheet process for a job to be output, the puncher 1606 is controlled to execute a punch process for print sheets of that job, and to exhaust the sheets onto the exhaust tray such as the stack tray 1602, sample tray, or the like through the machine.

A saddle stitcher 1607 executes a process (booklet process) for binding the central portions of sheets at two positions, and folding the sheets into two by nipping the central portions of the sheets by rollers so as to form a booklet like a pamphlet. The sheets bound by the saddle stitcher 1607 are exhausted onto a booklet tray 1608. Whether or not a sheet process operation such as a booklet process by the saddle stitcher 1607 or the like is to be executed is determined on the basis of the sheet process setups set by the user for a job to be output.

An inserter 1603 is used to feed sheets set on a tray 1610 to one of the trays 1601, 1602, and 1608 without going through the printer. In this manner, each sheet set on the inserter 1603 can be inserted between sheets (those which are printed by the printer unit) fed into the on-line finisher unit 1210. Sheets are set facing up on the tray 1610 of the inserter 1603, and a pickup roller 1611 feeds them in turn from the uppermost one.

Therefore, a sheet from the inserter 1603 is exhausted facing down when it is conveyed to the tray 1601 or 1602 intact. When a sheet from the inserter 1603 is fed to the saddle stitcher 1607, it is temporarily fed toward the puncher 1606, and is then switched back, thus adjusting the direction of the face. Whether or not a sheet process operation such as a sheet insertion process by the inserter 1603 or the like is to be executed is determined on the basis of the sheet process setups set by the user for a job to be output.

A trimmer 1612 will be described below.

A booklet saddle-stitched by the saddle stitcher 1607 enters this trimmer 1612. In this case, the output booklet is fed by a predetermined length by rollers, and is cut by a predetermined length by a cutter unit 1613, thus trimming up nonuniform end portions of a plurality of pages in the booklet. Then, the booklet is stored in a booklet hold unit 1614. Whether or not a sheet process operation such as a trimming process by the trimmer 1612 or the like is to be executed is determined on the basis of the sheet process setups set by the user for a job to be output.

[Post-Process Manager 116]

The post-process manager 116 shown in FIG. 1 is a computer which generally manages off-line finishers, and takes charge of status management, job instructions, and the like of various off-line finishers which apply finishing processes to the printout from the MFP 104 (or 105).

The off-line finishers (also called sheet processing devices) managed by the post-process manager 116 include various finishers such as the trimmer 121, saddle stitcher 122, case binder 123, paper folder 124, mail inserter 125, collator 126, and the like. The post-process manager 116 recognizes device states and job states by polling with these off-line finishers using a predetermined protocol, and manages job execution states. Note that this embodiment may adopt either an arrangement that executes these plurality of sheet processes (various sheet processes such as trimming, case binding, sheet folding, mail insertion, stapling, punch, collation, sorting, bookbinding, pasting, and the like) by independent sheet processing devices, or an arrangement that allows a single sheet processing device to execute the plurality of sheet processes. Alternatively, this system may comprise any of a plurality of sheet processing devices.

[File Archiving Manager 117]

The file archiving manager 117 shown in FIG. 1 archives user files (including user information, image data, and print condition data) to cope with a re-print schedule later. As the formats of files to be archived, one or both of a PDL file and Print Ready file (Bitmap and Tiff files are prevalent) are used. Upon archiving, Print Ready files are recorded on other storage media (CD-ROM, MO, ZIP, and the like) since they require a large capacity. Also, older PDL files or those which have large file sizes are similarly archived on other media. When the user wants, such medium can be sent back together with the final output. In this manner, the file archiving manager 117 controls to read out job data of that user from the storage medium and to re-print that job under desired print output conditions every time it receives a re-output request from the user (client).

When the user wants to re-print archived data, he or she can re-order it using a "Restore" item on the window shown in FIG. 29 (to be described later).

[Delivery/shipping Manager 118]

The delivery/shipping manager 118 shown in FIG. 1 is a computer which links with services such as parcel delivery service, courier service, mail, and the like, and manages the current delivery states, arrival schedules, and the like on the basis of delivery tracking numbers, airway bill numbers, and the like. In this way, the delivery/shipping manager 118 is configured to acquire delivery states of final results to be delivered upon delivering the final result (prints) output by this system to the client, and controls to manage delivery dates and scheduled arrival times.

[Scan Manager 119]

The scan manager 119 shown in FIG. 1 is a computer which is used to control the scanner 106 and scanner units of the MFPs 104 and 105, calls a scanner driver in response to an operator's instruction to control it to display a preview of scanned image data on the display unit, and is used to attain a quick copy process in collaboration with an image scan or the printer unit of the MFP. The scan manager 119 is also used when the user enters a paper document and the worker converts that paper document into digital data. More specifically, the scan manager 119 launches a scanner driver in response to a key operation of the worker or the like at the operation unit.

Figure 20:
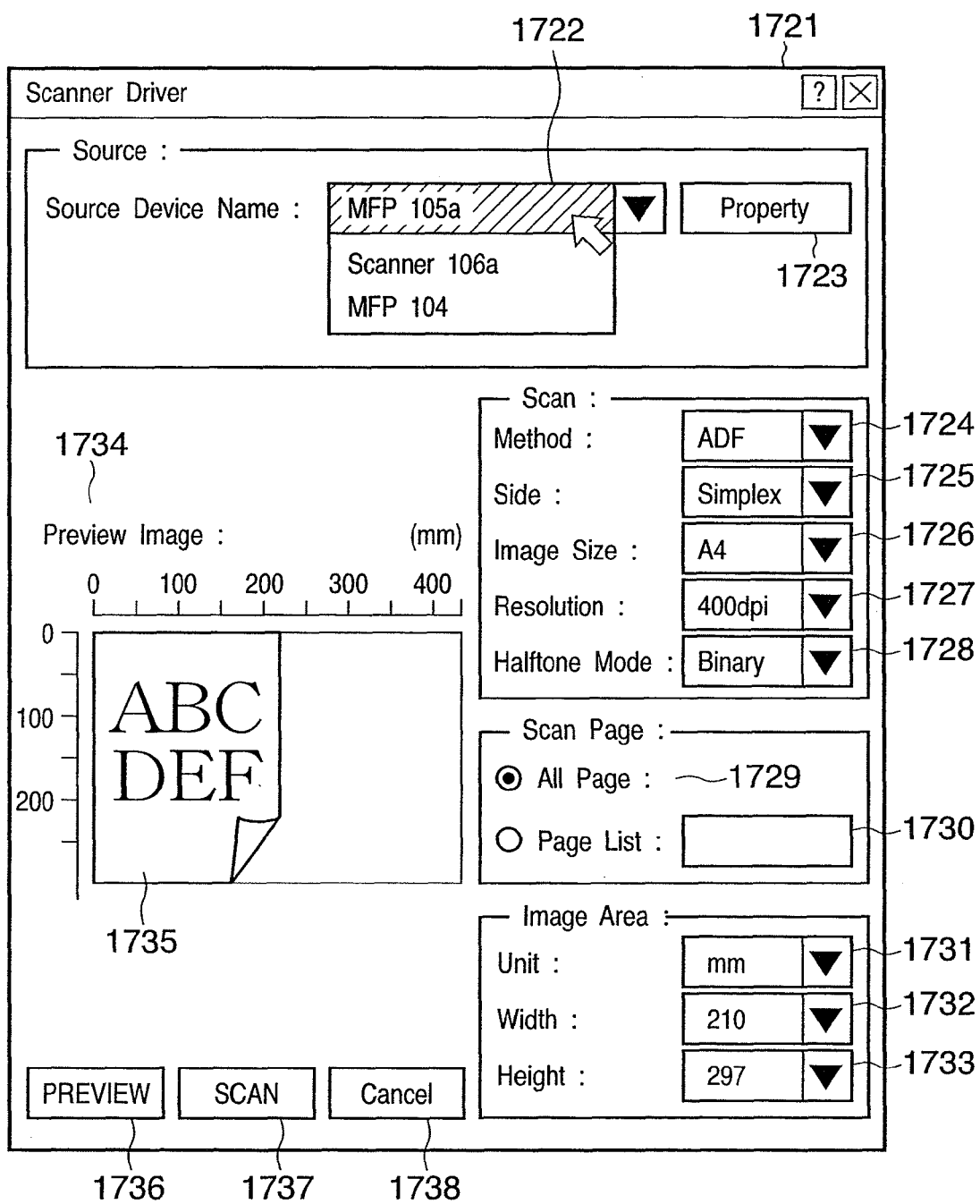
FIG. 20 shows a GUI (Graphic User Interface) of a scanner driver used to instruct a scan operation.

FIG. 20 shows a GUI (Graphic User Interface), which is to be displayed on the display unit of the information processing device such as the scan manager 119, client computer, or the like, of the scanner driver used to instruct a scan operation.

The GUI of the scanner driver comprises a source device name selection column 1722, setup columns 1724 to 1733 that allow to set detailed parameters, a preview key 1736, and a scan key 1737. On the GUI (operation window) of the scanner driver, the user selects a target scanner (in this system, the MFPs are also selectable devices since they comprise scanner units) from a plurality of devices of this system using the source device name column 1722, sets desired parameters using the columns 1724 to 1733, and clicks the preview key 1736 or scan key 1737. Then, control is made to start an image scan. When the user clicks a cancel key 1738 (using a pointing device or the like; not shown), control is made to cancel an image scan. Furthermore, when the user clicks a property key 1723 (using a pointing device or the like; not shown), control is made to display a property setup window of the scanner selected using the source device name selection column 1722.

Figure 21:
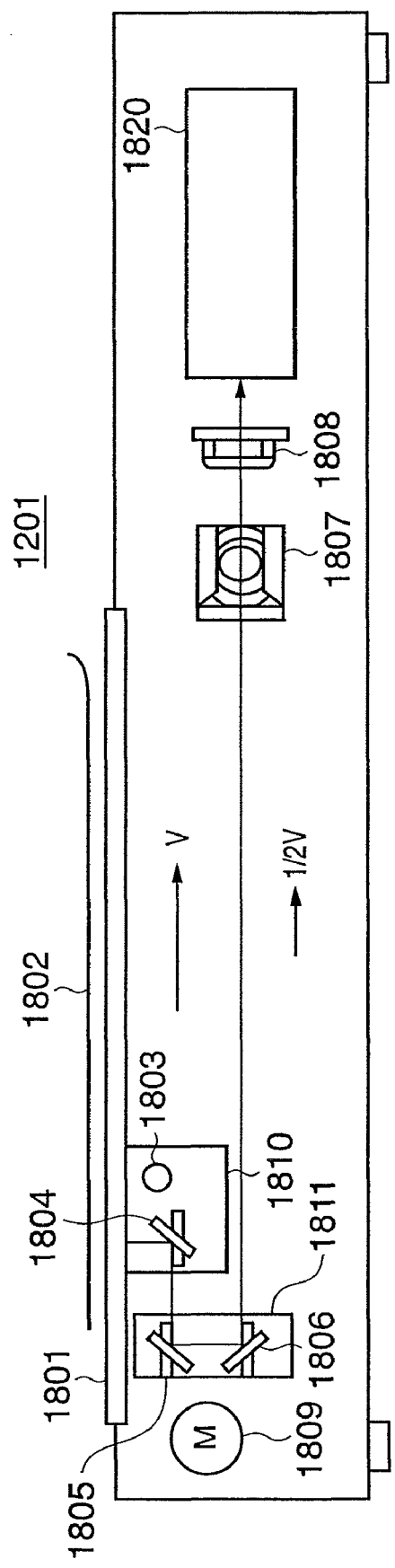
FIG. 21 is a sectional view showing the structure of a scanner unit shown in FIG. 15.

FIG. 21 is a sectional view showing the structure of the scanner unit 1201 shown in FIG. 15.

Referring to FIG. 21, reference numeral 1801 denotes a document table glass, on which a document 1802 to be scanned is placed. The document 1802 is irradiated with light emitted by an illumination lamp 1803, and light reflected by the document 1802 forms an image on a CCD sensor 1808 by a lens 1807 via mirrors 1804, 1805, and 1806. The output from the CCD sensor is input to a data processor 1820. A first mirror unit 1810 including the mirror 1804 and illumination lamp 1803 moves at velocity V, and a second mirror unit 1811 including the mirrors 1805 and 1806 moves at velocity V/2, thus scanning the entire surface of the document 1802. The first and second mirror units 1810 and 1811 are driven by a motor 1809.

Figure 22A:
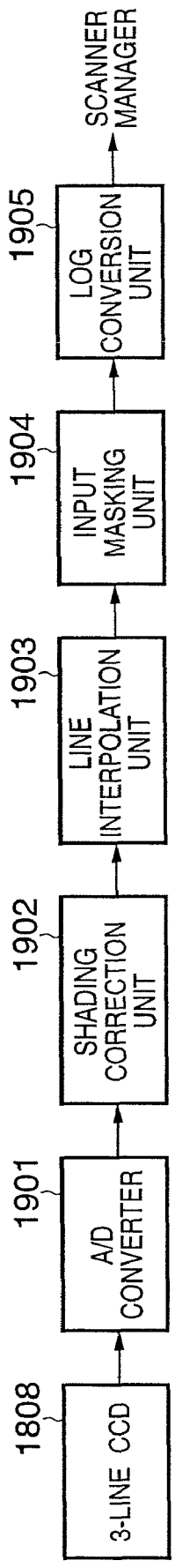
FIGS. 22A and 22B are block diagrams showing the data processing arrangements of the scanner shown in FIG. 21.
Figure 22B:
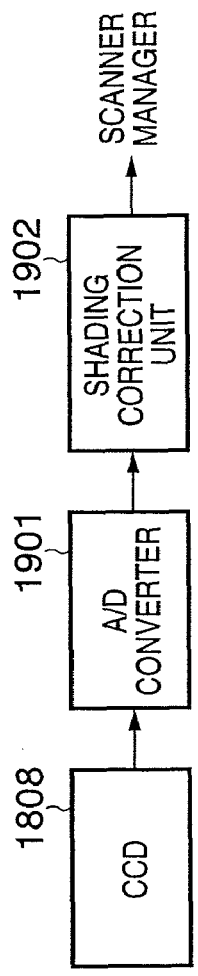

FIGS. 22A and 22B are block diagrams showing the arrangement of the data processor 1820 in the scanner unit 1201 shown in FIG. 21. FIG. 22A corresponds to a color scanner, and FIG. 22B corresponds to a monochrome scanner.

As shown in FIG. 22A, in case of the color scanner, a scanned image is converted into an electrical signal by the CCD sensor 1808. This CCD sensor 1808 comprises RGB, 3-line color sensors, which input R, G, and B image signals to an A/D conversion unit 1901. After the input image signals undergo gain adjustment and offset adjustment, the A/D converter (A/D conversion unit) 1901 converts these image signals into 8-bit digital image signals R0, G0, and B0. After that, a shading correction unit 1902 applies shading correction using a scan signal of a reference white plate for respective colors.

Furthermore, since the respective color line sensors of the CCD sensor 1808 are arranged to be spaced by a predetermined distance from each other, a line delay adjustment circuit (line interpolation unit) 1903 corrects the spatial deviations of the image signals in the sub-scan direction. Next, an input masking unit 1904 converts a scan color space determined by the spectral characteristics of R, G, and B filters of the CCD sensor 1808 into an NTSC standard color space. That is, the unit 1904 converts input (R0, G0, B0) signals into standard (R, G, B) signals by making 3×3 matrix calculations using constants unique to the device in consideration of various characteristics such as the sensitivity characteristics of the CCD sensor 1808/spectral characteristics of the illumination lamp, and the like. A luminance/density conversion unit (LOG conversion unit) 1905 comprises a lookup table (LUT) RAM, and converts R, G, and B luminance signals into C1, M1, and Y1 density signals.

These density signals are input to the scanner manager 119.

As shown in FIG. 22B, in case of the monochrome scanner, a scanned image is converted into an electrical signal using a monochrome 1-line CCD sensor 1808, and a monochrome image signal is input to the A/D conversion unit 1901. This image signal is A/D-converted into a digital signal by the A/D conversion unit 1901, and the digital signal undergoes shading correction by the shading correction unit 1902. The image signal output from the shading correction unit 1902 is input to the scanner manager 119.

Note that the scanned image can be confirmed on a preview field 1735 of the scanner driver shown in FIG. 20 or is stored in a memory or hard disk in the scanner manager 119 as image data. Of course, image data from the scanner can be printed by the printing device of this system via the aforementioned memory such as a hard disk or the like, or can be transferred to another device, on the basis of an operator's instruction.

As described above, in this embodiment, a plurality of independent information processing devices such as computers or the like may individually comprise the functions of the managers 112 to 118, a single information processing device or a single image forming device such as an MFP or the like may comprise all the manager functions, or a single information processing device or a single image forming device such as an MFP or the like may comprise at least two of all the manager functions. In any case, the present invention is not limited to specific device and system arrangements as long as they can execute control, functions, and the like provided by this embodiment.

[Data Flow]

Referring back to FIG. 1, the actual data flow in the image forming system of this embodiment will be examined. This system can exchange data among respective computers and devices using their data communication units, and the process control manager 111 can manage all of them.

Data to be exchanged among the respective managers and devices are preferably implemented by a format called PPF (Print Production Format) in CIP3 (International Cooperation For Integration of Prepress, Press and PostPress: the collegial organization for work flow integration of prepress, press, and postpress processes; the data standard that utilizes prepress data in all print processes after prepress for automation and quality improvement) or a new format (standard specification associated with a description of jobs over a broad range including printing and E-commerce) called JDF (Job Definition Format) in CIP4 (International Cooperation For Integration of Processes in Prepress, Press, and Postpress: the collegial organization for integration of prepress, press, and postpress steps/processes; the expanded organization of CIP3).

PPF is the format which is required to integrate all work flows associated with print processes in a plurality of devices of this system, i.e., prepress (a generic name of steps executed before a print operation in the image forming device (e.g., MFP) of this system; also called a pre-step)→press (a print step in the image forming device (e.g., MFP) of this system)→postpress (a sheet process step as a post-process in the sheet processing devices of this system, which is executed after the print operation in the image forming device (e.g., MFP) of this system; also called a post-step), and to exchange process and management data among these steps. PPF is the PostScript®-based standard format, which handles various kinds of information such as management information, ink adjustment, designation of trimming positions, and the like, and aims at quality stabilization, error elimination, high-speed processing, and efficient management of production equipment.

On the other hand, JDF is the format appended with prepress operation information called PJTF (Portable Job Ticket Format) proposed by Adobe Systems Corporation, control properties, and the like in addition to controllability of PPF, and has as its features information integration of prepress, press, and postpress, collaboration between production and a process control manager, and compatibility with existing systems.

JDF takes over an architecture that transfers a work instruction called Job Ticket as specialty of PJTF, i.e., a mechanism that sequentially executes processes required in respective steps for a history, work instruction, management information, and the like, and passes them to the next step.

Furthermore, JDF adopts XML (eXtensible Markup Language) as a language used to form Job Ticket (work instruction). JDF defines a template called a schema that describes a layout of XML elements and properties, and rewrites XML data in respective steps according to the define schema. FIG. 23 shows this state.

FIG. 23 shows the rewrite states of JDF state in respective steps.

As shown in FIG. 23, in this system, the order/input manager 112 mainly controls an JDF application 2102 in the process control manager 111 to generate JDF data for a job 2101 input to the order/input manager 112.

Furthermore, this system allows, e.g., the process control manager 111, order/input manager 112, document edit manager 113, proof manager 114, print manager 115, post-process manager 116, file archiving manager 117, delivery/shipping manager 118, or scan manager 119 to rewrite the JDF data generated by the order/input manager 112.

FIG. 23 exemplifies exchange of JDF data between the print manager 115 and post-process manager 116. In these mangers, JDF data is parsed by a JDF parser 2104 (or 2107), and information can be added, deleted, and modified under the control of each manager.

Even when an actual print output undergoes an off-line process (for example, this off-line process means that a worker manually carries printouts of the image processing device to the sheet processing device such as a finisher or the like, and sets them in that sheet processing device in this system), job processing states from respective devices are written in the JDF data via JDF parsers to transfer the JDF data in a bucket brigade manner. The process control manager 111 manages such JDF data, thus presenting respective job states as a list.

[Web Ordering]

An example of an e-shop using a Web page on the Internet will be explained below with reference to FIGS. 24 to 31.

FIGS. 24 to 31 show an example of a job order window provided by the order/input manager 112 shown in FIG. 1.

Figure 24:
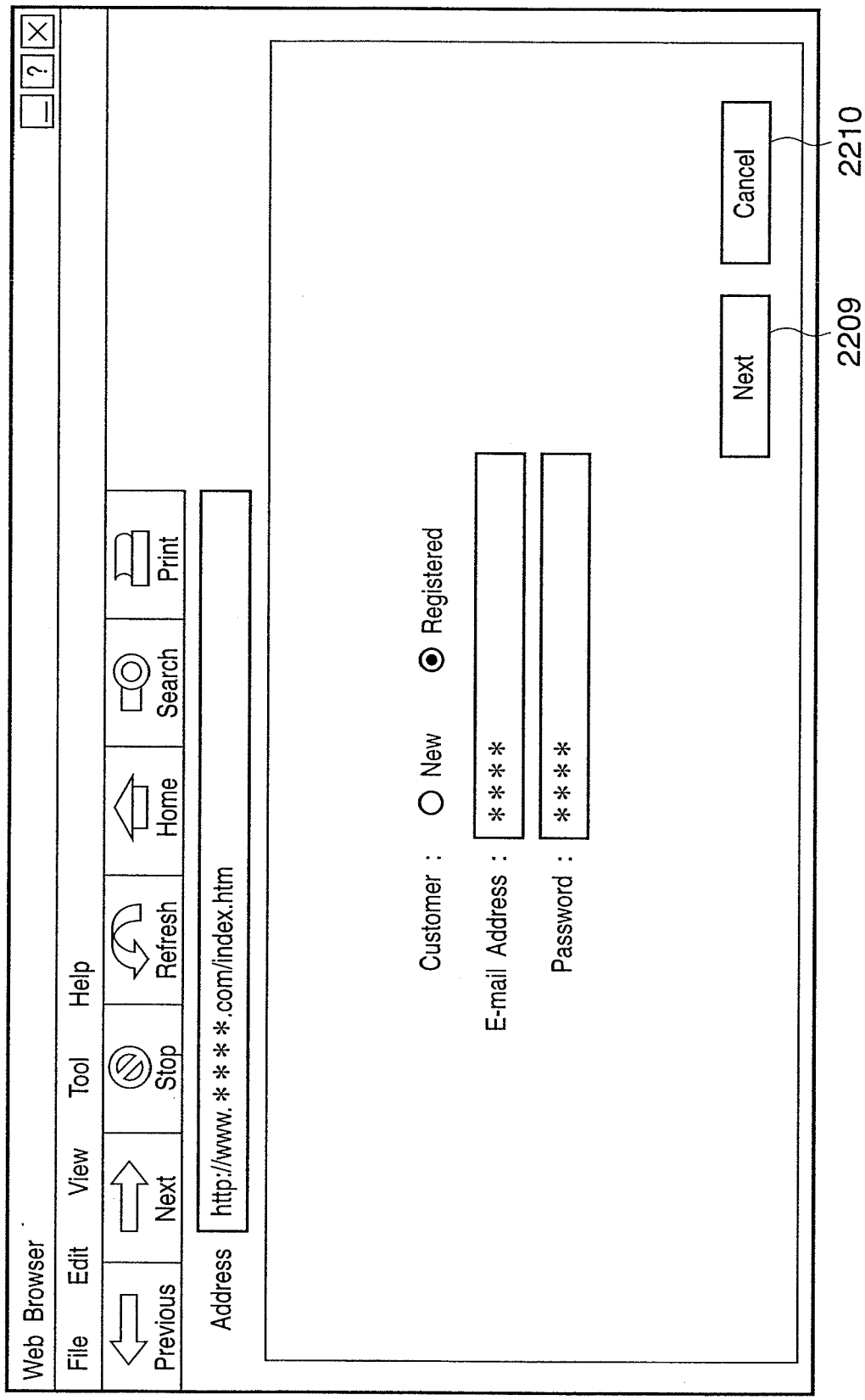
FIG. 24 shows an example of a job order window by the order/input manager shown in FIG. 1.

This embodiment makes display control to allow the user to browser a site shown in FIG. 24 on the display unit of the user's computer (client computer) in response to a user's key operation at the operation unit of that computer (steps S201 and S202 in FIG. 2). This embodiment allows ordering with respect to this system on the Web page when the registered user selects "Registered", inputs the ID number (e-mail address) and password, and presses a NEXT key 2209 on the operation window shown in FIG. 24. That is, control is made to display a window shown in FIG. 26 on the display unit of the client computer when the registered user has done the above setups and has pressed the NEXT key 2209 on the window in FIG. 24. Note that the display control of this embodiment can be executed by the controller of the client computer or that of a predetermined device of this system.

A new user who visits this Web site selects "New" on the operation window in FIG. 24. When the user has selected "New" and pressed the NEXT key 2209 on the window in FIG. 24, control is made to display an input window shown in FIG. 25 on the display unit of the client computer in response to that operation. Control is made to allow the user to register by completing necessary information (name, company name, address, telephone number, facsimile number, e-mail address, etc.) by his or her key operations via the operation window in FIG. 25 (step S203 in FIG. 2). Reference numeral 2210 denotes a cancel key which is pressed to close this site. In this example, the user need only complete necessary information. Alternatively, in order to improve security, double- or triple-check may be applied via a personal identification procedure, account opening procedure, and the like. After such registration procedure, display transition from the window in FIG. 24 to that in FIG. 26 is allowed as the registered user.

Figure 26:
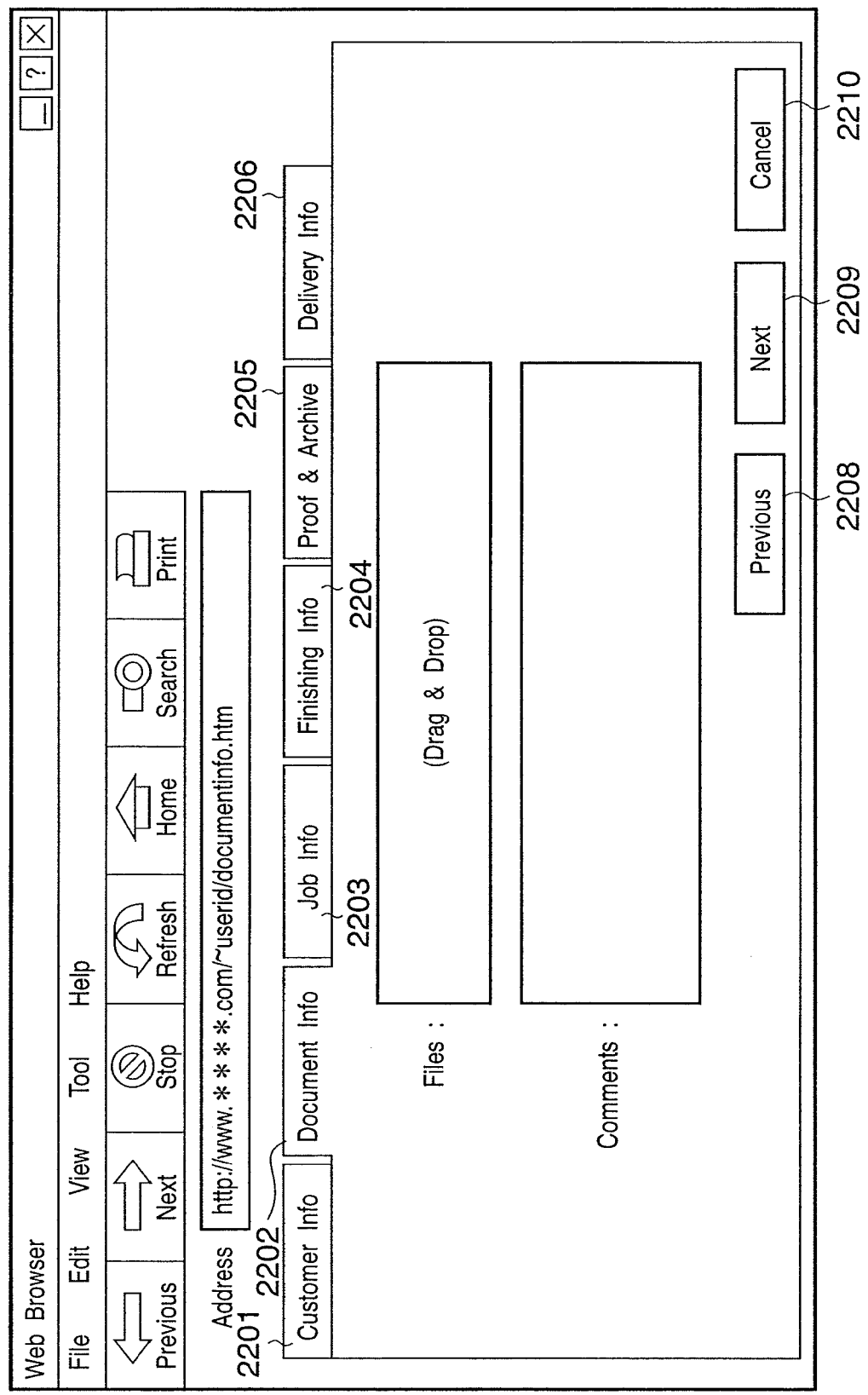
FIG. 26 shows an example of a job order window by the order/input manager shown in FIG. 1.

On the operation window shown in FIG. 26, the user can select digital data (data desired by the user such as document data, table data, photo data, and the like) to be printed, whose order is to be placed to this system by his or her key operations. The user can append digital data to be printed by dragging and dropping it on a "Files" designation field on the window shown in FIG. 26 by his or her mouse operations. Furthermore, the user can input his or her requests in a "Comments" field on the window in FIG. 26 via his or her key operations as needed. When the setup operations on the window in FIG. 26 is complete and the user has pressed the NEXT key 2209 on the window in FIG. 26, the display contents on the display unit of the computer are changed to a window in FIG. 27 in response to this operation (step S204 in FIG. 2). Via the window shown in FIG. 27, the user can input setup information (e.g., including various kinds of print output condition information such as setup information of the number of copies to be printed, setup information of the paper size of print sheets, information that specifies if document data includes color pages alone, monochrome pages alone, or both color and monochrome pages, setup information about a duplex or simplex print process to be executed, setup information indicating if images for N pages are to be laid out on a single surface of one sheet using an N-UP function that allows to print images for a plurality of pages on single surface of one sheet, and the like) for a job (data to be printed, whose order is to be placed to this system) called a job ticket by his or her key operations (step S205 in FIG. 2). When the setup operations on the window in FIG. 27 are complete, and the user has pressed the NEXT key 2209 on the window in FIG. 27, the display contents on the display unit of the computer are changed to a window in FIG. 28 in response to that operation.

Figure 28:
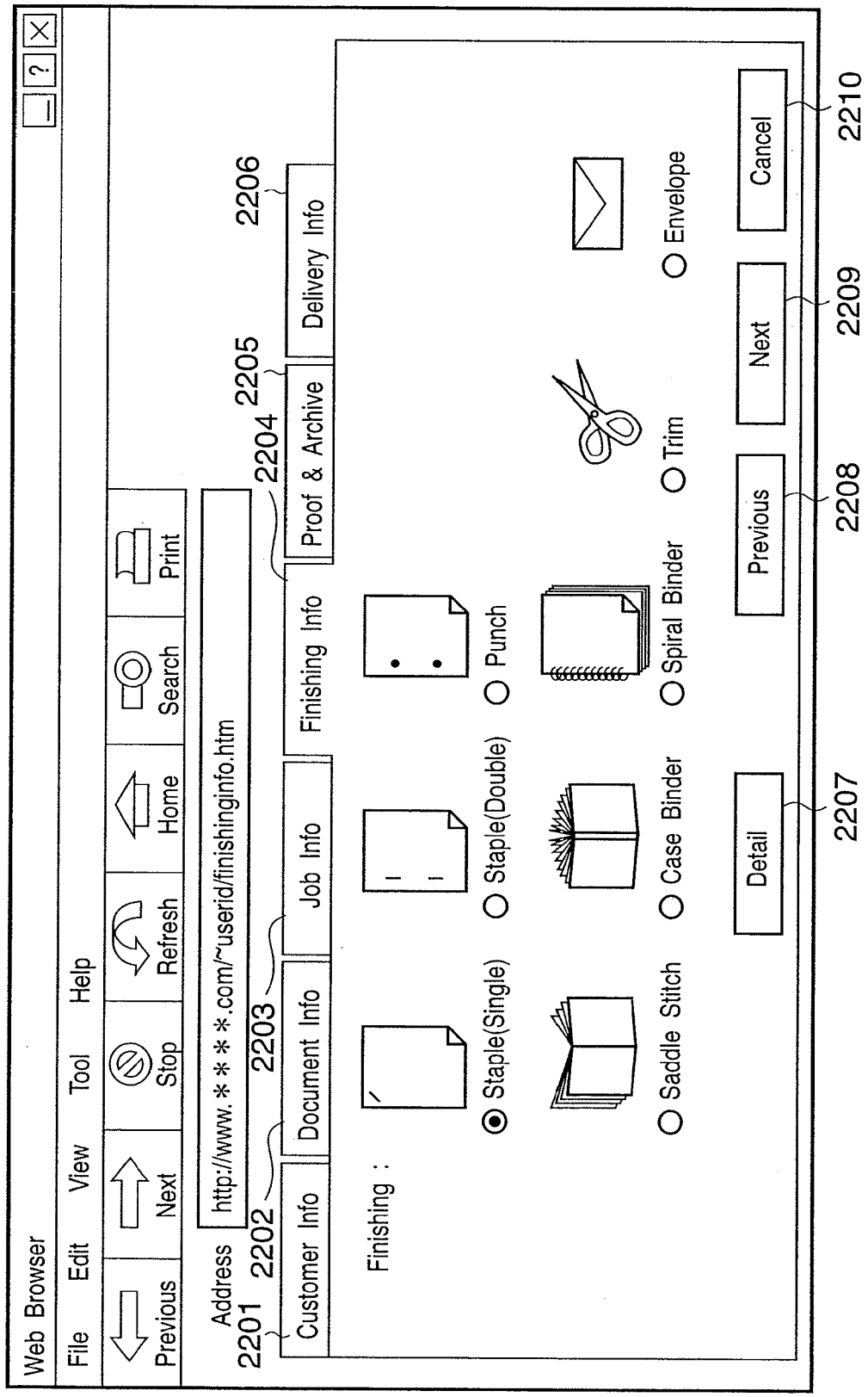
FIG. 28 shows an example of a job order window by the order/input manager shown in FIG. 1.

Via the operation window in FIG. 28, the user can select, by his or her key operations, desired finishing processes (also called sheet processes) to be set for the data to be printed from a plurality of types of sheet processes (various sheet processes such as a staple process, saddle stitch process, punch process, spiral bind process, trim process, mail insertion process that inserts print sheets into an envelope, and the like) which can be executed by the sheet processing devices of this system (step S206 in FIG. 2). When the setup operations on the window in FIG. 28 are complete, and the user has pressed the NEXT key 2209 on the window in FIG. 28, the display contents on the display unit of the computer are changed to a window in FIG. 29 in response to that operation. Via the operation window in FIG. 29, the user can select ON/OFF (2220) of proof printing, and a proof mode (proof expression method) (one or a plurality of a plurality of proof methods such as "Thumbnail on web site" 2221, "PDF file on ftp site" 2222, "PDF file by E-mail" 2223, "PDF file in CD-ROM by post" 2224, and the like, which can be provided by this system to allow the client to confirm the doneness of products of the job to be processed by the devices of this system), and can input archive information and the like by his or her key operations (step S207 in FIG. 2). When the setup operations on the window in FIG. 29 are complete, and the user has pressed the NEXT key 2209 on the window in FIG. 29, the display contents on the display unit of the computer are changed to a window in FIG. 30 in response to that operation. Via the operation window in FIG. 30, the user can input information of a desired delivery date (information about a date at which prints are to be delivered) of the job ordered to this system, and the like by his or her key operations (step S208 in FIG. 2). When the setup operations on the window in FIG. 30 are complete, and the user has pressed the NEXT key 2209 on the window in FIG. 30, the display contents on the display unit of the computer are changed to a window in FIG. 31 in response to that operation.

The operation window shown in FIG. 31 presents approximate cost required to generate prints of the job to be processed to the client. If the user finds that fee reasonable, he or she operates a key 2211 on the window to place a temporary order instruction to this system. Note that control is made to calculate the cost to be displayed on the window in accordance with various parameters such as a new user or good client, the size of a job (data size), the contents of the job ticket (e.g., the number of copies to be printed), a finishing process method, methods and number of proofs, archive and re-print information, a short or long delivery period, and the like. Since the user can confirm approximate cost via the user interface provided by this embodiment before placement of a temporary order, a trouble due to cost can be avoided. If the user does not find that cost reasonable, the user can change print condition setups to reduce the cost using respective information tabs (customer information tab 2201, document information tab 2202, job information tab 2203, post-process information tab 2204, proof & archive information tab 2205, delivery information tab 2206), a back key 2208, a next key 2209, and the like. Then, the approximate cost can be calculated again, and the re-estimated cost data can be presented again to the user via the UI.

As described above, after the client has done all the setups and a fee estimated based on the setup information and the like is presented to the client via the UI, a temporary order instruction of the job, which is output from the client computer in response to depression (designation) of an OK key 2211 on the window in FIG. 31, is received by the order/input manager 112 of this system. Then, the respective devices of this system are controlled to execute a temporary order process of job data from the client in accordance with that job data including the temporary order instruction received by the order/input manager 112 (Yes in step S209 in FIG. 2). Note that the job ticket can also be set or changed in the proof process to be described later since the temporary order process is merely executed.

In this way, job data accepted by the order/input manager 112 is transferred from the order/input manager 112 to the process control manager 111 via the data communication medium such as the network 101 and the like. Upon reception of this job data, the process control manager 111 controls to start management of that job, and to issue JDF data for that job.

[Layout Confirmation]

The proof manager 114 shown in FIG. 1 controls the device of this system to generate proof data (edit result) of the job which is accepted by the order/input manager 112 from the client computer and is to undergo the temporary order process, thus generating proof display data which corresponds to the generation result and can be displayed on the client computer. The proof manager 114 then provides a confirmation window that displays the edit result (the doneness result used to confirm the temporarily ordered job) by the document edit manager 113, as shown in FIGS. 32 to 36, on the user's computer via the Web server module 441 (steps S402 to S406 in FIG. 6).

FIGS. 32 to 36 show an example of the confirmation window to be displayed on the display unit of the client computer under the control of the proof manager 114 shown in FIG. 1.

This confirmation window comprises display elements such as page/print order select buttons 2301, a page property (property setup) key 3202, a document property key 3203, a job property key 2304, and the like. Via this window, the user of the client computer can switch the paper size and media type of print sheets in a desired unit (e.g., for respective pages, documents, jobs, or the like) by his or her key operations. Furthermore, the user can select the number of images to be laid out on a single surface of one print sheet in the N-up (reduced layout) print function from a plurality of candidates (a plurality of candidates of the numbers of images to be laid out (e.g., one image, two images, four images, eight images, nine images, sixteen images, and the like)), and can select a layout order on a single surface of one print sheet of a plurality of images to be laid out on a single surface of one print sheet from a plurality of candidates (for example, when a 2up print function that lays out images for two pages is designated, two different layout order candidates; when a 4up print function that lays out images for four pages is designated, four different layout order candidates). Moreover, the user can set ON/OFF of finishing (ON/OFF of execution of sheet processes), and can select the type of finishing from a plurality of candidates (a plurality of different sheet processes such as a sort process, staple process, punch process, booklet process, saddle stitch process, folding process, case binding process, and the like). Note that this example shows the proof window of a job with the job number "012345".

Even when the user enters a plurality of documents which are created by applications of different types or are files of different types) (e.g., when document data created by document creation software and table data created by spreadsheet software are mixed), this system can cope with such case. The user can drag & drop these files to display them as thumbnails on the confirmation window for respective documents.

Figure 32:
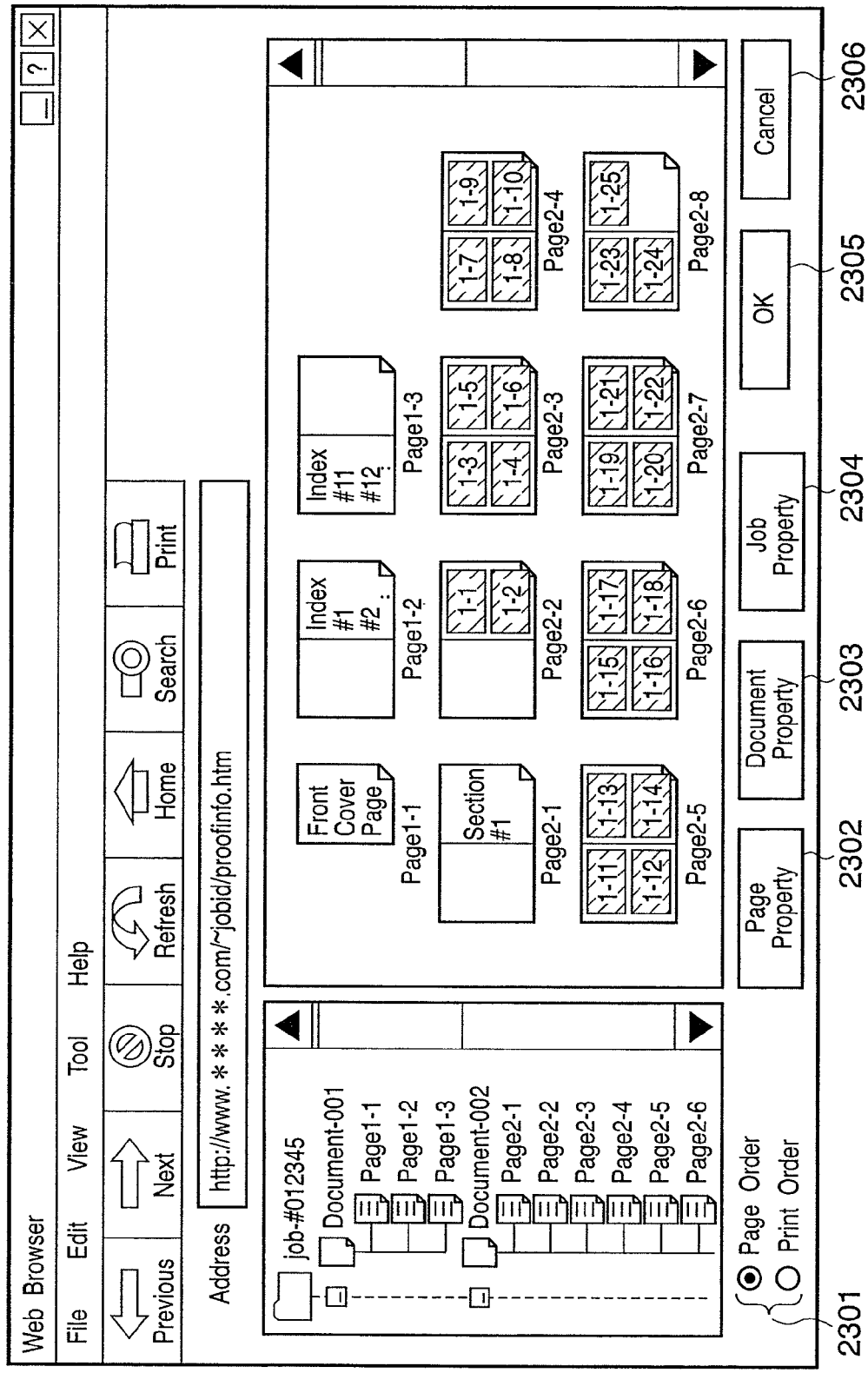
FIG. 32 shows an example of a confirmation window by the proof manager shown in FIG. 1.
Figure 33:
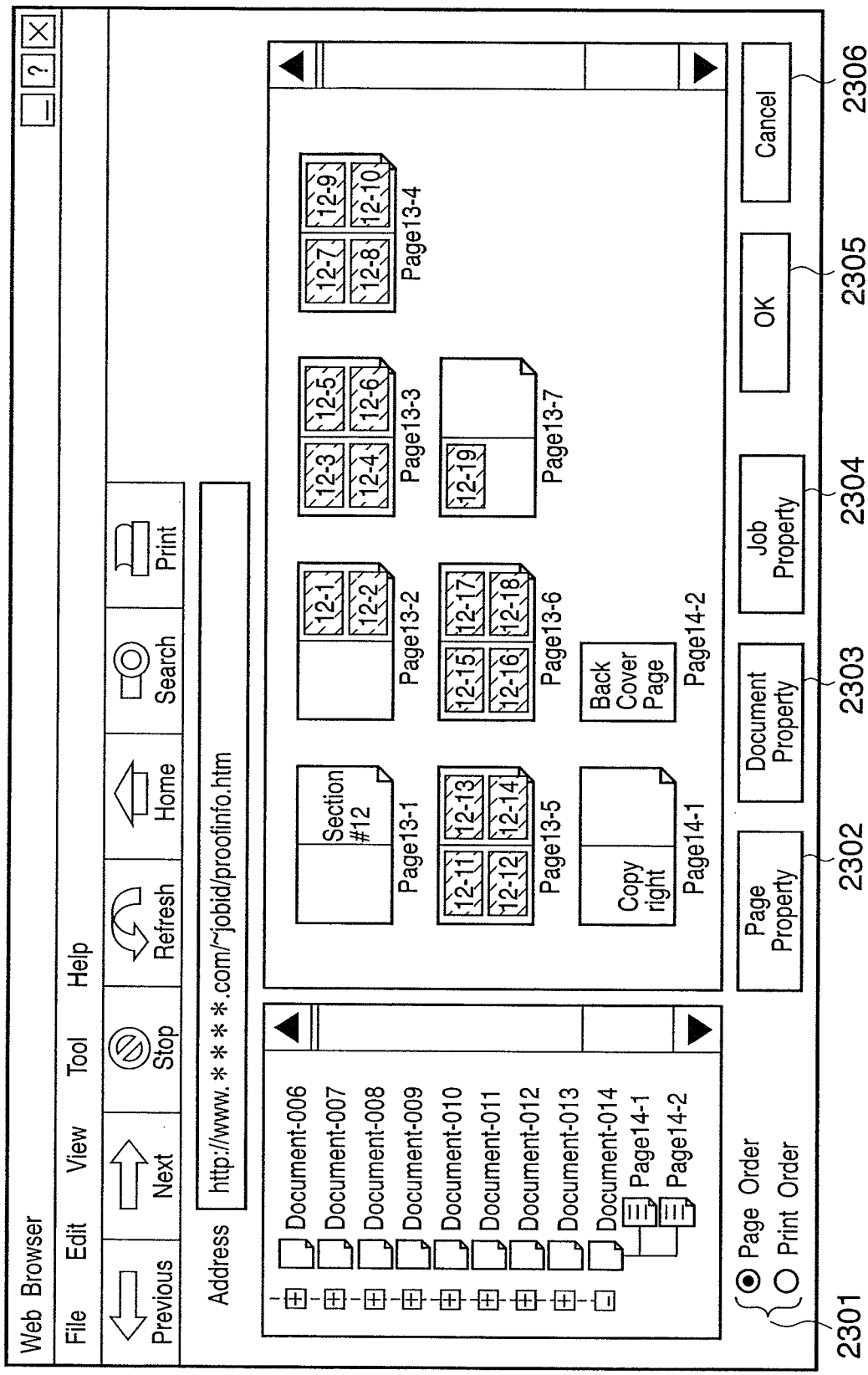
FIG. 33 shows an example of a confirmation window by the proof manager shown in FIG. 1.

For example, FIGS. 32 and 33 correspond to a display example in the page order. In this example, a 2in1 layout is selected for those on print sheets that record data of the first chapter (Document-001) and that of the 14th chapter included in document data to be printed, and a 4in1 layout is selected for other sheets, i.e., the number of pages to be laid out is changed for respective chapters (documents).

Figure 34:
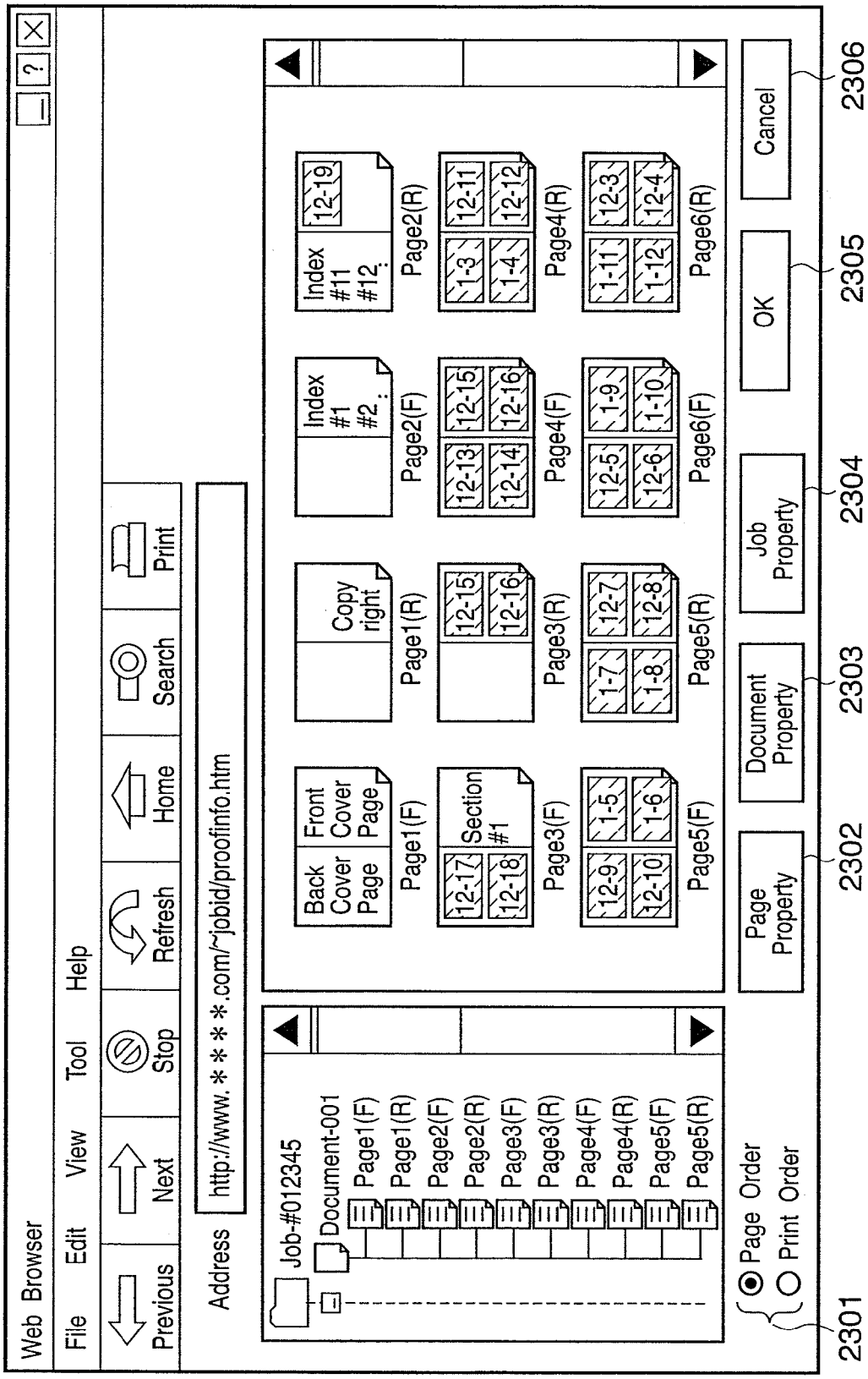
FIG. 34 shows an example of a confirmation window by the proof manager shown in FIG. 1.
Figure 35:
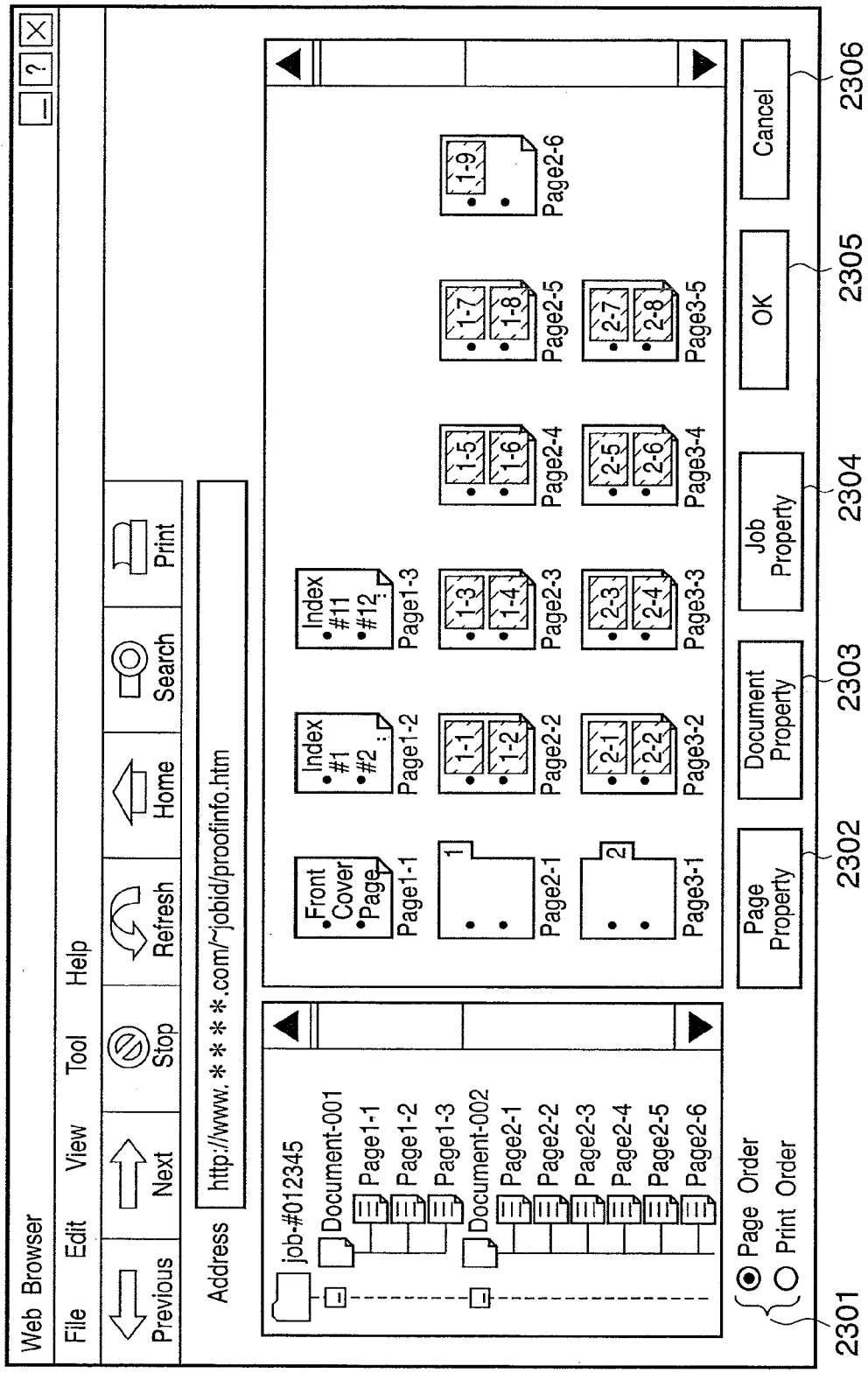
FIG. 35 shows an example of a confirmation window by the proof manager shown in FIG. 1.
Figure 36:
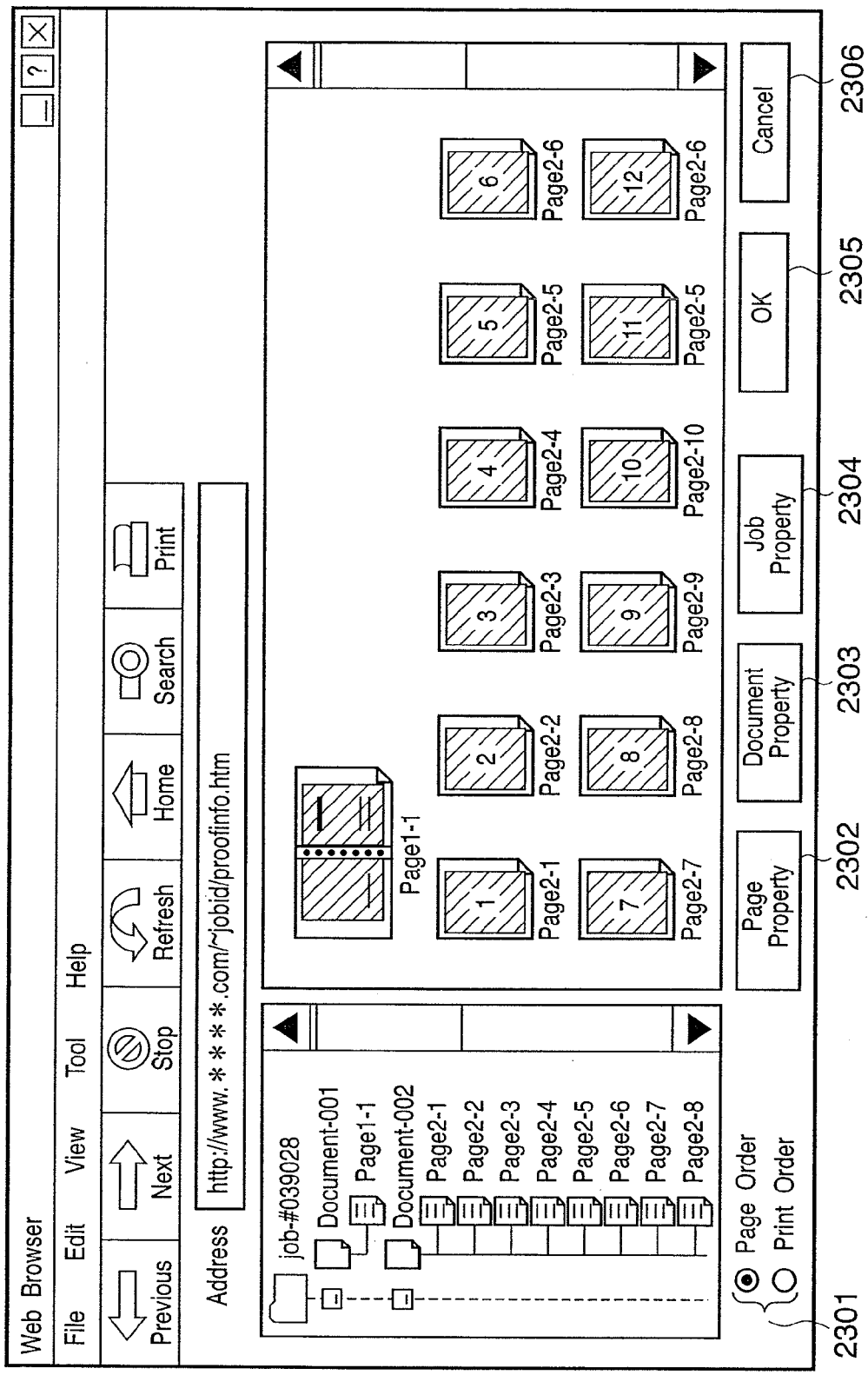
FIG. 36 shows an example of a confirmation window by the proof manager shown in FIG. 1.

FIG. 34 corresponds to a display example in the print order by switching the page/print order select buttons 2301, and the user can browse print layouts after a saddle stitch (booklet) process is applied (booklet printing). FIG. 35 corresponds to an example wherein media are switched for respective pages using tab sheets, and a punch process is also designated. In this case, the user can confirm hole positions and the like on thumbnails. FIG. 36 corresponds to an example wherein case binding is applied. In this case, the user can confirm that a larger sheet is used as a cover in correspondence with the back.

Each of the confirmation windows shown in FIGS. 32 to 36 includes a folder field indicating a file structure and a thumbnail field. When one page on the thumbnail field is double-clicked, a preview image for each page can be displayed in an enlarged scale.

On the confirmation windows shown in FIGS. 32 to 36 or a display window of a PDF file (which is downloaded from the Web server module 441; not shown), the user confirms a proof and determines if the proof confirmation result is OK (step S407 in FIG. 6).

If the proof confirmation result is OK, control is made in response to a user's key operation to submit an e-mail message indicating that the proof confirmation result is OK (to instruct to proceed with the print step) from the client computer to the proof manager 114 (to a predetermined address assigned to the proof manager 114, an address of a person in charge, or the like) (step S408 in FIG. 6).

On the other hand, if the proof confirmation result is not OK (NG), the user submits an e-mail message which indicates that the proof confirmation result is NG (to instruct re-proofing in place of the print step) and describes an NG portion and comments to the proof manager 114 (steps S407 and S408 in FIG. 6).

Upon reception of the e-mail message from the client computer, the proof manager 114 analyzes the contents of that e-mail message. If it is determined that the proof confirmation result is OK (to instruct to proceed with the print step), the proof manager 114 ends the proof step of that job, and passes a task to the next manager (e.g., the print manager 115) to proceed with the next print step (step S427 and Yes in step S428 in FIG. 6). On the other hand, if the proof confirmation result is NG (to instruct re-proofing in place of the print step), the worker attending the image forming system side confirms correction contents, and the respective devices used in re-proofing process of this system are controlled to redone the document edit process, document process, and proof print process by the operation instruction of that worker in accordance with the user's NG portion comments (steps S427 to S429 in FIG. 6).

As described above, since the thumbnail confirmation windows shown in FIGS. 32 to 36 and PDF file (not shown) are presented to the user as proof means, the system which can easily and reliably estimate an output without any actual print process, facilitates various changes upon proofing after document input, reduces the load on the user by obviating the need for elaborate check upon document input in the conventional system, and can offer an output with lower cost to the customer within a shorter period can be provided.

Second Embodiment

The first embodiment has exemplified generation of thumbnails and PDF data as proof expression methods that can be designated (selected) by the user, as shown in FIGS. 6 and 29. However, in case of a color print, an actual print allows accurate confirmation of color appearance and the like (an image on the screen often has color appearance slightly different from an actual print due to the characteristics of a display device or the like). Hence, as a proof expression method, the print manager 114 and image forming device such as the MFP 104 (or 105) may be actually used to form only a copy of test prints (proof prints) of the designated number of copies, and that output sample may be delivered to the customer by mail, visiting with that sample, or other delivery means except for on-line means. The customer who received the output sample may confirm the proof result. Such embodiment will be described below.

[Job Order Window (Proof) <Second Embodiment>]

FIG. 37 shows an example of a job order window according to the second embodiment of the present invention, and especially corresponds to a proof information setup window. The same reference numerals in FIG. 37 denotes the same parts as in FIG. 29.

The user can select ON/OFF (2220) of proof printing, and a required proof mode (proof expression method) (one or a plurality of a plurality of proof expression means such as "Thumbnail on web site" 2221, "PDF file on ftp site" 2222, "PDF file by E-mail" 2223, "PDF file in CD-ROM by post" 2224, "Print Output by Post" 2901, "Visit Customer Site" 2902, "Others" 2903, and the like) on the window in FIG. 37 via the Internet. When the user selects "Print Output (proof output) by Post" 2901 or "Visit Customer Site (with print output (proof output))" 2902, only one copy of test prints are formed in practice using the print manager 115 and MFP 104 (or 105), and is delivered to the user. The user can confirm the proof result by checking this actual print. Note that a record of mailing or visit with the print (proof output) or the like is also managed by the process control manager 111.

[Proof Manager <Second Embodiment>]

Figure 38:
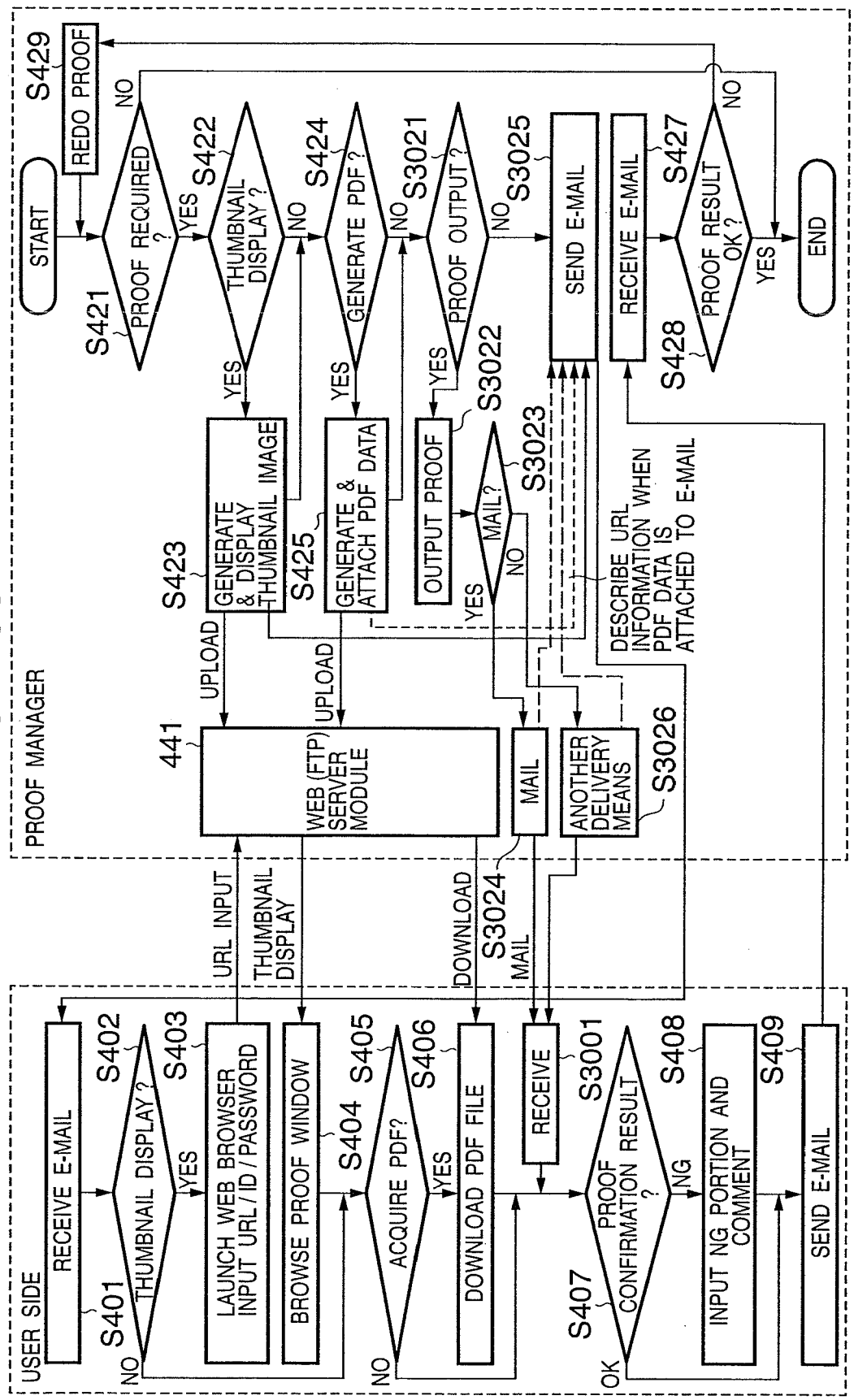
FIG. 38 is a flow chart showing communications between the proof manager and user's computer, and a proof creation process (the third control process of the present invention) by the proof manager according to the second embodiment of the present invention.

FIG. 38 is a flow chart showing communications between the proof manager 114 and user's computer, and the proof creation process (the third control process of the present invention) by the proof manager 114 in the second embodiment of the present invention. S401 to S409 and S3001 indicate operation steps to be executed by the user's client computer, and S421 to S425, S427 to S429, and S3021 to S3026 indicate control process steps on the proof manager 114 side. Note that the same step numbers denote the same steps as in FIG. 6, and a description thereof will be omitted.

If it is determined in step S424 that PDF data is not requested, or after step S425, it is checked in step S3021 if a proof output is requested as the proof expression method (i.e., if item 2901 or 2902 in FIG. 37 is selected upon document input). If it is determined that a proof output is requested, the proof manager controls the print manager 115 to generate a proof output (or after an arbitrary operation using the printer driver by the worker if such operation is required) in step S3022, and the flow advances to step S3023.

It is checked in step S3023 if the proof output need be sent by mail (if item 2901 in FIG. 37 is selected upon document input). If it is determined that the proof output need be sent by mail, the proof manager instructs a person in charge to send that proof output by mail (using an e-mail message) in step S3024; if it is determined that the proof output need not be sent by mail, the proof manager instructs a person in charge to deliver the proof output by another delivery means (using an e-mail message) in step S3026.

On the other hand, if it is determined in step S3021 that the proof output is not requested, or after step S3024 or S3026, the flow advances to step S3025 to submit, to the user, an e-mail message which describes the URL of a Web site to which thumbnail image data or PDF file is uploaded, which is appended with a PDF file, which describes that the proof output is sent by mail, which describes that the proof output is delivered by another delivery means (e.g., visit), or the like.

On the other hand, the user receives the proof output by mail, visit, or the like in step S3001, and the flow advances to step S407 to confirm the proof output. Then, the user sends back the confirmation result by e-mail.

In this manner, the user can acquire an actual proof output by his or her on-line request, and can confirm color appearance and the like of a color print more accurately.

Third Embodiment

In the arrangement of the first and second embodiments, the user receives an acceptance (or rejection) message of a temporary order on the Web (steps S210 and S211 in FIG. 2). However, since the arrangement that informs an acceptance (or rejection) message of a temporary order on the Web cannot leave a confirmation record, an acceptance (or rejection) message of a temporary order may be sent by e-mail. Such embodiment will be described below.

Figure 39:
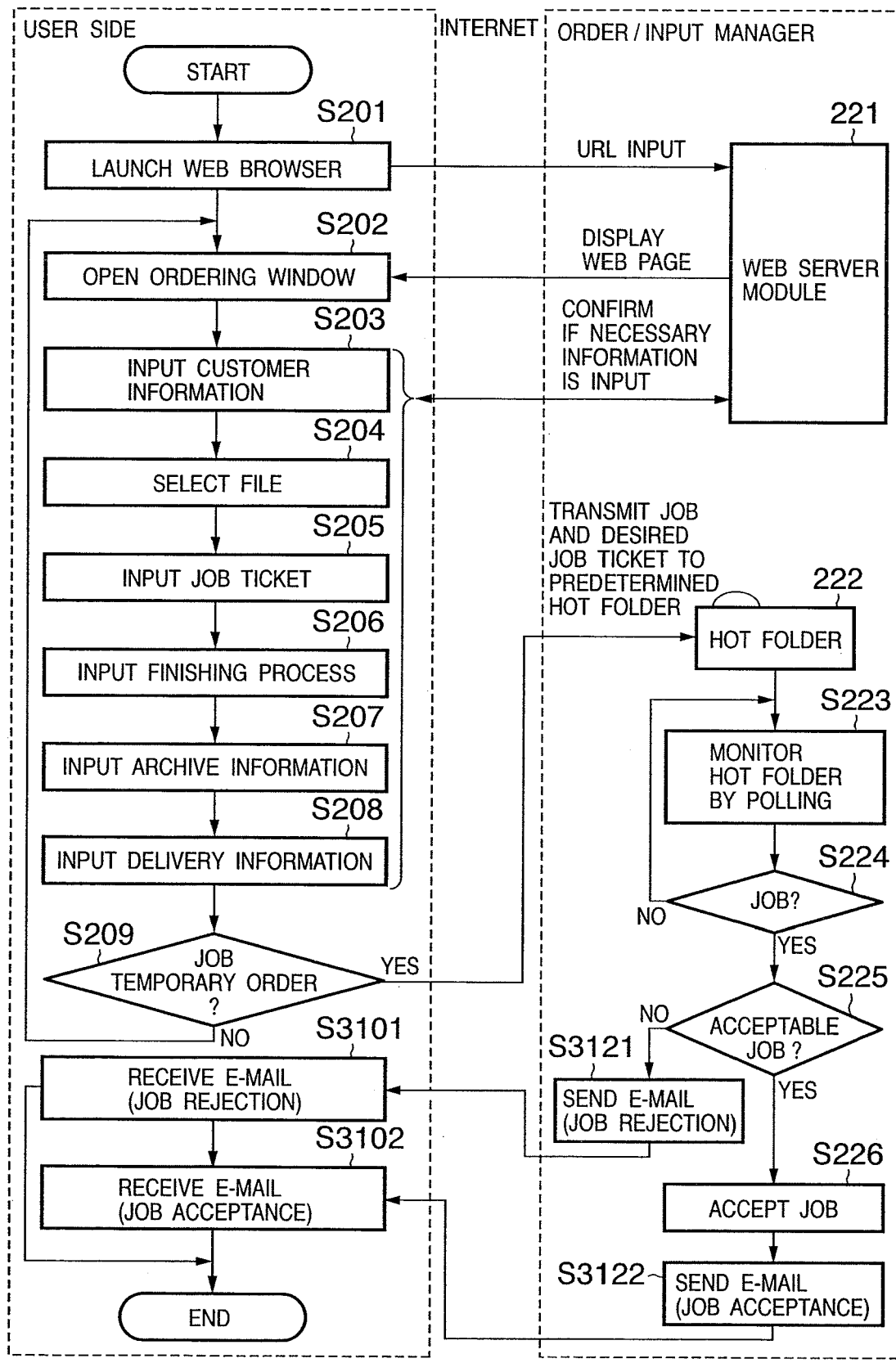
FIG. 39 is a flow chart showing communications between the order/input manager and user's computer, and an order process (the fourth control process of the present invention) by the order/input manager according to the third embodiment of the present invention.

FIG. 39 is a flow chart showing data communications between the order/input manager 112 and user's computer, and the order process (the fourth control process of the present invention) by the order/input manager 112 in the third embodiment of the present invention. In FIG. 39, S201 to S209, S3101, and S3102 indicate operation steps on the user's Web browser, and S223 to S226, S3121, and S3122 indicate control process steps on the order/input manager 112 side. Note that the same step numbers denote the same steps as in FIG. 2, and a description thereof will be omitted.

If the order/input manager 112 determines in step S225 that the job in the hot folder 222 is unacceptable, it automatically sends a "job rejection" e-mail message to the user (S3121).

On the other hand, if the order/input manager 112 determines in step S225 that the job in the hot folder 222 is acceptable, it accepts the job and transmits the accepted job to the process control manager 111 in step S226. Also, the order/input manager 112 automatically sends a "job acceptance" e-mail message to the user (S3122).

On the other hand, the user receives the "job acceptance" or "job rejection" e-mail message from the order/input manager 112 (S3101, S3102), thus ending the process. In this way, the user can easily determine whether or not a job temporarily ordered by himself or herself is accepted, and that record can be saved.

As described above, since a temporary order acceptance (or rejection) message is sent by e-mail, a record of acceptance (or rejection) of a temporary order can be saved.

Note that a temporary order acceptance (or rejection) message is sent by e-mail in this embodiment, and is displayed on the Web browser in the first embodiment. Also, acceptance/rejection of a temporarily ordered job may be confirmed by facsimile, phone, or the like.

Fourth Embodiment

In the third embodiment, a temporary order acceptance (or rejection) message is sent by e-mail to easily save a record of the temporary order acceptance (or rejection) message. Alternatively, a temporary order itself from the user may be submitted by e-mail. Such embodiment will be explained below.

Figure 40:
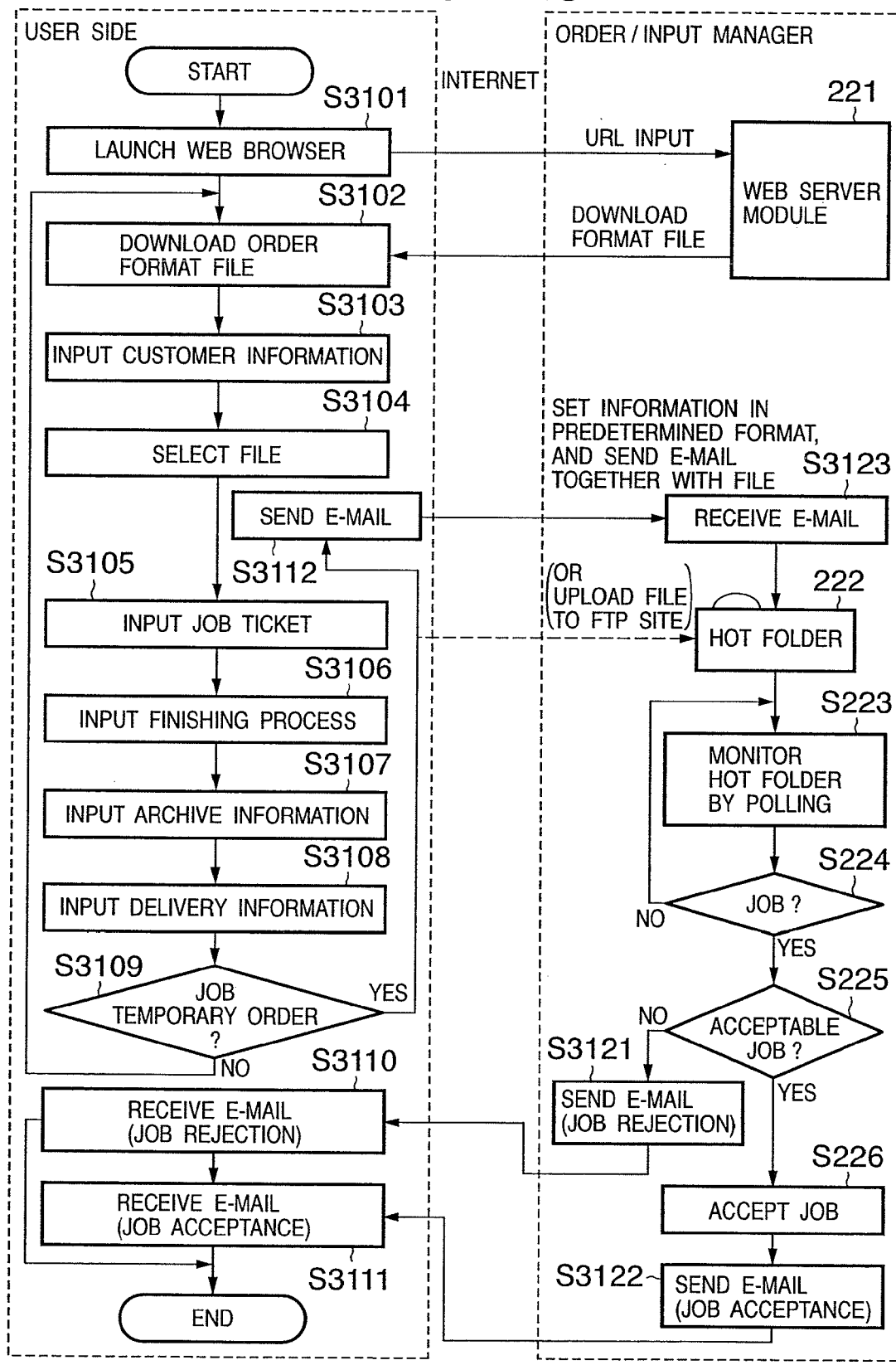
FIG. 40 is a flow chart showing communications between the order/input manager and user's computer, and an order process (the fifth control process of the present invention) by the order/input manager according to the fourth embodiment of the present invention.

FIG. 40 is a flow chart showing data communications between the order/input manager 112 and user's computer, and the order process (the fifth control process of the present invention) by the order/input manager 112 in the fourth embodiment of the present invention. In FIG. 40, S3101 to S3112 indicate operation steps on the user's Web browser, and S3121 to S3123 indicate control process steps on the order/input manager 112 side. Note that the same step numbers denote the same steps as in FIG. 2, and a description thereof will be omitted.

In step S3101, the user launches the Web browser, and inputs a URL (Uniform Resource Locator) address on the Web browser to access the Web server module 221 of the order/input manager 112.

If the user inputs the URL address via the Web browser, this Web server module 221 provides a service window to the Web browser. Assume that this service window, an order format file with the same format as in FIGS. 25 to 30, and the like are uploaded in advance to the Web server module 221.

On the user side, the Web browser opens a window (not shown) provided by the Web server module 221, and downloads the order format file (S3102).

On this order format file, the user inputs various print instructions such as customer information, document information (file name of image data (multiple selections allowed)), job information (job ticket or the like), post-process information (finishing process or the like), proof & archive information, delivery information, and the like as in FIGS. 25 to 30 (S3103 to S3108).

If the input operations of the order format file are complete, and if the user wants to place a temporary order (Yes in S3109), the user sends an e-mail message that includes the order format file and a file (image data) of his or her choice to the order/input manager 112 (S3112). In this manner, the user can easily save the contents of a job temporarily ordered by himself and herself and a record indicating that order. In place of sending an e-mail message, the user may upload the order format file and a file (image data) of his or her choice to a predetermined ftp site.

Upon reception of the e-mail message from the user, the order/input manager 112 stores a job including the order format file and the file (image data) of user's choice, which are appended to the e-mail message, in the hot folder (S3123).

The order/input manager 112 always monitors the presence/absence of a job in each hot folder by polling (S223, S224). If the order/input manager 112 determines the presence of a job, it confirms whether or not that job can be accepted (S225). If the order/input manager 112 determines that the job is unacceptable, it automatically sends a "job rejection" e-mail message to the user (S3121).

If the order/input manager 112 determines that a job based on the format file in the hot folder is acceptable, the order/input manager 112 accepts the job, and transmits the accepted job to the process control manager 111 in step S226. In addition, the order/input manager 112 automatically sends a "job acceptance" e-mail message to the user (S3122).

On the other hand, the user receives the "job acceptance" or "job rejection" e-mail message from the order/input manager 112 (S3110, S3111), thus ending the process. In this way, the user can easily save not only a record indicating whether or not a job temporarily ordered by himself or herself is accepted, and but also a record indicating the contents of the job temporarily ordered by himself or herself and the fact of the order.

As described above, since a temporary order itself is sent by e-mail, not only a record of acceptance/rejection of the temporary order but also a record of the temporary order contents can be saved.

Fifth Embodiment

The second embodiment has explained the case wherein the printer of the image forming system generates a proof output, which is to be confirmed by the user after it is delivered by mail, visit, or the like. If a proof printer is also available on the customer side, the proof output may be generated using that proof printer. Such embodiment will be described below.

Figure 41:
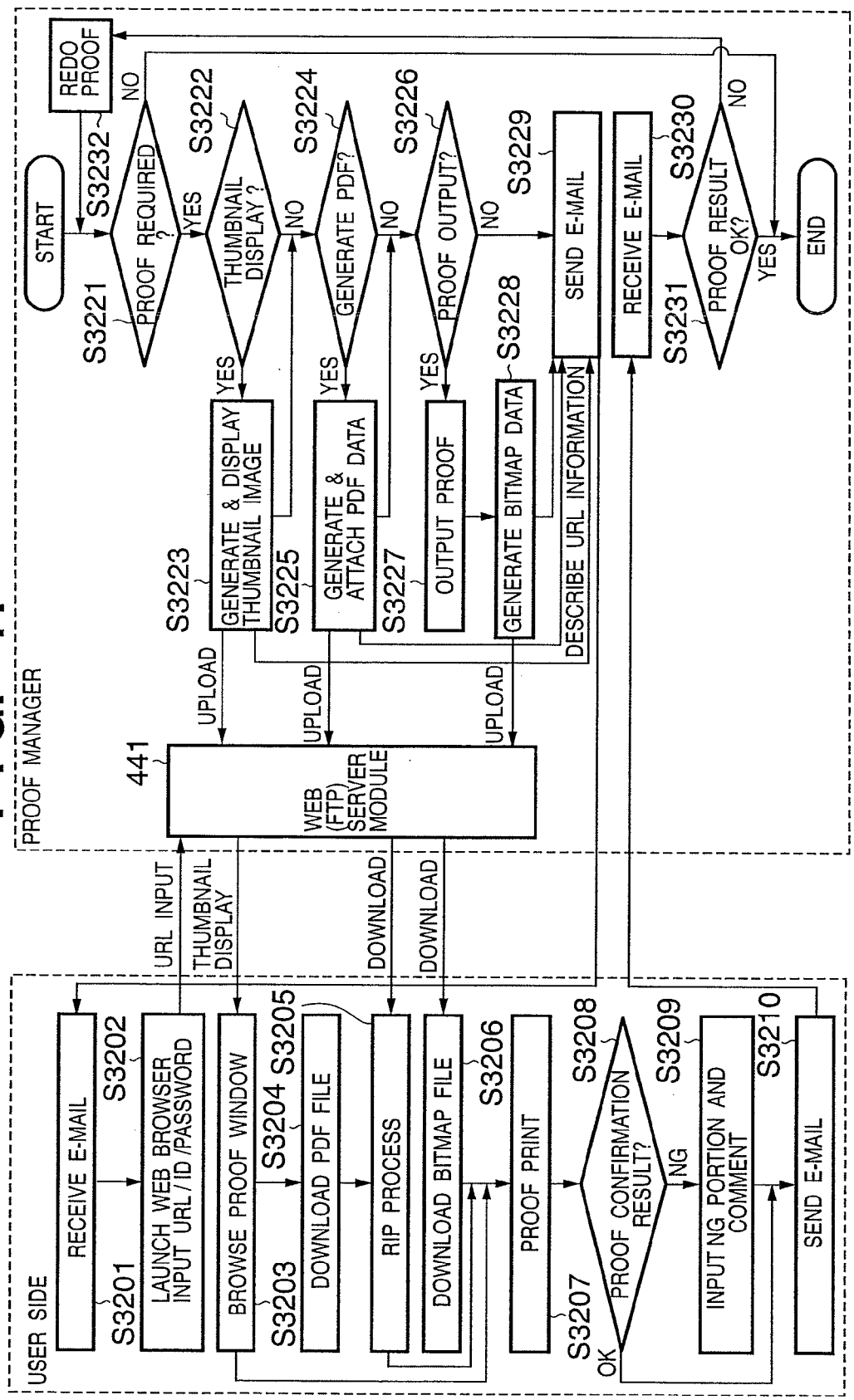
FIG. 41 is a flow chart showing communications between the proof manager and user's computer, and a proof creation process (the sixth control process of the present invention) by the proof manager according to the fifth embodiment of the present invention.

FIG. 41 is a flow chart showing communications between the proof manager 114 and user's computer, and the proof creation process (the sixth control process of the present invention) by the proof manager 114 in the fifth embodiment of the present invention. S3201 to S3210 indicate operation steps to be executed by the user's client computer, and S3221 to S3232 indicate control process steps on the proof manager 114 side.

It is checked in step S3221 if the user requests to output a proof of the job to be managed in the proof step by the process control manager 111 (i.e., if the user sets such request on the window shown in FIG. 29 or 37). If the user inputs no proof request, the process ends.

On the other hand, if it is determined in step S3221 that the user inputs the proof request, the flow advances to step S3222 and subsequent steps to provide a service to the user by the requested proof method.

More specifically, it is checked in step S3222 if thumbnail display on a Web page is requested. If it is determined that such expression method is requested, the proof manager 114 controls the document edit manager 113 to generate a thumbnail image, and uploads the generated thumbnail image to the Web server module 441 and sets that thumbnail image so that only an authentic user can display it, in step S3223. In this manner, the user can confirm the finished image on the Web page (can confirm it on confirmation windows shown in FIGS. 32 to 36).

On the other hand, if it is determined in step S3222 that thumbnail display on a Web page is not requested, or after step S3223, the flow advances to step S3224 to check if a PDF file is requested. If it is determined that a PDF file is requested, a PDF file (data) is created using, e.g., Acrobat Distiller available from Adobe Systems Corporation in step S3225, and is presented to the user by the method requested by the user (e.g., that PDF file may be browsed on a Web page, may be uploaded to an ftp site, or may be attached to an e-mail message to the user if it has a small file size).

On the other hand, if it is determined in step S3224 that the PDF file is not requested, or after step S3225, the flow advances to step S3226 to check if a proof output (bitmap) is requested. If it is determined that a proof output is requested, bitmap data or print ready data is generated using the RIP module of the print manager 115 in steps S3227 and S3228, and is uploaded to a predetermined ftp site.

If it is determined in step S3226 that a proof output is not requested, or after step S3228, the flow advances to step S3229 to transmit to the user an e-mail message that describes the URL of a Web site to which the thumbnail image data, PDF file, or proof output bitmap data is uploaded, or is attached with the PDF file.

Upon reception of this e-mail message in step S3201, the user launches the Web browser in step S3202, inputs the URL, and also inputs the user ID and password on the window provided by the Web server module 441, thus accessing the Web server module 441.

If the user requests thumbnail display, he or she acquires a thumbnail window from the Web server module 441 in step S3203, displays and browses thumbnail images (FIGS. 32 to 36), and proof-prints the thumbnail images in step S3207.

On the other hand, if the user requests the PDF file, he or she downloads that PDF file from the Web server module 441 in step S3204, applies an RIP process in step S3205, and proof-prints that file in step S3207.

If the user requests a bitmap file, he or she downloads a bitmap file or print ready file from the Web server module S3206, and proof-prints that file in step S3207.

In step S3208, the user checks the proof output. If the user determines that the proof confirmation result is OK, the flow jumps to step S3210.

On the other hand, if it is determined in step S3208 that the proof confirmation result is not OK (NG), the user inputs an NG portion and comments of the proof output in step S3209, and the flow advances to step S3210.

In step S3210, an e-mail message indicating the proof confirmation result is generated, and is sent to the proof manager 114. If the proof confirmation result is NG, the user attaches data of the NG portion and comment of the proof input in step S3209 to the e-mail message or writes them in the body text of the e-mail message. Also, information indicating if the proof confirmation result is OK/NG may be described in the body text of the e-mail message or a character string indicating OK/NG may be described in the title of the e-mail message.

Upon reception of this e-mail message (S3230), the proof manager 141 checks in step S3231 if the proof confirmation result is OK. If it is determined that the proof confirmation result is OK, the proof manager 141 ends the process, and rewrites JDF data shown in FIG. 23 to proceed with the print step. Note that determination in step S3231 may be made by a program on the basis of the title or like of the received e-mail message, or a person in charge may be informed of reception of the e-mail message, and may make determination based on the contents of the e-mail message.

On the other hand, if it is determined in step S3231 that the proof confirmation result is not OK (NG), the flow advances to step S3232, and the worker of the image forming system redoes a document edit process, document process, and proof printing process in accordance with the comment data of the NG portion from the user, and the flow then returns to step S3221.

Note that the proof confirmation result of the user is sent by e-mail. Alternatively, the user may contact a person in charge of the image processing system via a telephone or FAX, that person in charge may determine if the proof confirmation result is OK/NG.

In case of remote proofing like in this embodiment, the user can access image parameters such as an ICC profile, gamma table, and the like that have been explained using FIGS. 13, 14, and the like, via the Web server module 441 (or ftp server).

As described above, by providing one or a plurality of proof means (thumbnail image display on a Web, download of a PDF file, mailing or handover of a proof output (hardcopy), download of a proof output (bitmap data), and the like) to the user, a service can be provided to the user with reasonable cost.

The user can select a desired one of a plurality of proof means, and can reliably predict an output. Also, the service provider can proceed with operations step by step, and can output desired prints within a shorter period of time.

Therefore, the customer can select required levels for a portion which attaches an importance on confirmation of design & layout, and that which attaches an importance on confirmation of color appearance and color adjustment. Also, the customer can categorize jobs to be ordered depending on their types (e.g., color or monochrome output), and can select suitable confirmation operations (proof mode, proof expression).

Nowadays, an ordering system such as an e-shop using the Web browser and Web page on the Internet allows the user to easily and automatically select a comprehensive layout and proof methods (proof expression methods), and changes cost in accordance with the selected methods and number, thus providing a service with an order and cost that meet various customer's needs.

Sixth Embodiment

Reference to steps to be managed by the process control manager 111 will be described below. Note that a print job will be especially explained. The process control manager 111 can systematically control the managers and devices of this system, and can manage all jobs accepted by the order/input manager 112.

Each job to be handled by this system goes through a plurality of process steps across a plurality of devices from the order process step of a job under the control of the order/input manager 112 until the delivery process step under the control of the delivery/shipping manager 118 (however, since all processes may be done by a single device depending on a request from the client, this system can cope with such request and process contents). In this system, prints as one result are finished, and operations for one job are completed by sequentially executing a plurality of process steps in an appropriate order.

For example, assume that a given client wants to create 100 copies of project books using his or her data, and to apply a staple process to all these copies of project books. Also, that client makes setups according to his or her request via various UI windows including the operation windows shown in FIGS. 24 to 31 to be displayed on the client computer and places an order of the print request to this system via the client computer, and the order/input manager 112 receives that request, thus settling the order. Also, digital data as an original is received from the client. Under such conditions, as operations to be done by this system to finish this job (to be referred to as job 1 hereinafter), an order process step of job 1 is executed by the order/input manager 112, an edit process of job 1 is executed via the document edit manager 113, a proof process step of job 1 that has undergone the edit process is executed via the proof manager 114, a print process step of job 1 (including a process for printing 100 copies) after the proof process is executed by the print manager 115 and the image forming device (e.g., the MFP 104 or 105), a sheet process step (including a process for applying a staple process to 100 copies) is executed for the printed print sheets of job 1 by one of the sheet processing devices 121 to 126, and a delivery process step (including a process for delivering 100 copies of stapled project books to the client) is executed under the control of the delivery/shipping manager 118. In this manner, by executing these plurality of process steps via (by collaboration of) a plurality of devices (the respective managers, image forming devices, and sheet processing devices will be generally referred to as devices hereinafter) of this system, the operations of job 1 are finished.

On the other hand, for example, assume that another client wants to color-print 80 copies of brochures of products manufactured by a company to which he or she belongs, and to apply a saddle stitch process to all the 80 copies. The order/input manager 112 accepts a corresponding request from the client, thus settling the order. Also, the client hands a paper document as an original to the worker of this system. Under such conditions, as operations to be done by this system to finish this job (to be referred to as job 2 hereinafter), an order process step of job 1 is executed by the order/input manager 112, a document input process step of job 2 is executed by the scanner 106 and scan manager 119, an edit process of job 2 is executed via the document edit manager 113, a proof process step of job 2 that has undergone the edit process is executed via the proof manager 114, a print process step of job 2 (including a process for color-printing 80 copies) after the proof process is executed by the print manager 115 and the image forming device (e.g., the MFP 104) that can print a full-color image, a sheet process step (including a process for applying a saddle stitch process to 80 copies of color-printed print sheets) is executed for the color-printed print sheets of job 2 by any of the sheet processing devices 121 to 126, and a delivery process step (including a process for delivering 80 copies of saddle-stitched, color prints to the client) is executed under the control of the delivery/shipping manager 118. In this manner, by executing these plurality of process steps via (by collaboration of) a plurality of devices (the respective managers, image forming devices, and sheet processing devices will be generally referred to as devices hereinafter) of this system, the operations of job 2 are finished.

Under such system arrangement and preconditions, the process control manager 111 of this system controls to manage all process steps to be executed for a job to be processed in a series of work periods (in this embodiment, a series of work steps which are required to complete one job (a job corresponding to the contents of one order) and have a plurality of process steps executed via one or a plurality of devices will be referred to as a work flow) of the job to be processed by this system, which are included in a period from the order process step of the job until execution of the delivery process step of that job. In addition, the process control manager 111 controls to manage all process steps to be executed for a job to be processed until that job is completed for each of a plurality of jobs accepted by the order/input manager 112, even when all these process steps are executed by a single device of this system or are executed by collaboration of a plurality of devices of this system that execute individual processes.

The system of this embodiment is not configured to automatically execute all process steps to be executed by this system without any intervention work of an operator. In other words, this system requires, in some cases, an intervention work of an operator (worker of this system) in a series of work steps (work flow) including a plurality of process steps which are required upon completing one job to be processed and are to be executed via one or a plurality of devices.

Taking job 1 above as an example, assume that when the staple process is executed for documents (project books), which are completed by the print process step of the image forming device (e.g., MFP), in the sheet process step by the sheet processing device of this system in the work flow of job 1, the image forming device (e.g., one of the MFP 104 and 105 in FIG. 1) that executes a print process of job 1, and the sheet processing device (e.g., the collator 126 in FIG. 1) that executes a staple process for print sheets of job 1 are independently equipped to have individual housings, and are not electrically and physically connected (of course, the image forming device may comprise sheet processing devices as option devices, but these devices are not connected for the sake of simplicity; however, it is preferable that the image forming device be electrically connected to at least the print manager 115, and the sheet processing device be electrically connected to at least the post-process manager 116 so as to allow them to make data communications with the corresponding managers). In such case, an operation that requires an operator (worker) of this system to pick up prints of job 1 printed by the image forming device, to transfer the picked-up prints of job 1, and to set them on a process tray of the sheet processing device takes place. In this manner, in the work flow of job 1 required to complete job 1, at least the pickup & transfer operation of prints from the image forming device, and the set operation of the prints on the sheet processing device are required as operator intervention works.

Taking job 2 above as an example, the work flow of job 2 requires at least an operation for setting a paper document of job 2 on the scanner 106 as an operator intervention work. Also, when the image forming device (e.g., the color MFP 104 in FIG. 1) that executes a color print process of job 2 and the sheet processing device (e.g., the saddle stitcher 122 in FIG. 1) that executes a saddle stitching process for color-printed print sheets of job 2 are independently equipped to have individual housings, the work flow requires at least pickup & transfer operation of prints from the image forming device, and the set operation of the prints on the sheet processing device as operator intervention works, as in job 1.

As described above, both the work flows of job 1 and 2 require intervention works by an operator of this system. Also, the work flow required to complete an ordered job in this system includes, for example, a plurality of different operator intervention works such as an order confirmation operation of a job by an operator by collaboration with the order/input manager 112, a process condition parameter setup operation, job edit operation, and printer environment setup operation for the job, which are done by collaboration with the document edit manager 113, a delivery/shipping operation which is done by collaboration with the delivery/shipping manager 118, and the like, in addition to the aforementioned ones.

In this embodiment, on the precondition of such system arrangement, the process control manager 111 can manage even a plurality of different intervention works by an operator (worker) in the work flow of each job. In addition, the process control manager 111 executes UI control so as to inform and present appropriate work instruction information for an operator, which is used to inform the operator of an action to be taken by that operator in each operator intervention work in the work flow required to complete an ordered job, in an optimal presentation format that allows the operator himself or herself who confirms the instruction information to identify for respective operators and respective jobs, via a user interface unit of an arbitrary device of this system such as the display unit of the computer, that of the image forming device, that of the sheet processing device, and the like.

[Print Job]

Figure 42:
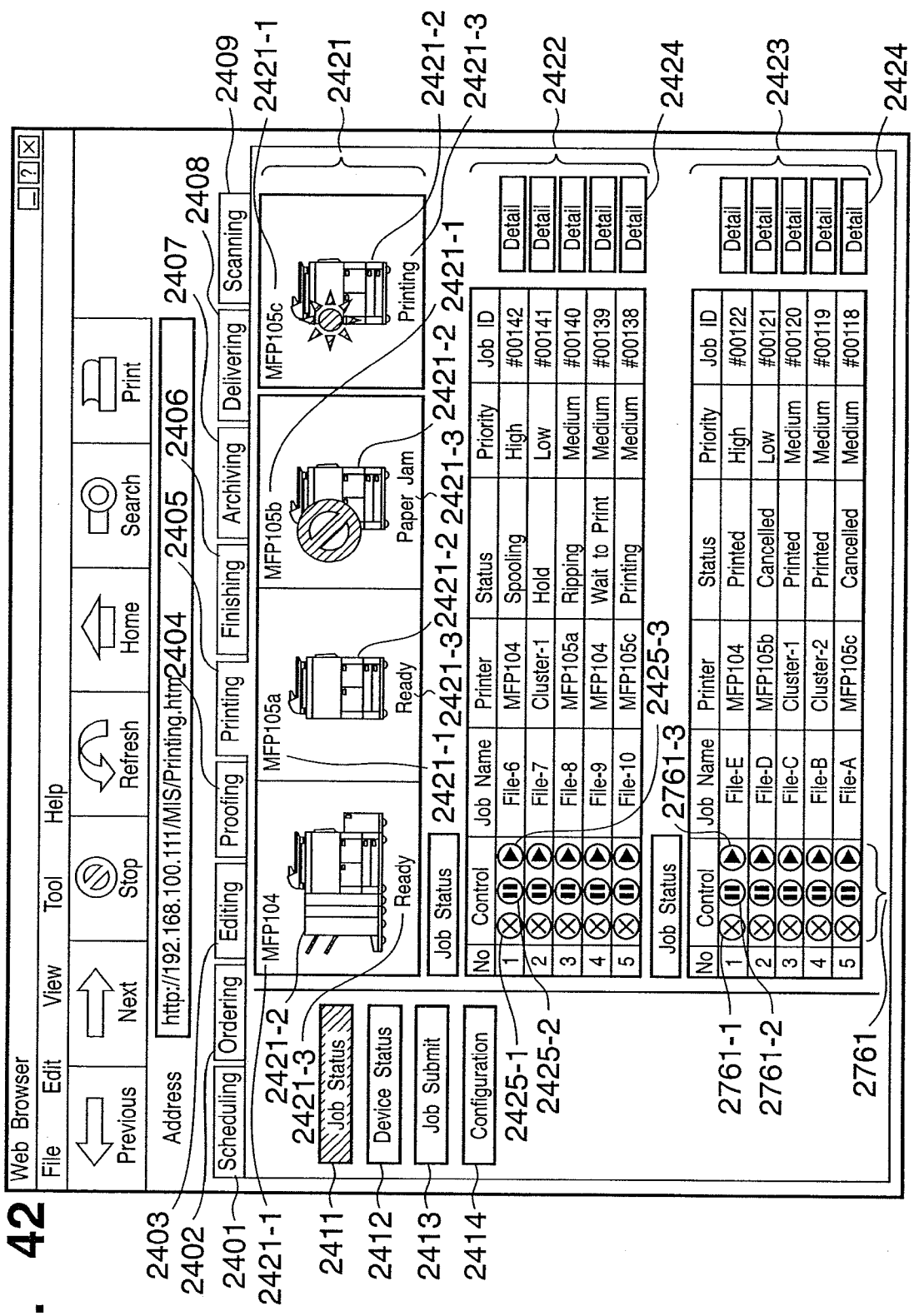
FIG. 42 shows a print step management window provided by the print manager shown in FIG. 1.
Figure 44:
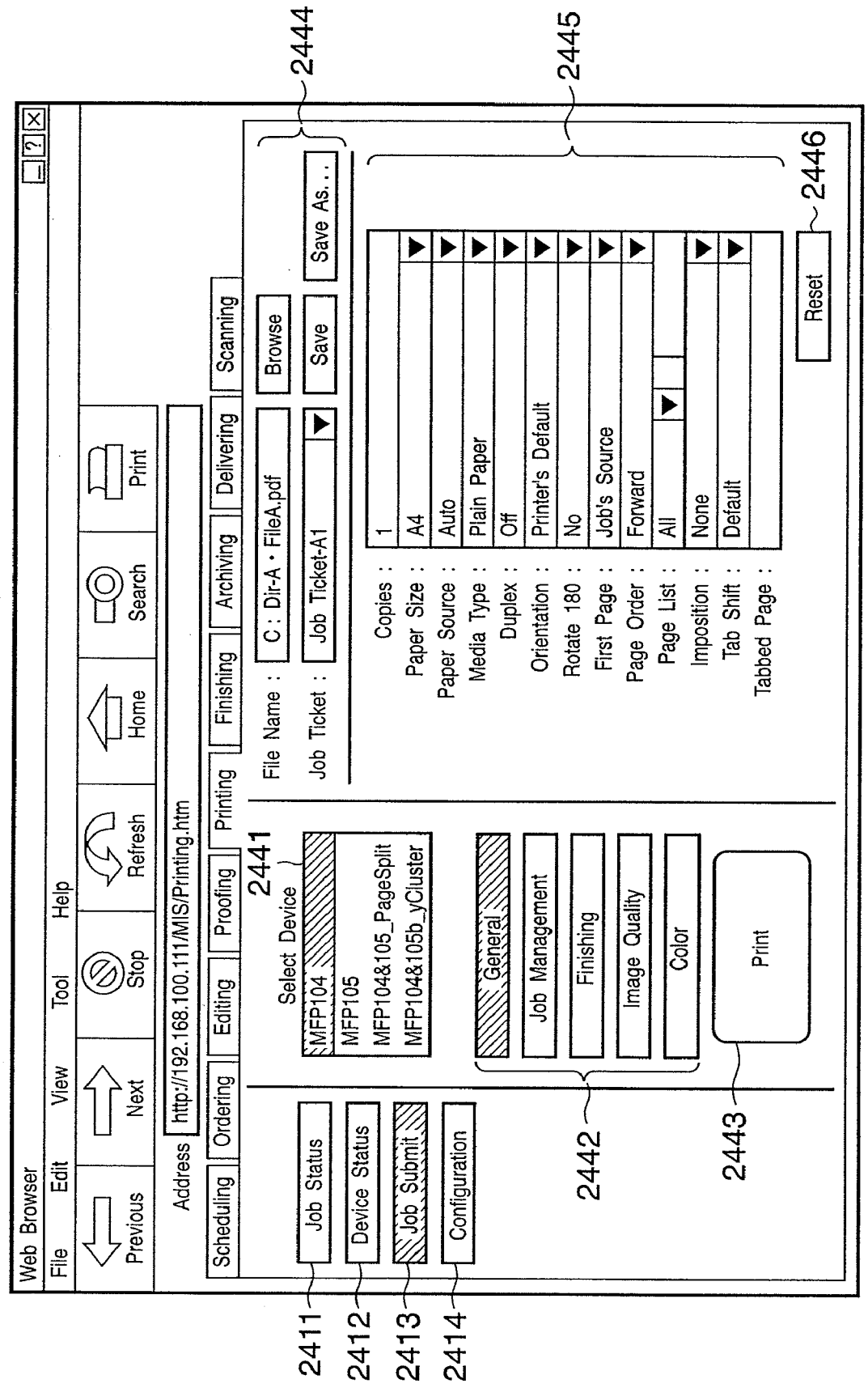
FIG. 44 shows a print step management window provided by the print manager shown in FIG. 1.
Figure 45:
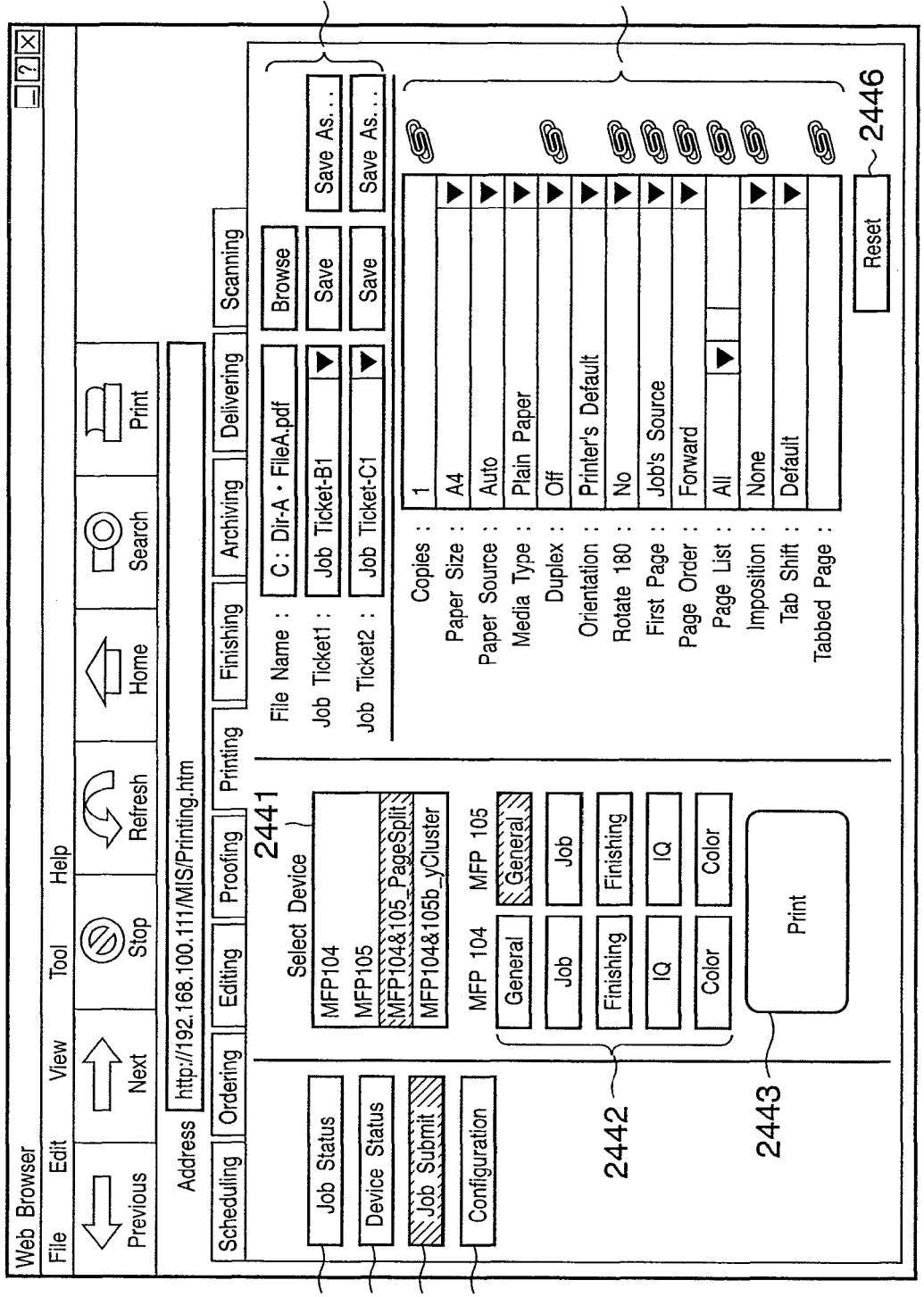
FIG. 45 shows a print step management window provided by the print manager shown in FIG. 1.

FIGS. 42 to 45 show an example of a print step management window, which is presented (displayed) by the print manager 114 shown in FIG. 1 on a user interface such as the display unit of the device (the device such as the computer, image forming device, sheet processing device, and the like) of this system on the basis of various kinds of information which are acquired from devices such as image forming devices (e.g., MFPs) via data communication unit and mainly include status information, job processing state information, and the like of the respective image forming devices. Note that the operation windows shown in FIGS. 42 to 45 can be displayed on the display unit of a computer which comprises the function of the print manager 114. However, for example, in a system arrangement in which other managers (e.g., the process control manager 111 and the like) are incorporated in computers having housings independent from that of the computer of the print manager 114, these windows are controlled to be displayed on the display units of the computers of other managers. Of course, these windows may be displayed on the display unit of the client computer used to place a job order, and may also be displayed on those of the image forming devices and sheet processing devices. In any case, the arrangement to be adopted is not particularly limited as long as this system can provide an optimal user interface to a client who places a job order and/or an operator of this system who receives that job order. FIG. 42 shows a job status window in a print step of the work flow (including a plurality of different process steps such as a scheduling step, order step, edit step, proof step, print step, finishing (sheet process) step, archiving step, delivery step, scan step, and the like, which are associated with a job to be processed by this system) to be executed in this system. FIG. 43 shows a device status window in the print step, and FIGS. 44 and 45 show a job submit window in the print step. Note that it can be set in advance to load each of service windows shown in FIGS. 42 to 45 and the like to the client computer, and to display it on the display unit of that client computer in response to the IP address (e.g., 192.168.100.11; a server name may be used instead in an environment that supports DNS (short for Domain Name System; a system that provides a service for detecting the IP address from a host name on a TCP/IP network such as the Internet or the like)) of the Web server on the process control manager 111 side input to a URL address field of the Web browser on the client computer 103 by an operator's key operation. This service tool (service window) adopts a display configuration comprising a scheduling tab 2401 used to input an instruction for displaying an operation window suited to implement scheduling among the managers via user's key operations on the display unit, an ordering tab 2402 used to input an instruction for displaying an operation window that allows the user to confirm the order state by the order/input manager on the display unit, an editing tab 2403 used to input an instruction for displaying an operation window suited to execute a document edit process via user's key operations on the display unit, a proofing tab 2404 used to input an instruction for displaying an operation window that allows the proof manager 114 to manage the customer's approval state of a proof on the display unit, a printing tab 2405 used to input an instruction for displaying an operation window to be used to manage or submit a print job on the display unit, a finishing tab 2406 used to input an instruction for displaying an operation window suited to allow the post-process manager 116 to manage a post-process step (sheet process step) on the display unit, an archiving tab 2407 used to input an instruction for displaying an operation window suited to allow the file archiving manager 117 to manage job archive states (job storage states), a delivery tab 2408 used to input an instruction for displaying an operation window suited to allow the delivery/shipping manager 118 to manage delivery slips and delivery states, a scan tab 2409 used to input an instruction for displaying an operation window suited to allow the scan manager 119 to mange a scan job, and the like. With such display configuration, for example, when the printing tab 2405 is selected by a user's key operation, control is made in response to that operation to make the computer which displays this window access the Web server (which may be common to that on the process control manager 111) of the print manager 115 in response to that operation, to load data required to display the job status window in the print step shown in FIG. 42, and to display that window on the display unit of that computer.

The print step management window (a service window displayed on the display unit upon selection of the printing tab 2405) shown in FIGS. 42 to 44 comprises display elements such as a job status key 2411 used to input an instruction for displaying an operation window suited to make job management on the display unit, a device status key 2412 used to input an instruction for displaying an operation window suited to manage the print devices (MFPs 104 and 105) on the display unit, a job submit key 2413 used to input an instruction for displaying an operation window suited to control submission of a print job on the display unit, a configuration key 2414 used to input an instruction for displaying an operation window suited to make various setups such as registration of a printer, cluster printer, and the like, and so forth. FIG. 42 corresponds to the operation window to be displayed on the computer upon selection of the job status key 2411; FIG. 43, the operation window to be displayed on the computer upon selection of the device status key 2412; and FIGS. 44 and 45, the operation window to be displayed on the computer upon selection of the job submit key 2413.

As an example of display control of this embodiment, control is made to display, on a device display area 2421 of the job status window shown in FIG. 42, device name fields 2421-1 (MFPs and the like on the network), device status icon fields 2421-2 (each icon changes in accordance with status), and text information fields 2421-3 (Ready, PaperJam, Printing, etc.) indicating status of such devices, so that the user can identify them.

Also, control is made to display, on a job status display area 2422 of the job status window shown in FIG. 42, status information (processing status information) of jobs as ordered jobs which can be stored and held in the server and are to be processed by this system, so that the user can monitor them. For example, control is made to display "Spooling" (reception of data before RIP in progress) as information of a job whose reception process is in progress by the image forming device of this system; "Ripping" (RIP in progress) as information of a job whose rasterize process is in progress by the image forming device of this system; "Wait to Print" (print waiting) as information of a job which waits for a print process in the image forming device of this system; and "Printing" (print in progress) as information of a job whose print process is in progress by the image forming device of this embodiment. As for a job which is instructed in advance to wait in the server upon submission, "Hold" is displayed as a state before RIP. As for a job that has caused an error, jam, or the like, a message that advises accordingly is displayed so that the user can identify it. As for a printed job, "finished job" is displayed as the next job history. Device status information as information required upon displaying such information is acquired from each network device (including the image forming device (e.g., MFP)) as a reply result from that device in response to information (status request information), which allows the server to inquire each device of its status, transmitted at predetermined time intervals or at a desired timing. Alternatively, in place of such inquiry sent by the server, each network device may positively inform the server of its status information when its own status has changed, thus allowing the managers of this system to acquire the status information. In any case, appropriate status information need only be provided to the user at a timing desired by the user under the control of the respective managers of this system.

The operation window in FIG. 42 comprises a job history display area 2423 that displays history information associated with a job that has been processed by this system. The job history display area 2423 allows the user to confirm job history. For example, control is made to display "Printed" as history information of a job whose print operation terminated normally (a job which has been processed by the print operation according to user's instructions), and "Canceled" as history information of a job which is canceled during its process.

Furthermore, the operation window comprises detail keys 2424. In response to depression of each detail key 2424 by a user's key operation (click; designated using a pointing device or the like (not shown)), control is made to present, to the user, details of a job selected by that key 2424 of jobs which are to be processed by this system (print waiting jobs and printing jobs) and jobs which have been processed (printed jobs and canceled jobs). As detail information, for example, in addition to a job name, target printer, job status, job priority, job ID, and client name, the number of pages, the number of copies, paper size, and predicted output time of the job, comments that describe requirements from the client to the operator, and the like are displayed. Note that the predicted output time (predicted time) is calculated by this manager on the basis of the current spool order and predicted RIP time of a job, printer speed, or the like.

Moreover, on the job status display area 2422, reference numerals 2425-1 to 2425-3 denote control keys, which allow only a given privileged person (e.g., an administrator) to make control for each job. These keys function to instruct this manager (print manager 115) to make a related device (e.g., the image forming device such as an MFP), which actually process the job, cancel a job (2425-1), pause (pause or hold) a job (2425-2), restart a job (release a paused or held job) (2425-3), and so forth, in turn from the left.

On the job history display area 2423, reference numerals 2761-1 to 2761-3 denote control keys which allow control for jobs in the job history display area 2423. These keys function to instruct this manager (print manager 115) to make a related device (e.g., the image forming device such as an MFP), which actually process the job, archive a job (2761-1), delete a job (2761-2), re-print a job (2761-3), and so forth, in turn from the left.

In this system, a standardized database called MIB (Management Information Base) is formed in a network interface in each image forming device of this system which includes the MFPs 104 and 105 and printers (not shown), so as to allow the computers on the network to communicate with such databases via a network management protocol called SNMP (Simple Network Management Protocol), to acquire status data of devices such as the MFPs 104 and 105 and the like connected on the network of this system, and to allow the image forming devices and the computer 103 to exchange required information. For example, the functions of finishers connected to the MFPs 104 and 105 can be detected as equipment information of these MFPs, and whether or not an error, jam, or the like has occurred, whether the device is printing or idling, or the like can be detected as status information. The acquired information can be displayed on the computer. In this manner, every kinds of static information such as equipment information, device states, network setups, job routes, management/control of use states, and the like of the image forming devices of this system including the MFPs 104 and 105 can be acquired. The print manager controls to fetch status data of the MFPs and the like using this MIB as needed, and to update such data using an HTML file, thus allowing the client to always browse such states.

In response to clicking (designation using a pointing device (not shown) or the like) of the device status key 2412 on the operation window or the like of FIG. 42 by the user, the controller (e.g., the print manager) displays the device status window shown in FIG. 43 on the display unit. Device status information is displayed on a device status display area 2432 of the operation window of FIG. 43, so that the user can confirm, in advance, the paper sizes and their replenishment states (the residual quantities of paper sheets in paper stackers or cassettes) in the devices, and accessories such as finishers connected to the respective devices. The residual quantity of print sheets is detected by a sensor (not shown), which can detect it, of each paper cassette of the image forming device of this system. Note that the residual quantity of sheets may be detected in increments of about 10 sheets as a minimum unit in place of the exact number of sheets. That is, at least the presence (presence of paper) and absence (out of paper) of print sheets in each paper cassette can be identified for each of a plurality of paper cassettes of the image forming device. Reference numeral 2433 denotes detail keys, each of which is used to display details (e.g., monochrome/color, resolution, print speed, and the like) of each device in response to clicking (designation using a pointing device (not shown) or the like) of this key by the user.

In response to clicking (designation using a pointing device (not shown) or the like) of the job submit key 2413 on the operation window by the user, the print manager 115 displays the job submit window shown in FIG. 44 on the display unit.

The use method of the job submit window is the same as that of the aforementioned printer driver. The job submit window works to directly submit a job to be printed (to transfer or copy a document file to be printed by appending the following additional information to it) to the print manager 115 without opening a file on the client computer 103 by an application (without any print instruction on the application).

Normally, the printer driver has two roles. The first role is to open data via an application on the client computer 103 and to convert that data into PDL data of Postscript® (or PCL) or the like. The second role is to submit the converted data to the print manager 115 (or printer). This is because the conventional RIP process can cope with only one type of RIP process.

By contrast, a job submit process has as its role to merely submit a job using a GUI together with a job ticket. In recent years, a single software RIP module which can execute the RIP process of not only PS data but also data of various other formats (e.g., pdf, tif, jpg, and the like) is available, and the print manager 115 has a plurality of different software RIP modules (e.g., PS and PCL) which can be selectively used in correspondence with data. Hence, even when not only PDL data of a given format but also those of various formats (e.g., pdf, tif, jpg, and the like) are directly sent to the print manager 115, they can undergo the RIP process and can be rasterized to bitmap data as in the conventional PDL data of a given format. If the MFP 104 or 105 comprises a printer with an RIP process function of a type that handles only PS data in place of bitmap data depending on its interface, the print manager 115 rasterizes input data to bitmap data by the RIP process, compresses the bitmap data by JBIG or G4 (CCITT), appends a PS header (a header indicating PS data) or the like to the compressed data, and outputs that data to the MFP, thus realizing print processes of various format data for various printers.

As a setup item added on the job submit window, reference numeral 2441 denotes a destination selection column used to select an output destination as a target. In general, the aforementioned MFP 104 or 105, or a cluster printer as a combination of them can be set. When a so-called cluster printer that virtually combines a plurality of printers is selected by the destination selection column 2441, the GUI contents of setup item switch keys 2442 are changed so that setups can be made for respective printers, as shown in FIG. 45.

Reference numeral 2444 denotes a column used to select a file. With this column, a file name and directory may be directly designated together. However, in general, the user selects a job file in the server computer itself (or in the network) using a browse button located on the right side of the column 2444.

After the aforementioned setups, if the user clicks a print key 2443, the set contents and designated file are transferred to the print manager 115, and are added (queued) as a print job.

Setup items to be sent together with the selected file are called a job ticket. The job ticket has setup items 2445. Note that FIGS. 44 and 45 display setup items for a general setup (General). By selecting setup item categories (general setup, job control, finishing, image process setup, and color setup) using the setup item switch keys 2442, setup items (those of general setup, job control, finishing, image process setup, color setup, and the like) of different categories shown in FIGS. 46 to 49 are displayed. After setups, these setup items are transmitted as a job ticket to the print manager 115 together with image data, and are used in the RIP process, print process, post-process, and the like.

In this embodiment, detailed setup items of a job ticket are classified into some categories, as follows, to allow various setups.

1. General setup (General): the number of copies of a job to be printed, the paper size of print sheets of the job to be printed, a paper source used by the image forming device in the job to be printed, the type (media type) of print sheets of the job to be printed, ON/OFF of duplex print as to whether the job to be printed is to be printed in the duplex or simplex mode, etc. (2445 in FIGS. 44 and 45)

Figure 46:
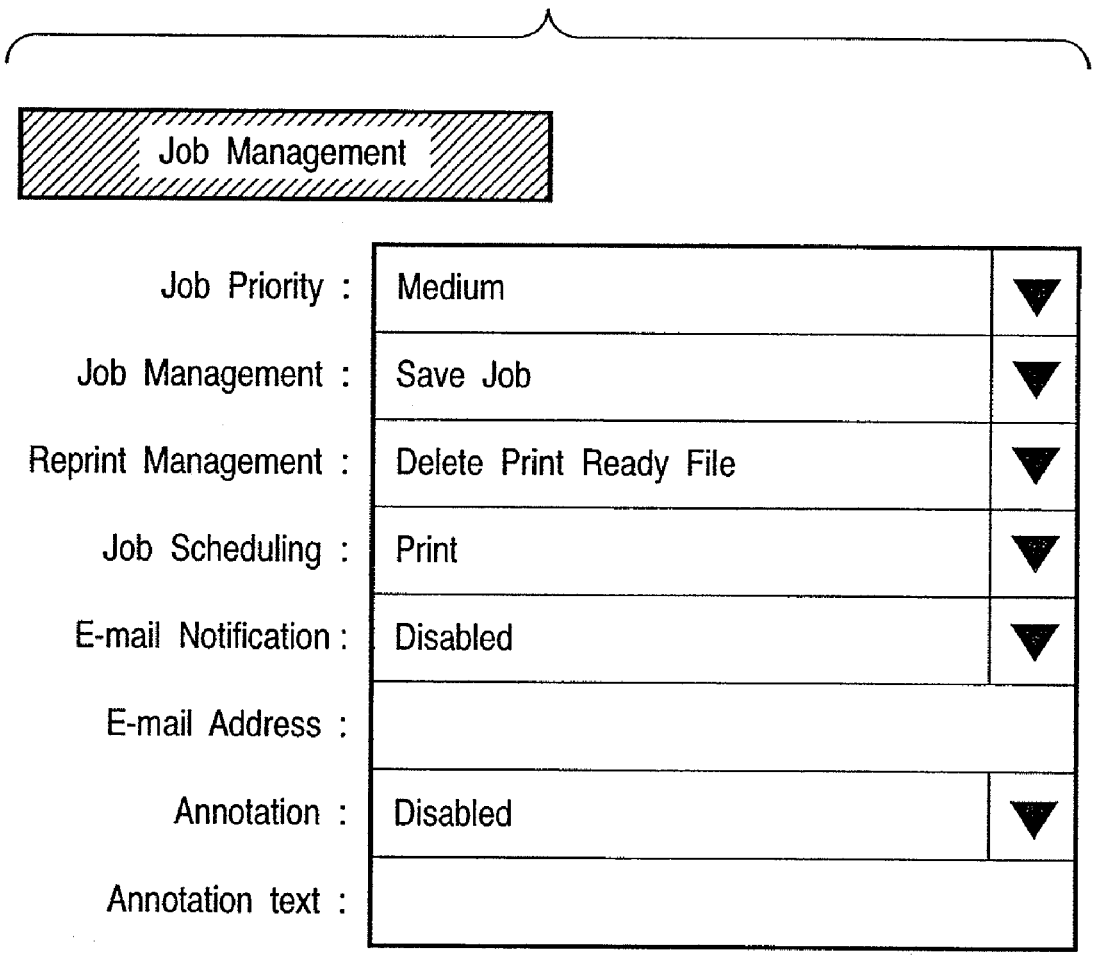
FIG. 46 shows an example of job control setup items.

2. Job control (Job): setups about job control such as job priority required to determine a print order, ON/OFF of job save used to specify if a job to be printed is saved in a memory such as a hard disk or the like, etc. (FIG. 46)

Figure 47:
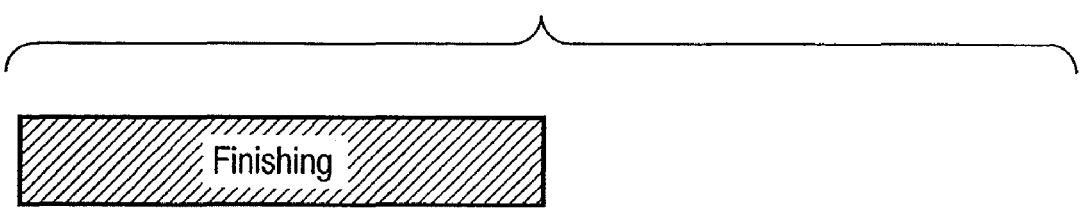
FIG. 47 shows an example of finishing setup items.

3. Finishing (Finishing): setups of sheet processes for a job such as ON/OFF of sheet processes such as staple, punch, booklet, and the like (FIG. 47)

Figure 48:
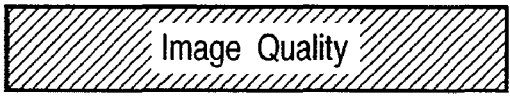
FIG. 48 shows an example of image process setup items.

4. Image process setup (Image Quality=IQ): setups of image processes for a job such as sharpness, brightness, toner reduction setup, and the like (FIG. 48)

Figure 49:
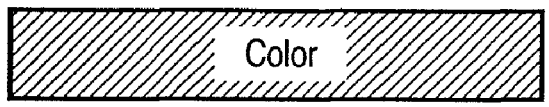
FIG. 49 shows an example of color setup items.

5. Color setup (Color): color process setups for a job such as gamma conversion table setups, ICC profile setups, and the like (FIG. 49)

When a print process is made by combining a plurality of printers, the detailed setup items of a job ticket of these categories 1 to 5 can be set for the respective printers, as indicated by 2442 in FIG. 45.

Furthermore, since not only this job ticket has setup items unique to each individual device, but also it allows a smooth operation if it is prepared in advance, keys 2444 including a job ticket call key, a save key used to save an arbitrary set job ticket (so as to re-use that job ticket), a save as key used to save a job ticket with a new name, and a delete key (not shown) used to delete a job ticket are prepared. Note that the keys 2444 also include a file name input area, browse key, and the like, which are used to select a print file from the own computer or the network accessible by that computer.

Upon completion of various setups by the user, the print manager 115 controls related devices (image forming device (e.g., MFP) and the like) of this system to execute the process operations according to various print output process conditions set by the user.

Upon depression of a reset key 2446 on the operation window of FIG. 44 or the like, the print manager 115 controls to return job ticket setups (setups of print process conditions for a job) to a default state (initial setup values).

[Print Job Flow]

The process of a print job submitted to the print manager 115 from the job submit window or printer driver will be described below with reference to the flow charts of FIGS. 50 and 51.

Figure 50:
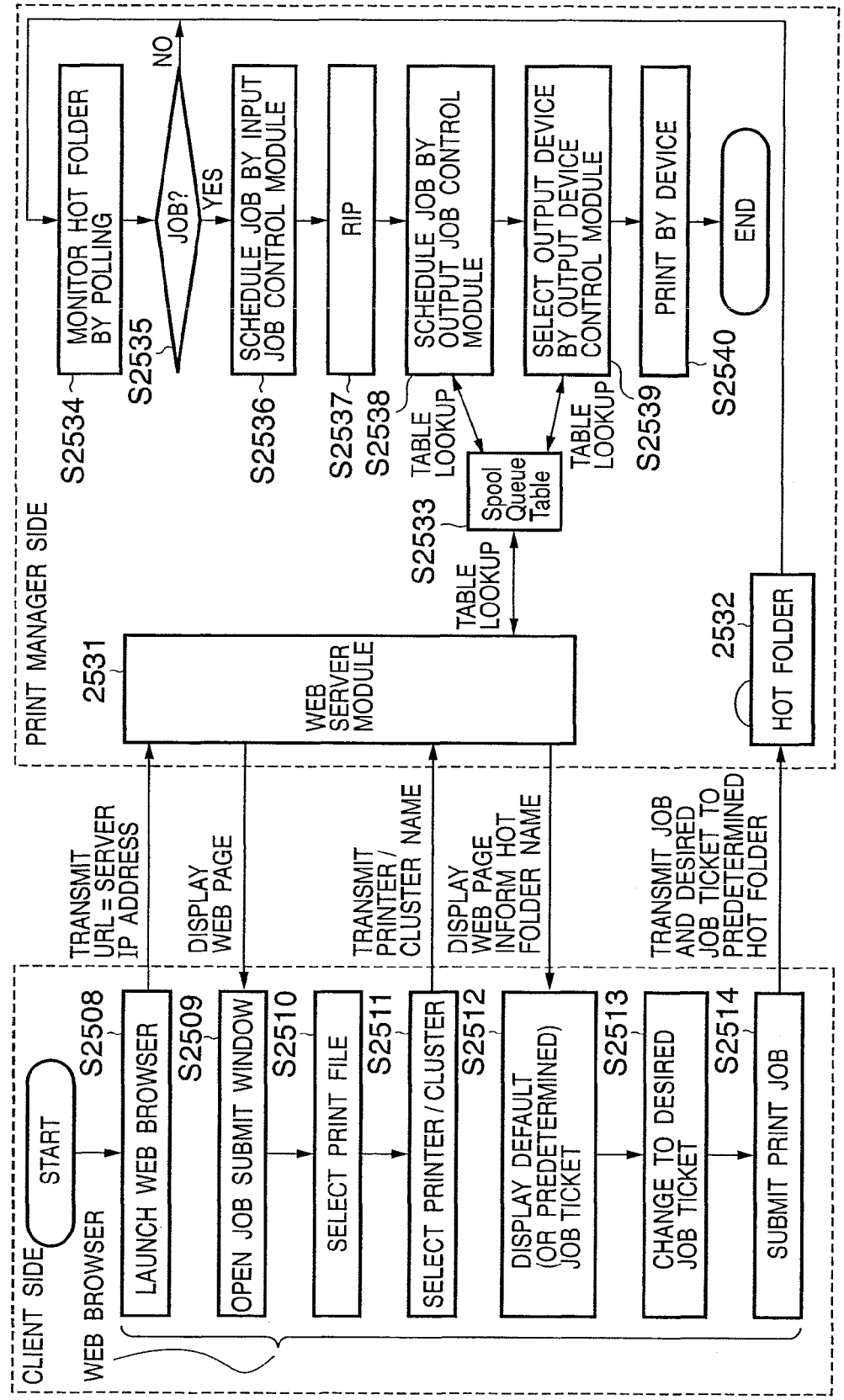
FIG. 50 is a flow chart for explaining the process (the seventh control process according to the present invention) of a print job which is submitted to the print manager upon operation on the job submit window shown in FIGS. 44 and 45.

FIG. 50 is a flow chart for explaining the process (the seventh control process of the present invention) of a print job which is submitted to the print manager 115 on the basis of an instruction from the user input via the job submit window shown in FIGS. 44 and 45. S2508 to S2514 indicate operation steps of an operator on the Web browser (job submit window) on the client computer 103 side, and S2534 to S2540 indicate control process steps on the print manager 115 side.

Upon submitting a file from the job submit window shown in FIGS. 44 and 45 to the print manager 115, the client computer 103 accesses a Web server module 2531 on the print manager 115 side (S2508). More specifically, the operator launches the Web browser on the client computer 103 and inputs the URL address on the Web browser to access the Web server module 2531 on the print manager 115 side. Then, the operator on the client computer side opens a job submit window (that shown in FIG. 44) (by selecting the printing tab 2405 on the service window provided from the Web server on the process control manager 111 side, and also selecting the job submit key 2413) (S2509).

Next, the operator selects a desired print file on his or her computer or on the network accessible by that computer (S2510). The file to be selected need not always be a PS file but may be a PCL file, TIFF file, JPEG file, PDF file, or the like as long as they can be rasterized (RIP process) by the server.

Furthermore, the operator selects a printer or cluster to be used in an output process (S2511). The client computer immediately informs the print manager 115 of the selected printer or cluster name, receives a Web page which includes a default (or desired) job ticket, hot folder name, and the like, which are prepared in advance on the print manager 115 side, and displays it on the Web browser (S2512).

The operator changes the contents of the displayed job ticket to desired setup values to be used in the print process (S2513), and then clicks the print key 2443 (by designating it using a pointing device (not shown) or the like). In response to this operation, the selected job and desired job ticket are transmitted to a hot folder 2532 on the print manager 115 side (submit a print job) (S2514).

At this time, the print manager 115 independently manages the received job file (both of a PDL file and application file will be generally referred to as a job file hereinafter) and job setup information (job ticket) using, e.g., different extensions or the like.

The print manager 115 monitors a plurality of hot folders by polling (S2534). If a job is found in the hot folder 2532 (S2535), that job is passed to the input job control module 602 to be scheduled (S2536), and then undergoes an RIP process (S2537), as shown in FIGS. 7 and 11. A spool queue table 2533 of a desired printer (or cluster) selected by the operator is then looked up (S2538, S2539) to print the job by the output device registered in that table (to transmit print data to that output device) (S2540).

Figure 51:
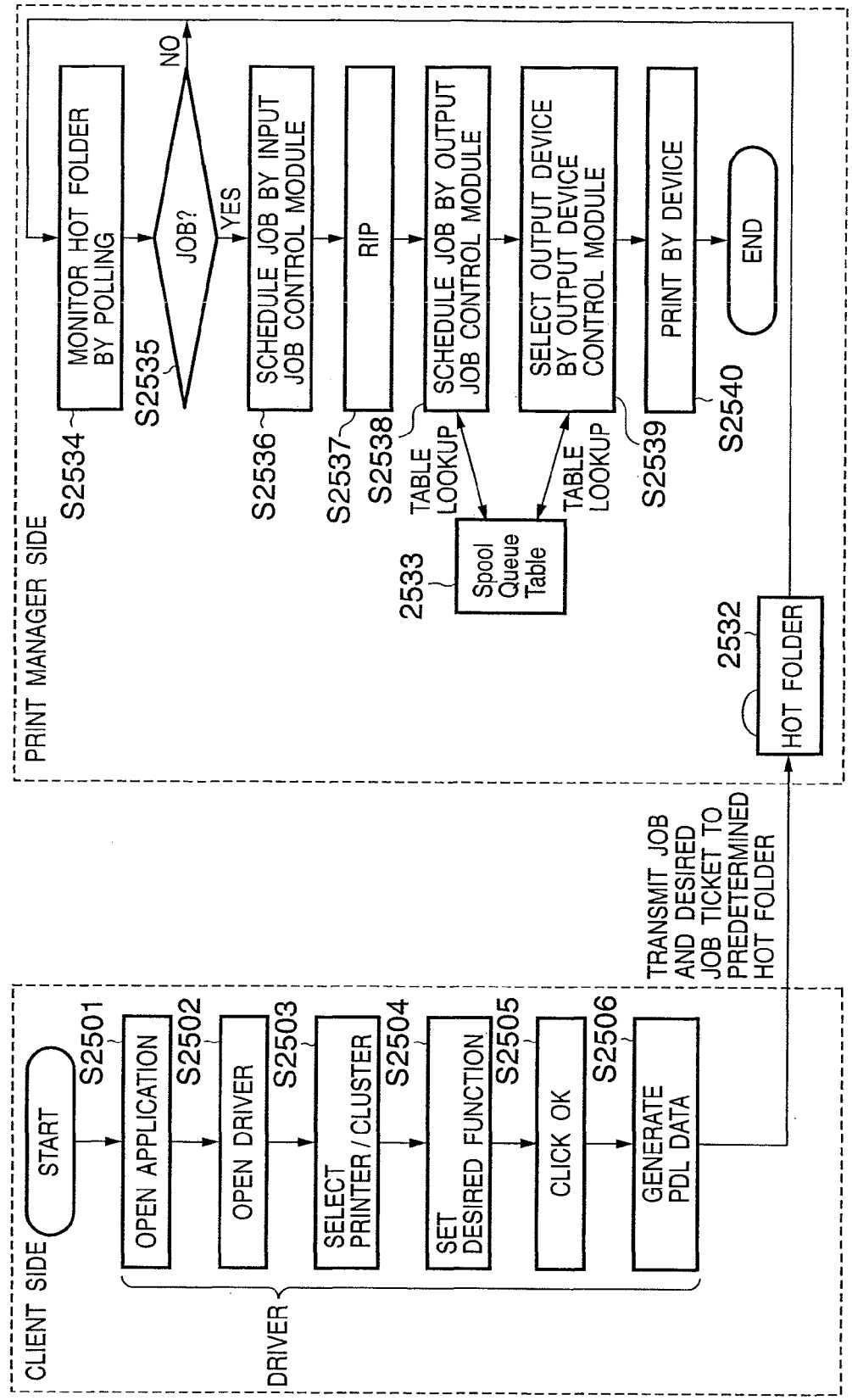
FIG. 51 is a flow chart for explaining the process (the eighth control process according to the present invention) of a print job which is submitted to the print manager upon operation on the printer driver window shown in FIGS. 8 to 10.

FIG. 51 is a flow chart for explaining the process (the eighth control process of the present invention) of a print job which is submitted to the print manager 115 upon operation from the printer driver window shown in FIGS. 8 to 10. S2501 to S2506 indicate operation steps of an operator on the printer driver window on the client computer 103 side, and S2534 to S2540 indicate control process steps on the print manager 115 side. The same step numbers denote the same steps as in FIG. 50.

Upon submitting a file from the printer driver to the print manager 115, the client computer 103 issues a print instruction from an application (e.g., word processing software or the like) which runs on it, and consequently submits a job from the printer driver. More specifically, the operator launches application software (S2501) on the client computer 103, opens a file to be printed, and issues a print instruction (by opening the printer driver window shown in FIG. 8) (S2502).

Next, the operator selects a printer (S2503), and sets desired functions using a property dialog or the like (S2504). If the operator clicks the OK key 705 (by designating it using a pointing device (not shown) or the like) (S2505), generation of PDL data starts in the client computer 103 (S2506).

After the PDL data is generated, it is immediately sent to a predetermined hot folder 2532 in the print manager 115. The subsequent print processes in the print manager 115 are the same as those for a job submitted from the job submit window, and a description thereof will be omitted.

Upon selecting a printer or cluster, a PPD (PostScript® Printer Description) file or the like must be prepared and the printer driver must be set in advance in the client computer 103. The PPD file describes setup items and their initial values required to control that printer, advisability of combinations of setups, or the like, and is provided as a file unique to each printer or cluster. The operator must prepare linked PPD files and drivers in his or her computer for respective printers and clusters.

[Setup of Cluster Printer]

A virtual printer defined by combining a plurality of printers, as described above, is called a cluster printer. For example, using a plurality of image forming devices (e.g., two image forming devices, i.e., the MFPs 104 and 105) of this system, a print operation of a job output from a data generation source such as a computer or the like is shared and simultaneously executed by the plurality of image forming devices (which are controlled to parallelly execute the print operation). In such cluster print mode, for example, control is made in response to an instruction from the user so that the first image forming device can print 50 copies of 100 copies of a job to be printed, and the second image forming device can print the remaining 50 copies parallel to the print operation of the first image forming device (copy number distribution). Control is made so that the first image forming device can execute a print operation of the 1st to 49th pages of a job including 100 pages, and the second image forming device can execute a print operation of the 50th to 100th pages parallel to the print operation of the first image forming device (page distribution). Control is made so that the color MFP executes a print operation of color pages of color & monochrome page mixed document data including both color and monochrome pages, and the monochrome MFP executes a print operation of monochrome pages of that color & monochrome page mixed document data parallel to the print operation of the color MFP (color/monochrome distribution). The number of image forming devices that can achieve distributed print operations is not limited to two. For example, two or more image forming devices can execute such operations on the basis of the print setups from the user. This embodiment has a plurality of different cluster print modes, and a control unit of the print manager 115 or the like can control a plurality of image forming devices of this system to execute the distributed print operations. Note that the user can make a cluster print setup, which indicates image forming devices (e.g., MFPs) used to execute a cluster print process of those of this system, via an operation window (not shown) displayed by the print manager 115.

This cluster print setup is available as one of setups displayed upon operation of the configuration key 2414 on the print step management window shown in FIGS. 42 to 45. The flow of a process for defining a cluster printer by combining the MFPs 104 and 105, which are registered in advance, will be described below with reference to the flow chart shown in FIG. 52.

Figure 52:
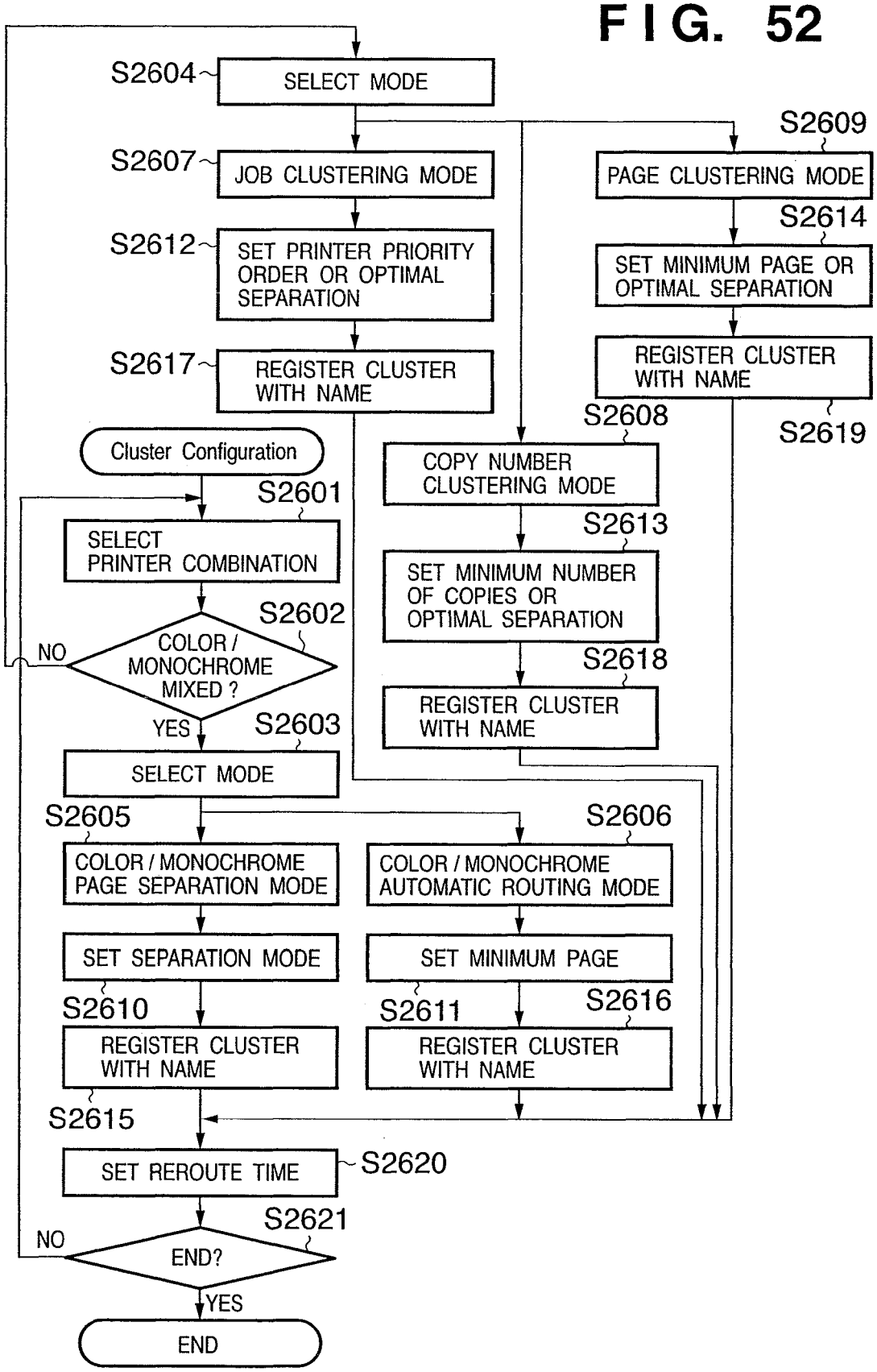
FIG. 52 is a flow chart showing an example of a cluster printer registration process (the ninth control process of the present invention) in the image forming system of the present invention.

FIG. 52 is a flow chart showing an example of the cluster printer registration process (the ninth control process of the present invention) in the image forming system of the present invention. S2601 to S2621 indicate respective steps.

The control prompts the operator to select two or more printers from registered printers (S2601). For example, if there are three printers A, B, and C, four different combinations, i.e., A & B, A & C, B & C, and A & B & C, are available. If different modes to be described below are selected for a given combination of printers, such combination can be registered as different cluster printers.

It is checked if the selected combination includes printers of different types (color/monochrome mixed) like color and monochrome printer (S2602). If "color/monochrome mixed" is determined, the control prompts the operator to select one of two modes, i.e., a color/monochrome page separation mode and a color/monochrome automatic routing mode (S2603).

In the color/monochrome page separation mode, a job which includes both color and monochrome pages is separated into color pages and monochrome pages for respective pages in advance, pages including color information are output to the color printer, and pages (monochrome pages) which do not include any color information are output to the monochrome printer. In the color/monochrome automatic routing mode, after color and monochrome pages are distinguished, automatic routine is done: if a job includes at least one color page, all pages of that job are output to the color printer; if all pages of a job are monochrome pages, those pages are output to the monochrome printer. These functions are modes which aim at cost reduction and simple operations since print cost per color page and that per monochrome page have a gap.

If the color/monochrome page separation mode is selected (S2605), the control prompts the operator to set this separation mode (S2610), and registers a cluster with a name (S2615). The flow then advances to step S2620.

On the other hand, if the color/monochrome automatic routing mode is selected (S2606), the control prompts the operator to set a minimum page (that per printer) (S2611), and registers a cluster with a name (S2616). The flow then advances to step S2620.

If it is determined in step S2602 that the selected combination includes printers of an identical type like two color printers or two monochrome printers (not color/monochrome mixed), the control prompts the operator to select a mode from three modes, i.e., a job clustering mode, copy number clustering mode, and page clustering mode (S2604).

In the job clustering mode, jobs are sequentially distributed to an idle printer or a printer which becomes an idle state earliest of the selected printers. That is, this mode optimizes load balance.

In the copy number clustering mode, if the number of copies set by the user for a job to be printed is 100, copies to be printed of that job are allocated (distributed) to three printers with identical performance (identical print speed in this case) (for example, 33, 33, and 34 copies (remainder=1 when 100/3 is assigned to the last printer) are distributed), and the respective image forming devices (three devices in this case) are controlled to execute print operations of the distributed copies. Hence, this mode is suited to complete the print operation of the job earlier (see FIG. 54).

Furthermore, in the page clustering mode, for example, a job including 1000 pages is distributed to two printers (500 pages each), and the image forming devices (two devices in this case) are controlled to execute print operations for the distributed pages.

If the job clustering mode is selected (S2607), the control prompts the operator to set a printer priority order or optimal separation (S2612), and registers a cluster with a name (S2617). The flow then advances to step S2620.

If the copy number clustering mode is selected (S2608), the control prompts the operator to set the minimum number of copies or optimal separation (S2613), and registers a cluster with a name (S2618). The flow then advances to step S2620.

If the page clustering mode is selected (S2609), the control prompts the operator to set a minimum page or optimal separation (S2614), and registers a cluster with a name (S2619). The flow then advances to step S2620.

Each cluster printer can be named and registered in different types of modes even when it has an identical combination of printers, and can be handled as a virtual high-speed printer like a normal printer.

In step S2620, the control prompts the operator to set a reroute time (to set a wait time for job re-routing which automatically distributes the job to another printer when one printer is down due to any jam, error, or the like). It is then checked if a setup end instruction is detected (S2621). If it is determined that the setup end instruction is detected, the process ends; otherwise, the flow returns to step S2601.

Figure 53:
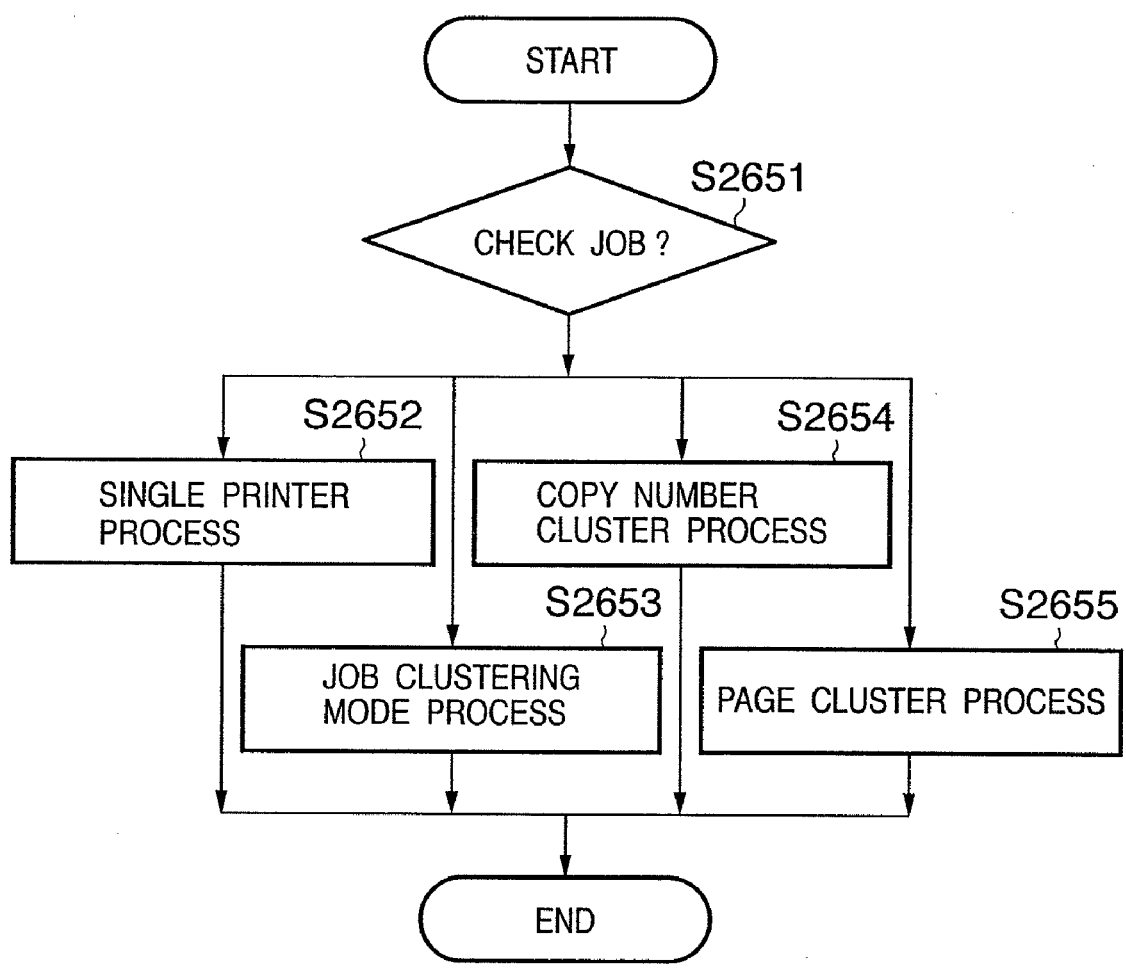
FIG. 53 is a flow chart showing an example of a cluster printer process (the ninth control process of the present invention) by the print manager shown in FIG. 1.

FIG. 53 is a flow chart showing an example of a cluster printer process (the ninth control process of the present invention) by the print manager 115 shown in FIG. 1. S2651 to S2655 indicate respective steps.

If a job is submitted to the registered cluster printer, a process to be executed by that cluster printer is determined (S2651), and the process is executed by the predetermined cluster scheme. That is, one of a single printer process (S2652), job clustering mode process (S2653), copy number cluster process (S2654), and page cluster process (S2655) is executed, thus ending the process.

Figure 54:
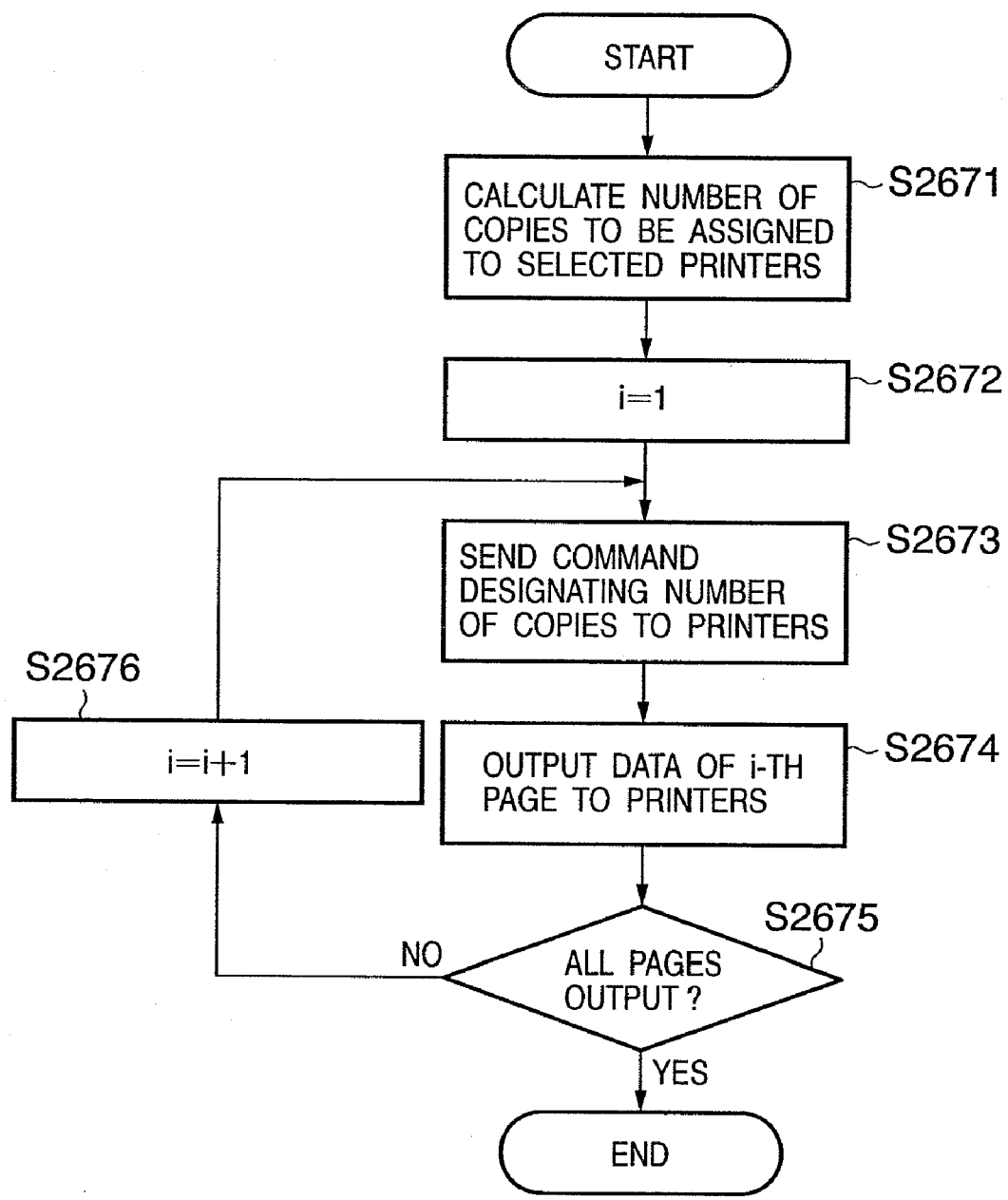
FIG. 54 is a flow chart showing an example of a copy number cluster process (the ninth control process of the present invention) shown in FIG. 53.

FIG. 54 is a flow chart showing an example of the copy number cluster process (the ninth control process of the present invention) in step S2654 in FIG. 53. S2671 to S2676 indicate respective steps.

In step S2671, the numbers of copies to be assigned to the selected printers are calculated. Variable i indicating the number of pages is reset (i 1) (S2672). A command that designates the number of copies is sent to each printer (S2673). Then, data of the i-th page is output to each printer (S2674).

It is checked in step S2675 if all pages are output. If it is determined that pages to be output still remain, the flow advances to step S2676 to increment i, and the flow returns to step S2673.

On the other hand, if it is determined in step S2675 that all pages are output, the process ends.

With the above process, the number of copies set for a job can be distributed to the registered printers as the copy number clustering mode, and that job can be finished earlier.

[Finishing Flow]

The post-process step (also called a sheet process step) in the image forming system shown in FIG. 1 will be described below with reference to FIG. 55.

Figure 55:
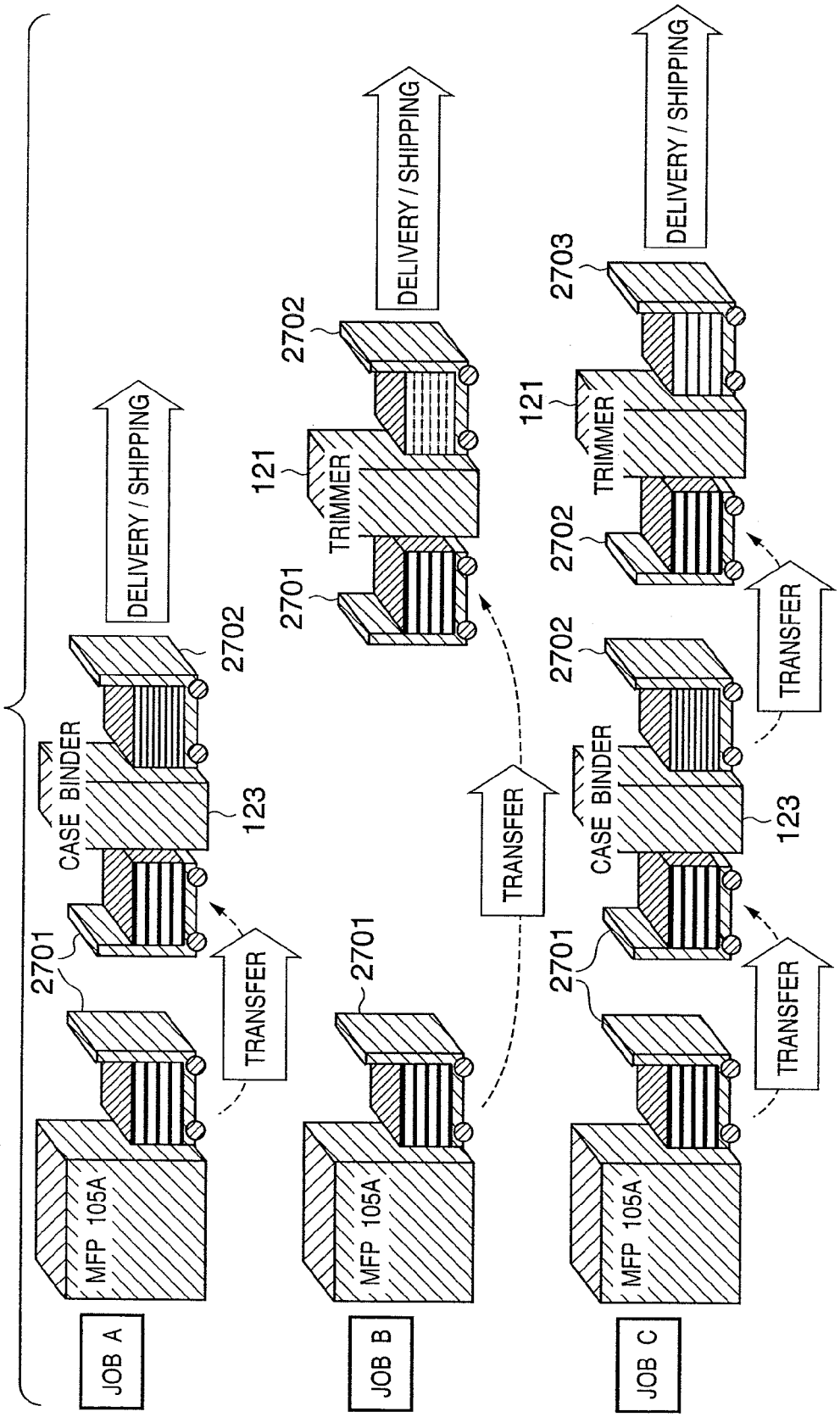
FIG. 55 is a chart showing the flow of a post-process applied to printed jobs in the image forming system shown in FIG. 1.

FIG. 55 is a chart showing the flow of post-processes desired by the user (e.g., a staple process, punch process, booklet process, folding process, and the like) which are applied to printed jobs in the image forming system shown in FIG. 1. Note that print outputs of the MFP 105 (or 104) can be stacked on a large-capacity stacker (which stores printed sheets) equipped at the output port (an exhaust unit that exhausts sheets printed by a printer unit) of the MFP. In this system, this stacker has a cart which can be wheeled by the operator, and the worker can transfer print outputs stacked on the cart to various finishers 121 to 126 managed by the post-process manager 116 by wheeling the cart.

FIG. 55 will be described below. In this system, for example, job A requires this system to execute a plurality of process steps including those of making the worker transfer print outputs (bundles of printed print sheets) of job A printed by an MFP 105A of this system using a cart 2701 and set them on the case binder 123 of this system, making the case binder 123 execute a case binding process to the bundles of print sheets, and making the worker deliver the bundles of print sheets that have undergone the case binding process using a cart 2702. Job B requires this system to execute a plurality of process steps including those of making the worker transfer print outputs of job B printed by the MFP 105A of this system using the cart 2701 and set them on the trimmer 121 of this system, making the trimmer 121 execute a trimming process to the bundles of print sheets, and making the worker deliver the bundles of print sheets that have undergone the trimming process using the cart 2702. Job C requires this system to execute a plurality of process steps including those of making the worker transfer print outputs of job C printed by the MFP 105A of this system using the cart 2701 and set them on the case binder 123 of this system, making the case binder 123 execute a case binding process to the bundles of print sheets, making the worker transfer the bundles of print sheets that have undergone the case binding process using the cart 2702 and set them on the trimmer 121, making the trimmer 121 execute a trimming process to the bundles of print sheets, and making the worker deliver the bundles of print sheets that have undergone the trimming process using a cart 2703. In this embodiment, control is made using control units of this system including the process control manager 111 to execute a series of process steps including a plurality of process steps by a plurality of devices of this system and operator intervention works as a work flow with respect to jobs accepted via the order/input manager 122 of this system. Also, the work flow is determined for each job accepted via the order/input manager 122 on the basis of information required to specify the work flow, such as print output condition information set for a job to be processed via the user interface including the aforementioned operation windows, resource information of devices of this system, their performance, and the like, information of the workers of this system, and the like, and control is made using control units of this system including the process control manager 111 to process each job based on the determined work flow.

Instructions of jobs A to C are configured to execute post-process steps in turn on the basis of JDF data which are generated by the process control manager 111 for requests instructed by the customers (clients) via the operation window in FIG. 28 and the like, so as to obtain desired output results. For this purpose, using the Web server of, in response to clicking of the finishing tab 2406 on an operation window in FIG. 56 by a user's key operation, the process control manager 111 makes data communications with the post-process manager 116 using its Web server via the communication medium such as the network 101 and the like, so as to monitor and control the states of all finishers (including sheet processing devices such as the trimmer 121 to collator 126, and the like) managed by the post-process manager 116.

Figure 56:
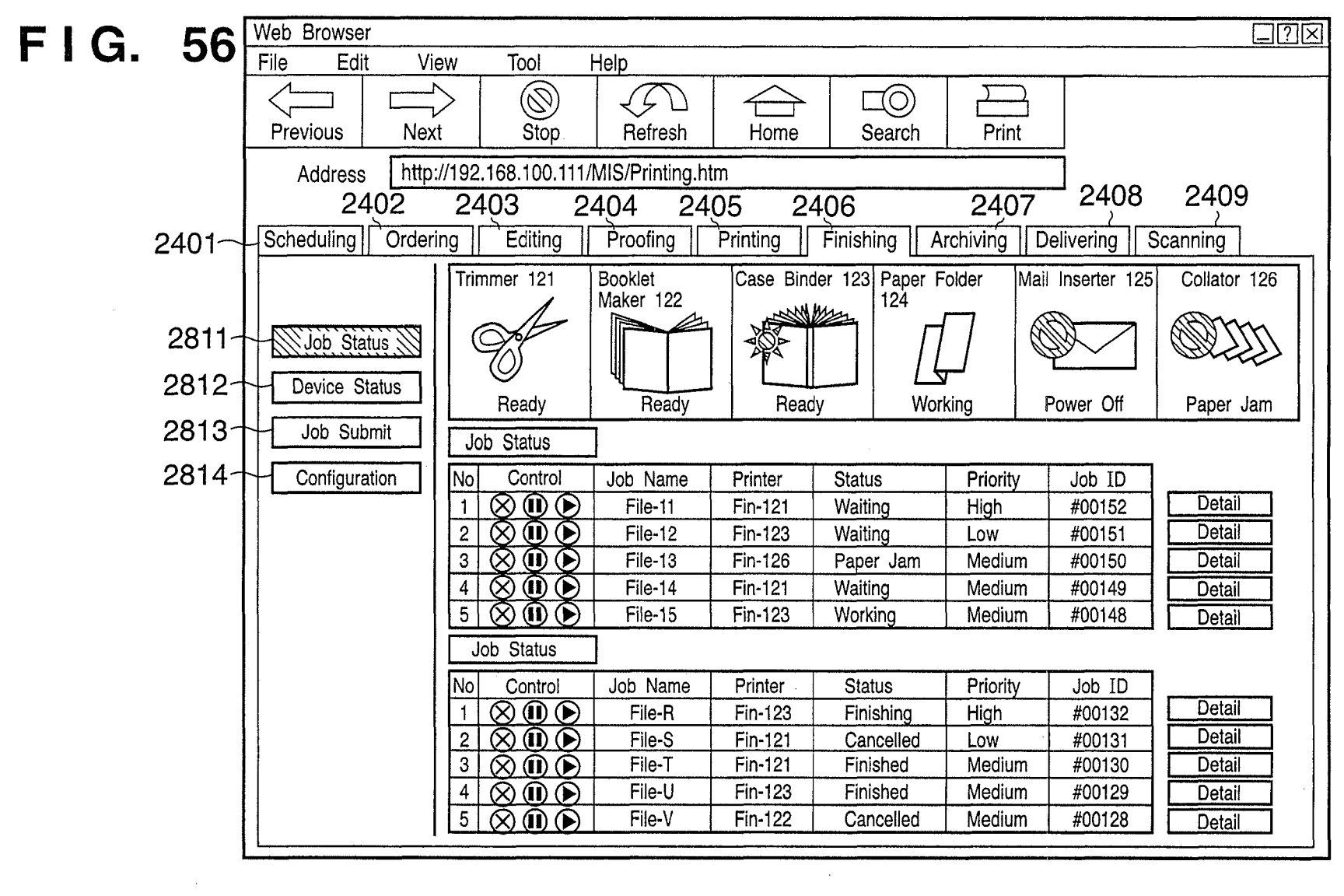

FIG. 56 shows a post-process step management window (a window used to monitor and control the states of all the finishers managed by the post-process manager 116) presented (displayed) to the user via the display unit of a device such as a computer or the like mainly under the control of the post-process manager 116 shown in FIG. 1. When the user selects, by his or her key operation, the finishing tab 2406 on the service window, which is loaded (displayed) in response to input of the IP address of the Web server on the process control manager 111 side to an URL address input field of the Web browser by user's key operations, the window shown in FIG. 56 is loaded (displayed) by accessing the Web server (which may be common to that of the process control manager 111) on the post-process manager 116 in response to that operation.

In response to depression of a job status key 2811 on the operation window in FIG. 56 by the user, display control is made to display the operation states of the respective finishers, respective job states, and the like to allow the user to recognize and manage them at a glance, as shown in FIG. 56. In this way, the user can recognize how many jobs are queued, which of jobs are finished, and so forth.

In response to clicking (designation using a pointing device (not shown) or the like) of a device status key 2812 by the user on the operation window shown in FIG. 56, a device status window is displayed on the display unit so as to allow the user to recognize and manage performance of the finishers, their accessories, and the like.

In response to clicking (designation using a pointing device (not shown) or the like) of a job submit key 2813 by the user on the operation window shown in FIG. 56, a submit window (not shown) is displayed on the display unit so as to allow the user to instruct the contents of a job to be submitted to respective finishers (i.e., to set sheet processes to be executed for that job) via the window. For example, when a trimming process by the trimmer 121 is to be executed, the user instructs a trimming amount (a setup of a value (mm) a print sheet is to be trimmed, or the like) and trimming direction (a setup about which of four corners (upper, lower, right, and left) of a print sheet is to be trimmed, or the like) via the window. Also, in case of the paper folder 124, the user can instruct to set the folding order and direction of a sheet via the window.

In response to clicking (designation using a pointing device (not shown) or the like) of a configuration key 2814 by the user on the operation window shown in FIG. 56, a configuration window (not shown) is displayed on the display unit to allow the user to make setups of a registration process of a new finisher introduced to this system, a deletion process of the registered finisher of this system (to exclude it from the setup), availability of the functions (e.g., stapler, puncher, folding unit, booklet unit, and the like), and the like via the window.

[Scheduling of Process Control]

As described above, the process control manager 111 communicates with the order/input manager 112, document edit manager 113, proof manager 114, print manager 115, post-process manager 116, file archiving manager 117, delivery/shipping manager 118, scan manager 119, and the like to systematically manage and control these managers, to manage job states in these managers, and to link and schedule these managers. Note that this system may adopt any of a system arrangement in which a plurality of managers (including 111 to 119) of this system including the process control manager 111 are incorporated in individual devices (including various devices such as information processing devices such as a computer or the like, image forming devices such as the MFP and the like, and sheet processing devices) as functions, an arrangement in which all manager functions are implemented by a single device, and an arrangement in which a plurality of manager functions are implemented by a single device, as described above. In any case, the device and system arrangements are not particularly limited as long as various operations and control described in this embodiment can be implemented.

Figure 57:
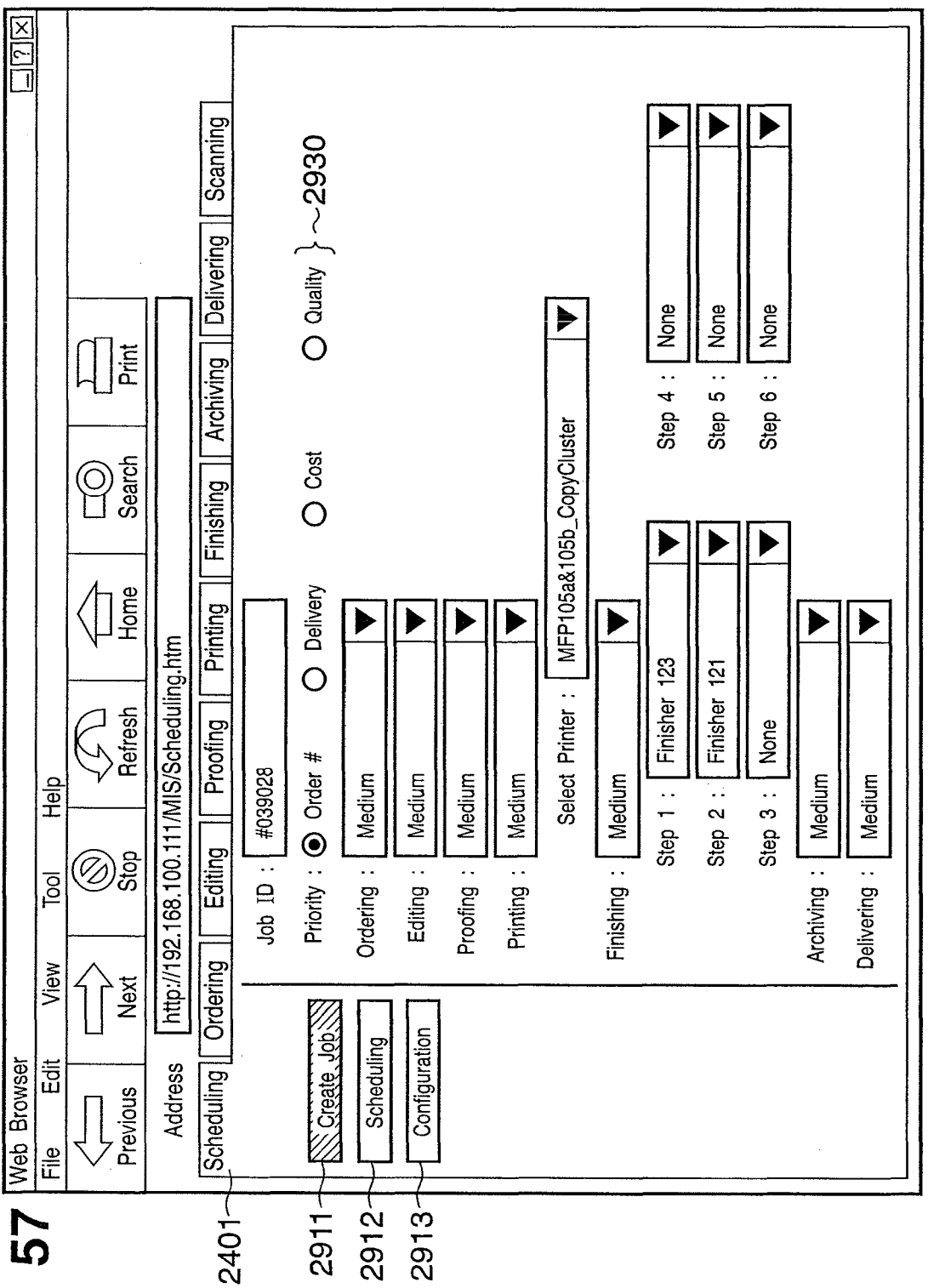
FIG. 57 shows a job creation window provided by a process control manager shown in FIG. 1.

FIG. 57 shows an example of a job creation window to be presented (displayed) to a device user interface such as a display unit of a computer under the control of the process control manager 111 shown in FIG. 1. This window can be set in advance, so that the client computer 103 can load data of this window from the process control manager 111 via the network and can display it on its display unit in response to input of the IP address of the Web server on the process control manager 111 side to the URL address input field of the Web browser of the client computer 103 by user's key operations.

Note that this system not only can display various operation windows, which includes the window shown in FIG. 57 and operation windows shown in FIGS. 58 to 64 (to be described later) and are controlled by the process control manager 111, on the display unit of the client computer 103, as described above, but also can display them on the display unit of the computer itself which comprises a manager function such as the process control manager 111 or the like and can display them on control panels of the image forming devices. In this manner, such operation windows can be displayed on the display unit of an arbitrary device associated with this system (at least one device of information processing devices such as a computer and the like, image forming devices such as an MFP and the like, and sheet processing devices).

This embodiment will exemplify a display process on the display unit as an informing process by an informing unit. For example, the user may be informed of information equivalent to that to be received by the user via various operation windows shown in FIGS. 57 to 64 via, e.g., an audio output process using an audio unit, a print output process of information on print sheets by a printer, and the like. In any case, an implementation method is not particularly limited as long as a user interface unit which comprises a function that can provide and inform the user of various kinds of information equivalent to those to be provided to the user via various operation windows of this embodiment, and a setup function that allows the user to make setups equivalent to those which can be made via various operation windows of this embodiment.

In response to selection of a create job key 2911 as one display element of the operation window of FIG. 57 (also in the operation windows of FIGS. 58 to 64) by a user's key operation (designation using a pointing device (not shown) or the like), control is made to display the job creation window in FIG. 57 on the display unit. This job creation window comprises, as display elements, priority selection buttons 2930 used to determine and set job priority in response to a user's key operation when a job order in the order/input manager 112 is settled (when a print output instruction is issued via an order key 2211 on the operation window in FIG. 31 or the like, and the order/input manager 112 accepts a job).

This embodiment allows the user by his or her key operation via the priority selection buttons 2930 to select an order priority instruction (to be referred to as a first instruction hereinafter) which is used to instruct the process control manager 111 to set a priority order (an acceptance (Order) order; to be referred to as a first priority order hereinafter) required to sequentially process jobs accepted by this system via the order/input manager 112 in the order (input order) of acceptance by the order/input manager 112 for jobs to be processed, and to plan (determine) and execute scheduling associated with the work flow of a job to be processed (to be referred to as work flow scheduling), which is required to sequentially process the job in accordance with the set first priority order. When this first instruction is input, the process control manager 111 schedules to start processes of the job set with this instruction after those of other ordered jobs have started. When the instruction is input, if devices to be used in a job set with that instruction are the same as those used by another ordered job (if the job of interest uses the same MFP and sheet processing device as those of another job), the process control manager 111 plans and determines a schedule of the work flow of the job to be processed so that the work flow of the job corresponding to the instruction is completed after completion of a series of process steps (work flow) of another ordered job (this scheduling method will be referred to as a first type scheduling method hereinafter). After the schedule is determined, the process control manager 111 controls a plurality of devices (a plurality of devices such as the image forming device, sheet processing device, and the like; note that a job may be completed by a single device depending on the print conditions, but a plurality of devices are used in this case) used to execute a plurality of process steps, which are required in the work flow to complete the job, to sequentially execute process operations according to the contents of the determined schedule (determined by the first type scheduling method) at timings and in a process order based on the contents of the schedule. In addition, the process control manager 111 controls to generate information (work instruction information) that allows the operator to identify an action (work instruction) to be taken by him or her in an intervention work by the operator (worker of this system) in the work flow for the job in accordance with the contents of the schedule, and to inform the worker (operator) of this system of the generated work instruction information at an informing timing according to the contents of the schedule in the work flow via an informing unit such as the display unit or the like. Note that the order/input manager 112 of this system can accept a plurality of jobs, which are stored and held in a memory such as a hard disk or the like of an arbitrary device of this system. Under the condition of such arrangement, the process control manager 111 can dynamically replace and change the execution order and schedule of jobs, as described above.

This embodiment allows the user by his or her key operation via the priority selection buttons 2930 to select a delivery date priority instruction (to be referred to as a second instruction hereinafter) which is used to instruct the process control manager 111 set a priority order (a delivery date priority (Delivery) order; to be referred to as a second priority order hereinafter) required to sequentially process jobs accepted by this system via the order/input manager 112 in the order of delivery dates of jobs (job delivery dates) for jobs to be processed, and to plan (determine) and execute scheduling associated with the job work flow, which is required to sequentially process the job in accordance with the set second priority order. When the second instruction is input, the process control manager 111 determines the process start timing of a job set with the second instruction based on the job delivery order irrespective of the acceptance order of other ordered jobs (in other words, the manager 111 gives top priority to the job delivery date). When that instruction is input, if delivery of the job set with the second instruction may be overdue since devices to be used in the job set with the second instruction are the same as those used by another ordered job (if the job of interest uses the same MFP and sheet processing device as those of another job; when the same devices are used in this manner, such devices will be referred to as competitive devices hereinafter), the process control manager 111 schedules to execute a substitute operation by devices which can execute the processes of the job of the second instruction of other devices different from competitive devices to be used in the work flow of another ordered job (the first example of second type scheduling). If other substitute devices are not available (e.g., if this system comprises only one device that can execute the designated sheet process), the process control manager 111 schedules to use competitive devices at earlier timings for the job of the second instruction than the use timing of them in the work flow of another job by completing processes to be executed by devices other than the competitive devices prior to the process steps to be executed by the competitive devices in the work flow of the job of the second instruction before the process steps to be executed by the competitive device in the work flow of the other job (the second example of second type scheduling). When the second instruction is input, the process control manager 111 plans a schedule that executes a processing method which can complete the work flow of the job set with the second instruction within the shortest possible period according to the delivery information of the job set with the second instruction by fully utilizing the devices of this system as in the above two examples (this scheduling method will be referred to as a second type scheduling method hereinafter). After the schedule is determined, the process control manager 111 controls a plurality of devices used to execute a plurality of process steps, which are required in the work flow to complete the job, to sequentially execute process operations according to the contents of the determined schedule (determined by the second type scheduling method) at timings and in a process order based on the contents of the schedule. In addition, the process control manager 111 controls to generate information (work instruction information) that allows the operator to identify an action (work instruction) to be taken by him or her in an intervention work by the operator (worker of this system) in the work flow for the job in accordance with the contents of the schedule, and to inform (by, e.g., display) the worker (operator) of this system of the generated work instruction information at an informing timing according to the contents of the schedule in the work flow via an informing unit such as the display unit or the like.

This embodiment allows the user by his or her key operation via the priority selection buttons 2930 to select a cost priority instruction (to be referred to as a third instruction hereinafter) which is used to instruct the process control manager 111 to set a priority order (a cost priority (Cost) order; to be referred to as a third priority order hereinafter) required to sequentially process jobs accepted by this system via the order/input manager 112 in descending order of fee (cost) to be received (already received) from the clients as reward upon creating and delivering a job in this system, for jobs to be processed, and to plan (determine) and execute scheduling associated with the job work flow, which is required to sequentially process the job in accordance with the set third priority order.

In this embodiment, a job which is ordered to create a higher-quality output result requires higher cost than other jobs. Also, a job which is to be completed within a shorter delivery period from ordering to delivery of that job requires higher cost than other jobs. That is, this system controls to output a job of a client who paid a higher fee with higher quality than other jobs, and to finish such job within a shorter delivery period than other jobs. In other words, this system may output a job of a client who requests to finish that job with the lowest possible cost (fee) irrespective of its delivery date and quality as long as minimum quality is guaranteed to have quality that satisfies a minimum requirement of that client, and may set its delivery date behind other jobs. In this manner, cost priority as the third priority order is not influenced by the acceptance order as the first priority order, but may influence the delivery order as the second priority order or a quality order as the fourth priority order to be described later. Hence, in this embodiment, the user may set, using the operation unit, priority among respective priority orders like "cost order> (this symbol means that the left priority order has higher priority than the right priority order) delivery order>quality order>acceptance order", "cost order>quality order>delivery order>acceptance order" "cost order>delivery order=(this symbol means that the left priority order has equivalent priority to the right priority order) quality order>acceptance order", "cost order=quality order=delivery order>acceptance order", and the like, as a setup of priority among a plurality of priority order including the four different priority orders of this system (to set a priority order used to determine, e.g., a priority order to which top priority is to be given). Note that the following description will be given using an example wherein the cost order has at least higher priority than the acceptance order.

When the third instruction is input, the process control manager 111 determines the process start timing of a job set with the third instruction in the cost order of accepted jobs irrespective of the acceptance order of the already ordered jobs (in other words, it gives top priority to job cost). When the third instruction is input, if the cost of a job already accepted by the order/input manager 112 before the job set with the third instruction is lower than that of the job set with the third instruction, the process control manager 111 schedules to preferentially complete the work flow of the job set with the third instruction and to postpone completion of the work flow of the previously submitted job. On the other hand, if the cost of a job already accepted by the order/input manager 112 before the job set with the third instruction is higher than that of the job set with the third instruction, the process control manager 111 schedules to postpone completion of the work flow of the job set with the third instruction and to preferentially complete the work flow of the previously submitted job. When the third instruction is input, the process control manager 111 plans a schedule of the work flow of a job set with the third instruction on the basis of its cost information independently of the acceptance order or the like (this scheduling method will be referred to as a third type scheduling method hereinafter). After the schedule is determined, the process control manager 111 controls a plurality of devices used to execute a plurality of process steps, which are required in the work flow to complete the job, to sequentially execute process operations according to the contents of the determined schedule (determined by the third type scheduling method) at timings and in a process order based on the contents of the schedule. In addition, the process control manager 111 controls to generate information (work instruction information) that allows the operator to identify an action (work instruction) to be taken by him or her in an intervention work by the operator (worker of this system) in the work flow for the job in accordance with the contents of the schedule, and to inform (by, e.g., display) the worker (operator) of this system of the generated work instruction information at an informing timing according to the contents of the schedule in the work flow via an informing unit such as the display unit or the like.

This embodiment allows the user by his or her key operation via the priority selection buttons 2930 to select a quality priority instruction (to be referred to as a fourth instruction hereinafter) which is used to instruct the process control manager 111 to set a priority order (a quality priority (Quality) order; to be referred to as a fourth priority order hereinafter) required to sequentially process jobs accepted by this system via the order/input manager 112 in an order that attaches an importance on quality for jobs to be processed, and to plan (determine) and execute scheduling associated with the job work flow, which is required to sequentially process the job in accordance with the set fourth priority order.

When the fourth instruction is input, the process control manager 111 adds and inserts a verification step of a job set with the fourth instruction mainly using the proof manager 114 in its work flow irrespective of whether or not the client explicitly sets a proof process request using the proof manager 114. Even when insertion of the verification step delays the completion timing of the work flow of the job set with the fourth instruction compared to that of the work flow without the verification step, the process control manager 111 schedules to insert the job verification step mainly using the proof manager 114 into the work flow of the job set with the fourth instruction. In this way, when the fourth instruction is set, the process control manager 111 plans a schedule to improve the quality of the job set with the fourth instruction even when delivery of the job set with the fourth instruction is overdue (this scheduling method will be referred to as a fourth type scheduling method hereinafter). After the schedule is determined, the process control manager 111 controls a plurality of devices used to execute a plurality of process steps, which are required in the work flow to complete the job, to sequentially execute process operations according to the contents of the determined schedule (determined by the fourth type scheduling method) at timings and in a process order based on the contents of the schedule. In addition, the process control manager 111 controls to generate information (work instruction information) that allows the operator to identify an action (work instruction) to be taken by him or her in an intervention work by the operator (worker of this system) in the work flow for the job in accordance with the contents of the schedule, and to inform (by, e.g., display) the worker (operator) of this system of the generated work instruction information at an informing timing according to the contents of the schedule in the work flow via an informing unit such as the display unit or the like.

The above control examples will be explained from another aspect. This system comprises a plurality of devices such as computers of respective managers and the like, a scanner, image forming devices, sheet processing devices, and the like. A plurality of jobs such as jobs output from the computer, jobs output from the scanner unit, and the like can be accepted via the order/input manager 112, and can be sequentially stored in a memory such as a hard disk or the like of an arbitrary device such as managers, image forming devices, and the like, and the controllers of the managers control to print out job data stored in the hard disk by the image forming device of this system and to transmit data to other devices in response to a user's instruction.

In such system arrangement, assume that the client computer as an example of a data generation source outputs a job (to be referred to as a first job hereinafter) that requests a print order and, after that, the above data generation source or another data generation source (e.g., another client computer or scanner) outputs another job (to be referred to as a second job hereinafter) that requests a print order. The first job and the second job output after the first job are sequentially input via the order/input manager 112, and are stored in the hard disk or the like. When the first job and the second job input after the first job are accepted via the order/input manager 112 in this way, the process control manager 111 schedules the work flows of the first and second jobs in this system, manages and controls them, and controls to execute the work flows of these jobs using related devices of this system in accordance with the determined schedule.

Note that the process control manager plans a schedule of the job work flow on the basis of print output condition information (including information that specifies print output setups) set by the client for each job, performance information of the devices of this system (for example, information associated with functions of the devices of this system, information used to specify the number of image forming devices of this system, the number of color image forming devices, the number of monochrome image forming devices, the print speed per minute of each image forming device, option units (a paper feed unit, exhaust unit, duplex print unit, and the like), and so forth), information used to specify the free space in the memory of the hard disk or the like of this system, and so forth), and various kinds of determination information such as job processing states of the respective devices in this system (information used to specify the current status data of respective devices such as printing, waiting, error, and the like), workforce information of the workers in this system (information indicating the number of workers and the like), and so forth.

Under such precondition, when one of the plurality of instruction data (first to fourth instructions) is input to the first job and/or the second job from the client and/or the worker of this system via various user interfaces such as the display unit of the computer or the like, the operation unit of the image forming device, and the like, the process control manager 111 controls to re-schedule one or both of the work flows of the first and second jobs on the basis of the input instruction. Assume that the work flow of the first job includes a monochrome print process step by the monochrome MFP 105*a*, and a staple process step by the collator 126 to be executed after the print process step. On the other hand, assume that the work flow of the second job includes an output verification step by the proof manager, a color print process step by the color MFP 104*a* to be executed after the verification step, and a staple process step by the collator 126 to be executed after the print process step. In this manner, the staple process steps by the collator 126 are competitive in the first and second jobs.

For example, when the user (client or operator) inputs the first instruction (acceptance order priority) via the interface, the process control manager 111 schedules the work flow of the second job input after the first job to complete it after completion of the work flow of the first job.

On the other hand, when the user inputs the second instruction (delivery date priority) for the second job via the interface, the process control manager 111 has planned to use a single image forming device (monochrome MFP 105*a*) to print in the print process of the second job in the previous schedule, but re-schedules to make three image forming devices (monochrome MFPs 105*a* to 105*c*) of this system execute a cluster print operation so as to shorten the print step period in the work flow of the second job, and to complete the staple process step for the second job by the collator 126 in the work flow of the second job before execution of the staple process step for the first job accordingly. In this way, the use timing in the second job of the sheet processing device (collator 126) as a competitive device in the first and second jobs is set before that of the first job. In this manner, the work flow of the second job can be completed with top priority. As described above, when the second instruction is set for the second job, the process control manager 111 schedules the work flow of the second job input after the first job to complete it before completion of the work flow of the first job, while giving top priority to the delivery date of the second job (irrespective of other priority orders).

When the user inputs the third instruction (cost priority instruction) for the second job via the interface, since the above schedule associated with the work flow of the second job includes the output verification step by the proof manager 114 and the color print process step by the color MFP 104*a*, the process control manager 111 re-schedules to exclude the output verification step by the proof manager 114 (cost can be reduced as the confirmation operation is omitted), and to cancel use of the color MFP 104*a* and to use the monochrome MFP 105*a* instead in the print step (use of the monochrome MFP requires lower cost than use of the color MFP), so as to give top priority to a cost reduction of the second job. In this manner, when the third instruction is set for the second job, the process control manager 111 re-schedules to remove a process step (the verification step by the proof manager 114 in this case) included in the work flow of the second job which was scheduled before the third instruction is set for the second job from that after the third instruction is set so as to reduce the cost of the second job, and to cancel use of a device (color MFP in this case) which was scheduled before the third instruction is set for the second job in that of the second job after the second instruction is set and to use a substitute device (monochrome MFP) so as to reduce the cost of the second job, while giving top priority to the cost of the second job (irrespective of other priority order).

When the user inputs the fourth instruction (quality priority instruction) for the first job via the interface, for example, the previous schedule associated with the work flow of the first job includes only the monochrome print process step by the monochrome MFP 105*a*, the staple process step by the collator 126 to be executed after the print process step, and the like. However, in response to the input of the fourth instruction to the first job, the process control manager 111 re-schedules that work flow to, e.g., the verification step by the proof manager 114→the print step by the color image forming device 104*a*→the verification step by the proof manager 114→the sheet process step by the collator 126→the verification step by the proof manager 114, so as to give top priority to improvement of the quality of the first job. In this way, when the fourth instruction is set for the first job, the process control manager 111 re-schedules the work flow of the first job to add and insert process steps (the verification steps by the proof manager 114 in this case) which are not included in the work flow of the first job that was scheduled before the fourth instruction is set for the first job into the work flow of the first job after the fourth instruction is set so as to improve the quality of the first job, and to cancel use of the device (monochrome MFP in this case) set to be used in the work flow of the first job that was scheduled before the fourth instruction is set for the first job in the work flow of the first job after the fourth instruction is set and to use a substitute device (color MFP) so as to improve the quality of the first job, while giving top priority to the quality of the first job (irrespective of other priority orders).

As described above, the process control manager 111 schedules the work flows of a plurality of jobs. In addition, a plurality of instructions (including the first to fourth instructions) as determination condition information used to determine a schedule of each work flow can be accepted from the user via the user interface (e.g., the operation window in FIG. 57 or those of FIGS. 58 to 61 to be described later) that informs and provides (displays) such instruction under the control of the process control manager. When the user inputs one of these instructions via an operation instruction field of the user interface (the priority selection buttons 2930 on the operation window of FIG. 57, a priority selection field 2916 on the operation windows shown in FIGS. 58 to 61, or the like), the process control manager 111 controls to re-schedule the already scheduled work flow of a job to a new work flow. Furthermore, the process control manager 111 controls to execute the work flow of each job in accordance with the new schedule, and to inform the workers of this system at timings according to the schedule via an appropriate user interface unit (e.g., display units of respective managers, image forming devices, sheet processing devices, portable terminals, and the like).

Note that the above control examples are merely examples of this embodiment, and there may be various other situations and control processes in such situation (a plurality of jobs may be present in addition to the first and second jobs, or other competitive devices are found). However, various applications can be made using the control of this embodiment with reference to the control examples of this embodiment.

The description will revert to that of the operation window example of FIG. 57. As described above, the user (the operator of this system in this case, or may be the client) can set one of acceptance order priority (Order), delivery date priority (Delivery), cost priority (Cost), and quality priority (Quality) as priority of an accepted job for each job via the priority selection buttons 2930 of the operation window of FIG. 57 to be displayed on the display unit (in this example, the user makes setups of a job with the job ID #039028). Also, the user can select a printer of this system to be used to execute a print operation of the job of interest, and also a finisher to be used to execute a sheet process for print sheets of that job printed by the selected image forming device via other setting fields displayed on that window. Upon operation of the setups by the operator via the operation window of FIG. 57, the process control manager 111 controls to issue a new job and also JDF data at the same time, and controls to manage the generated job in consideration of already registered jobs.

When the operator clicks (designates using a pointing device (not shown) or the like) a scheduling key 2912 on the operation window of FIG. 57 by his or her key operation, the process control manager 111 controls to schedule that job (a scheduling process shown in FIG. 62 to be described later), and to selectively display job scheduling windows shown in FIGS. 58 to 61 on the display unit.

When the operator clicks (designates using a pointing device (not shown) or the like) a configuration key 2913 on the operation window of FIG. 57 by his or her key operation, the process control manager 111 displays a job configuration window (not shown) that allows the operator to confirm job setup information, configuration information, and the like on the display unit.

FIGS. 58 to 61 show an example of a job scheduling window to be provided (displayed) on the display unit by the process control manager 111 in response to operator's key operations. The same reference numerals denote the same function buttons (operation keys) as those on the operation window in FIG. 57.

Figure 58:
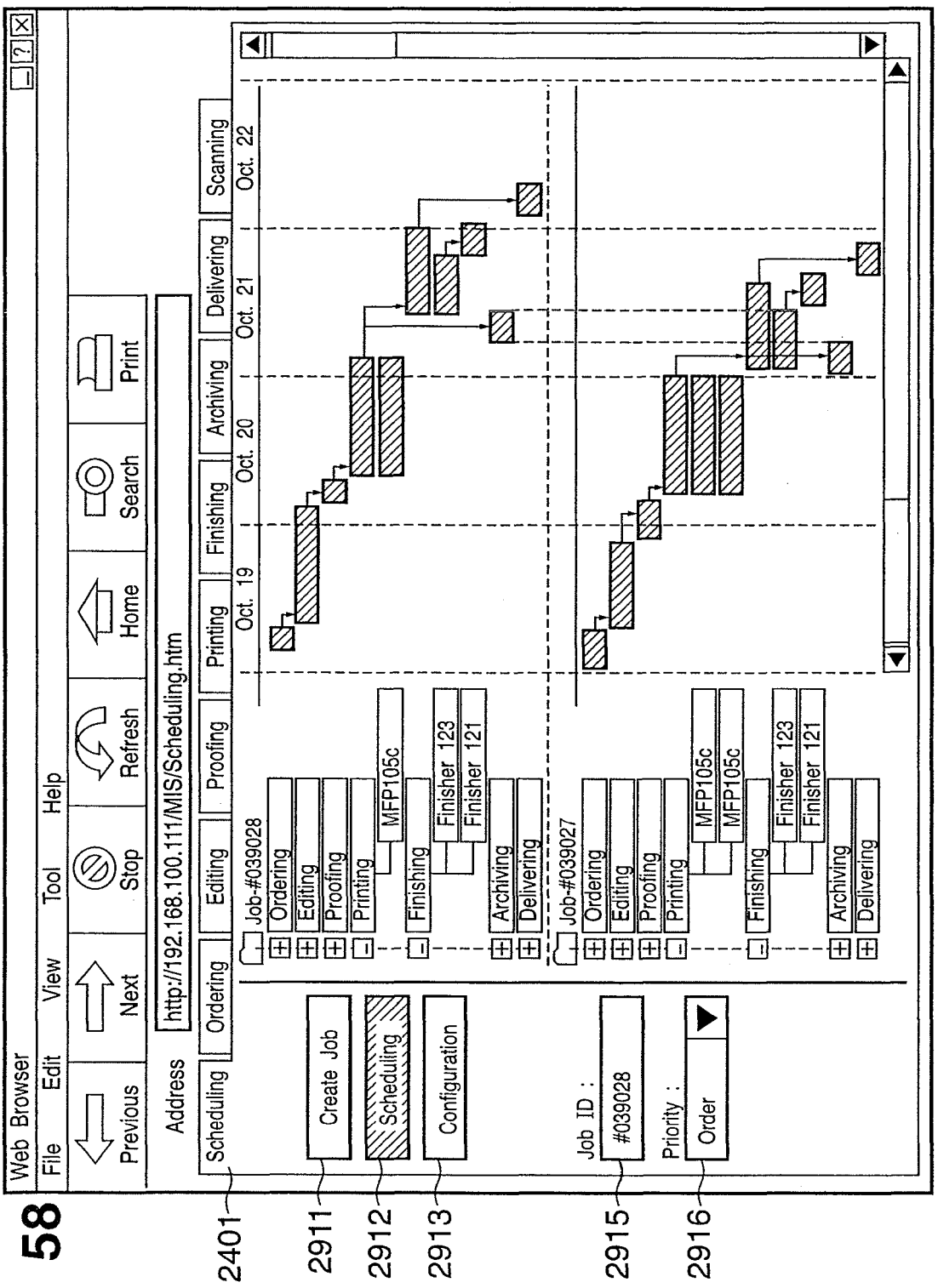
FIG. 58 shows a job scheduling window provided by the process control manager shown in FIG. 1.

For example, in response to depression of the scheduling key 2912 on the above operation window of FIG. 57 by the operator, the process control manager 111 makes display control to switch the current display contents of the display unit to an operation window shown in FIG. 58. In this embodiment, the process control manager 111 makes informing control to present identification information that allows the user (the operator of this system in this case, or may be the client user) to visually confirm the scheduling result of the work flow of each job mainly planned by the process control manager 111 for each job on a user interface such as the display unit or the like in, e.g., a graphical display format. For example, in the display control as an example of informing control by the process control manager 111, the process control manager 111 controls to generate information for the job scheduling window as shown in FIG. 58, and to display an operation window based on the generated window information on the display unit. In this case, the process control manager 111 controls to display schedule result information that considers time periods spent by respective managers (112 to 119) to be identifiable by the operator, and makes informing control to allow the operator to confirm and recognize links among the respective managers. For example, the process control manager 111 controls to display process steps included in the work flows of jobs scheduled by the process control manager 111, and their order and time schedule upon execution, so that the operator can identify them for respective jobs. In addition, this embodiment can accept a plurality of jobs by a job acceptance process by the order/input manager 112 and a storage process in the memory such as a hard disk or the like, and allows the process control manager 111 to make management for respective jobs. Hence, the process control manager 111 comprises a job ID input area 2915 on the operation window, as indicated by the display contents to be provided by the operation window of FIG. 57, and allows the operator to input a job ID of a job, the schedule of which is to be confirmed, by his or her key operation. When the job ID is input via the job ID input area 2915, the process control manager 111 controls to display, on the display unit, schedule information of the work flow of a job corresponding to the job ID input via the job ID input area 2915 of a plurality of jobs which are accepted by the order/input manager 112 and are stored and held in the memory, so that the schedule of that job is displayed together with those of other jobs so as to be distinguished from other jobs. For example, control is made to display, on the display unit, a schedule of a job with the job ID #039028, which is designated via the job ID input area 2915, as that of the job of interest, and to display, on the display unit, schedule information of the work flow of a neighboring job with the job ID #039027, which was accepted (input) immediately before the job corresponding to that job ID, together with that of the job of interest. In this example, control is made to display, on a single window, the immediately preceding job as the neighboring job based on the job ID input to the job ID input area 2915. However, the present invention is not limited to this, and control may be made to display the schedules of work flows of at least two or more jobs including two jobs accepted before and after the ID input to the job ID input area 2915. Also, control may be made to display schedule information of other jobs in turn in the order corresponding to the acceptance order of jobs by the order/input manager 112 by a scroll display process or the like upon operation of a scroll bar, which appears on the right end of the operation window of FIG. 57. Of course, a display window may be switched for each individual job in place of simultaneously displaying schedules of a plurality of jobs on a single window.

In this manner, as for schedule display of jobs in this embodiment, the process control manager 111 controls to display schedules of jobs, which are managed by the process control manager 111, for respective steps. In addition, as shown in the display window example of FIG. 58, the manager 111 controls to display information associated with the work times (work periods) required for respective steps in each work flow as information to be identified by the operator in, e.g., a bar graph format, as shown in FIG. 58.

For example, when the job ID #039028 is input to the job ID input area 2915, the process control manager 111 controls to display schedule information of the corresponding job on the display unit.

An example of the scheduling result expression method of a job under the informing control of the process control manager 111 of this embodiment will be described in detail below using the display window of FIG. 58. For example, in response to a job ID input to the job ID input area 2915, the scheduling result of a job corresponding to the job ID #039028 input to the job ID input area 2915 is displayed on an upper central display area (to be also referred to as a first display area hereinafter) of the window in FIG. 58. Also, the scheduling result of a job with the job ID #039027, as a job which was submitted immediately before the job with the job ID #039028 designated on the job ID input area 2915 is controlled to be displayed on a lower central display area (to be also referred to as a second display area hereinafter) of the window.

On each of the first and second display areas, control is made to lay out and display a plurality of pieces of information which allow the operator to identify devices to be used of a plurality of devices (including devices such as image forming devices, managers, sheet processing devices, and the like) of this system, process steps to be processed, their process order, and the like upon completing a job to be processed (upon executing the work flow of the job of interest) in the direction of ordinate of the window. For example, control is made to lay out and display, for each job, a plurality of pieces of step name information used to identify the names of a plurality of process steps in the work flow of the job of interest in turn from top down of the direction of ordinate of the window in the same order as the execution order of these process steps on each of the first and second display areas, so that the operator can identify the order of these process steps.

Taking FIG. 58 as an example, the operator can identify, by browsing a plurality of pieces of name information of the process steps associated with the job with the job ID #039028, which are displayed on the first display area in turn from top down in the direction of ordinate of the window, that the job with the job ID #039028 is scheduled to be completed via an order process using the order/input manager 112, an edit process using the document edit manager 113, a proof process using the proof manager 111A, a print process step using the MFP 105c, a sheet process step (case binding process) using the finisher 123 (corresponding to the case binder 123 in FIG. 1), a sheet process step (trimming process) using the finisher 121 (corresponding to the trimmer 121 in FIG. 1), a data archiving process step using the file archiving manager 117, and a delivery process step using the delivery/shipping manager 118. Likewise, on the second display area, control is made to lay out and display a plurality of pieces of name information of respective process steps in the work flow of a job with the job ID #039027 in an order corresponding to the execution order of respective process steps in turn from top down in the direction of ordinate of the window, so as to allow the operator to identify devices to be used of a plurality of devices (including devices such as image forming devices, managers, sheet processing devices, and the like) of this system, process steps to be processed, their process order, and the like.

Furthermore, the process control manager 111 controls the display unit to lay out and display a plurality of pieces of information which allow the operator to identify the execution time schedule of a plurality of process steps in the work flow of the job of interest to be processed, i.e., their order and their timings, in the direction of abscissa of each of the first and second display areas on the operation window of FIG. 58, together with the display control in the direction of ordinate of the window on the first and second display areas. For example, a plurality of pieces of information associated with execution dates of respective process steps are displayed in turn from the left to the right on the abscissa of the window (in this window example, October 19→October 20→October 21→October 22), bar graph data for respective process steps, which express work periods required for a plurality of process steps in the work flow of the job of interest, are displayed in turn from the left to the right in the same order as the execution order of the respective processes so as to be independently shifted downward one by one for respective process steps.

Taking FIG. 58 as an example, the operator can identify the following schedule by browsing and confirming a plurality of pieces of time schedule information in the bar graph form, which are used to identify the execution dates and work periods of respective process steps associated with the job with the job ID #039028, and are displayed in turn from the left in the direction of abscissa of the first display area. That is, the process control manager 111 schedules the job with the job ID #039028 to complete its the work flow by executing an order process using the order/input manager 112 on October 19; an edit process using the document edit manager 113 on October 19 and 20; a proof process using the proof manager 114 on October 20; a print process step using the MFP 105c on October 20 and 21; a sheet process step (case binding process using the finisher 123 (corresponding to the case binder 123 in FIG. 1) and a job data archiving process using the file archiving manager 117 on October 21; a sheet process step (trimming process) using the finisher 121 (corresponding to the trimmer 121 in FIG. 1) on October 21 and 22; and a delivery process step using the delivery/shipping manager 118 on October 22. Likewise, control is made to lay out and display a plurality of pieces of schedule information in turn from the left of the direction of the abscissa of the window on the second display area, so as to allow the operator to identify the time schedule of the job with the job ID #039027, i.e., devices to be used of a plurality of devices (including devices such as image forming devices, managers, sheet processing devices, and the like) of this system, process steps to be executed, and their process order, work periods, and timings.

Furthermore, the process control manager 111 makes display control that allows the operator to confirm details of the steps of the job by providing a key input area used to inform the operator such details on the window, in addition to the aforementioned display control. For example, a "+" key and "−" key which can be clicked by the user are displayed on the left side of each step name information on the window of FIG. 58. When the user clicks (designates using a pointing device (not shown) or the like) that key, control is made to display detailed information of the selected process step on the display unit or to fold such detailed display contents (simple display) in response to that operation. In the example of FIG. 58, details of the print step and finishing step in the work flow of the job ID #039028 are displayed in response to user's key operations, i.e., device names are displayed as detailed information that allows the operator to identify devices used to execute the respective process steps. In this way, the operator can identify based on the device name information that the print step in the work flow of the job with the job ID #039028 is executed by the MFP 105c of this system, and a sheet process step is executed by the sheet process devices 123 and 121 of this system. Note that the process control manager 111 makes the following display control. That is, when the user clicks the "+" key while it is displayed, the process control manager 111 switches the displayed key from the "+" key to the "−" key and displays a device name or names as detailed information; when the user clicks the "−" key while it is displayed, the manager 111 switches the displayed key from the "−" key to the "+" key, and clears (folds) the device name or names as detailed information.

In addition to the aforementioned display control processes, the process control manager 111 may display, on the window of FIG. 58, the current date information, or a process step that has been done so far or a process step whose process is underway in the work flow of the job displayed on the window in a display format (gray-out display, hatching, flickering, or the like) that allows the operator to distinguish them from other non-executed process steps in a process waiting state, as another display control associated with the scheduling window.

In this embodiment, the following operations can be executed via operation windows shown in FIGS. 58 to 61 which are displayed on the display unit under the display control of the process control manager 111.

Taking the scheduling window of FIG. 58 as an example, the operator can confirm with reference to the scheduling result of the job with the job ID #039028 displayed on the first display area of the window that respective process steps are smoothly done to the middle of the work flow of that job, but a time lag is generated when the job is passed from a print step mainly executed by the print manager 115 to a sheet process step mainly executed by the finishing (post-process; also called a sheet process) manager 116. This is because the process control manager 111 of this embodiment schedules a plurality of jobs in the acceptance order of the order/input manager 112 in accordance with the first instruction from the operator in the scheduling control which is done according to an instruction designated by the operator from the plurality of instructions which include the first to fourth instructions and are used to determine a schedule (when the user selects the acceptance order priority (Order) via the priority selection buttons 2930 on the operation window in FIG. 57), and the manager 111 schedules to use the same finishers 121 and 123 as those to be used in the job with the job ID #039028 in the sheet process step in the work flow of the job with the job ID #039027, which was accepted by the order/input manager 112 immediately before the job with the job ID #039028. In such case, since the job with the job ID #039028 is scheduled to start its sheet process step after completion of the finishing step (sheet process step) of the previously input job with the job ID #039027, its delivery date is determined to have such schedule as a bottleneck.

Even when the customer (client) of the job with the job ID #039028 requests to quicken the delivery of that job as much as possible, while the user (the operator of this system in this case, or may be the client user) confirms and recognizes the job scheduling result displayed on the operation window of FIG. 58, the user (the operator of this system in this case, or may be the client user) can make an operation that changes job priority via the priority selection (priority order) field 2916 displayed on the operation windows of FIGS. 58 to 61 and instructs the process control manager 111 to re-schedule the job work flow. Hence, the process control manager 111 controls to meet the above requirement. That is, the process control manager 111 can control to set a scheduled delivery date of the job with the job ID #309028 at a timing (time schedule) earlier than that of the job with the job ID #309028 in the job scheduling result created according to the first instruction (acceptance order) displayed on the display window of FIG. 58, in response to the user's instruction input via the priority selection (priority order) field 2916.

For example, when it is set to execute the management operation according to the scheduling result displayed on the operation window of FIG. 58 (this result is scheduled by the process control manager 111 based on priority information set via the priority selection buttons 2930 on the operation window of FIG. 57, various kinds of setup information from the user including print condition information set for each job, and device performance information and current status information of devices of this system), if the user (the operator of this system in this case, or may be the client user) instructs to change the current acceptance order priority (Order priority; corresponding to the first instruction) to delivery date priority (Delivery priority; corresponding to the second instruction) via the priority selection (priority order) field 2916 on the operation window of FIG. 58, the process control manager 111 controls to re-schedule the work flow of the job with the job ID #039028, in accordance with the priority information (second instruction in this case) set via the priority selection field 2916 on the operation window of FIG. 58, various kinds of setup information from the user including print condition information set for each job, and device performance information and current status information of devices of this system, so that the completion timing (delivery timing) of the work flow of the job with the job ID #039028 is quickened from that in the work flow of the job with the job ID #039028 in the schedule according to the previous acceptance order as much as possible. In addition, the process control manager 111 controls the user interface to switch the informing contents for the user on the user interface from those based on the previous scheduling result to those based on the re-scheduling result so as to feed back the re-scheduling result to the operator. For example, the process control manager 111 executes display control so as to switch the display contents to be displayed on the display unit as an example of an informing unit from those based on the scheduling result according to the acceptance order shown in FIG. 58 to those based on the re-scheduling result according to the delivery order shown in FIG. 59. In this embodiment, a display process by means of the display unit is used as an example of an informing process by the informing unit. Alternatively, an audio output process using an audio output unit may be used.

Figure 59:
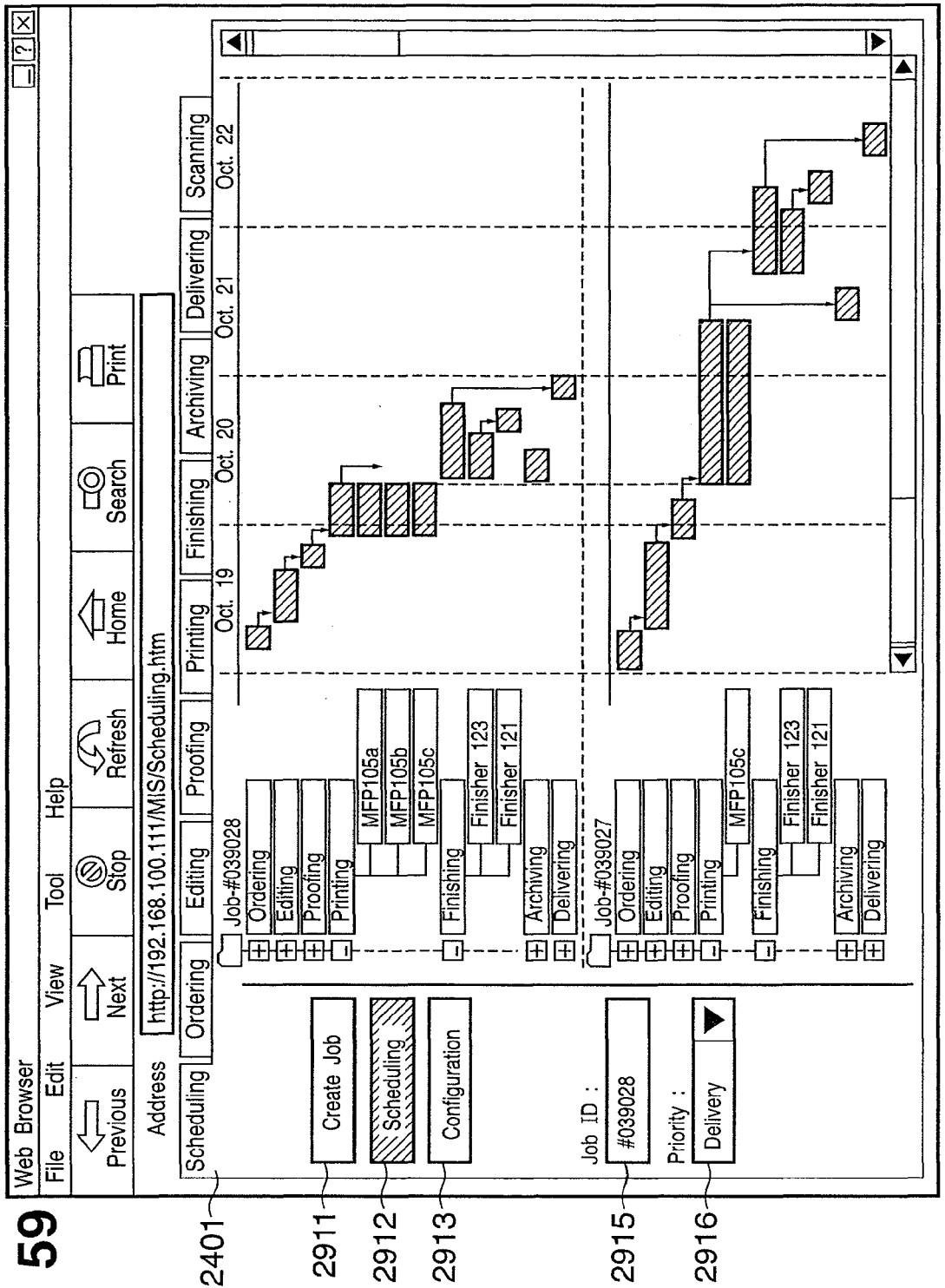
FIG. 59 shows a job scheduling window provided by the process control manager shown in FIG. 1.

For example, the process control manager 111 controls to display, on the display unit, the display contents corresponding to its re-scheduling result according to the delivery date priority (Delivery) in the aforementioned expression format (the expression format that allows the operator to visually and graphically identify and recognize a time schedule for each job, i.e., devices of this system to be used, process steps to be executed, and their order and work periods upon completing the job), as shown in the job scheduling window of FIG. 59. The job scheduling window of FIG. 59 reflects the job scheduling result after re-scheduling. In this example, as can be seen from the job scheduling window of FIG. 59, the process control manager 111 displays the re-scheduling result to allow the operator to identify that the scheduled delivery completion date (work flow completion timing) of the job with the jog ID #039028 is quickened two days from that in the schedule of the acceptance order priority (Order) shown in FIG. 58 (the scheduled completion date in the scheduling result presented on the window in FIG. 58 is October 22, but is re-set to October 20 as a result of the current re-scheduling).

Change points in the aforementioned re-scheduling process by the process control manager 111 will be described below. For example, in the schedule planned based on the previously instructed acceptance order priority (Order) setup in association with the work flow of the job with the job ID #039028, the process control manager 111 schedules to execute the print operation of image data of the job with the job ID #039028 using a single MFP. By contrast, based on the delivery date priority (Delivery) setup instructed based on the current user's priority setup change instruction, the process control manager 111 re-schedules to inhibit the print operation of image data of the job with the job ID #039028 using a single MFP, and to execute a distributed print process (cluster print) using three MFPs (note that the process control manager 111 executes the above scheduling after it recognizes based on device information acquired from the print manager 115 via a data communication with it that this system includes at least a plurality of image forming devices and this system can implement a cluster print operation using three MFPs). In this way, the aforementioned problem as a bottleneck is solved by scheduling the use timing of the sheet processing devices (finishers 123 and 121) in the sheet process step of the work flow of the job with the job ID #039028 as a delivery priority target to be earlier than that of the sheet processing devices (finishers 123 and 121) in the sheet process step of the work flow of the job with the job ID #039027, thus preferentially setting the delivery date of the job with the job ID #039028. As another scheduling method that quickens the delivery date, the post-process manager also preferentially process that job prior to other jobs to shorten the time, and other managers also throw in extra workers or make them work overtime, thus scheduling to quicken the delivery date of the job with the job ID #039028.

The same applies to cost priority (Cost) and quality priority (Quality) schedules in addition to the acceptance order priority (Order) and delivery date priority (Delivery) schedules. This embodiment allows the user (the operator of this system in this example, or may be the client user upon displaying the operation windows of FIGS. 57 to 61 on the client computer) to selectively input, by his or her key operation, a plurality of instructions which include cost priority (Cost priority; corresponding to the third instruction) and quality priority (Quality priority; corresponding to the fourth instruction) in addition to acceptance order priority (Order priority; corresponding to the first instruction) and delivery date priority (Delivery priority; corresponding to the second instruction) and are used upon determining a schedule via the priority selection (priority order) field 2916 on the operation windows shown in FIGS. 58 to 61 (or the priority selection buttons 2930 on the operation window of FIG. 57) displayed on the display unit by the process control manager 111. With this arrangement, for example, when the user instructs cost priority (Cost priority; corresponding to the third instruction) via priority selection (priority order) field 2916, the process control manager 111 controls to re-schedule according to the third instruction, and controls the display unit to switch (update) the display contents of the job scheduling window shown in FIG. 58 or 59 to, e.g., a cost priority job scheduling window shown in FIG. 60, so as to reflect the new scheduling result on the display unit after re-scheduling. Also, for example, when the user instructs quality priority (Quality priority; corresponding to the fourth instruction) via priority selection (priority order) field 2916, the process control manager 111 controls to re-schedule according to the fourth instruction, and controls the display unit to switch (update) the display contents of the job scheduling window shown in FIG. 58, 59, or 60 to, e.g., a cost priority job scheduling window shown in FIG. 61, so as to reflect the new scheduling result on the display unit after re-scheduling.

Figure 60:
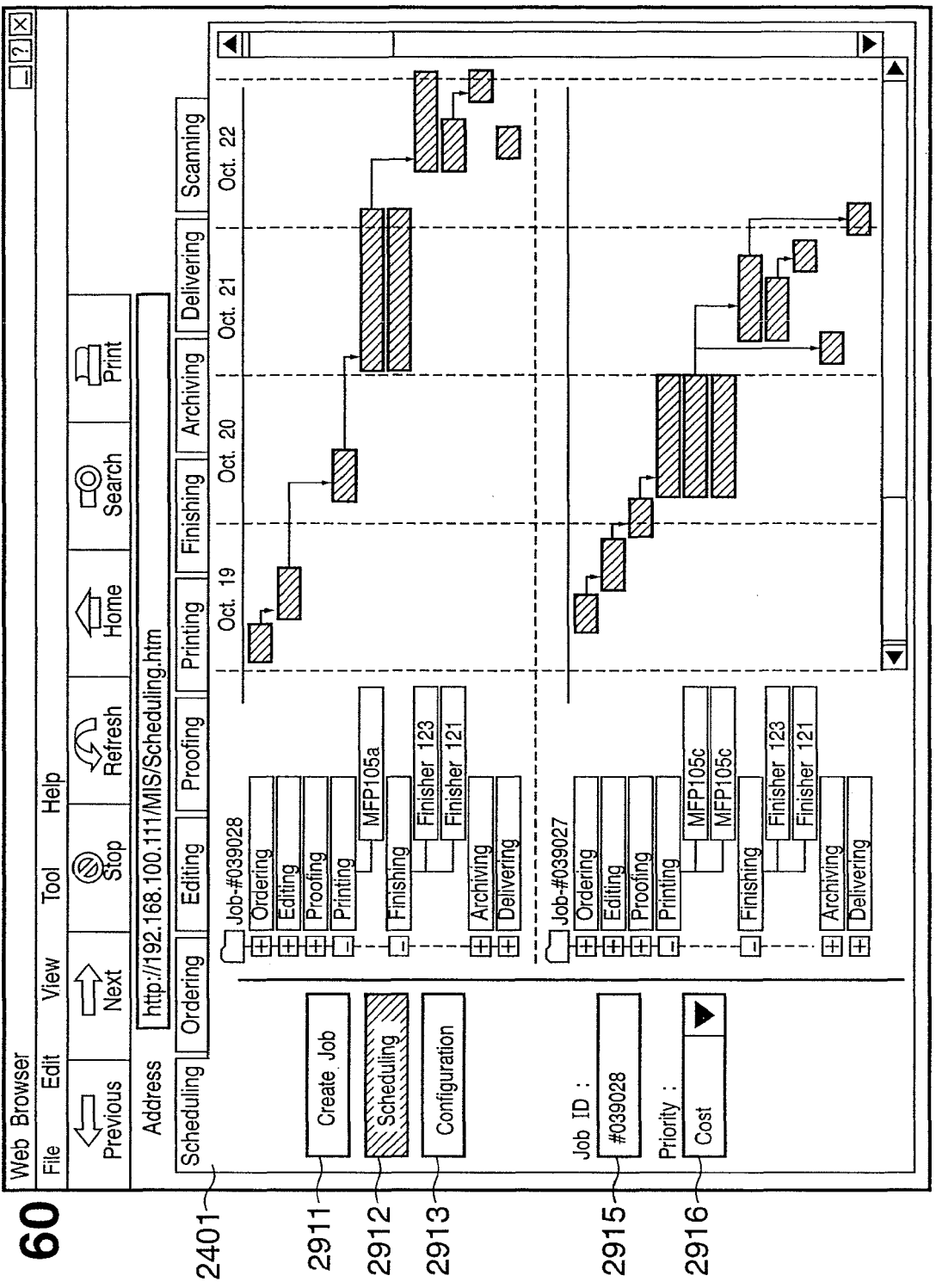
FIG. 60 shows a job scheduling window provided by the process control manager shown in FIG. 1.

On the cost priority (Cost) job scheduling window in FIG. 60, the job with the job ID #039028 undergoes cost-priority-based re-scheduling. In this example, respective steps are scheduled in advance to have enough margins. When a job which is input later to the order/input manager 112 has delivery date priority, the delivery date of the job with the job ID #039028 is scheduled in advance for the customer (client) of that job to have an enough time margin, so as to preferentially deliver that latter job, and a higher print cost discount is allowed to the customer (client) of the job with the job ID #039028 accordingly. The process control manager 111 can set such schedule when the third instruction is input, and makes display control to feed back that result to the user via the operation window shown in FIG. 61.

Even though cost priority is selected, if that job is always overtaken by delivery date priority jobs which are input later to the order/input manager 112, the output result of the job with the jog ID #039028 may not be delivered. Hence, the process control manager 111 may take the following measure. For example, information associated with the delivery deadline may be input as a client's instruction via the operation window of the client computer on which an order process of the job with the job ID #039028 is made so as to determine such deadline even when the job is overdue, and the process control manager may control to determine the maximum extended term of the delivery date based on that information and to make scheduling based on cost priority to keep that term as the precondition. Alternatively, the process control manager 111 may control to schedule a date a predetermined number of days after the delivery date desired by the user of the job ID #039028 as a deadline, and to make scheduling based on cost priority to complete the job with the job ID #039208 before an elapse of the predetermined number of days from the delivery date desired by the user of the job ID #039028. Note that the administrator can input in advance information indicating the predetermined number of days as an initial setup.

Figure 61:
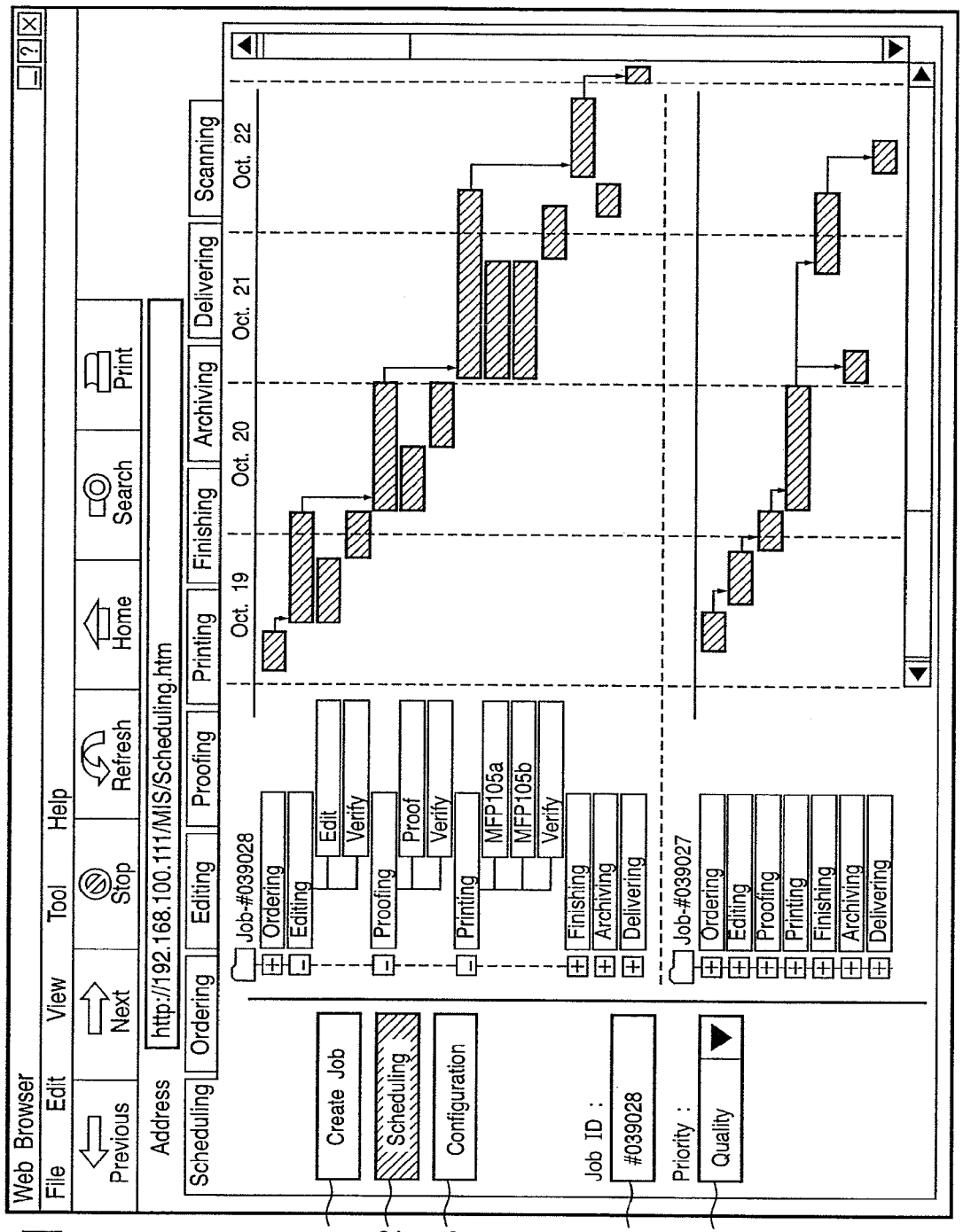
FIG. 61 shows a job scheduling window provided by the process control manager shown in FIG. 1.

The quality priority job scheduling window shown in FIG. 61 is displayed on the display unit when the user inputs quality priority (Quality priority; corresponding to the fourth instruction) via the priority selection field 2916 on one of the operation windows shown in FIGS. 58 to 60. When the fourth instruction is input via the priority selection field 2916, the process control manager executes a scheduling process of the job work flow to create and determine a quality priority schedule according to the fourth instruction (or re-schedules the work flow if it has already been scheduled). Upon completion of the scheduling process, the process control manager 111 controls to display information corresponding to the scheduling result created (re-scheduled) for quality priority on the display unit as the quality priority job scheduling window shown in FIG. 61. In this example, the process control manager 111 schedules the job with the job ID #039028 in accordance with the quality priority instruction from the user. As can be seen from the scheduling result on the window of FIG. 61, a schedule is determined to execute the verification step in the work flow of the job corresponding to the job ID #039208 set with the quality priority instruction, every time one process step is complete. In this manner, when the fourth instruction is input, the process control manager 111 can execute scheduling that inserts the step which assures quality even when the delivery date is overdue.

In this way, scheduling can be made while switching the priority order such as acceptance order priority, delivery priority, cost priority, quality priority, and the like by switching the contents of the priority selection field 2916. Furthermore, scheduling processes from various aspects (e.g., give top priority to work efficiency or the like of devices and workers). may be made.

Note that a plurality of instructions which include the first to fourth instruction that can be selectively input by the user via the user interface such as the operation windows of FIGS. 57 to 61 or the like, and are used by the process control manager 111 upon scheduling the work flow of each job may be set for each job (for each job input via the job ID input field 2915 on the operation windows of FIGS. 58 to 61) or may be effected for all of a plurality of jobs input via the order/input manager 112 as a common setup this system if one of these instructions is input. In this manner, the instruction may be set for each job, or may be uniformly (commonly) set for all of a plurality of jobs. In either case, control is made to accept a new instruction from the user even after the instruction is input once, and to execute a change in priority setup and job re-scheduling every time the new instruction is input.

Figure 62:
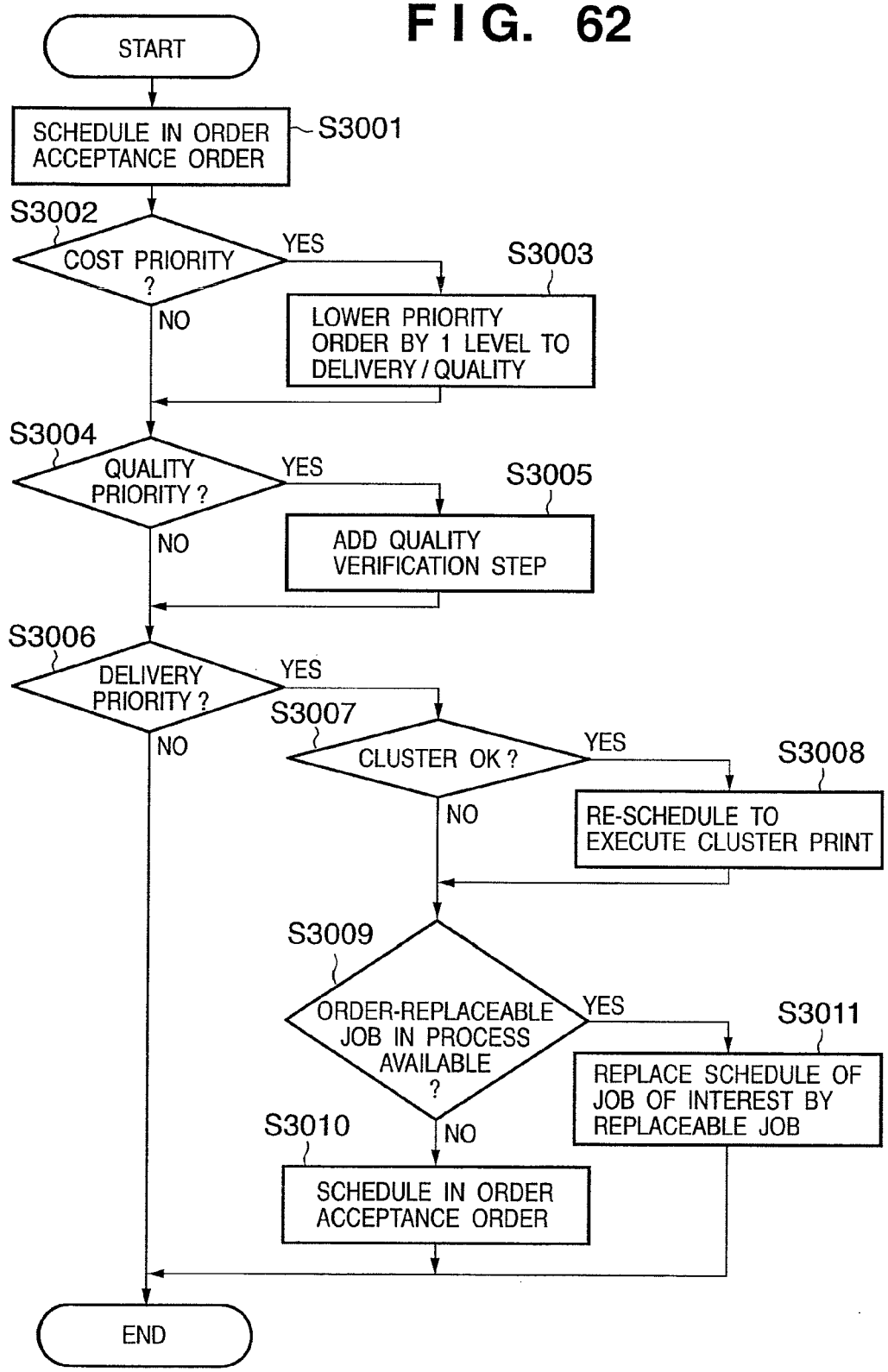
FIG. 62 is a flow chart showing an example of a scheduling process (the 10th control process of the present invention) by the process control manager shown in FIG. 1.

FIG. 62 is a flow chart showing an example of the scheduling process (the 10th control process of the present invention) by the process control manager 111 shown in FIG. 1, and this process adjusts other jobs and schedules in accordance with priority. Note that S3001 to S3011 indicate respective steps. Also, a case will be exemplified below wherein the acceptance order is set as default priority (default priority may be set by an administrator or the like via the operation unit). Upon executing the scheduling process to be explained in the following flow chart, the process control manager 111 makes the following processes and decisions beforehand and in real time. For example, the process control manager 111 makes a data communication process with other managers 112 to 119. With this process, the process control manager 111 acquires output condition information of a job to be processed, which can specify print output conditions set for each job, on the basis of information acquired from, e.g., the order/input manager 112. Also, the process control manager 111 acquires device information indicating the number of devices included in this system, the functions and units equipped in these devices, and so forth, on the basis of device information acquired from the managers 112 to 119. Furthermore, the process control manager 111 acquires various kinds of status information (current information such as a job process waiting state, job process execution state, error state, job process state, and the like) of devices on the basis of status information acquired from the managers 112 to 119. The process control manager 111 can acquire such information as necessary information upon determining a schedule in the following flow chart, and uses the information in the following scheduling process.

The process control manager 111 generates a schedule in the acceptance order (order of Order acceptance) in association with process control of jobs accepted by this system. The process control manager 111 registers the scheduling result information generated based on the acceptance order in a memory such as a hard disk or the like, so as to allow the user to read out and display that scheduling result on an informing unit such as the display unit or the like in response to his or her instruction, as shown in the operation window of FIG. 58 (S3001). The process control manager 111 determines whether or not cost priority is selected for a job corresponding to the job ID input by the user via any of the operation windows in FIGS. 57 to 61, by checking the contents of a user's instruction input via the priority selection buttons 2930 on the operation window of FIG. 57 or the priority selection field 2916 on any of the operation windows shown in FIGS. 58 to 61 (S3002). If it is determined that cost priority is selected for a job corresponding to the job ID input by the user via any of the operation windows in FIGS. 57 to 61, the process control manager 111 schedules the work flow of that job to give top priority to cost. For example, the process control manager 111 adjusts schedule to execute a postpone process that executes the processes of a job as a cost priority target after execution of the processes of other jobs, and a process for reducing date and quality parameters and the like, while confirming various kinds of information (job output condition information, device information, and status information) (e.g., lowers a time schedule/quality priority order by one level). Then, the process control manager 111 registers the scheduling result information generated based on this cost priority order in a memory such as a hard disk or the like, so as to allow the user to read out and display that scheduling result on an informing unit such as the display unit or the like in response to his or her instruction, as shown in the operation window of FIG. 60 (S3003). The process control manager 111 ends the process of this flow chart by skipping the processes in step S3004 and subsequent steps, so as to manage this system based on the above schedule. If it is determined in step S3002 that cost priority is not selected, the flow advances to step S3004.

The process control manager 111 determines in step S3004 whether or not quality priority is selected for a job corresponding to the job ID input by the user via any of the operation windows in FIGS. 57 to 61, by checking the contents of a user's instruction input via the priority selection buttons 2930 on the operation window of FIG. 57 or the priority selection field 2916 on any of the operation windows shown in FIGS. 58 to 61. If it is determined that quality priority is selected, the process control manager 111 schedules the job work flow to improve the quality of that job. For example, the process control manager 111 adjusts a schedule to add and insert quality verification steps between respective process steps of the job in the work flow of that job while confirming various kinds of information (job output condition information, device information, and status information). Then, the process control manager 111 registers the scheduling result information generated based on this quality priority in a memory such as a hard disk or the like, so as to allow the user to read out and display that scheduling result on an informing unit such as the display unit or the like in response to his or her instruction, as shown in the operation window of FIG. 61 (S3005). The process control manager 111 ends the process of this flow chart by skipping the processes in step S3006 and subsequent steps, so as to manage this system based on the above schedule. If it is determined in step S3004 that quality priority is not selected, the flow advances to step S3006.

The process control manager 111 determines in step S3006 whether or not delivery date priority is selected for a job corresponding to the job ID input by the user via any of the operation windows in FIGS. 57 to 61, by checking the contents of a user's instruction input via the priority selection buttons 2930 on the operation window of FIG. 57 or the priority selection field 2916 on any of the operation windows shown in FIGS. 58 to 61. If it is determined that delivery date priority is selected, the process control manager 111 sets a schedule to quicken the delivery date of that job (to complete the work flow of that job earlier than completion of the work flows of other jobs). As a method of shortening the delivery period of the job, for example, a cluster print mode that controls a plurality of image forming devices of this system to share and execute the print operation of the job at the same time is executed in the print process of the work flow of the job in place of a non-cluster print mode that controls a single image forming device to execute the print operation of the job. In this way, since the time required for one process step (print step in this case) is shortened, the overall work time can be shortened. Hence, the process control manager 111 determines whether or not the cluster print operation of that job can be executed by this system by confirming various kinds of information (job output condition information, device information, and status information), so as to inhibit execution of the non-cluster print mode and to execute the cluster print mode (S3007). If it is determined that the cluster print operation can be executed for that job by this system, the process control manager 111 re-schedules the work flow of the job to execute the cluster print operation of the job using a plurality of image forming devices of this system in the print step of that work flow. Then, the process control manager 111 registers the scheduling result information generated based on this delivery date priority in a memory such as a hard disk or the like, so as to allow the user to read out and display that scheduling result on an informing unit such as the display unit or the like in response to his or her instruction, as shown in the operation window of FIG. 59 (S3008). The process control manager 111 ends the process of this flow chart by skipping the processes in step S3009 and subsequent steps, so as to manage this system based on the above schedule. If it is determined in step S3007 that the cluster print operation cannot be executed for the job, the flow advances to step S3009.

The process control manager 111 determines in step S3009 whether or not jobs in process (including jobs whose processes are in progress; corresponding to jobs whose processes are not completed, of those accepted by this system) includes ones which allow to replace their order, by, e.g., confirming various kinds of information (job output condition information, device information, and status information). As an example of a job that allows order replacement of jobs in process, a job (waiting job) whose print process step is complete, and is waiting for its turn of the sheet process step is such case. That is, a job for which at least one process step is complete, and the next process step is not yet started is such case. As an example of a job that does not allow order replacement of jobs in process, a job which is a competitive job that uses the same devices as those to be used in the job of interest, and whose process is in progress in one process step in the work flow is such case. If it is determined in step S3009 that jobs in process include a job that allows order replacement, the process control manager 111 sets a schedule which replaces the schedule of the job of interest by that of the replaceable job (i.e., to complete the work flow of the job of interest prior to completion of that of the replaceable job). Then, the process control manager 111 registers the scheduling result information generated based on this delivery date priority in a memory such as a hard disk or the like, so as to allow the user to read out and display that scheduling result on an informing unit such as the display unit or the like in response to his or her instruction, as shown in the operation window of FIG. 59 (S3011). The process control manager 111 ends the process of this flow chart, so as to manage this system based on the above schedule.

On the other hand, if it is determined in step S3009 that jobs in process (including jobs whose processes are in progress; corresponding to jobs whose processes are not completed) do not include any job that allows order replacement, the process control manager 111 sets a schedule according to the acceptance order (order of Order acceptance). For example, the process control manager 111 schedules to complete the work flow of the job of interest corresponding to the job ID input by the user via any of the operation windows in FIGS. 57 to 61 after completion of the work flow of a job which has already been received via the order/input manager 112 before the job of interest. In this case, the process control manager 111 reads out the schedule information according to the acceptance order, which has already been generated in the process of step S3001 and held in the memory, from the memory, and controls to manage this system on the basis of that schedule information according to the acceptance order (S3010). The manager 111 then ends the process of this flow chart.

Although not shown, as a sub-flow chart of the above flow chart, control is made to execute a scheduling result display process that displays the scheduling result information, which is generated by the scheduling process in the above flow chart and is stored in the memory, on the display unit as the job scheduling window shown in FIGS. 58 to 61 on the basis of an instruction from the priority selection field 2916 on any of the operation windows shown in FIGS. 58 to 61, parallel to the scheduling process in the above flow chart. In addition, control is made to display the scheduling result corresponding to that whose management in this system is settled on the display unit.

The process control manager 111 controls to manage this system in accordance with the schedule of the job work flow, actual management of which is determined via the process of the above flow chart. Two scheduling management control examples will be explained below.

Operation Example 1

The process control manager 111 reads out schedule information of the job work flow, which is settled via the process of the flow chart in FIG. 62, from its memory such as a hard disk or the like, distributes the readout information to all other managers 112 to 119 via communication units, the network 101, and the like, and controls these managers to register the received information in their memories such as hard disks or the like. Then, respective managers can provide the information to respective devices (the scanner 106, image forming devices 104 and 105, and sheet processing devices 121 to 126) managed by them to control their devices. If a computer itself which comprises the function of the process control manager 111 incorporates those of other managers 112 to 119 and all the functions are managed by a single computer, this process can be omitted. In any case, an implementation method is not particularly limited as long as the determined schedule information can be transferred to computers and a plurality of devices including the scanner 106, image forming devices 104 and 105 (MFP, SFP, and the like), and sheet processing devices 121 to 126 of this system, and the respective devices can be controlled to execute operations according to the information. Upon transferring data (image data) of a job to respective devices, a job ID used to specify that job (this job ID is generated by one of the above managers) can be transferred in correspondence with the image data of that job together with the print process condition information of that job, so as to specify the ID of that job.

Under such precondition, in this system, when the image forming device (e.g., MFP) receives data (image data) of a job output from a computer or a device such as a scanner or the like, that image forming device specifies the job ID of that job by interpreting job ID information received together with the image data as the data of that job. The image forming device determines the print operation start timing for printing the image data of the job corresponding to that job ID by comparing it with the schedule information which is acquired in advance from the process control manager 111.

For example, the schedule information generated by the process control manager 111 includes information (step confirmation information) that allows each device to specify, for each job, process steps to be executed and devices to be used in such process steps upon completing the work flow of that job. In addition, that information includes information (time schedule information) that allows each device to specify, for each job, the execution timings of a plurality of process steps included in the work flow of one job and devices to be used in such process steps (note that such information can be confirmed by the user himself or herself such as an operator or the like, as has been explained in various display examples above). Respective devices including the image forming device are configured to determine the execution timings of processes of a job received from other devices by the self devices.

Hence, if the image forming device determines as a result of checking the schedule information that the received job is to be immediately printed by the self device, it starts and executes the print operation of that job. On the other hand, if the image forming device determines as a result of checking the schedule information that the received job is not to be printed immediately, it stores and holds the image data of that job in its memory such as a hard disk or the like, and reads out and prints the job from the memory at a print start timing determined based on the schedule information.

For example, if the image forming device determines as a result of checking the schedule information that a job to be immediately printed by the self device is present in this system but the image forming device itself has not received image data of that job yet, it determines that a delay of a job process, an error, or the like may have occurred in pre-process steps (e.g., a document edit process using the document edit manager 113, a proof process step using the proof manager 114, and the like) to be executed using other devices prior to the print step using the image forming device, and transmits (informs) error information that advises accordingly to the process control manager 111 via the print manager 115 and the like. In this manner, if each device determines based on the schedule information acquired from the process control manager 111 that there is a job to be immediately processed by the self device, but that device has not received that job yet, it transmits (informs) information that advises accordingly to the process control manager 111 via the communication medium such as the network 101 and the like so as to request the process control manager 111 to execute re-scheduling, and an error informing process to the user such as a client, operator, and the like.

Operation Example 2

In operation example 1, the image forming device receives, from another device, data of a job that has been processed in pre-steps of other devices in the form of digital data (image data). This system can cope with a case wherein data of a job is received as paper data in place of digital data. Paper data corresponds to a paper document to be scanned by the scanner and print sheets that have undergone the print process in the aforementioned image forming device. In this operation example, an operation control example based on the schedule information in a device which receives and processes data of a job in the form of such paper data will be explained.

For example, according to the scheduling result determined by the process control manager 111, assume that there is a job which is scheduled to execute a sheet process step (e.g., a staple process, booklet process, folding process, or the like) by the sheet processing device (any of 121 to 126) after execution of the print process step by the image forming device in operation example 1 in its work flow. How to process such job by the sheet processing device (any of 121 to 126) according to the schedule information from the process control manager 111 will be described below. Note that the process until the sheet processing device acquires the schedule information generated by the process control manager 111 and sets it in its memory is the same as that in operation example 1, and a description thereof will be omitted.

The sheet processing device recognizes as a result of checking the schedule information of the job work flow output from the process control manager 111 that there are jobs which require sheet processes to be executed for print sheets printed by the image forming device of operation example 1. In addition, the sheet processing device specifies a job to be processed by the self device of such jobs on the basis of the schedule information, and also specifies an execution timing of the sheet process of that job.

In this system, intervention works by the operator of this system such as a pickup operation of print sheets printed by the image forming device, a transfer operation of the print sheets using a cart or the like, a placing operation of the print sheets on a stacker of the sheet processing device, and the like often take place during a period from completion of the print process step in the image forming device until the start of the sheet process step in the sheet processing device in the work flow of the job (a period from completion of a given process step by a single device until the start of another process step by another device in one work flow). In this case, such operator intervention works can be positively utilized.

For example, when print sheets printed by the image forming device are set on the stacker of the sheet processing device by the operator intervention work from the image forming device, the sheet processing device instructs that operator to input the job ID of the set a bundle of print sheets via its operation unit by operator's key inputs. In this manner, the sheet processing device can specify the ID of the actual bundle of print sheets (corresponding to paper data) set on the stacker of the sheet processing device. Note that additional information such as a barcode or the like used to specify the job ID may be printed on each print sheet together with image data of the job in the print step by the image forming device as a pre-step, and may be scanned by a scanner of the sheet processing device, thus allowing the sheet processing device to specify the ID of the actual bundle of print sheets (corresponding to paper data) set on the stacker of the sheet processing device without any operator's key inputs. In either case, an implementation method is not particularly limited as long as the job ID of the bundle of print sheets actually set on the sheet processing device can be specified.

The sheet processing device determines based on the interpretation result of the previously checked schedule information if the bundle of print sheets set on the stacker set on the stacker of the sheet processing device correspond to those of a job with the job ID which is to immediately undergo a sheet process. If it is determined that the bundle of print sheets is to immediately undergo the sheet process, control is made to start to feed the print sheets from the stacker, to execute a sheet process by a sheet processing unit (e.g., a stapler), and to exhaust them on an exhaust unit. On the other hand, if it is determined that the print sheets correspond to those of a job which is not to be processed yet, the sheet processing device stacks them on the stacker, and waits for execution of a sheet process operation for the print sheets until a sheet process execution timing determined based on the schedule information is reached.

For example, if the sheet processing device determines as a result of checking the schedule information that there is a job whose sheet process operation is to be immediately executed by the self device in this system, but the sheet processing device itself has not received a bundle of print sheets of that job yet (a paper document has not been set on the stacker of the sheet processing device yet), it determines that a delay of a job process, an error, or the like may have occurred in pre-process steps (e.g., a document edit process using the document edit manager 113, a proof process step using the proof manager 114, a print step by the image forming device, and the like) to be executed using other devices prior to the sheet process step using the sheet processing device, and transmits (informs) error information that advises accordingly to the process control manager 111 via the print manager 115 and the like.

The process control manager 111 systematically controls the overall system to allow respective devices in this system to execute operations like in the above two operation examples, and controls this system to execute the management operations according to scheduling data of job work flows, actual operations of which are determined via the process of the flow chart in FIG. 62. In this manner, a system which is optimal in terms of not only work flow management but also operations can be built.

In the above description, scheduling is made for each job by switching (selecting) modes such as acceptance order priority, delivery date priority, cost priority, quality priority, and the like. Also, scheduling may be made by switching (selecting) modes such as system optimization priority for a cost reduction, system operation efficiency priority, and the like in addition those for each job.

In the above description, scheduling made by switching modes such as acceptance order priority, delivery date priority, cost priority, quality priority, system optimization priority for a cost reduction, system operation efficiency priority, and the like has been described. However, scheduling may also be made by selecting a plurality of ones of modes such as acceptance order priority, delivery date priority, cost priority, quality priority, system optimization priority for a cost reduction, system operation efficiency priority, and the like, and combining the selected modes.

Furthermore, the aforementioned scheduling mode can be switched even after a schedule is determined. When the scheduling mode is switched, the process control manager 111 not only executes re-scheduling, but also re-displays the re-scheduled schedule. In addition, the process control manager 111 controls the respective devices of this system to execute operations according to the scheduling result to be managed by this system, thus systematically controlling the entire system.

As described above, the process control manager 111 mainly categorizes steps in the printing business and POD market (categorizes steps of a job to an order/input step, document edit step, proof step, print step, post-process step, file archiving step, delivery/shipping step, scan step, and the like), and optimally schedules the respective steps in consideration of the efficient operation sequence, order, priority with respect to other jobs, and the like, thus allowing efficient process management in a system like in this image forming system. Also, the process control manager 111 controls the respective devices of this system to execute the operations according to such schedule, thus allowing efficient process management in a system like in this image forming system.

Also, since the process control manager 111 displays the schedule categorized into steps as a list, efficient process management can be made.

Furthermore, modes such as acceptance order priority, delivery date priority, cost priority, quality priority, and the like are set for respective jobs, and whole processes are scheduled while making adjustment with other jobs, thus obtaining outputs which meet customers' needs.

The process control manager 111 further engages the following control processes.

For example, as described above, a plurality of instructions including the first to fourth instructions can be selectively input together with the job ID via a user interface such as the operation windows in FIGS. 57 to 61 and the like provided by the process control manager 111 of this system.

The process control manager 111 of this system can selectively set a plurality of scheduling methods including scheduling (first scheduling) which schedules the work flows of jobs to complete the work flow of a job (a job with the job ID #039028 in this example) corresponding to the job ID input via the operation window after completion of that of a job (a job with the job ID #039027) that has already been input to the order/input manager 112 before that job (the job with the job ID #039028 in this example), and scheduling (second scheduling) which schedules the work flows of jobs to complete the work flow of a job (a job with the job ID #039028 in this example) corresponding to the job ID input via the operation window before completion of that of a job (a job with the job ID #039027) that has already been input to the order/input manager 112 before that job (the job with the job ID #039028 in this example). When the first instruction (acceptance order priority) is input via the user interface, the process control manager 111 can set the first scheduling method; when the second instruction (delivery priority) is input, it can set the second scheduling method. The process control manager 111 controls the respective devices of this system to operate according to a schedule of the job work flow whose setup (including re-adjustment) has been settled, and controls to inform the user of the determined schedule information via the user interface.

When this system is controlled using the second scheduling method, the process control manager 111 controls the respective devices of this system to complete the work flow of a job (a job with the job ID #039028 in this example) corresponding to the job ID selected by a user's key operation before completion of that of a job (a job with the job ID #039027) that has already been input to the order/input manager 112 before that job (the job with the job ID #039028 in this example) (such control will be referred to overtake control of the work flow of a subsequent job hereinafter; to be also referred to as a second work flow sequence hereinafter; the work flow operation according to the first scheduling method will be referred to as a first work flow sequence hereinafter).

In this embodiment, when this system executes the second work flow sequence according to this second scheduling method, control (first control) which can start execution of the first process step included in the work flow of a job (a job with the job ID #039028 in this example) corresponding to the job ID selected by a user's key operation before the start of execution of the first process step included in that of a job (a job with the job ID #039027) that has already been input to the order/input manager 112 before that job (the job with the job ID #039028 in this example) is made.

In addition, when this system executes the second work flow sequence according to this second scheduling method, control (second control) that can start execution of the first process step included in the work flow of the job (the job with the job ID #039028 in this example) corresponding to the job ID selected by a user's key operation even after the start of execution of the first process step included in that of the job (the job with the job ID #039027) that has already been input to the order/input manager 112 before that job (the job with the job ID #039028 in this example) is also permitted.

That is, when this system develops and executes the second work flow sequence according to the second scheduling method, the process control manager 111 controls independently of either of the above two control methods to be executed as long as control can be made to complete the work flow of the subsequent job (the job with the job ID #039028 in this example) before completion of that of the preceding job (the job with the job ID #039027 in this example).

In this embodiment, by applying such rules, for example, the process control manager 111 can mainly execute the following control premised on the following arrangement.

For example, each image forming device (MFP, SFP, or the like) of this system can sequentially store a plurality of print jobs including a first print job input to the self device, and a second print job input after the first job in a memory such as a hard disk or the like of the self device.

Furthermore, the image forming device comprises, based on such arrangement, an interrupt print function which interrupts a print operation of the first print job during execution of the print operation of the first print job, and can start a print operation of the second print job, which is input after the first print job and is stored and held in the memory, in the interrupt state. In this manner, the image forming device of this system has a function that can interrupt a print job whose print process is in progress, and can execute a print process of another print job.

Moreover, the image forming device comprises an overtake print function that can preferentially start the print operation of the second print job which is input after the first job prior to the start of the print operation of the first print job on the basis of the comparison result of priority orders set for the first and second print jobs, when the first print job is queued in the memory in a print wait state (the print operation of the first print job has not been started yet) since the print operation of another print job (print job X) is in progress, and image data of the second print job is input and stored in the memory. In this manner, the image forming device has a function that can execute a print process of another job (second print job) prior to a given print job (first print job) after a print job (print job X) whose print process is in progress ends.

Note that an image forming device such as an SFP or the like which has only a printer function (to be also referred to as a print mode hereinafter) can execute the above two functions between jobs of the printer function (print mode) as an identical function. On the other hand, an image forming device such as an MFP or the like, which comprises a plurality of functions (to be also referred to as a plurality of modes hereinafter) such as a copy function, facsimile function, print function, and the like is controlled to execute the above interrupt print function and overtake print function either between jobs of an identical function (when both the first and second print jobs are jobs of the print mode) or between jobs of different functions (when the first print job is that of the print mode and the second print job is that of the copy mode).

The above two functions quicken or delay the print completion timing of a print job depending on setups. However, such decrease/increase in processing time mainly has an influence during one process step, i.e., a print process step, in one device, i.e., an image forming device.

When this system comprises such image forming device, the process control manager 111 applies the aforementioned rules and makes the following control.

Control Example 1

In this system, when the first scheduling method (that schedules the work flows to complete a second work flow of a second job accepted by the order/input manager 112 after a first job accepted by the order/input manager 112 after completion of a first work flow of the first job) is set via the scheduling process in FIG. 62 by the process control manager 111, and when the process control manager 111 determines based on, e.g., various kinds of information (device performance information, job setup information, status information, and the like) acquired from the managers 112 to 119 that this system is not ready to execute the first work flow sequence corresponding to operations according to the first scheduling method (a sequence that completes the work flow of the subsequent job after completion of that of the preceding job) (first state), the process control manager 111 controls to inhibit execution of the interrupt print function and/or the overtake print function of the image forming devices (including the color MFP 104 and/or monochrome MFP 105) included in this system.

On the other hand, when the first scheduling method is set via the scheduling process in FIG. 62 by the process control manager 111, and when the process control manager 111 determines based on, e.g., various kinds of information (device performance information, job setup information, status information, and the like) acquired from the managers 112 to 119 that this system is ready to execute the first work flow sequence corresponding to operations according to the first scheduling method (second state), the process control manager 111 controls to permit execution of the interrupt print function and/or the overtake print function of the image forming devices (including the color MFP 104 and/or monochrome MFP 105) included in this system.

Control Example 2

When the second scheduling method (that schedules the work flows to complete a second work flow of a second job accepted by the order/input manager 112 after a first job accepted by the order/input manager 112 before completion of a first work flow of the first job) is set via the scheduling process in FIG. 62 by the process control manager 111, and when the process control manager 111 determines based on, e.g., various kinds of information (device performance information, job setup information, status information, and the like) acquired from the managers 112 to 119 that this system is ready to execute the second work flow sequence corresponding to operations according to the second scheduling method (a sequence that completes the work flow of the subsequent job before completion of that of the preceding job) (third state), the process control manager 111 controls to permit execution of the interrupt print function and/or the overtake print function of the image forming devices (including the color MFP 104 and/or monochrome MFP 105) of this system.

On the other hand, when the second scheduling method is set via the scheduling process in FIG. 62 by the process control manager 111, and when the process control manager 111 determines based on, e.g., various kinds of information (device performance information, job setup information, status information, and the like) acquired from the managers 112 to 119 that this system is not ready to execute the second work flow sequence corresponding to operations according to the second scheduling method (fourth state), the process control manager 111 controls to inhibit execution of the interrupt print function and/or the overtake print function of the image forming devices (including the color MFP 104 and/or monochrome MFP 105) of this system.

As in the above two control examples, if the work flow sequence according to the schedule of the job work flow, which is set and determined via the process of the flow chart in FIG. 62 on the basis of a user's instruction input via the user interface such as the operation windows in FIG. 57 to 61, and the like, can be executed using the respective devices of this system under the control of the process control manager 111 (unless any problem such as a delay of the completion timing itself of the job work flow or the like that adversely influences the final delivery date of a job occurs), execution of the interrupt print function, overtake print function, or the like of the image forming device of this system is permitted even when the processing time of a job is prolonged or shortened in the period of one process step, i.e., the print process step, in one device, i.e., the image forming device due to execution of the interrupt print function, overtake print function, or the like of the image forming device of this system. On the other hand, if a delay of the print step in the image forming device due to execution of the interrupt print function, overtake print function, or the like of the image forming device of this system results in a delay of the delivery process step using the delivery/shipping manager 118, and also that of the completion timing itself of the job work flow, execution of the interrupt print function, overtake print function, or the like of the image forming device of this system is inhibited irrespective of whether the first or second scheduling method is selected.

With such application control by the process control manager 111, a flexible system like this image forming system which can provide appropriate work flow management suited to the POD market, and can fully utilize functions unique to the respective devices can be built.

The process control manager 111 can also execute the following control by expanding the above control processes on the basis of such concept.

Control Example 3

For example, when the first scheduling method is set and the current state of this system is the first state, control is made to inhibit execution of various expanded application functions such as a facsimile transmission function, network scanner function, preview function, and the like of the multi-function image forming device such as an MFP or the like having a plurality of functions; when the current state of this system is the second state, control is made to permit execution of the application functions of that image forming device.

Control Example 4

For example, when the second scheduling method is set and the current state of this system is the third state, control is made to permit execution of the application functions of that image forming device; when the current state of this system is the fourth state, control is made to inhibit execution of the application functions of that image forming device.

As a practical method of inhibiting execution of respective functions (interrupt print function, overtake print function, facsimile transmission function, network scanner function, preview functions, and the like) in control examples 1 to 4 above, the following method may be used. That is, if the process control manager 111 determines inhibition of these functions, it sends inhibition information to the image forming devices via the communication medium such as the network 101 and the like, and controls the display unit of each image forming device to gray out or hatch display of an interrupt print key used to instruct execution of the interrupt print function, an overtake print key used to instruct execution of the overtake print function, application keys used to instruct execution of application functions and the like on the operation window that can be displayed on the display unit of the operation unit of the image forming device, or to clear display of such keys themselves, i.e., to disable these keys, so as not to accept key inputs of these functions on the operation unit of the image forming device by the user of the image forming device, thus disabling execution of the functions to be inhibited. As another method, in case of the print function, the inhibition function information is sent to a computer as a transmission source of a print job to control the display unit of the computer to gray out or hatch displays of the keys or to clear display of the keys themselves on the printer driver to be displayed on the display unit of that computer, so as not to accept key inputs of these functions on the operation unit of the computer by the user of that computer, thus disabling execution of the functions to be inhibited. On the other hand, as a practical method of permitting these functions in the image forming device, the process control manager transmits information that permits use of the functions to the image forming device whose functions are inhibited by the above control via the print manager 115 to cancel the disabled state of the keys on the operation window of the operation unit of the image forming device (to cancel gray-out display, hatching, or non-display), i.e., to enable these keys, so as to accept key inputs of these functions from the user, thus controlling the image forming device to execute the function-selected by the user. In case of the print function, the function permission signal is transmitted to the computer to make display control that switches the disabled state to the enabled state of key display on the printer driver, so as to accept the key inputs, thus controlling to execute the function designated by the user.

The process control manager 111 controls to determine the availability of execution of the respective functions for each of a plurality of image forming devices (including the MFPs 104 and 105) of this system. That is, the above process is individually executed for each device. As a result, for example, of a plurality of image forming devices, an image forming device, which is used in a print step included in the work flow of a job to be executed based on the schedule set by the process control manager 111, is controlled to inhibit the above functions (which may be permitted as long as the delivery step in that work flow is not delayed). On the other hand, the remaining image forming devices which are not used in the print step included in the work flow are controlled to permit the above functions.

As described above, the availability of execution of the functions unique to each device is controlled depending on whether or not the process control manager 111 can appropriate manage the work flow in this system, thus further improving the effects.

Seventh Embodiment

The sixth embodiment has explained the arrangement in which the process control manager 111 sets a device-subjective schedule, displays the scheduling result, executes the work flow according to the schedule, and executes system management and the like.

In this embodiment, as described above, in the image forming system which is systematically managed and controlled by the process control manager, operations of one job are completed by sequentially executing a plurality of process steps (order process, edit process, proof process, print process, sheet process, delivery process, data archiving process, and the like) using a plurality of devices of this system as one work flow in an order according to a schedule set by the process control manager. Such work flow is executed for each of jobs accepted by the order/input manager 112. Furthermore, there are many jobs each of which includes a plurality of process steps using a plurality of devices and requires operator intervention works every time each process step is completed (requires an operator intervention work during a period after completion of one of a plurality of process steps included in one work flow until the start of the next process step) in one work flow.

In such system arrangement, this embodiment allows the process control manager 111 to set and manage a schedule of workers (or operators) who actually make such operator intervention works required in each work flow and work in this system. Furthermore, appropriate instructions are provided to these workers under the control of the process control manager 111 to improve the efficiency of the workers who work in this system. The process control manager 111 executes scheduling on behalf of the workers who work in this system environment, and assigns (schedules) works to a plurality of workers who work in this system. Furthermore, the process control manager 111 assigns works by calculating the efficiency of workers who execute respective works upon executing the work flow of a job accepted by the order/input manager 112, and instructs the next work (a work to be done by a worker after one process step and/or one work) via the user interface unit such as the display unit or the like, thus efficiently doing works in the whole system. Such embodiment will be described below. Note that the arrangement, control, and operations in this system except for the following description are the same as those in the aforementioned system (but need not always be perfectly the same). Hence, this embodiment is configured as follows based on the aforementioned system arrangement.

[Scheduling of Workers]

Figure 63:
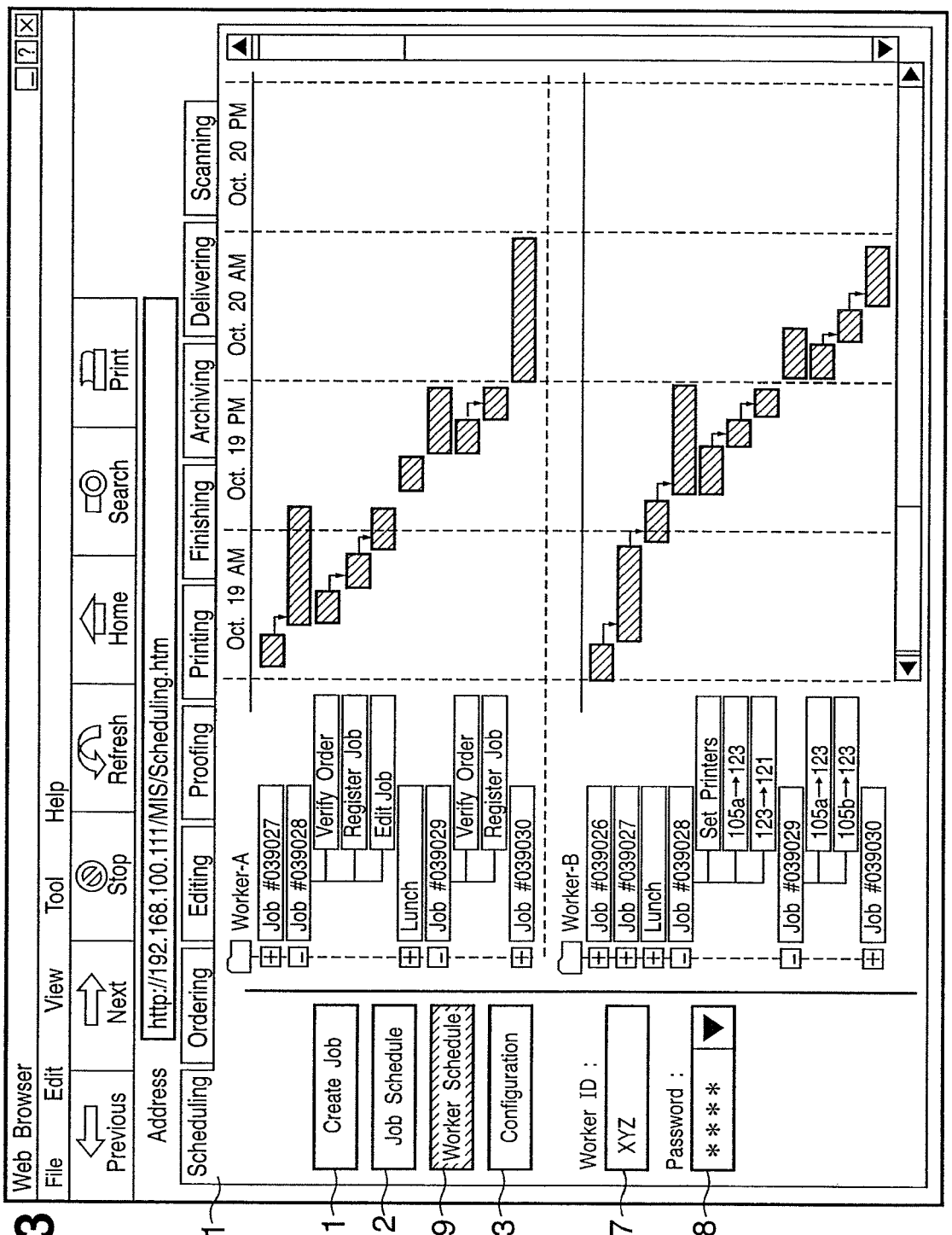
FIG. 63 shows a job schedule window for workers provided by the process control manager shown in FIG. 1.

FIG. 63 shows a job schedule window of workers which is provided by the process control manager 111 shown in FIG. 1 on the display units of devices such as computers, image forming devices, and the like of this system as an example of informing control. This schedule window corresponds to a timetable of works on behalf of workers.

Note that information informed (presented) by the process control manager 111 via the operation windows in FIGS. 58 to 61 of the above embodiment will be defined as first type scheduling (result) information which is mainly associated with the respective process steps by devices in each job work flow (the first type schedule information includes first schedule information according to the acceptance order of jobs, second schedule information according to delivery priority of jobs, third schedule information according to cost priority, fourth schedule information according to quality priority, and the like). A mode that informs (displays) the operator of the first type schedule information will be referred to as a first scheduling informing (display) mode hereinafter.

Figure 64:
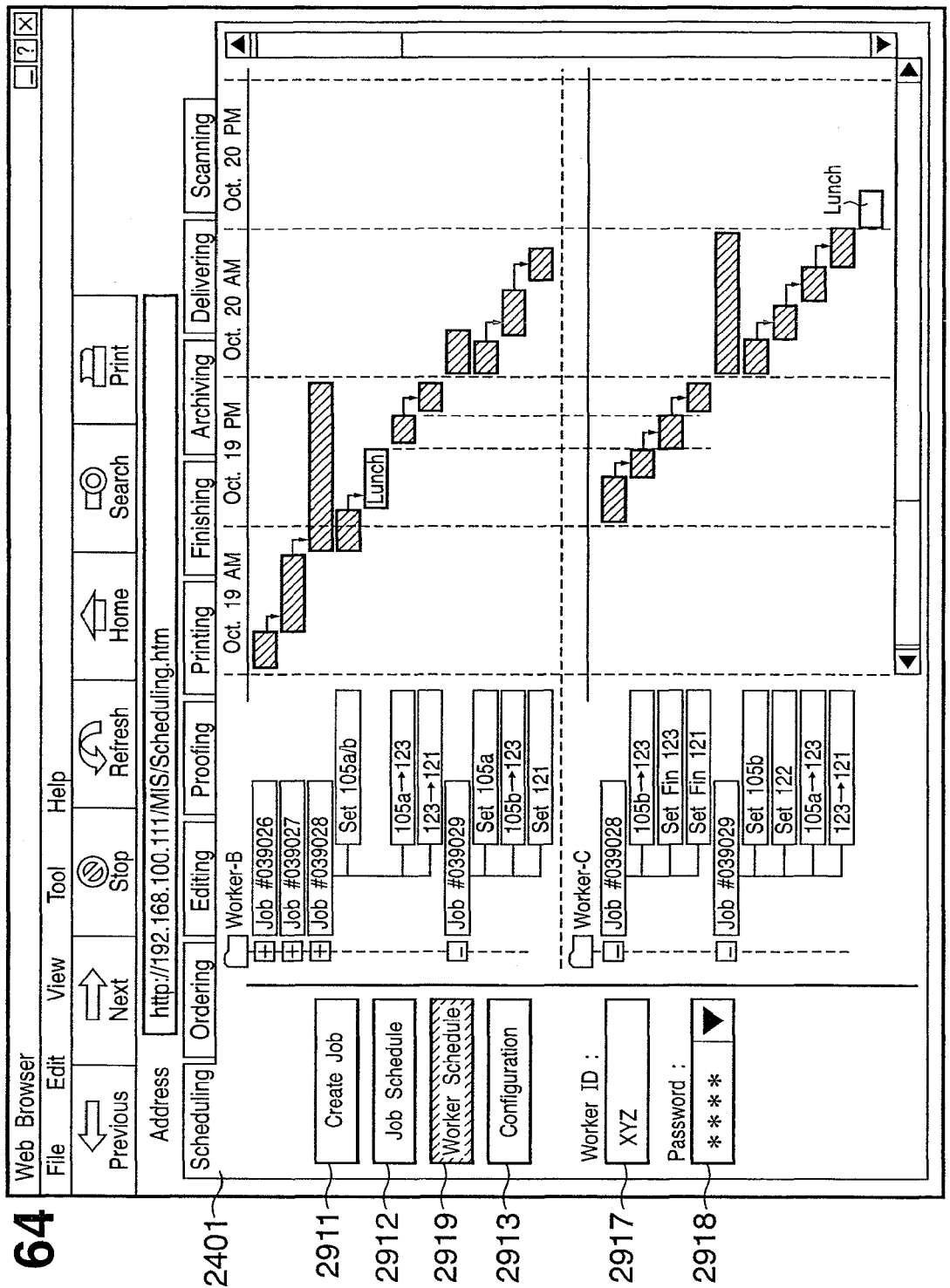
FIG. 64 shows a job schedule window for workers provided by the process control manager shown in FIG. 1.

By contrast, information to be informed (displayed) via the operation window in FIGS. 63 and 64 and the like will be defined as second type scheduling (result) information which is mainly associated with process steps (works) by workers of this system in each job work flow. A mode that informs (displays) the operator of the second type schedule information will be referred to as a second scheduling informing (display) mode hereinafter.

The process control manager 111 controls to selectively switch the first and second scheduling informing modes in accordance with an operator's instruction.

In this embodiment, the left display area on the operation window shown in each of FIGS. 57 to 61 comprises a worker scheduling key 2919 on the operation window in FIG. 63 (that is, the operation windows of FIGS. 57 to 61 are locally customized to comprise the key 2919 as a display element). In response to a key input (clicking; designation using a pointing device (not shown) or the like) by the user (mainly the worker, or may be the client user as in the above embodiment) of the key 2919 on the operation window formed by locally customizing those in FIGS. 57 to 61, the process control manager 111 controls to display the operation window of FIG. 63 on the display unit (i.e., it controls the display unit to switch from the first scheduling informing mode to the second scheduling informing mode). The operation window in FIG. 63 displays a schedule window associated with workers themselves to allow the workers to identify the second type schedule information.

In this system, the process control manager 111 controls to manage workers who work in this system to process a job from the client for each worker in correspondence with a schedule upon executing the job work flow (this schedule is determined by the process control manager 111 via the scheduling process shown in the flow chart of FIG. 62 on the basis of information input via the operation windows shown in FIGS. 57 to 61, performance information of respective devices of this system, job progress information, device status information, job setup information from the client, and the like). The process control manager 111 informs of management information (including, e.g., information that allows each worker himself or herself to recognize actions to be taken in the job work flow) directly associated with each worker himself or herself by displaying the worker schedule window in FIG. 63 on the display unit (or it may inform by means of an audio output using an audio unit in place of the informing unit such as the display unit or the like).

The process control manager 111 prevents a trouble (e.g., it informs a wrong worker of work information to be informed another worker) and illicit access. For this purpose, the process control manager 111 controls to display, on the display unit, the operation window which comprises a worker ID input field 2917 for inputting a worker ID as information that allows the process control manager 111 itself to specify and identify the user who currently accesses to confirm the work contents on the display unit, and a password input field 2918 for inputting authentication information (a password is used as an example of authentication data; information from an IC card may be used as authentication data) required to check if the user who inputs the worker ID is an authentic worker corresponding to that worker ID and to control availability (inhibition/permission) of an informing process of work information to the user, as shown in FIG. 63.

The process control manager 111 registers and holds, in its memory such as a hard disk or the like, various kinds of information associated with workers such as name information, worker IDs, passwords, process performance (skill) information, labor time information, work progress information, and the like of all workers who work in this system in association with respective workers so as to be identified for each worker.

The operation window of FIG. 63 comprises a work information display area that displays work information to be informed the worker corresponding to the worker ID input to the worker ID input field 2917 on the right side of the worker ID input field 2917 and password input field 2918. The process control manager 111 controls (permits) to display work information to be informed the worker (worker-A in the example of FIG. 63) corresponding to the worker ID input to the worker ID input field 2917 on the work information display area, as shown in FIG. 63, under the condition that a password which matches the password held in the memory for the worker (worker-A in the example of FIG. 63) corresponding to the worker ID input to the worker ID input field 2917 is input via the password input field 2918 by user's key operations. FIG. 63 shows a display result example when an authentic password is input. On the other hand, when a password which does not match the password held in the memory for the worker corresponding to the worker ID input to the worker ID input field 2917 is input via the password input field 2918 by user's key operations, the process control manager 111 inhibits display of work information to be informed the worker corresponding to the worker ID input to the worker ID input field 2917. That is, the process control manager 111 inhibits the display contents on the window of FIG. 63 from displaying.

When an authentic password is input, as described above, the process control manager 111 displays schedule information for the worker (worker-A in the example of FIG. 63) himself or herself corresponding to the worker ID on the work information display area, as shown in FIG. 63. In addition, the process control manager 111 controls to display schedule information of a worker (worker-B in this example) associated with works to be done by the worker corresponding to the worker ID in the job work flow as schedule information of the worker of neighboring works together on the work information display area. Note that the process control manager 111 may control to allow the worker (worker-A in the example of FIG. 63) corresponding to the worker ID to confirm the schedule information of the worker (worker-B in this example) of neighboring works to be distinguished from his or her schedule information by scrolling the window or using another window in place of using the single window.

For example, when worker A (corresponding to worker-A) and worker B (corresponding to worker-B) work in this work environment, worker A mainly belongs to a prepress division (that has charge of process steps which include an order step, edit step, and the like, and are executed before a print step by the image forming device), and worker B belongs to a postpress division (that has charge of process steps which include a sheet process step and are executed after the print step by the image forming device). In this case, the process control manager 111 controls to determine works to be done by worker A (corresponding to worker-A) and worker B (corresponding to worker-B) on the basis of determination information such as the worker information managed in its memory, performance information of devices of the system, device status information, job setup information from the client, the device-subjective first type schedule information determined by the process control manager 111 via the scheduling process in the flow chart of FIG. 62, and the like, and to assign the work contents to these workers. For example, the process control manager 111 determines the work flows of respective jobs by executing the scheduling process in the flow chart of FIG. 62. Hence, the process control manager 111 recognizes a plurality of devices and a plurality of process steps required to complete each job. Also, the process control manager 111 confirms operator intervention works required in each work flow. The process control manager 111 determines workers and their execution timings (time schedule) of a plurality of operator intervention works required in the job work flow with reference to the above information and various kinds of information associated with the workers of this system, which are held in the memory via the previous work information registration process. The process control manager 111 displays the determination result on the work information display area of the display unit as the second type schedule information, e.g., as the schedule information shown in FIG. 63.

As shown in FIG. 63, the process control manager 111 controls to lay out and display a plurality of pieces of information (job IDs in this example) which allow the worker (worker-A in this case) corresponding to the ID input to the worker ID field 2917 to identify works of jobs to be executed of a plurality of jobs accepted via the order/input manager 112, in the vertical direction of the window on the work information display area in turn from jobs in ascending order of job number. In this example, worker-A can confirm that he or she execute works of at least four jobs (job IDs #039027 to #039030). Furthermore, as shown in FIG. 63, the process control manager 111 controls to display a plurality of pieces of information which allow the worker works (operator intervention works) to be executed by him or her (worker-A in this case) as detailed information in the vertical direction of the window on the work information display area in turn from top down in ascending order of work sequence. In this example, the process control manager 111 controls to display a "+" key for each job ID corresponding to each of jobs which are arranged in the execution order of the work flow in the direction of ordinate of the work information display area. When the worker presses the "+" key, the process control manager 111 switches the display state of that key from "+" to "−", and displays intervention works which are required during execution period of the work flow of the job corresponding to that key and are to be executed by that worker (worker-A in this case) in the order of works in turn from top down in the direction of ordinate of the work information display area. In the example of FIG. 63, display control is made to allow worker A corresponding to worker-A to identify that worker A must execute, upon executing the work flow of a job corresponding to the job ID #309028, at least three intervention works, i.e., a work (Verify Order) for verifying the order contents of that job, a work (Register Job) for registering that job in the memory, and a work (Edit Job) for editing that job, in the work flow of that job in this order (Verify Order→Register Job→Edit Job). Moreover, display control is made to allow the worker (worker-A) to identify that the worker must execute, after a lunch (Lunch information), at least two intervention works, i.e., a work (Verify Order) for verifying the order contents of a job corresponding to the job ID #039029, and a work (Register Job) for registering that job in the memory in the work flow of that job in this order (Verify Order→Register Job). When the worker presses the "−" key, the process control manager clears (folds) detailed information of that job from the window and displays the "+" key again. Moreover, the process control manager 111 controls to lay out and display a plurality of pieces of time schedule information that allow the worker (worker-A in this case) to specify and identify the timings of these jobs (jobs listed in the direction of ordinate of the worker information display area) and the execution timings of operator intervention works by the worker (worker-A in this case), which are required in the work flows of the respective jobs, in an expression form that allows the worker to visually and graphically recognize them (e.g., by a method of expressing dates using text data, a method of displaying work times required for respective work steps by bar graphs, and the like, as shown in FIG. 63) in ascending order of date in the direction of abscissa of the worker information display area. In this example, worker A can confirm that he or she is scheduled to execute a work of the job ID #039027 in the morning of October 19, execute works of the job ID #039028 from the morning to the afternoon of October 19, execute works of the job ID #039029 in the afternoon of October 19, and then execute a work of the job ID #039030 in the morning of October 20. In addition, in association with three intervention works required in the work flow of the job corresponding to the job ID #039028, the worker can confirm that he or she must execute a work (Very Order) for confirming the order contents in the work flow of that job in the morning of October 19, must then execute a work (Register Job) for registering that job in the memory, must execute a work (Edit Job) for editing that job until the morning of October 20, and so forth. Furthermore, the process control manager 111 controls to display information associated with a worker (worker-B in this case) who executes works associated with those of the worker of interest corresponding to the worker ID input to the worker ID field 2917 in the same expression form as above on the worker information display area. Note that control may be made to display information of other workers by operating a scroll bar on the right end of the worker information display area on the display window of FIG. 63. Also, display control may be made to display information of a plurality of workers by sequentially switching a plurality of operation windows for respective workers in place of one window in FIG. 63. In either case, each worker need only be informed of guidance information (also called the second type schedule information) associated with scheduling for workers themselves in the job work flows, which includes information that allows each worker himself or herself to confirm job work flows to be engaged, information that allows each worker himself or herself to confirm intervention works to be executed, information that allows each worker himself or herself to confirm the execution order of such intervention works, and information that allows each worker himself or herself to confirm time schedule information about the execution timings of the works, via various user interfaces such as a display unit, audio unit, and the like under the control of the process control manager 111.

In addition, the process control manager 111 controls to selectively switch the first and second scheduling informing modes in accordance with an operator's instruction, as described above. For example, upon depression of the job scheduling key 2912 on the operation window in FIG. 63, the process control manager 111 controls the display unit to switch the display contents from the operation window in FIG. 63 to the display window that displays the first type schedule information in FIGS. 58 to 61. In this manner, control is made to switch the operation window which displays the first type schedule information and that which displays the second type schedule information every time the user inputs a mode switching instruction. In order to revert to the operation windows in FIGS. 58 to 61, control is made to display an operation window corresponding to the instruction selected from the aforementioned first to fourth instructions (acceptance order priority, delivery order priority, cost priority, and quality priority). When the create job key 2911 on the operation window shown in FIG. 63 and the like is input, control is made to revert to the operation window of FIG. 57. In this fashion, control is made to selectively display a plurality of different operation windows (including those shown in FIGS. 57 to 64) on the display unit in response to user's key inputs.

Furthermore, as a major feature, the contents of the second type schedule information that can be displayed on the operation window of FIG. 63 or 64 are determined based on the first type schedule information in the above embodiment. That is, the process control manager 111 creates first type schedule information with the contents corresponding to one of the plurality of instructions which is input by the user via the operation window of FIGS. 57 to 61, and creates second type schedule information in accordance with the contents of the created first type schedule information. For example, when the first instruction is input, the manager 111 creates first schedule information according to the acceptance order of jobs as the first type schedule information, and creates second type schedule information with contents based on the generated first schedule information, worker information, and the like. When the second instruction is input, the manager 111 creates second schedule information according to delivery priority of jobs as first type schedule information, and creates second type schedule information with contents based on the generated second schedule information, worker information, and the like. When the third instruction is input, the manager 111 creates third schedule information according to cost priority as first type schedule information, and creates second type schedule information with contents based on the generated third schedule information, worker information, and the like. When the fourth instruction is input, the manager 111 creates fourth schedule information according to quality priority as first type schedule information, and creates second type schedule information with contents based on the generated fourth schedule information, worker information, and the like. Therefore, the contents to be displayed on the worker information display area of the operation window in FIG. 63 or 64 differ depending on the plurality of instructions. When the instruction which is set once via the operation window of FIG. 57 is set again or changed via the operation window of FIGS. 58 to 61 as in the above embodiment, the display contents are changed in synchronism with that change, so that the second type schedule information to be displayed on the worker information display area of the operation window in FIG. 63 or 64 reflect the changed instruction.

In this work environment, when worker C (corresponding to worker-C in FIG. 64) also has charge of the same postpress division as worker B, the process control manager 111 controls to assign jobs so that the work contents of worker B do not overlap those of worker C at the same time (to determine schedules for the workers in the work flows so that workers B and C can execute different works). The process control manager 111 then controls to display the scheduling result as the second type schedule information on the operation window shown in FIG. 63 or 64.

The workers do their works according to instructions of the process control manager 111, thus efficiently operating this system as a whole.

Eighth Embodiment

In the description of the seventh embodiment, when workers B and C have charge of the identical postpress division, the process control manager 111 assigns their jobs so that their works do not overlap each other, i.e., they handle different jobs. Alternatively, one job may be shared by a plurality of workers. Such embodiment will be described below.

FIG. 64 shows a job schedule window of workers provided by the process control manager 111 shown in FIG. 1, and corresponds to a case wherein workers B and C have charge of the identical postpress division, and share a single job.

As shown in FIG. 64, when both workers B and C take charge of the postpress division, worker B executes an intervention work for setting both the MFPs 105a and 105b (e.g., power ON, setups of various parameters for color adjustment and the like, etc.) in the work flow of a job with the job ID #039028, executes an intervention work for transferring print outputs of the MPF 105a to the finisher 123 for that job, and also executes an intervention work for transferring the outputs from the finisher 123 to the finisher 121 for that job. In this manner, the process control manager 111 displays the scheduling result so that worker B can identify it.

On the other hand, the process control manager 111 schedules the works of worker C to execute an intervention work for transferring the print outputs of the MFP 105b to the finisher 123 for the job with the job ID #039028, to set up the finisher 123 (e.g., power ON, setups of various parameters required to appropriately execute a case binding process, etc.), and to also set up the finisher 121 (e.g., power ON, setups of various parameters required to appropriately execute a trimming process, etc.). The process control manager 111 identifiably displays such scheduling result.

When the process control manager 111 schedules based on the first type schedule information stored in its memory, worker information, and the like in this way (as shown in FIG. 64), workers can do different works even in a single job, and workers and segmented works can be optimally assigned, thus allowing efficient management.

In this embodiment, the process control manager 111 executes design and control in consideration of the fact that when one job is assigned to a worker, he or she can easily analogize the next work to be done, but when one job is shared by two or more workers, these workers cannot recognize works assigned to other workers, and the number of overlapping works and wasteful time may increase in practice.

The process control manager 111 can execute informing control to efficiently and adequately put workers in place by sequentially giving next work instructions to these workers (the manager 111 instructs each worker of an intervention work to be executed immediately after a given one of a plurality of intervention works required for the worker upon execution of the job work flow; the manager 111 instructs the worker of the next work in real time every time or immediately before the worker completes one intervention work).

Figure 65:
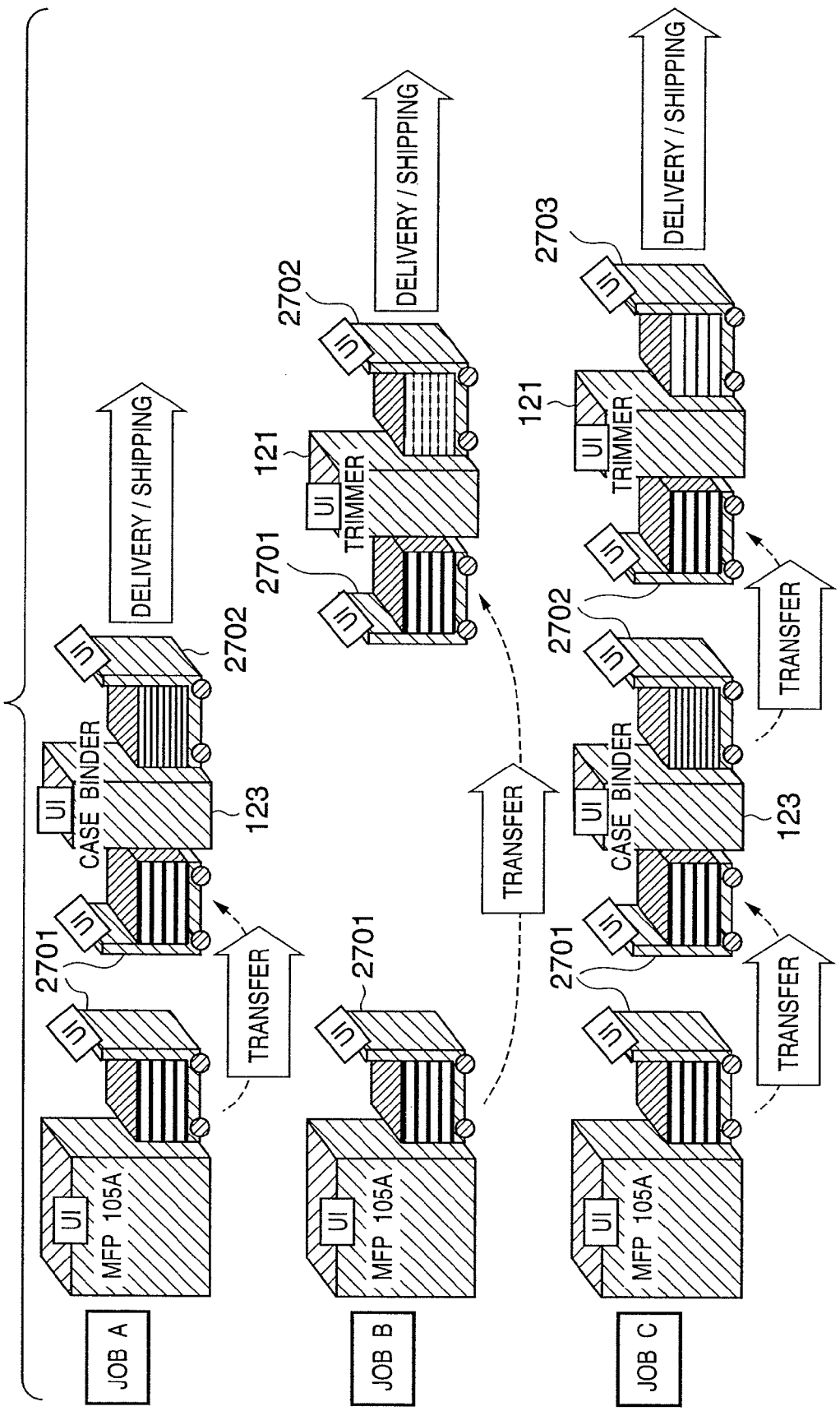
FIG. 65 is a chart for explaining an example of the arrangement that successively issues reliable instructions to respective workers.

FIG. 65 is a chart for explaining the arrangement that issues adequate instructions to respective workers, and the same reference numerals denote the same parts as in FIG. 55.

For example, as shown in FIG. 65, in order to issue adequate instructions to respective workers upon executing works shown in FIG. 55, display devices (UIs) are provided in advance to devices (104, 105, 121 to 126, and the like shown in FIG. 1) and carts 2701 to 2703 used to transfer jobs among these devices, and the process control manager 111 controls to display the next step of the job processed using each device or cart on the UI of that device or cart. Furthermore, the process control manager 111 controls to display the next work of that worker on the UI of the device or cart at work. In this manner, adequate instructions can be given to the respective workers. Note that the process control manager 111 determines an instruction to be given to each worker as the next step while checking the aforementioned two types of schedule information, current date information, current job processing states, and the like.

Therefore, each worker can acquire information of the next step of the currently processed job and information of his or her next work from the UI of the device or cart at work. As a result, each worker can easily recognize the next work to be done. Even when two or more workers share a single job, they can recognize works assigned to other workers, thus suppressing generation of overlapping works and wasteful time.

Note that the above instructions are sent to the respective devices via the network. However, since the carts are movable and their workability impairs if they are connected to a physical (wired) network, communications are made via a wireless network to display and issue different work instructions for respective workers who attend these carts and devices.

Ninth Embodiment

In the eighth embodiment, the UIs are provided to the respective devices and carts, and are used to display instructions from the process control manager 111, thus informing the respective workers of the instructions from the process control manager 111. Alternatively, each worker may have an ID card, terminal, and the like, a worker who is working at a predetermined device may be identified by the ID card, and the process control manager 111 may control to display an instruction on the terminal of that worker. Such embodiment will be described below.

FIG. 66 shows an example of ID cards provided to respective workers.

In FIG. 66, reference numerals 3301 and 3302 denote ID cards (for example, 3301 is John's ID card, and 3302 is Laura's ID card). Each ID card describes information such as the worker's name, ID number, department name, skill, field in charge, work history, and the like.

FIG. 67 is a chart for explaining the arrangement that issues adequate instructions to respective workers, and the same reference numerals denote the same parts as in FIG. 65.

As shown in FIG. 67, all workers have their ID cards (for example, John has the ID card 3301, and Laura has the ID card 3302, as shown in FIG. 66). The process control manager 111 can identify these workers by their ID cards. The process control manager 111 issues work instructions to these workers by discriminating work contents according to the IDs of the identified workers.

Also, all the workers have portable terminals called PDAs (Personal Digital Assistants) (For example, John has a PDA 3401, and Laura has a PDA 3402). Note that a portable phone or the like may be used as the portable terminal, and such device is not particularly limited as long as it is portable by the user, has a data communication function, comprises an informing unit such as a display unit or the like, and can receive information from the process control manager 111 and can inform the received information via the informing unit. The aforementioned ID card includes a transmitter, which transmits a signal unique to its ID (worker's ID). When each worker carries this PDA and ID card in combination, a signal (worker's ID) transmitted from the ID card is wirelessly received by the PDA, which informs the process control manager 111 of the owner of that PDA. Note that the ID card includes the transmitter. Alternatively, the PDA may comprise a card reader which can read information in the ID card. In such case, a magnetic card, other IC cards, and the like may be used.

The process control manager 111 discriminates the work contents according to the ID of each worker identified via a communication from the PDA, and transmits a work instruction for that worker to his or her PDA. In this manner, the process control manager 111 can control to display an adequate work instruction corresponding to each worker on his or her PDA.

Therefore, each worker can acquire information of the next step of the currently processed job and information of his or her next work from his or her PDA. As a result, each worker can easily recognize the next work to be done. Even when two or more workers share a single job, they can recognize works assigned to other workers, thus suppressing generation of overlapping works and wasteful time. Note that communications between the process control manager 111 and PDAs use, e.g., a wireless LAN or the like.

Using such ID cards, the skills, fields in charge, and the like of respective workers can be registered (such information may be directly recorded in each ID card or may be stored and managed in this image forming system). Hence, the process control manager 111 can estimate the number of works in correspondence with the level of each individual worker, and can accurately calculate the work time.

Furthermore, leave of absence information of each worker may be managed based on the ID of that worker. The process control manager 111 can reliably recognize the leave of absence information of respective workers using the ID cards even when there is a worker who takes a day off (especially, even when there is a worker who takes a day off without any request due to an acute disease or the like), and can reschedule works to be distributed.

As described above, a schedule of order/input, document edit, proof, print, post-process, file archiving, delivery/shipping, scan, and the like of each job is efficiently managed in terms of workers' works, thus improving the efficiency of the work flow of the whole works.

Since adequate instructions are sent to respective workers using the UIs provided to the respective devices or carts or the PDA terminals or the like carried by the workers, a plurality of workers can efficiently do different works at the same time, thus consequently finishing a job within a Shorter delivery period.

Furthermore, since this system can flexibly cope with skills, diligence/laziness, and the like of the workers, a time schedule progress state, an increase/decrease in resource, and the like can be predicted, and designing resource management can be achieved.

Note that the present invention includes all the combinations of the arrangements of the above embodiments (an arrangement that comprises all constituent elements of the first to ninth embodiments or an arrangement that comprises those of at least two embodiments).

Note that this system may adopt a system arrangement that comprises a digital camera or the like in addition to devices such as a scanner, computer, and the like, which serve as image data generation sources, as one of a plurality of devices. In this case, a print operation of sensed image data which is sensed by and supplied from the digital camera (or sensed image data which is written in a detachable storage medium of the digital camera) can be accepted by the order/input manager as one job. In addition, such job can undergo control including scheduling and management by the process control manager 111 as one job in the same manner as other jobs described above. In such system, sensed image data, which is directly received from the digital camera or is read out from the detachable storage medium, can undergo an edit process and the like, and can then undergo a print process, post-process, and the like.

As described above, according to this embodiment, since a print job and print instruction are accepted, a plurality of steps for the print job are controlled, and the respective steps are scheduled and managed on the basis of the scheduling result, the plurality of steps to be applied to the print job can be scheduled to attain efficient process control. Therefore, by scheduling a plurality of steps (order acceptance, document edit, proof, print, post-process, file archiving, delivery/shipping, scan, and the like) for the print job, efficient process control can be made. Also, scheduling modes such as acceptance order priority, delivery priority, cost priority, quality priority, and the like are provided, and adjustment is made with other jobs in accordance with the selected scheduling mode, thus achieving an output process (image forming process) in a schedule that meets the customer's needs.

Furthermore, even when each image forming device comprises unique functions such as an interrupt print function, overtake print function, and various other expanded application functions, a flexible and convenient system, which can fully utilize these functions without influencing the schedule determined by the process control manager 111, can be provided.

According to this embodiment, a plurality of steps of an image forming process are managed to issue appropriate work instructions to workers who work in this system in real time. The steps of an image forming process in the printing business and POD market are categorized to determine a schedule of respective steps (which include document edit, proof, print, post-process, file archiving, delivery/shipping, scan, and the like) in terms of workers' works, thus allowing efficient process control.

As described above, according to this embodiment, when a service that combines all works from ordering of commercial products to packaging, shipping, after service, inventory control, and cash receipt control is to be provided in the printing business or POD market to have prints as commercial products, an optimal service and system can be provided. Also, when a system that supports business planning and management works via acquisition, processing, and reporting of production-related data, accumulates information, and provides the accumulated information to respective departments as needed is examined in the printing business or POD market, an optimal system can be implemented and managed. Furthermore, a system which can sufficiently examine and cope with requirements in the POD market (e.g., skilled persons are unemployable compared to the conventional printing business, and requirements to complete jobs at low cost, to do business with fewer investments, to reduce TCO (Total Cost of Ownership), and so forth) can be provided.

The configuration of data processing programs which can be read out by the image forming system according to the present invention will be described below with reference to the memory map shown in FIG. 68.

FIG. 68 is a view for explaining the memory map of a storage medium that stores various data processing programs that can be read out by the image forming system according to the present invention.

Although not shown, information used to manage the programs stored in the storage medium (e.g., version information, author information, and the like) may also be stored, and information depending on an OS or the like on the program read side (e.g., icons used to identifiably display programs, and the like) may be stored.

Furthermore, data which belong to various programs are managed in the above directory. Programs used to install various programs in a computer, a program used to decompress such installer program when that program is compressed, and the like may be stored.

The functions shown in FIGS. 2, 6, 38, 39, 40, 41, 50, 51, 52, 53, 54, and 62 in the embodiments of the present invention may be implemented by a host computer on the basis of externally installed programs. In this case, data required to display operation windows equivalent to those described in the above embodiments which include the operation windows shown in FIGS. 57 to 61, and FIGS. 63, and 64 are externally installed, and various user interface windows are provided to the display unit of the host computer. In this case, the present invention can be applied to a case in which an information group including programs is supplied from a storage medium such as a CD-ROM, flash memory, FD, or the like, or an external storage medium via a network to an output device.

As described above, the objects of the invention are also achieved by supplying a storage medium which records a software program that implements the functions of the aforementioned embodiments to a system or apparatus, and reading out and executing the supplied program code stored in the storage medium by a computer (or a CPU or MPU) of that system or apparatus.

In this case, the program code itself read out from the storage medium implements the novel functions of the present invention, and the storage medium which stores the program code constitutes the present invention.

Therefore, the form of program is not particularly limited, and an object code, a program to be executed by an interpreter, script data to be supplied to an OS, and the like may be used as along as they have the program function.

As a storage medium for supplying the program, for example, a flexible disk, hard disk, optical disk, magnetooptical disk, MO, CD-ROM, CD-R, CD-RW, magnetic tape, nonvolatile memory card, ROM, DVD, and the like may be used.

In this case, the program code itself read out from the storage medium implements the functions of the above-mentioned embodiments, and the storage medium which stores the program code constitutes the present invention.

As another program supply method, the program may be supplied by establishing connection to a home page on the Internet using a browser on a client computer, and downloading the computer program itself of the present invention or a compressed file containing an automatic installation function from the home page onto a recording medium such as a hard disk or the like. Also, the program code that forms the program of the present invention may be segmented into a plurality of files, which may be downloaded from different home pages. That is, the appended claims of the present invention include a WWW server, ftp server, and the like, which make a plurality of users download a program file required to implement the functional process of the present invention by the computer.

Also, a storage medium such as a CD-ROM or the like, which stores the encrypted program of the present invention, may be delivered to the user, the user who has cleared a predetermined condition may be allowed to download key information that is used to decrypt the program from a home page via the Internet, and the encrypted program may be executed using that key information to be installed on a computer, thus implementing the present invention.

Furthermore, the functions of the aforementioned embodiments may be implemented by some or all of actual processes executed by a CPU or the like arranged in a function extension board or a function extension unit, which is inserted in or connected to the computer, after the program read out from the storage medium is written in a memory of the extension board or unit.

The present invention can be applied to either a system consisting of a plurality of devices or an apparatus including a single device. The present invention can also be applied when the invention is achieved by supplying a program to such system or apparatus. In this case, the system or apparatus can enjoy the effects of the present invention by reading out a storage medium that stores a program expressed by software used to achieve the present invention by the system or apparatus.

The present invention is not limited to the above embodiments, and various modifications (including organic combinations of respective embodiments) are available based on the spirit of the present invention. The scope of the present invention also includes such modifications.

Various examples and embodiments of the present invention have been explained, and the spirit and scope of the present invention are not limited to the specific description in this specification, as can be understood by those who are skilled in the art.

What is claimed is:

1. A control apparatus for plural devices including a printing device, comprising:
   a scheduling unit which controls a plurality of work flows each of which includes a process executed by a printing device and a pre-print process or a postpress process executed by another device, and which schedules each of the processes of the work flows to be sequentially executed based on an operator's instruction; and
   a reception unit which receives an operator's instruction to complete one work flow among the plurality of work flows in priority to completion of other said work flows, wherein the operator's instruction is inputted by an inputting unit, and
   wherein said scheduling unit schedules so that the one work flow is completed in priority to completion of the other work flows, and schedules each of the processes which are included in the one work flow and the other work flows according to the operator's instruction received by said reception unit.

2. The apparatus according to claim 1, further comprising:
   a device control unit which controls the printing device and the other device, so as that each of the processes which are included in the one work flow and the other work flows are executed as scheduled by said scheduling unit.

3. The apparatus according to claim 2, wherein the printing device has an interruption function for interrupting a printing process being executed and for then executing another process, and wherein if the printing device uses the interruption function to prevent each of the processes which are included in the one work flow and the other work flows from being executed on said schedule, said device control unit inhibits the printing device from using the interruption function.

4. The apparatus according to claim 1, wherein the operator's instruction is an instruction of scheduling each of the processes which are included in the one work flow and the other work flows so as to give priority to a cost upon executing at least two of the plurality of work flows.

5. The apparatus according to claim 1, wherein the operator's instruction is an instruction of scheduling each of the processes which are included in the one work flow and the other work flows so as to give priority to a date of a work flow upon executing at least two of the plurality of work flows.

6. The apparatus according to claim 1, wherein the operator's instruction is an instruction of scheduling each of the processes which are included in the one work flow and the other work flows so as to give priority to quality upon executing at least two of the plurality of work flows.

7. The apparatus according to claim 1, further comprising:
   a display control unit which controls a display unit to display information related to a scheduled result of said scheduling unit.

8. A control method for controlling plural devices including a printing device, comprising:
   a scheduling step which schedules the control of a plurality of work flows each of which includes a process executed by a printing device and a pre-print process or a postpress process executed by another device, and which schedules each of the processes of the work flows to be sequentially executed based on an operator's instruction; and
   a reception step which receives an operator's instruction to complete one work flow among the plurality of work flows in priority to completion of other said work flows, wherein the operator's instruction is inputted by an inputting step, and
   wherein said scheduling step schedules so that the one work flow is completed in priority to completion of the other work flows, and schedules each of the processes which are included in the one work flow and the other work flows according to the operator's instruction received by said reception step.

9. The method according to claim 8, further comprising:
   a device control step which controls the printing device and the other device, so as that each of the processes which are included in the one work flow and the other work flows is executed as scheduled by said scheduling step.

10. The method according to claim 9, wherein the printing device have an interruption function of interrupting process being in execution and for then executing another process, and wherein if the printing device uses the interruption function to prevent each of the processes which are included in the one work flow and the other work flows from being executed on said schedule, said device control step inhibits the printing device from using the interruption function.

11. The method according to claim 8, wherein the operator's instruction is an instruction of scheduling each of the processes which are included in the one work flow and the other work flows so as to give priority to a cost upon executing at least two of the plurality of work flows.

12. The method according to claim 8, wherein the operator's instruction is an instruction of scheduling each of the processes which are included in the one work flow and the other work flows so as to give priority to a date of a work flow upon executing at least two of the plurality of work flows.

13. The method according to claim 8, wherein the operator's instruction is an instruction of scheduling each of the processes which are included in the one work flow and the other work flows so as to give priority to quality upon executing at least two of the plurality of work flows.

14. The method according to claim 8, further comprising:
   a display control step which controls a display unit to display information related to a scheduled result of said scheduling step.

15. A non transitory program stored on a computer-readable medium for use by a computer to perform steps to control plural devices including a printing device, said steps comprising:
   a scheduling step which schedules the control of a plurality of work flows each of which includes a process executed by a printing device and a pre-print process or a postpress process executed by another device, and which schedules each of the processes of the work flows to be sequentially executed based on an operator's instruction; and
   a reception step which receives an operator's instruction to complete one work flow among the plurality of work flows in priority to completion of other said work flows, wherein the operator's instruction is inputted by an inputting step, and
   wherein said scheduling step schedules so that the one work flow is completed in priority to completion of the other work flows, and schedules each of the processes which are included in the one work flow and the other work flows according to the operator's instruction received by said reception step.

* * * * *